US012737903B2

(12) United States Patent
Ivascu et al.

(10) Patent No.: US 12,737,903 B2
(45) **Date of Patent: *Sep. 15, 2026**

(54) METHODS FOR DETERMINING AND REPORTING VEHICLE FOLLOWING DISTANCE

(71) Applicant: Geotab Inc., Oakville (CA)

(72) Inventors: Cristian Florin Ivascu, Hamilton (CA); Joy Mazumder, Etobicoke (CA); Shashank Saurav, Toronto (CA); Javed Siddique, York (CA); Mohammed Sohail Siddique, Milton (CA); Donghao Qiao, Milton (CA)

(73) Assignee: Geotab Inc., Oakville (CA)

( * ) Notice: Subject to any disclaimer, the term of this patent is extended or adjusted under 35 U.S.C. 154(b) by 226 days.

This patent is subject to a terminal disclaimer.

(21) Appl. No.: 18/808,429

(22) Filed: Aug. 19, 2024

(65) Prior Publication Data

US 2024/0412392 A1 Dec. 12, 2024

Related U.S. Application Data

(63) Continuation of application No. 18/620,486, filed on Mar. 28, 2024, now Pat. No. 12,125,222.

(Continued)

(51) Int. Cl.
*G06T 7/50* (2017.01)
*B60W 30/16* (2020.01)
(Continued)

(52) U.S. Cl.
CPC ............... *G06T 7/50* (2017.01); *B60W 30/16* (2013.01); *B60W 50/14* (2013.01); *G01B 11/14* (2013.01);

(Continued)

(58) Field of Classification Search
CPC ......... G06T 7/50; B60W 30/16; B60W 50/14; B60W 2050/143; B60W 2050/146;
(Continued)

(56) References Cited

U.S. PATENT DOCUMENTS 6,950,788 B2 9/2005 Faghri
7,505,841 B2 3/2009 Sun et al.
(Continued)

FOREIGN PATENT DOCUMENTS

CA 3008091 A1 8/2018
CN 110745140 B 1/2021
(Continued)

OTHER PUBLICATIONS

Cao, et al. "A geometry-driven car-following distance estimation algorithm robust to road slopes," Transportation Research Part C: Emerging Technologies, vol. 102, 2019, pp. 274-288, ISSN 0968-090X, (https://www.sciencedirect.com/science/article/pii/S0968 (Year: 2019).*

(Continued)

*Primary Examiner* — Wesley J Tucker
(74) *Attorney, Agent, or Firm* — Mark J. Pringle-Rigby

(57) ABSTRACT

Systems, methods, models, and training data for models are discussed, for determining vehicle positioning, and in particular identifying tailgating. Simulated training images showing vehicles following other vehicles, under various conditions, are generated using a virtual environment. Models are trained to determine following distance between two vehicles. Trained models are used in detection of tailgating, based on determined distance between two vehicles. Results of tailgating are output to warn a driver, or to provide a report on driver behavior. Following distance over time is determined, and simplified following distance data is generated for use at a management device.

18 Claims, 49 Drawing Sheets

Related U.S. Application Data

(60) Provisional application No. 63/606,307, filed on Dec. 5, 2023, provisional application No. 63/537,875, filed on Sep. 12, 2023, provisional application No. 63/526,233, filed on Jul. 12, 2023, provisional application No. 63/456,179, filed on Mar. 31, 2023.

(51) Int. Cl.

| | |
|---|---|
| ***B60W 50/14*** | (2020.01) |
| ***G01B 11/14*** | (2006.01) |
| ***G06V 10/25*** | (2022.01) |
| ***G06V 10/75*** | (2022.01) |
| ***G06V 20/56*** | (2022.01) |
| ***G06V 20/58*** | (2022.01) |
| ***G08G 1/01*** | (2006.01) |
| ***H04W 4/029*** | (2018.01) |
| ***H04W 4/40*** | (2018.01) |

(52) U.S. Cl.

CPC ............ *G06V 10/25* (2022.01); *G06V 10/753* (2022.01); *G06V 20/58* (2022.01); *G06V 20/588* (2022.01); *G08G 1/0112* (2013.01); *G08G 1/0129* (2013.01); *H04W 4/029* (2018.02); *H04W 4/40* (2018.02); *B60W 2050/143* (2013.01); *B60W 2050/146* (2013.01); *B60W 2420/403* (2013.01); *B60W 2552/53* (2020.02); *B60W 2554/802* (2020.02)

(58) Field of Classification Search

CPC ....... B60W 2420/403; B60W 2552/53; B60W 2554/802; G01B 11/14; G06V 10/25; G06V 10/753; G06V 20/58; G06V 20/588; G08G 1/0112; G08G 1/0129; H04W 4/029; H04W 4/40

See application file for complete search history.

(56) References Cited

U.S. PATENT DOCUMENTS 7,676,087 B2 3/2010 Dhua et al.
10,728,420 B2 7/2020 Popa
10,766,489 B2 9/2020 Tuncali et al.
10,818,109 B2 10/2020 Palmer et al.
10,997,434 B2 5/2021 Kurian et al.
11,017,244 B2 5/2021 Xue
11,022,444 B1 6/2021 Bjorkengren
11,138,751 B2 10/2021 Guizilini et al.
11,257,272 B2 2/2022 Rowell et al.
11,336,867 B2 5/2022 Meier et al.
11,373,411 B1 6/2022 Goh et al.
11,390,276 B2 * 7/2022 Yamada ............... G05D 1/0088
11,521,009 B2 12/2022 Peake et al.
11,544,935 B2 1/2023 Chen et al.
11,615,628 B2 3/2023 Tsurumi
11,643,102 B1 5/2023 Calmer et al.
11,683,579 B1 6/2023 Symons et al.
11,704,910 B2 7/2023 Endo et al.
11,758,096 B2 9/2023 Shah et al.
11,866,055 B1 1/2024 Srinivasan et al.
11,989,001 B1 5/2024 Eihattab et al.
11,989,949 B1 * 5/2024 Mazumder ........... G06V 10/774
11,995,546 B1 5/2024 Srinivasan et al.
12,125,222 B1 10/2024 Ivascu et al.
12,330,821 B2 * 6/2025 Xu ........................ B64C 39/024
12,423,864 B2 * 9/2025 Mazumder ................ G06T 7/13
12,586,230 B2 * 3/2026 Mazumder ................ G06T 7/70
2005/0090983 A1 4/2005 Isaji et al.
2005/0125121 A1 6/2005 Isaji et al.
2005/0259033 A1 11/2005 Levine
2006/0273922 A1 12/2006 Bhogal et al.
2010/0110176 A1 5/2010 Aoyama
2012/0119894 A1 5/2012 Pandy
2012/0239268 A1 9/2012 Chen et al.
2013/0057397 A1 3/2013 Cutler et al.
2013/0107051 A1 5/2013 Maruoka et al.
2014/0195093 A1 7/2014 Litkouhi et al.
2014/0222280 A1 8/2014 Salomonsson et al.
2016/0019791 A1 1/2016 Lin
2016/0167514 A1 * 6/2016 Nishizaki ............. B60K 35/213 345/7
2016/0170487 A1 * 6/2016 Saisho .................. B60K 35/10 345/156
2016/0280132 A1 9/2016 Palanimuthu
2017/0261747 A1 9/2017 Acklin
2017/0305419 A1 10/2017 Liebinger Portela et al.
2017/0326981 A1 11/2017 Masui et al.
2017/0327037 A1 11/2017 Prakah-Asante et al.
2017/0369055 A1 12/2017 Saigusa et al.
2018/0001899 A1 1/2018 Shenoy et al.
2019/0001977 A1 1/2019 Lin et al.
2019/0232961 A1 8/2019 Baier et al.
2019/0256105 A1 8/2019 Parat et al.
2019/0389487 A1 12/2019 Gowda et al.
2020/0020121 A1 1/2020 Rawashdeh et al.
2020/0238991 A1 7/2020 Aragon et al.
2020/0342760 A1 10/2020 Vassilovski et al.
2021/0224560 A1 7/2021 Kim et al.
2021/0356696 A1 11/2021 Kamada et al.
2021/0365696 A1 11/2021 He et al.
2021/0366144 A1 11/2021 Magistri et al.
2021/0370969 A1 12/2021 Hegde et al.
2022/0009488 A1 1/2022 Li
2022/0161798 A1 * 5/2022 Kienitz ................ G08G 1/0112
2022/0172396 A1 6/2022 Okuma
2022/0244142 A1 8/2022 Breton
2022/0245955 A1 8/2022 Freeman et al.
2022/0284623 A1 9/2022 Kumar et al.
2022/0371534 A1 11/2022 Zheng
2022/0379889 A1 12/2022 Akella et al.
2023/0077207 A1 3/2023 Hassan et al.
2023/0102113 A1 3/2023 Magistri et al.
2023/0159031 A1 5/2023 Hu et al.
2023/0169793 A1 6/2023 Ogino
2023/0206466 A1 6/2023 Todoran et al.
2023/0227058 A1 7/2023 Julian et al.
2023/0273033 A1 8/2023 Kim et al.
2023/0286498 A1 9/2023 Oguri et al.
2023/0290002 A1 * 9/2023 Yang ..................... G06T 3/4038
2023/0382380 A1 * 11/2023 Herrero Zarzosa .. G06V 20/584
2023/0394843 A1 12/2023 Lee et al.
2024/0005675 A1 1/2024 Lelowicz et al.
2024/0059291 A1 2/2024 Saylor et al.
2024/0174218 A1 * 5/2024 Kuepfer .............. B60W 40/068
2024/0312343 A1 * 9/2024 Ali ........................... G08G 1/04
2024/0331398 A1 * 10/2024 Mazumder ............. G06V 20/58
2024/0331399 A1 * 10/2024 Mazumder ............. G06V 10/44
2025/0191190 A1 * 6/2025 Ivascu ....................... G06T 7/11

FOREIGN PATENT DOCUMENTS

| | | | |
|---|---|---|---|
| CN | 113421298 | A | 9/2021 |
| CN | 113591518 | A | 11/2021 |
| CN | 115035251 | A | 9/2022 |
| DE | 102022208020 | A1 | 2/2023 |
| EP | 3855409 | A1 | 7/2021 |
| JP | H04205825 | A | 7/1992 |
| JP | 4205825 | B2 | 1/2009 |
| KR | 20120021445 | A | 3/2012 |
| KR | 20220119396 | A | 8/2022 |
| WO | 2015134376 | A1 | 9/2015 |
| WO | 2021253245 | A1 | 12/2021 |

OTHER PUBLICATIONS

L.-C. Liu, C.-Y. Fang and S.-W. Chen, "A Novel Distance Estimation Method Leading a Forward Collision Avoidance Assist System for Vehicles on Highways," in IEEE Transactions on Intelligent Transportation Systems, vol. 18, No. 4, pp. 937-949, Apr. 2017, doi: 10.1109/TITS.2016.2597299. (Year: 2017).*

(56) References Cited

OTHER PUBLICATIONS

J. W. Ro, P. S. Roop and A. Malik, "A New Safety Distance Calculation for Rear-End Collision Avoidance," in IEEE Transactions on Intelligent Transportation Systems, vol. 22, No. 3, pp. 1742-1747, Mar. 2021, doi: 10.1109/TITS.2020.2975015. (Year: 2021).*

Extended European Search Report for European Application No. 24165653.7, mailed Sep. 12, 2024, 8 pages.

Anwar A, "What are Intrinsic and Extrinsic Camera Parameters in Computer Vision?", Towards Data Science, 2022, pp. 1-14.

Tram et al ("Vehicle to Vehicle Distance Estimation Using Camera based Visible Light Communications", IEEE 2017, pp. 517-519) (Year: 2017).

Extended European Search Report for European Application No. 24165655.2, mailed Aug. 27, 2024, 134 pages.

* cited by examiner

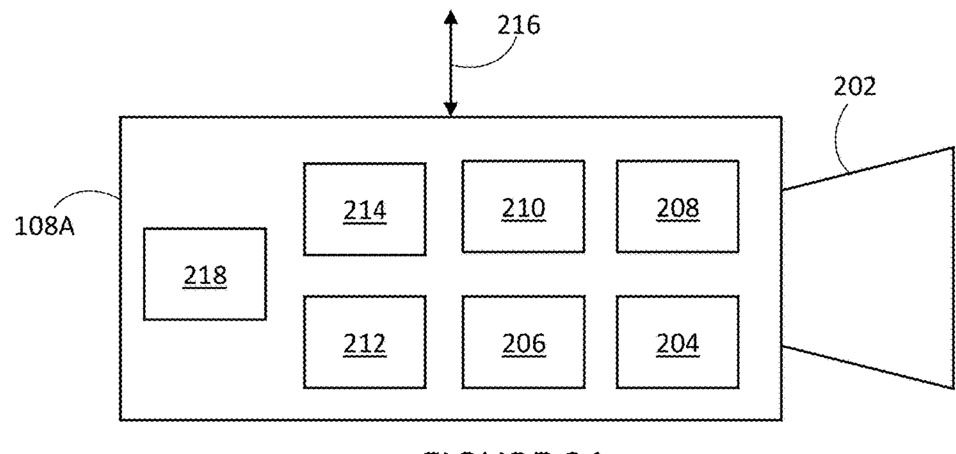
FIGURE 2A
FIGURE 2B
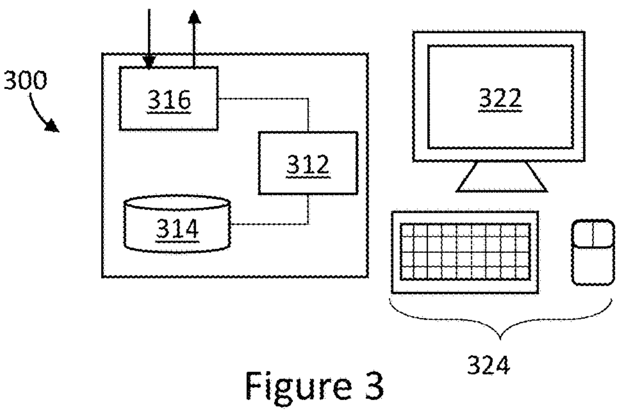
Figure 3

702
710
712
714
790
722
720
700

| Parameter | Range |
|---|---|
| Camera Height | *0.6 to 3m*<br>*+/-0.5m from top of vehicle* |
| Camera Angle | 5 degree is Yaw,<br>5 degree is pitch,<br>5 degree is roll |
| Camera Position-x direction | From 0 m |
| Camera Position-y direction | 1 m from the center of the vehicle |
| Color of the vehicle | random |
| Vehicle Model | random |
| Sun altitude | -32 to 92 degrees |
| Sun azimuth | 2 to 362 |
| Clouds | 2 to 22 |
| Rain amount | 2 to 62 |
| Wind Intensity | 2 to 122 |
| Fog intensity | 2 to 12 |
| Wetness Intensity | 2 to 52 |
| Scattering intensity | 2 to infinity |
| Rayleigh Scattering Scale | 2 to 2 |
| Mie Scattering Scale | 2 to 5 |
| Number of vehicles | **32** |
| Fog Distance | 2 to 122 |
| Fog Fall | 2 to infinity |
| Puddles amount | 2 to 122 |

Figure 18

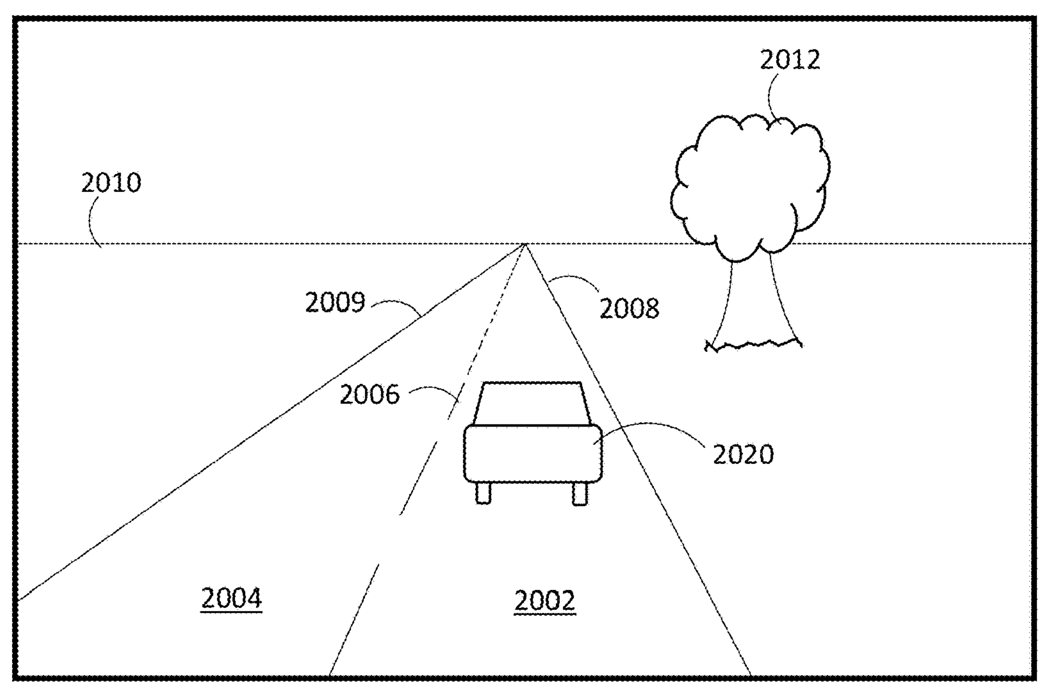
Figure 20A
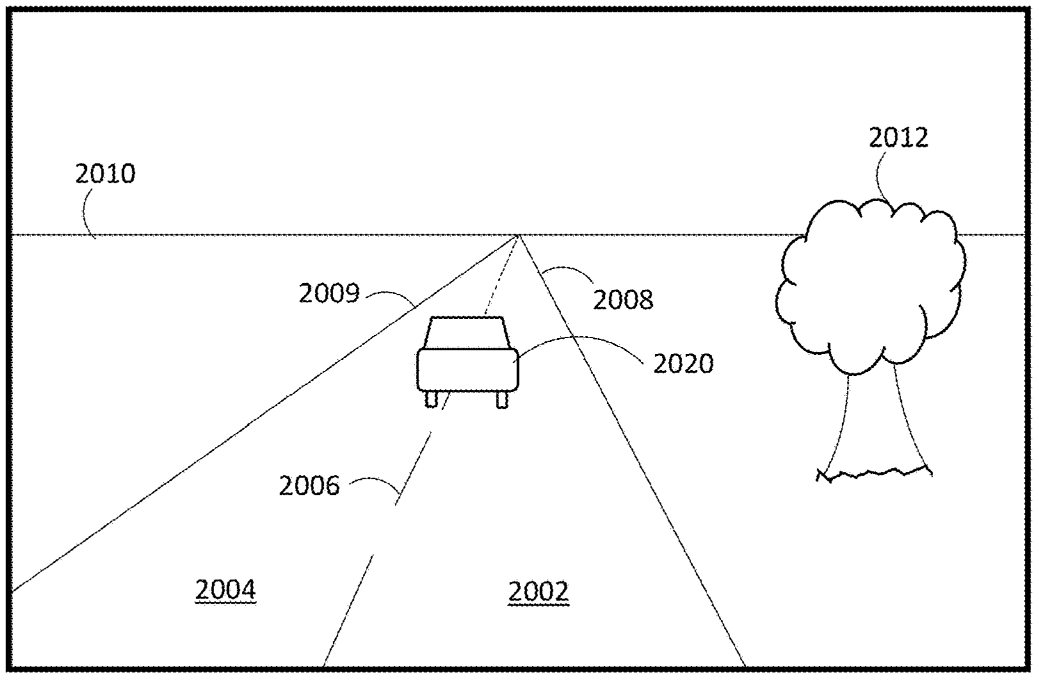
Figure 20B

Alert: Tailgating
Please increase following distance
Following distance = 15 m

2600

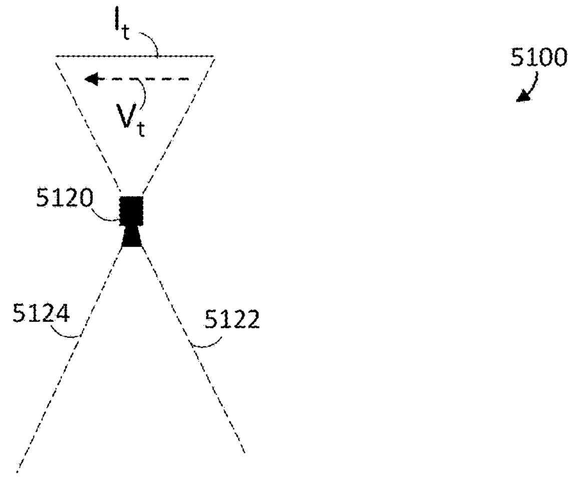
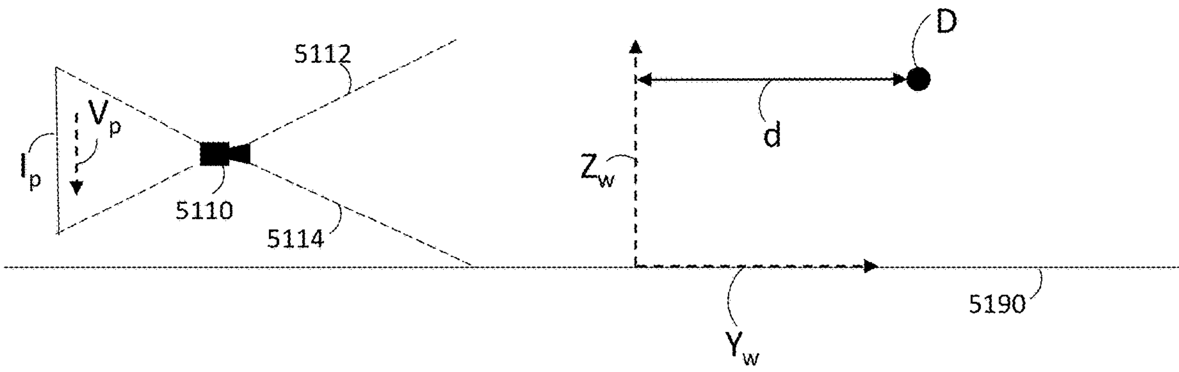
Figure 51

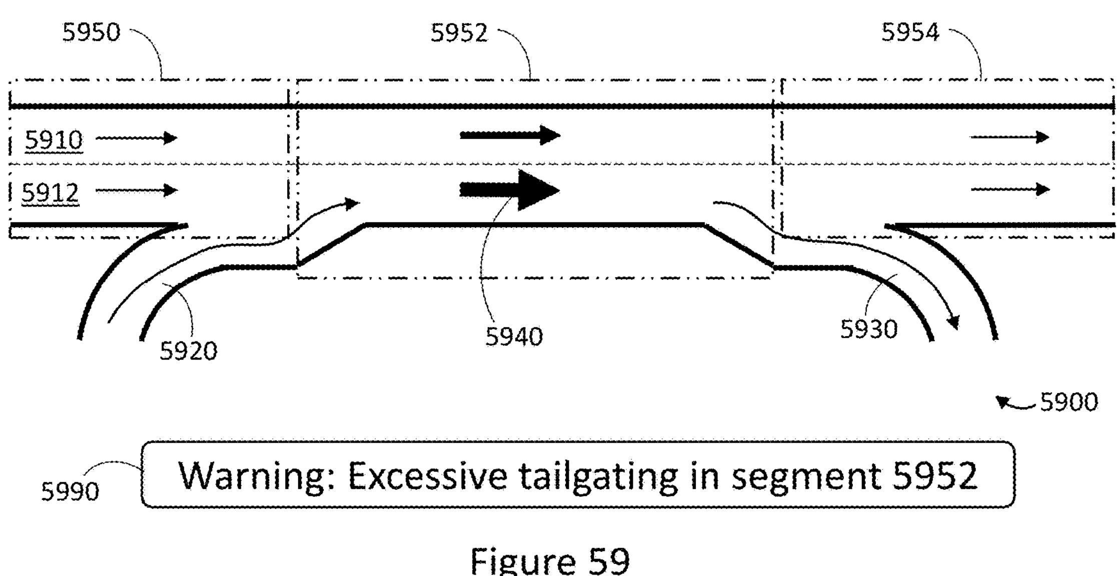

Figure 59

6002 Receive respective simplified following distance data for a plurality of subject vehicles.

6004 Receive respective location data for the plurality of subject vehicles.

6006 For each data point in the simplified following distance data for each subject vehicle of the plurality of subject vehicles: associate a location of the respective subject vehicle at a respective time of the data point with a roadway segment corresponding to the location of the respective subject vehicle at the respective time.

6008 Quantify following distance for the plurality of vehicles for at least one roadway segment of interest.

METHODS FOR DETERMINING AND REPORTING VEHICLE FOLLOWING DISTANCE

PRIOR APPLICATION DATA

This application is a continuation of U.S. Non-Provisional patent application Ser. No. 18/620,486, titled "Systems for Determining and Reporting Vehicle Following Distance", which claims priority to: U.S. Provisional Patent Application No. 63/456,179, titled "Systems and Methods for Detecting Vehicle Following Distance", filed on Mar. 31, 2023; to U.S. Provisional Patent Application No. 63/526,233, titled "Systems and Methods for Detecting Vehicle Following Distance", filed on Jul. 12, 2023; to U.S. Provisional Patent Application No. 63/537,875, titled "Systems and Methods for Detecting Vehicle Following Distance", filed on Sep. 12, 2023; to U.S. Provisional Patent Application No. 63/606,307, titled "Systems and Methods for Detecting Vehicle Following Distance", filed on Dec. 5, 2023, each of which is incorporated in its entirety by reference herein.

TECHNICAL FIELD

The present disclosure generally relates to systems and methods for determining vehicle positioning, and in particular relate to determining vehicle following distance.

BACKGROUND

Monitoring vehicle movement and positioning is advantageous for fleet managers for a variety of reasons, including improving the safety of their fleet. Via real time monitoring, inappropriate behavior or dangerous situations can be identified, and a driver can be immediately alerted of the dangerous situation. Reports can be prepared indicating or summarizing dangerous situations. Such alerts or reports may reduce occurrence of traffic accidents. Further, monitoring vehicle movement and positioning is also useful in self-driving (autonomous) vehicles.

SUMMARY

According to a broad aspect, the present disclosure describes a method for creating training data for training an artificial intelligence to predict a distance between two vehicles, the method comprising: for each instance in a first plurality of instances: accessing respective parameter data, the respective parameter data indicating at least a first position of a first vehicle and a second position of a virtual camera, the first position and the second position specific to the instance, the virtual camera representing a perspective from a second vehicle positioned behind the first vehicle, facing towards the first vehicle; simulating, by at least one processor in a virtual environment, the first vehicle at the first position and the virtual camera at the second position; rendering, by the at least one processor in the virtual environment, at least one image for the instance from the perspective represented by the virtual camera; and outputting the at least one image for the instance, associated with a label indicative of a distance between the first vehicle and the second vehicle; and storing, by at least one non-transitory processor-readable storage medium, a first plurality of images including each at least one image output for each instance of the plurality of instances associated with the respective label indicating distance between the first vehicle and the second vehicle for the respective instance.

The method may further comprise: for each instance in a second plurality of instances: accessing respective parameter data, the respective parameter data indicating at least a third position of a virtual camera representing a perspective from a third vehicle; simulating, by the at least one processor in the virtual environment, the virtual camera at the third position; rendering, by the at least one processor in the virtual environment, at least one image for the instance from a perspective represented by the virtual camera at the third position; and outputting the at least one image for the instance, associated with a label indicative of a distance between two vehicles which is a null value; and storing, by the at least one non-transitory processor-readable storage medium, a second plurality of images including each at least one image output for each instance of the second plurality of instances associated with the respective label indicating a distance between two vehicles which is a null value.

For each instance in the first plurality of instances: the respective parameter data may further indicate the distance between the first vehicle and the second vehicle; and the label indicative of the distance between the first vehicle and the second vehicle may indicate the distance between the first vehicle and the second vehicle as included in the respective parameter data.

The method may further comprise, for each instance in the first plurality of instances: determining, by the at least one processor, the distance between the first vehicle and the second vehicle by determining a difference between the first position and the second position.

For each instance in the first plurality of instances, accessing the respective parameter data may comprise receiving the respective parameter data as user input via a user input device.

For each instance in the first plurality of instances, accessing the respective parameter data may comprise autonomously generating, by the at least one processor, the respective parameter data. For each instance in the first plurality of instances, autonomously generating the respective parameter data may comprise: autonomously determining random values for the first position and the second position, within a defined distance threshold.

For each instance in the first plurality of instances, outputting the at least one image for the instance may comprise outputting the at least one image for the instance associated with a distance label indicative of a distance between the first vehicle and the second vehicle and associated with a vehicle presence label indicative of whether the first vehicle is within a vehicle presence threshold of the second vehicle. The method may further comprise, for each instance in the first plurality of instances: generating, by the at least one processor, the vehicle presence label indicative of whether the first vehicle is within a vehicle presence threshold of the second vehicle, based on relative positions of the first vehicle and the second vehicle.

For each instance in the first plurality of instances: the respective parameter data may further indicate a resolution for the virtual camera; and rendering, by the at least one processor in the virtual environment, at least one image for the instance from the perspective represented by the virtual camera may comprise rendering the at least one image for the instance at the resolution for the virtual camera.

For each instance in the first plurality of instances, the respective parameter data may further indicate at least one parameter selected from a group of parameters consisting of: type of the first vehicle; type of the second vehicle; dimensions of the first vehicle; dimensions of the second vehicle; properties of the first vehicle; properties of the second vehicle; position and orientation of the virtual camera relative to the second vehicle; lens attributes of the virtual camera; weather conditions; lighting conditions; time of day; and date.

The method may further comprise: selecting a subset of instances from the first plurality of instances; for each instance in the subset of instances: autonomously applying a distortion effect to the at least one image output for the instance. The distortion effect may include at least one distortion effect selected from a group of distortion effects comprising: image compression loss; pixel value distribution; adversarial effect; image noise; image saturation; and image blur.

The method may further comprise: selecting a subset of instances from the first plurality of instances; for each instance in the subset of instances: autonomously applying an environmental effect to the at least one image output for the instance. The environmental effect may include at least one environmental effect selected from a group of environmental effects comprising: rain; snow; and fog.

For each instance in the first plurality of instances, rendering, by the at least one processor in the virtual environment, at least one image for the instance from the perspective represented by the virtual camera may comprise: rendering, by the at least one processor in the virtual environment, a single image for the instance from the perspective represented by the virtual camera.

For each instance in the first plurality of instances, rendering, by the at least one processor in the virtual environment, at least one image for the instance from the perspective represented by the virtual camera may comprise: rendering, by the at least one processor in the virtual environment, a plurality of images for the instance from the perspective represented by the virtual camera, each image of the plurality of images for the instance representing a respective moment in time. For each instance in the first plurality of instances, simulating, by at least one processor in a virtual environment, the first vehicle at the first position and the virtual camera at the second position may comprise: simulating, by the at least one processor in the virtual environment, movement of the first vehicle and movement of the virtual camera over each respective moment in time represented by the plurality of images for the instance.

For each instance in the first plurality of instances, the first position of the first vehicle may indicate a longitudinal position and lateral position of the first vehicle.

For each instance in the first plurality of instances, the second position of the virtual camera may indicate a longitudinal position and a lateral position of the virtual camera within a road lane and a height of the virtual camera.

According to another broad aspect, the present disclosure describes a system for creating training data for training an artificial intelligence to predict a distance between two vehicles, the system comprising: at least one processor; at least one non-transitory processor-readable storage medium communicatively coupled to the at least one processor and storing processor-executable instructions which when executed by the at least one processor cause the system to: for each instance in a first plurality of instances: access respective parameter data, the respective parameter data indicating at least a first position of a first vehicle and a second position of a virtual camera, the first position and the second position specific to the instance, the virtual camera representing a perspective from a second vehicle positioned behind the first vehicle, facing towards the first vehicle; simulate, by the at least one processor in a virtual environment, the first vehicle at the first position and the virtual camera at the second position; render, by the at least one processor in the virtual environment, at least one image for the instance from the perspective represented by the virtual camera; and output the at least one image for the instance, associated with a label indicative of a distance between the first vehicle and the second vehicle; and store, by the at least one non-transitory processor-readable storage medium, a first plurality of images including each at least one image output for each instance of the plurality of instances associated with the respective label indicating distance between the first vehicle and the second vehicle for the respective instance.

The processor-executable instructions may further cause the system to: for each instance in a second plurality of instances: access respective parameter data, the respective parameter data indicating at least a third position of a virtual camera representing a perspective from a third vehicle; simulate, by the at least one processor in the virtual environment, the virtual camera at the third position; render, by the at least one processor in the virtual environment, at least one image for the instance from a perspective represented by the virtual camera at the third position; and output the at least one image for the instance, associated with a label indicative of a distance between two vehicles which is a null value; and store, by the at least one non-transitory processor-readable storage medium, a second plurality of images including each at least one image output for each instance of the second plurality of instances associated with the respective label indicating a distance between two vehicles which is a null value.

For each instance in the first plurality of instances: the respective parameter data may further indicate the distance between the first vehicle and the second vehicle; and the label indicative of the distance between the first vehicle and the second vehicle may indicate the distance between the first vehicle and the second vehicle as included in the respective parameter data.

The processor-executable instructions may further cause the system to, for each instance in the first plurality of instances: determine, by the at least one processor, the distance between the first vehicle and the second vehicle by determining a difference between the first position and the second position.

For each instance in the first plurality of instances, the processor-executable instructions which cause the system to access the respective parameter data may cause the system to receive the respective parameter data as user input via a user input device.

For each instance in the first plurality of instances, the processor-executable instructions which cause the system to access the respective parameter data may cause the at least one processor to autonomously generate the respective parameter data. For each instance in the first plurality of instances, the processor-executable instructions which cause the at least one processor to autonomously generate the respective parameter data cause the at least one processor to: autonomously determine random values for the first position and the second position, within a defined distance threshold.

For each instance in the first plurality of instances, the processor-executable instructions which cause the system to output the at least one image for the instance may cause the system to: output the at least one image for the instance associated with a distance label indicative of a distance between the first vehicle and the second vehicle and associated with a vehicle presence label indicative of whether the first vehicle is within a vehicle presence threshold of the second vehicle. The processor-executable instructions may further cause the system to, for each instance in the first plurality of instances: generate, by the at least one processor, the vehicle presence label indicative of whether the first vehicle is within the vehicle presence threshold of the second vehicle, based on relative positions of the first vehicle and the second vehicle.

For each instance in the first plurality of instances: the respective parameter data may further indicate a resolution for the virtual camera; and the processor-executable instructions which cause the system to render, by the at least one processor in the virtual environment, at least one image for the instance from the perspective represented by the virtual camera may cause the at least one processor to: render the at least one image for the instance at the resolution for the virtual camera.

For each instance in the first plurality of instances, the respective parameter data may further indicate at least one parameter selected from a group of parameters consisting of: type of the first vehicle; type of the second vehicle; dimensions of the first vehicle; dimensions of the second vehicle; properties of the first vehicle; properties of the second vehicle; position and orientation of the virtual camera relative to the second vehicle; lens attributes of the virtual camera; weather conditions; lighting conditions; time of day; and date.

The processor-executable instructions may further cause the at least one processor to: select a subset of instances from the first plurality of instances; for each instance in the subset of instances: autonomously apply a distortion effect to the at least one image output for the instance. The distortion effect may include at least one distortion effect selected from a group of distortion effects comprising: image compression loss; pixel value distribution; adversarial effect; image noise; image saturation; and image blur.

The processor-executable instructions may further cause the at least one processor to: select a subset of instances from the first plurality of instances; for each instance in the subset of instances: autonomously apply an environmental effect to the at least one image output for the instance. The environmental effect may include at least one environmental effect selected from a group of environmental effects comprising: rain; snow; and fog.

For each instance in the first plurality of instances, the processor-executable instructions which cause the system to render, by the at least one processor in the virtual environment, at least one image for the instance from the perspective represented by the virtual camera may cause the system to: render, by the at least one processor in the virtual environment, a single image for the instance from the perspective represented by the virtual camera.

For each instance in the first plurality of instances, the processor-executable instructions which cause the system to render, by the at least one processor in the virtual environment, at least one image for the instance from the perspective represented by the virtual camera may cause the system to: render, by the at least one processor in the virtual environment, a plurality of images for the instance from the perspective represented by the virtual camera, each image of the plurality of images for the instance representing a respective moment in time. For each instance in the first plurality of instances, the processor-executable instructions which cause the system to simulate, by the at least one processor in the virtual environment, the first vehicle at the first position and the virtual camera at the second position may cause the system to: simulate, by the at least one processor in the virtual environment, movement of the first vehicle and movement of the virtual camera over each respective moment in time represented by the plurality of images for the instance.

For each instance in the first plurality of instances, the first position of the first vehicle may indicate a longitudinal position and lateral position of the first vehicle.

For each instance in the first plurality of instances, the second position of the virtual camera may indicate a longitudinal position and a lateral position of the virtual camera within a road lane and a height of the virtual camera.

According to yet another broad aspect, the present disclosure describes a method for training a model for determining a distance between a first vehicle and second vehicle comprising: accessing image data, the image data including at least a first set of images, each image in the first set of images including a representation of a respective first vehicle from a perspective of a second respective vehicle behind the first respective vehicle, and each image in the first set of images associated with a distance label indicating a distance between the respective first vehicle and the respective second vehicle; evaluating a following distance loss function for each image in the first set of images, the following loss function including a first term representing a difference between a distance indicated in a respective distance label and a determined distance between the first vehicle and the second vehicle by the model for each respective image; and training the model by minimizing the following distance loss function over the first set of images.

Each image in the first set of images may be further associated with a vehicle presence label indicating whether the distance between the first vehicle is within a vehicle presence threshold of the second vehicle. The following distance loss function may further include a second term representing a difference between the vehicle presence label and a determined vehicle presence for each respective image.

The method may further comprise determining, for each image in the first set of images, whether the first vehicle is within a vehicle presence threshold of the second vehicle, and generating a vehicle presence label associated with each image indicating whether the first vehicle is within the vehicle presence threshold of the second vehicle. The following distance loss function may further include a second term representing a difference between the vehicle presence label and a determined vehicle presence for each respective image.

The method may further comprise determining whether auxiliary criteria are satisfied over the first set of images; and further evaluating the following distance loss function for at least one image in the first set of images, if the auxiliary criteria are not satisfied. The auxiliary criteria may require that the following distance loss function be within a maximum loss threshold for each image in the first set of images. The auxiliary criteria may require that the following distance loss function be within a maximum loss threshold for a defined quantity of images in the first set of images, where the defined quantity of images is smaller than a total quantity of images in the first set of images. The auxiliary criteria may require that the following distance loss function be evaluated for each image in the first set of images. The auxiliary criteria may require that the following distance loss function be evaluated for a defined quantity of images in the first set of images, where the defined quantity of images is smaller than a total quantity of images in the first set of images.

According to yet another broad aspect, the present disclosure describes a system for training a model for determining a distance between a first vehicle and second vehicle, the system comprising: at least one processor; at least one non-transitory processor-readable storage medium communicatively coupled to the at least one processor and storing processor-executable instructions which when executed by the at least one processor cause the system to: access image data, the image data including at least a first set of images, each image in the first set of images including a representation of a respective first vehicle from a perspective of a second respective vehicle behind the first respective vehicle, and each image in the first set of images associated with a distance label indicating a distance between the respective first vehicle and the respective second vehicle; evaluate a following distance loss function for each image in the first set of images, the following loss function including a first term representing a difference between a distance indicated in a respective distance label and a determined distance between the first vehicle and the second vehicle by the model for each respective image; and train the model by minimizing the following distance loss function over the first set of images.

Each image in the first set of images may be further associated with a vehicle presence label indicating whether the first vehicle is within the vehicle presence threshold of the second vehicle. The following distance loss function may further include a second term representing a difference between the vehicle presence label and a determined vehicle presence for each respective image.

The processor-executable instructions may further cause the system to: determine, for each image in the first set of images, whether the first vehicle is within a vehicle presence threshold of the second vehicle, and generate a vehicle presence label associated with each image indicating whether the first vehicle is within the vehicle presence threshold of the second vehicle. The following distance loss function may further include a second term representing a difference between the vehicle presence label and a determined vehicle presence for each respective image.

The processor-executable instructions may further cause the system to: determine whether auxiliary criteria are satisfied over the first set of images; and further evaluate the following distance loss function for at least one image in the first set of images, if the auxiliary criteria are not satisfied. The auxiliary criteria may require that the following distance loss function be within a maximum loss threshold for each image in the first set of images. The auxiliary criteria may require that the following distance loss function be within a maximum loss threshold for a defined quantity of images in the first set of images, where the defined quantity of images is smaller than a total quantity of images in the first set of images. The auxiliary criteria may require that the following distance loss function be evaluated for each image in the first set of images. The auxiliary criteria may require that the following distance loss function be evaluated for a defined quantity of images in the first set of images, where the defined quantity of images is smaller than a total quantity of images in the first set of images.

According to yet another broad aspect, the present disclosure describes a method for identifying tailgating between a first vehicle and second vehicle comprising: accessing image data, the image data including at least at least one image, each image in the image data including a representation of a first vehicle from a perspective of a second vehicle behind the first vehicle; applying, by at least one processor, a following distance determination model to determine a following distance between the first vehicle and the second vehicle; determining, by the at least one processor, whether the following distance is within a tailgating distance criteria; identifying, by the at least one processor, that the second vehicle is not tailgating the first vehicle if the following distance is outside of the tailgating distance criteria; and identifying, by the at least one processor, that the second vehicle is tailgating the first vehicle if tailgating criteria are met, wherein the tailgating criteria includes the following distance being within the tailgating distance criteria.

The method may further comprise: identifying, by the at least one processor, a left-distance indicating a horizontal distance of the first vehicle from a left boundary of the at least one image; identifying, by the at least one processor, a right-distance indicating a horizontal distance of the first vehicle from a right boundary of the at least one image; determining, by the at least one processor, a difference between the left-distance and the right-distance; determining, determining whether the difference between the left-distance and the right-distance is within a horizontal distance criteria, wherein the tailgating criteria includes the difference between the left-distance and the right-distance being within the horizontal distance criteria; and identifying, by the at least one processor, that the second vehicle is not tailgating the first vehicle if the determined difference is outside of the horizontal distance criteria.

Identifying the left-distance may comprise identifying, by the at least one processor, a horizontal distance between a left edge of a bounding box delineating the first vehicle in the at least one image and a left edge of the at least one image; and identifying the right-distance may comprise identifying, by the at least one processor, a horizontal distance between a right edge of a bounding box delineating the first vehicle in the at least one image and a right edge of the at least one image.

Accessing the image data may comprise capturing, by at least one image capture device, the image data.

Accessing the image data may comprise receiving, by at least one communication interface communicatively coupled to the at least one processor, the image data.

Accessing the image data may comprise accessing the image data as stored in at least one non-transitory processor-readable storage medium.

Determining whether the following distance is within the tailgating distance criteria may comprise: determining a first stopping distance for the first vehicle; determining a second stopping distance for the second vehicle; determining that the following distance is within the tailgating distance criteria if the second stopping distance is greater than the first stopping distance plus the following distance; and determining that the following distance is not within the tailgating distance criteria if the second stopping distance is not greater than the first stopping distance plus the following distance. Determining the first stopping distance may comprise estimating the first stopping distance as a minimum distance for the first vehicle to stop; and determining the second stopping distance may comprise estimating the second stopping distance as a maximum distance for the second vehicle to stop.

Determining whether the determined following distance is within the tailgating distance criteria may comprise determining whether the following distance is within a tailgating distance threshold. The tailgating distance threshold may represent a safe following distance limit as a function of speed of the second vehicle.

According to yet another broad aspect, the present disclosure describes a system for identifying tailgating between a first vehicle and second vehicle, the system comprising: at least one processor; at least one non-transitory processor-readable storage medium communicatively coupled to the at least one processor and storing processor-executable instructions which when executed by the at least one processor cause the system to: access image data, the image data including at least at least one image, each image in the image data including a representation of a first vehicle from a perspective of a second vehicle behind the first vehicle; apply, by the at least one processor, a following distance determination model to determine a following distance between the first vehicle and the second vehicle; determine, by the at least one processor, whether the following distance is within a tailgating distance criteria; identify, by the at least one processor, that the second vehicle is not tailgating the first vehicle if the following distance is outside of the tailgating distance criteria; and identify, by the at least one processor, that the second vehicle is tailgating the first vehicle if tailgating criteria are met, wherein the tailgating criteria includes the following distance being within the tailgating distance criteria.

The processor-executable instructions may further cause the system to: identify, by the at least one processor, a left-distance indicating a horizontal distance of the first vehicle from a left boundary of the at least one image; identify, by the at least one processor, a right-distance indicating a horizontal distance of the first vehicle from a right boundary of the at least one image; determine, by the at least one processor, a difference between the left-distance and the right-distance; determine, by the at least one processor, whether the difference between the left-distance and the right-distance is within a horizontal distance criteria, wherein the tailgating criteria includes the difference between the left-distance and the right-distance being within the horizontal distance criteria; and identify, by the at least one processor, that the second vehicle is not tailgating the first vehicle if the determined difference is outside of the horizontal distance criteria.

The processor-executable instructions which cause the system to identify the left-distance may cause the at least one processor to: identify a horizontal distance between a left edge of a bounding box delineating the first vehicle in the at least one image and a left edge of the at least one image; and the processor-executable instructions which cause the system to identify the right-distance cause the at least one processor to: identify a horizontal distance between a right edge of a bounding box delineating the first vehicle in the at least one image and a right edge of the at least one image.

The processor-executable instructions which cause the system to access the image data may cause at least one image capture device of the system to capture the image data.

The processor-executable instructions which cause the system to access the image data may cause the system to receive, by at least one communication interface of the system communicatively coupled to the at least one processor, the image data.

The processor-executable instructions which cause the system to access the image data may cause the system to access the image data as stored in the at least one non-transitory processor-readable storage medium.

The processor-executable instructions which cause the system to determine whether the following distance is within the tailgating distance criteria may cause the at least one processor to: determine a first stopping distance for the first vehicle; determine a second stopping distance for the second vehicle; determine that the following distance is within the tailgating distance criteria if the second stopping distance is greater than the first stopping distance plus the following distance; and determine that the following distance is not within the tailgating distance criteria if the second stopping distance is not greater than the first stopping distance plus the following distance. The processor-executable instructions which cause the at least one processor to determine the first stopping distance may cause the at least one processor to estimate the first stopping distance as a minimum distance for the first vehicle to stop; and the processor-executable instructions which cause the at least one processor to determine the second stopping distance may cause the at least one processor to estimate the second stopping distance as a maximum distance for the second vehicle to stop.

The processor-executable instructions which cause the system to determine whether the following distance is within the tailgating distance criteria may cause the at least one processor to: determine whether the following distance is within a tailgating distance threshold. The tailgating distance threshold may represent a safe following distance limit as a function of speed of the second vehicle.

According to yet another broad aspect, the present disclosure describes a system for determining a following distance between a first vehicle and a second vehicle, the system comprising: at least one processor; and at least one non-transitory processor-readable storage medium communicatively coupled to the at least one processor and storing processor-executable instructions which when executed by the at least one processor cause the system to: access an image including a representation of a first vehicle from a perspective of a second vehicle behind the first vehicle; determine, by the at least one processor, at least one image attribute based on a positional measure between the first vehicle as represented in the image and at least one boundary of the image; and apply, by the at least one processor, a following distance determination model to determine a following distance based on the determined at least one image attribute.

The processor-executable instructions which cause the at least one processor to determine the at least one image attribute may cause the at least one processor to determine the at least one image attribute as including a first distance from a bottom boundary of the image to a bottom of the first vehicle as represented in the image. The processor-executable instructions which cause the at least one processor to determine the at least one image attribute may further cause the at least one processor to determine the at least one image attribute as further including a second distance from a top boundary of the image to a top of the first vehicle as represented in the image.

The processor-executable instructions which cause the at least one processor to determine the at least one image attribute may cause the at least one processor to determine the at least one image attribute as including a cumulative measure of: a first positional measure between a first corner of the image and a first corner of the first vehicle as represented in the image; and a second positional measure between a second corner of the image and a second corner of the first vehicle as represented in the image.

The processor-executable instructions which cause the at least one processor to determine the at least one image attribute may cause the at least one processor to determine the at least one image attribute as including: a first cumulative measure of: a first positional measure between a bottom-left corner of the image and a bottom-left corner of the first vehicle as represented in the image; and a second positional measure between a bottom-right corner of the image and a bottom-right corner of the first vehicle as represented in the image; and a second cumulative measure of: a third positional measure between a top-left corner of the image and a top-left corner of the first vehicle as represented in the image; and a fourth positional measure between a top-right corner of the image and a top-right corner of the first vehicle as represented in the image. The processor-executable instructions which cause the at least one processor to determine the at least one image attribute may cause the at least one processor to determine the at least one image attribute as further including: a third cumulative measure of: a fifth positional measure between a bottom-left corner of the image and a bottom-right corner of the first vehicle as represented in the image; and a sixth positional measure between a bottom-right corner of the image and a bottom-left corner of the first vehicle as represented in the image; and a fourth cumulative measure of: a seventh positional measure between a top-left corner of the image and a top-right corner of the first vehicle as represented in the image; and an eighth positional measure between a top-right corner of the image and a top-left corner of the first vehicle as represented in the image.

The processor-executable instructions which cause the at least one processor to determine the at least one image attribute may cause the at least one processor to determine the at least one image attribute based on respective positional measures between each corner of the image and each corner of the first vehicle as represented in the image.

The processor-executable instructions which cause the at least one processor to determine the at least one image attribute may cause the at least one processor to determine the at least one image attribute as including a first positional measure of a first corner of the first vehicle as represented in the image from a first corner of the image. The processor-executable instructions which cause the at least one processor to determine the at least one image attribute may cause the at least one processor to determine the at least one image attribute as further including a second positional measure of a second corner of the first vehicle as represented in the image from the first corner of the image. The processor-executable instructions which cause the at least one processor to determine the at least one image attribute may cause the at least one processor to determine the at least one image attribute as further including a scale measure of a size of the first vehicle as represented in the image.

The processor-executable instructions may further cause the system to: determine, by the at least one processor, whether the following distance is within a tailgating distance criteria; identify, by the at least one processor, that the second vehicle is not tailgating the first vehicle if the following distance is outside of the tailgating distance criteria; and identify, by the at least one processor, that the second vehicle is tailgating the first vehicle if tailgating criteria are met, wherein the tailgating criteria includes the following distance being within the tailgating distance criteria. The processor-executable instructions may further cause the system to, in response to an identification that the second vehicle is tailgating the first vehicle, output a tailgating indication to a driver of the second vehicle. The processor-executable instructions may further cause the system to, in response to an identification that the second vehicle is tailgating the first vehicle, output a tailgating indication to a management server.

The processor-executable instructions which cause the system to access the image may cause at least one image capture device of the system to capture the image.

The processor-executable instructions which cause the system to access the image may cause the system to receive, by at least one communication interface of the system communicatively coupled to the at least one processor, the image.

The processor-executable instructions which cause the system to access the image may cause the system to access the image as stored in the at least one non-transitory processor-readable storage medium.

According to yet another broad aspect, the present disclosure describes a method for determining a following distance between a first vehicle and a second vehicle, the method comprising: accessing an image including a representation of a first vehicle from a perspective of a second vehicle behind the first vehicle; determining, by the at least one processor, at least one image attribute based on a positional measure between the first vehicle as represented in the image and at least one boundary of the image; and applying, by the at least one processor, a following distance determination model to determine a following distance based on the determined at least one image attribute.

Determining the at least one image attribute may comprise determining the at least one image attribute as including a first distance from a bottom boundary of the image to a bottom of the first vehicle as represented in the image. Determining the at least one image attribute may further comprise determining the at least one image attribute as further including a second distance from a top boundary of the image to a top of the first vehicle as represented in the image.

Determining the at least one image attribute may comprise determining the at least one image attribute as including a cumulative measure of: a first positional measure between a first corner of the image and a first corner of the first vehicle as represented in the image; and a second positional measure between a second corner of the image and a second corner of the first vehicle as represented in the image.

Determining the at least one image attribute may comprise determining the at least one image attribute as including: a first cumulative measure of: a first positional measure between a bottom-left corner of the image and a bottom-left corner of the first vehicle as represented in the image; and a second positional measure between a bottom-right corner of the image and a bottom-right corner of the first vehicle as represented in the image; and a second cumulative measure of: a third positional measure between a top-left corner of the image and a top-left corner of the first vehicle as represented in the image; and a fourth positional measure between a top-right corner of the image and a top-right corner of the first vehicle as represented in the image. Determining the at least one image attribute may comprise determining the at least one image attribute as further including: a third cumulative measure of: a fifth positional measure between a bottom-left corner of the image and a bottom-right corner of the first vehicle as represented in the image; and a sixth positional measure between a bottom-right corner of the image and a bottom-left corner of the first vehicle as represented in the image; and a fourth cumulative measure of: a seventh positional measure between a top-left corner of the image and a top-right corner of the first vehicle as represented in the image; and an eighth positional measure between a top-right corner of the image and a top-left corner of the first vehicle as represented in the image.

Determining the at least one image attribute may comprise determining the at least one image attribute based on respective positional measures between each corner of the image and each corner of the first vehicle as represented in the image.

Determining the at least one image attribute may comprise determining the at least one image attribute as including a first positional measure of a first corner of the first vehicle as represented in the image from a first corner of the image. Determining the at least one image attribute may comprise determining the at least one image attribute as further including a second positional measure of a second corner of the first vehicle as represented in the image from the first corner of the image. Determining the at least one image attribute may comprise determining the at least one image attribute as further including a scale measure of a size of the first vehicle as represented in the image.

The method may further comprise: determining, by the at least one processor, whether the following distance is within a tailgating distance criteria; identifying, by the at least one processor, that the second vehicle is not tailgating the first vehicle if the following distance is outside of the tailgating distance criteria; and identifying, by the at least one processor, that the second vehicle is tailgating the first vehicle if tailgating criteria are met, wherein the tailgating criteria includes the following distance being within the tailgating distance criteria. The method may further comprise in response to an identification that the second vehicle is tailgating the first vehicle, outputting a tailgating indication to a driver of the second vehicle. The method may further comprise in response to an identification that the second vehicle is tailgating the first vehicle, outputting a tailgating indication to a management server.

Accessing the image may comprise at least one image capture device of the system capturing the image. Accessing the image may comprise receiving, by at least one communication interface of the system communicatively coupled to the at least one processor, the image. Accessing the image may comprise accessing the image as stored in the at least one non-transitory processor-readable storage medium.

According to yet another broad aspect, the present disclosure describes a system for training a model for determining a distance between a first vehicle and second vehicle, the system comprising: at least one processor; at least one non-transitory processor-readable storage medium communicatively coupled to the at least one processor and storing processor-executable instructions which when executed by the at least one processor cause the system to: access image data, the image data including at least a first set of images, each image in the first set of images including a representation of a respective first vehicle from a perspective of a second respective vehicle behind the first respective vehicle, and each image in the first set of images associated with a distance label indicating a distance between the respective first vehicle and the respective second vehicle; determine, by the at least one processor, for at least one image in the first set of image, at least one image attribute based on a positional measure between the first vehicle as represented in the image and at least one boundary of the image; evaluate a following distance loss function for the at least one image in the first set of images, the following distance loss function representing a difference between a distance indicated in a respective distance label and a determined distance between the first vehicle and the second vehicle by the model for each respective image; and train the model by minimizing the following distance loss function over the first set of images.

The processor-executable instructions which cause the at least one processor to determine the at least one image attribute may cause the at least one processor to determine the at least one image attribute as including a first distance from a bottom boundary of the image to a bottom of the first vehicle as represented in the image. The processor-executable instructions which cause the at least one processor to determine the at least one image attribute may further cause the at least one processor to determine the at least one image attribute as further including a second distance from a top boundary of the image to a top of the first vehicle as represented in the image.

The processor-executable instructions which cause the at least one processor to determine the at least one image attribute may cause the at least one processor to determine the at least one image attribute as including a cumulative measure of: a first positional measure between a first corner of the image and a first corner of the first vehicle as represented in the image; and a second positional measure between a second corner of the image and a second corner of the first vehicle as represented in the image.

The processor-executable instructions which cause the at least one processor to determine the at least one image attribute may cause the at least one processor to determine the at least one image attribute as including: a first cumulative measure of: a first positional measure between a bottom-left corner of the image and a bottom-left corner of the first vehicle as represented in the image; and a second positional measure between a bottom-right corner of the image and a bottom-right corner of the first vehicle as represented in the image; and a second cumulative measure of: a third positional measure between a top-left corner of the image and a top-left corner of the first vehicle as represented in the image; and a fourth positional measure between a top-right corner of the image and a top-right corner of the first vehicle as represented in the image. The processor-executable instructions which cause the at least one processor to determine the at least one image attribute may cause the at least one processor to determine the at least one image attribute as further including: a third cumulative measure of: a fifth positional measure between a bottom-left corner of the image and a bottom-right corner of the first vehicle as represented in the image; and a sixth positional measure between a bottom-right corner of the image and a bottom-left corner of the first vehicle as represented in the image; and a fourth cumulative measure of: a seventh positional measure between a top-left corner of the image and a top-right corner of the first vehicle as represented in the image; and an eighth positional measure between a top-right corner of the image and a top-left corner of the first vehicle as represented in the image.

The processor-executable instructions which cause the at least one processor to determine the at least one image attribute may cause the at least one processor to determine the at least one image attribute based on respective positional measures between each corner of the image and each corner of the first vehicle as represented in the image.

The processor-executable instructions which cause the at least one processor to determine the at least one image attribute may cause the at least one processor to determine the at least one image attribute as including a first positional measure of a first corner of the first vehicle as represented in the image from a first corner of the image. The processor-executable instructions which cause the at least one processor to determine the at least one image attribute may cause the at least one processor to determine the at least one image attribute as further including a second positional measure of a second corner of the first vehicle as represented in the image from the first corner of the image. The processor-executable instructions which cause the at least one processor to determine the at least one image attribute may cause the at least one processor to determine the at least one image attribute as further including a scale measure of a size of the first vehicle as represented in the image.

The processor-executable instructions may further cause the system to: determine whether auxiliary criteria are satisfied over the first set of images; and further evaluate the following distance loss function for at least one image in the first set of images, if the auxiliary criteria are not satisfied. The auxiliary criteria may require that the following distance loss function be within a maximum loss threshold for each image in the first set of images. The auxiliary criteria may require that the following distance loss function be within a maximum loss threshold for a defined quantity of images in the first set of images, where the defined quantity of images is smaller than a total quantity of images in the first set of images. The auxiliary criteria may require that the following distance loss function be evaluated for each image in the first set of images. The auxiliary criteria may require that the following distance loss function be evaluated for a defined quantity of images in the first set of images, where the defined quantity of images is smaller than a total quantity of images in the first set of images.

According to yet another broad aspect, the present disclosure describes a method for training a model for determining a distance between a first vehicle and second vehicle, the method comprising: accessing image data, the image data including at least a first set of images, each image in the first set of images including a representation of a respective first vehicle from a perspective of a second respective vehicle behind the first respective vehicle, and each image in the first set of images associated with a distance label indicating a distance between the respective first vehicle and the respective second vehicle; determining, by the at least one processor, for at least one image in the first set of images, at least one image attribute based on a positional measure between the first vehicle as represented in the image and at least one boundary of the image; evaluating a following distance loss function for the at least one image in the first set of images, the following distance loss function representing a difference between a distance indicated in a respective distance label and a determined distance between the first vehicle and the second vehicle by the model for each respective image; and training the model by minimizing the following distance loss function over the first set of images.

Determining the at least one image attribute may comprise determining the at least one image attribute as including a first distance from a bottom boundary of the image to a bottom of the first vehicle as represented in the image. Determining the at least one image attribute may further comprise determining the at least one image attribute as further including a second distance from a top boundary of the image to a top of the first vehicle as represented in the image.

Determining the at least one image attribute may comprise determining the at least one image attribute as including a cumulative measure of: a first positional measure between a first corner of the image and a first corner of the first vehicle as represented in the image; and a second positional measure between a second corner of the image and a second corner of the first vehicle as represented in the image.

Determining the at least one image attribute may comprise determining the at least one image attribute as including: a first cumulative measure of: a first positional measure between a bottom-left corner of the image and a bottom-left corner of the first vehicle as represented in the image; and a second positional measure between a bottom-right corner of the image and a bottom-right corner of the first vehicle as represented in the image; and a second cumulative measure of: a third positional measure between a top-left corner of the image and a top-left corner of the first vehicle as represented in the image; and a fourth positional measure between a top-right corner of the image and a top-right corner of the first vehicle as represented in the image. Determining the at least one image attribute may comprise determining the at least one image attribute as further including: a third cumulative measure of: a fifth positional measure between a bottom-left corner of the image and a bottom-right corner of the first vehicle as represented in the image; and a sixth positional measure between a bottom-right corner of the image and a bottom-left corner of the first vehicle as represented in the image; and a fourth cumulative measure of: a seventh positional measure between a top-left corner of the image and a top-right corner of the first vehicle as represented in the image; and an eighth positional measure between a top-right corner of the image and a top-left corner of the first vehicle as represented in the image.

Determining the at least one image attribute may comprise determining the at least one image attribute based on respective positional measures between each corner of the image and each corner of the first vehicle as represented in the image.

Determining the at least one image attribute may comprise determining the at least one image attribute as including a first positional measure of a first corner of the first vehicle as represented in the image from a first corner of the image. Determining the at least one image attribute may comprise determining the at least one image attribute as further including a second positional measure of a second corner of the first vehicle as represented in the image from the first corner of the image. Determining the at least one image attribute may comprise determining the at least one image attribute as further including a scale measure of a size of the first vehicle as represented in the image.

The method may further comprise: determining whether auxiliary criteria are satisfied over the first set of images; and further evaluating the following distance loss function for at least one image in the first set of images, if the auxiliary criteria are not satisfied. The auxiliary criteria may require that the following distance loss function be within a maximum loss threshold for each image in the first set of images. The auxiliary criteria may require that the following distance loss function be within a maximum loss threshold for a defined quantity of images in the first set of images, where the defined quantity of images is smaller than a total quantity of images in the first set of images. The auxiliary criteria may require that the following distance loss function be evaluated for each image in the first set of images. The auxiliary criteria may require that the following distance loss function be evaluated for a defined quantity of images in the first set of images, where the defined quantity of images is smaller than a total quantity of images in the first set of images.

According to yet another broad aspect, the present disclosure describes a system for determining a following distance between a first vehicle and a second vehicle, the system comprising: at least one processor; and at least one non-transitory processor-readable storage medium communicatively coupled to the at least one processor and storing processor-executable instructions which when executed by the at least one processor cause the system to: access an image including a representation of the first vehicle from a perspective of the second vehicle behind the first vehicle, the image further representing a common lane of travel of the first vehicle and the second vehicle; determine, by the at least one processor, a first vertical position in the image representing a bottom of the first vehicle; access, by the at least one processor, a second vertical position in the image representing a static physical distance from the second vehicle; determine a transformed first vertical position by applying, by the at least one processor, an image transformation matrix to the first vertical position; determine a transformed second vertical position by applying, by the at least one processor, the image transformation matrix to the second vertical position; determine an image distance between the transformed first vertical position and the transformed second vertical position; determine the following distance as a physical distance between the first vehicle and the second vehicle based on the determined image distance and the static physical distance; and output the determined following distance.

The first vertical position may represent a bottom boundary of a bounding box which encompasses the first vehicle. The second vertical position may represent a distal end of a hood of the second vehicle as represented in the image.

The image transformation matrix may represent a transformation of the image to a transformed image having a fixed relationship between pixel size in the transformed image and physical distance represented by the transformed image.

The processor-executable instructions may further cause the system to: determine a first boundary of the common lane of travel; determine a second boundary of the common lane of travel; determine a vanishing point for the image as a point where the first boundary and the second boundary intersect; access a region of interest in the image, where a bottom edge and a top edge of the region of interest are parallel to a horizontal axis of the image, a left edge of the region of interest extends from first point left of the common lane of travel towards the vanishing point, and a right edge of the region of interest extends from a second point right of the common lane of travel towards the vanishing point; determine a transformed region of interest where a left edge of the transformed region of interest is parallel to a right edge of the transformed region of interest; and determine the image transformation matrix as a matrix which when applied to the region of interest, transforms the region of interest to the determined transformed region of interest. The first point may be at a left boundary of the image and the second point may be at a right boundary of the image. The bottom edge of the region of interest may be positioned above a hood of the second vehicle as represented in the image, and the top edge of the region of interest may be positioned below the vanishing point. The processor-executable instructions which cause the system to access the region of interest in the image may cause the system to receive an indication of the region of interest as user input via a user input device. The processor-executable instructions which cause the system to access the region of interest in the image may cause the at least one processor to generate boundaries of the region of interest. The processor executable instructions which cause the system to determine the transformed region of interest may cause the at least one processor to determine four corners points of a rectangle corresponding to the transformed region of interest. The processor-executable instructions may further cause the at least one processor to: determine a ratio of image distance to physical distance for a vertical axis of the image as transformed according to the image transformation matrix, based on a received measurement for a physical distance coaxial to the common lane and an image distance coaxial to the common lane as represented in the transformed region of interest. The processor-executable instructions may further cause the at least one processor to: determine a ratio of image distance to physical distance for a horizontal axis of the image as transformed according to the image transformation matrix, based on a received measurement for a physical width of the common lane and an image distance width of the common lane as represented in the transformed region of interest. The processor-executable instructions may further cause the at least one processor to: determine a ratio of image distance to physical distance for a vertical axis of the image as transformed according to the image transformation matrix, based on the ratio of image distance to physical distance for the horizontal axis of the image and based on the image transformation matrix.

The static physical distance may be received as a physical measurement between a front of the second vehicle and content represented in the image at the second vertical position.

The processor-executable instructions may further cause the system to: determine, by the at least one processor, whether the following distance is within a tailgating distance criteria; identify, by the at least one processor, that the second vehicle is not tailgating the first vehicle if the following distance is outside of the tailgating distance criteria; and identify, by the at least one processor, that the second vehicle is tailgating the first vehicle if tailgating criteria are met, wherein the tailgating criteria includes the following distance being within the tailgating distance criteria. The processor-executable instructions may further cause the system to, in response to an identification that the second vehicle is tailgating the first vehicle, output a tailgating indication to a driver of the second vehicle. The processor-executable instructions may further cause the system to, in response to an identification that the second vehicle is tailgating the first vehicle, output a tailgating indication to a management server.

The processor-executable instructions which cause the system to access the image may cause at least one image capture device of the system to capture the image.

The processor-executable instructions which cause the system to access the image may cause the system to receive, by at least one communication interface of the system communicatively coupled to the at least one processor, the image.

The processor-executable instructions which cause the system to access the image may cause the system to access the image as stored in the at least one non-transitory processor-readable storage medium.

According to yet another broad aspect, the present disclosure describes a method for determining a following distance between a first vehicle and a second vehicle, the method comprising: accessing an image including a representation of the first vehicle from a perspective of the second vehicle behind the first vehicle, the image further representing a common lane of travel of the first vehicle and the second vehicle; determining, by at least one processor, a first vertical position in the image representing a bottom of the first vehicle; accessing, by the at least one processor, a second vertical position in the image representing a static physical distance from the second vehicle; determining a transformed first vertical position by applying, by the at least one processor, an image transformation matrix to the first vertical position; determining a transformed second vertical position by applying, by the at least one processor, the image transformation matrix to the second vertical position; determining an image distance between the transformed first vertical position and the transformed second vertical position; determining the following distance as a physical distance between the first vehicle and the second vehicle based on the determined image distance and the static physical distance; and outputting the determined following distance.

The first vertical position may represent a bottom boundary of a bounding box which encompasses the first vehicle. The second vertical position may represent a distal end of a hood of the second vehicle as represented in the image.

The image transformation matrix may represent a transformation of the image to a transformed image having a fixed relationship between pixel size in the transformed image and physical distance represented by the transformed image.

The method may further comprise: determining a first boundary of the common lane of travel; determining a second boundary of the common lane of travel; determining a vanishing point for the image as a point where the first boundary and the second boundary intersect; accessing a region of interest in the image, where a bottom edge and a top edge of the region of interest are parallel to a horizontal axis of the image, a left edge of the region of interest extends from first point left of the common lane of travel towards the vanishing point, and a right edge of the region of interest extends from a second point right of the common lane of travel towards the vanishing point; determining a transformed region of interest where a left edge of the transformed region of interest is parallel to a right edge of the transformed region of interest; and determining the image transformation matrix as a matrix which when applied to the region of interest, transforms the region of interest to the determined transformed region of interest. The first point may be at a left boundary of the image and the second point may be at a right boundary of the image. The bottom edge of the region of interest may be positioned above a hood of the second vehicle as represented in the image, and the top edge of the region of interest may be positioned below the vanishing point. Accessing the region of interest in the image may comprise receiving an indication of the region of interest as user input via a user input device. Accessing the region of interest in the image may comprise generating, by the at least one processor, boundaries of the region of interest. Determining the transformed region of interest may comprise determining four corner points of a rectangle corresponding to the transformed region of interest. The method may further comprise: determining a ratio of image distance to physical distance for a vertical axis of the image as transformed according to the image transformation matrix, based on a received measurement for a physical distance coaxial to the common lane and an image distance coaxial to the common lane as represented in the transformed region of interest. The method may further comprise: determining a ratio of image distance to physical distance for a horizontal axis of the image as transformed according to the image transformation matrix, based on a received measurement for a physical width of the common lane and an image distance width of the common lane as represented in the transformed region of interest. The method may further comprise: determining a ratio of image distance to physical distance for a vertical axis of the image as transformed according to the image transformation matrix, based on the ratio of image distance to physical distance for the horizontal axis of the image and based on the image transformation matrix.

The static physical distance may be received as a physical measurement between a front of the second vehicle and content represented in the image at the second vertical position.

The method may further comprise: determining, by the at least one processor, whether the following distance is within a tailgating distance criteria; identifying, by the at least one processor, that the second vehicle is not tailgating the first vehicle if the following distance is outside of the tailgating distance criteria; and identifying, by the at least one processor, that the second vehicle is tailgating the first vehicle if tailgating criteria are met, wherein the tailgating criteria includes the following distance being within the tailgating distance criteria. The method may further comprise, in response to an identification that the second vehicle is tailgating the first vehicle, outputting a tailgating indication to a driver of the second vehicle. The method may further comprise, in response to an identification that the second vehicle is tailgating the first vehicle, outputting a tailgating indication to a management server.

Accessing the image may comprise capturing the image by at least one image capture device of the system.

Accessing the image may comprise receiving, by at least one communication interface of the system communicatively coupled to the at least one processor, the image.

Accessing the image may comprise accessing the image as stored in at least one non-transitory processor-readable storage medium of the system.

According to yet another broad aspect, the present disclosure describes a method for generating following distance data over time for a subject vehicle, the method comprising: accessing a set of images, each image of the set of images being from a perspective of the subject vehicle and including a respective representation of another vehicle positioned in front of the subject vehicle, and each image of the set of images being associated with a respective time; generating following distance data based on at least a subset of images in the set of images, by: for each image in the subset of images, determining a respective physical distance between the subject vehicle and the other vehicle; and compiling the following distance data over time as a plurality of following distance data points, each following distance data point representing the determined physical distance for a respective image in the subset of images and the time associated with the respective image in the subset of images; generating simplified following distance data, by: identifying select data points from the following distance data for inclusion in the simplified following distance data, based on differences between the data points and iteratively-defined reference lines through portions of the following distance data; and compiling the select data points as the simplified following distance data, excluding data points which are not identified as select data points; and outputting the simplified following distance data.

Identifying select data points from the following distance data for inclusion in the simplified following distance data, based on differences between the data points and iteratively-defined reference lines through portions of the following distance data, may comprise, for each data point of the following distance data: determining a minimum difference between the data point and a corresponding reference line of the iteratively-defined reference lines; and identifying the data point as a select data point if the minimum difference between the data point and the corresponding reference line exceeds a difference threshold.

Identifying select data points from the following distance data for inclusion in the simplified following distance data, based on differences between the data points and iteratively-defined reference lines through portions of the following distance data, may comprise: defining a reference line through the following distance data; identifying a candidate data point of the following distance data, where a minimum difference between the candidate data point and the reference line is greater than a minimum difference between other data points and the reference line; and if the minimum difference between the candidate data point and the reference line exceeds a difference threshold: identifying the candidate data point as a select data point for inclusion in the simplified following distance data; and defining new reference lines which intersect the candidate data point through the following distance data. Identifying select data points from the following distance data for inclusion in the simplified following distance data, based on differences between the data points and iteratively-defined reference lines through portions of the following distance data, may further comprise: defining an additional reference line through the following distance data which intersects a select data point previously identified for inclusion in the simplified following distance data; identifying an additional candidate data point of the following distance data, where a minimum difference between the additional candidate data point and the additional reference line is greater than a minimum difference between other data points and the additional reference line; and if the minimum difference between the additional candidate data point and the additional reference line exceeds the difference threshold: identifying the additional candidate data point as an additional select data point for inclusion in the simplified following distance data.

The following distance data may comprise at least one data series of following distance data points; identifying select data points from the following distance data for inclusion in the simplified following distance data, based on differences between the data points and iteratively-defined reference lines through portions of the following distance data, may comprise, for each data series in the following distance data, until all data points in each data series are within a distance threshold of a corresponding reference line: identifying a first data point in the data series and a last data point in the data series as select data points for inclusion in the simplified following distance data; defining a reference line between the first data point in the data series and the last data point in the data series; identifying a candidate data point between the first data point in the data series and the last data point in the data series, where a minimum difference between the candidate data point and the reference line is greater than a minimum difference between other data points in the data series and the reference line; if the minimum difference between the candidate data point and the reference line exceeds a difference threshold: identifying the candidate data point as a select data point for inclusion in the simplified following distance data; defining a component data series between the first data point in the data series and the candidate data point; and defining another component data series between the candidate data point and the last data point in the data series; and if the minimum difference between the candidate data point and the reference line exceeds a difference threshold: excluding each data point of the data series between the first data point and the last data point from inclusion in the simplified following distance data.

The method may further comprise: accessing a plurality of images captured by an image capture device positioned at the subject vehicle; and identifying the set of images as images of the plurality of images which include another vehicle positioned in front of the subject vehicle.

The method may further comprise: accessing a plurality of images captured by an image capture device positioned at the subject vehicle; and identifying the set of images as images of the plurality of images which include another vehicle positioned in front of the subject vehicle and in a common lane of travel with the subject vehicle.

For each image in the subset of images, determining the respective physical distance between the subject vehicle and the other vehicle may comprise: applying a following distance determination model to the respective image, the following distance determination model being a machine learning model trained based on minimization of a following distance loss function for a training set of images representing a respective lead vehicle from a perspective of a following vehicle associated with a label indicating following distance between the lead vehicle and the following vehicle.

For each image in the subset of images, determining the respective physical distance between the subject vehicle and the other vehicle may comprise: determining, by the at least one processor, at least one image attribute based on a positional measure between the other vehicle as represented in the respective image and at least one boundary of the image; and applying, by the at least one processor, a following distance determination model to determine a following distance based on the determined at least one image attribute.

For each image in the subset of images, determining the respective physical distance between the subject vehicle and the other vehicle may comprise: determining, by at least one processor, a first vertical position in the image representing a bottom of the other vehicle; accessing, by the at least one processor, a second vertical position in the image representing a static physical distance from the subject vehicle; determining a transformed first vertical position by applying, by the at least one processor, an image transformation matrix to the first vertical position; determining a transformed second vertical position by applying, by the at least one processor, the image transformation matrix to the second vertical position; determining an image distance between the transformed first vertical position and the transformed second vertical position; and determining the following distance as a physical distance between the other vehicle and the subject vehicle based on the determined image distance and the static physical distance.

Outputting the simplified following distance data may comprise transmitting, by a communication interface positioned at the subject vehicle, the simplified following distance data to a device remote from the subject vehicle. The method may further comprise presenting, by a user interface of the device remote from the vehicle, at least a portion of the following distance data.

The method may further comprise, for each data point in the simplified following distance data: determining, by the at least one processor, whether the respective physical distance between the subject vehicle and the other vehicle for the data point is within a tailgating distance criteria; identifying, by the at least one processor, that the subject vehicle is not tailgating the other vehicle at a time corresponding to the data point if the respective physical distance is outside of the tailgating distance criteria; and identifying, by the at least one processor, that the subject vehicle is tailgating the other vehicle at a time corresponding to the data point if tailgating criteria are met, wherein the tailgating criteria includes the respective physical distance being within the tailgating distance criteria. The method may further comprise, in response to an identification that the subject vehicle is tailgating the other vehicle, outputting a tailgating indication. Outputting the tailgating indication may comprise transmitting the tailgating indication to a management device. The method may further comprise: receiving, at a management device, respective simplified following distance data for a plurality of subject vehicles; receiving, at the management device, location data for the plurality of subject vehicles; accessing, by the management device, respective tailgating indications for the plurality of subject vehicles; and for each tailgating indication, associating a location of the respective subject vehicle as indicated in the location data, at a time of the tailgating indication, with a roadway segment corresponding to the location of the subject vehicle. The method may further comprise: quantifying, by at least one processor of the management device, an amount of tailgating indications for at least one roadway segment of interest; and identifying, by the at least one processor of the management device, at least one high-risk roadway segment, by identifying at least one roadway segment where an amount of associated tailgating indications exceeds a tailgating risk threshold.

The method may further comprise: receiving, by a management device, respective simplified following distance data for a plurality of subject vehicles; receiving, by the management device, respective location data for the plurality of subject vehicles; for each data point in the simplified following distance data for each subject vehicle of the plurality of subject vehicles: associating a location of the respective subject vehicle at a respective time of the data point with a roadway segment corresponding to the location of the respective vehicle at the respective time; and quantifying following distance for the plurality of subject vehicles for at least one roadway segment of interest.

According to yet another broad aspect, the present disclosure describes a system for generating following distance data over time for a subject vehicle, the system comprising: at least one processor; at least one non-transitory processor-readable storage medium storing processor-executable instructions which when executed by the at least one processor cause the system to: access a set of images, each image of the set of images being from a perspective of the subject vehicle and including a respective representation of another vehicle positioned in front of the subject vehicle, and each image of the set of images being associated with a respective time; generate following distance data based on at least a subset of images in the set of images, by: for each image in the subset of images, determining a respective physical distance between the subject vehicle and the other vehicle; and compiling the following distance data over time as a plurality of following distance data points, each following distance data point representing the determined physical distance for a respective image in the subset of images and the time associated with the respective image in the subset of images; generate simplified following distance data, by: identifying select data points from the following distance data for inclusion in the simplified following distance data, based on differences between the data points and iteratively-defined reference lines through portions of the following distance data; and compiling the select data points as the simplified following distance data, excluding data points which are not identified as select data points; and output the simplified following distance data.

Identifying select data points from the following distance data for inclusion in the simplified following distance data, based on differences between the data points and iteratively-defined reference lines through portions of the following distance data, may comprise, for each data point of the following distance data: determining a minimum difference between the data point and a corresponding reference line of the iteratively-defined reference lines; and identifying the data point as a select data point if the minimum difference between the data point and the corresponding reference line exceeds a difference threshold.

Identifying select data points from the following distance data for inclusion in the simplified following distance data, based on differences between the data points and iteratively-defined reference lines through portions of the following distance data, may comprise: defining a reference line through the following distance data; identifying a candidate data point of the following distance data, where a minimum difference between the candidate data point and the reference line is greater than a minimum difference between other data points and the reference line; and if the minimum difference between the candidate data point and the reference line exceeds a difference threshold: identifying the candidate data point as a select data point for inclusion in the simplified following distance data; and defining new reference lines which intersect the candidate data point through the following distance data. Identifying select data points from the following distance data for inclusion in the simplified following distance data, based on differences between the data points and iteratively-defined reference lines through portions of the following distance data, may further comprise: defining an additional reference line through the following distance data which intersects a select data point previously identified for inclusion in the simplified following distance data; identifying an additional candidate data point of the following distance data, where a minimum difference between the additional candidate data point and the additional reference line is greater than a minimum difference between other data points and the additional reference line; and if the minimum difference between the additional candidate data point and the additional reference line exceeds the difference threshold: identifying the additional candidate data point as an additional select data point for inclusion in the simplified following distance data.

The following distance data may comprise at least one data series of following distance data points; identifying select data points from the following distance data for inclusion in the simplified following distance data, based on differences between the data points and iteratively-defined reference lines through portions of the following distance data, may comprise, for each data series in the following distance data, until all data points in each data series are within a distance threshold of a corresponding reference line: identifying a first data point in the data series and a last data point in the data series as select data points for inclusion in the simplified following distance data; defining a reference line between the first data point in the data series and the last data point in the data series; identifying a candidate data point between the first data point in the data series and the last data point in the data series, where a minimum difference between the candidate data point and the reference line is greater than a minimum difference between other data points in the data series and the reference line; if the minimum difference between the candidate data point and the reference line exceeds a difference threshold: identify the candidate data point as a select data point for inclusion in the simplified following distance data; define a component data series between the first data point in the data series and the candidate data point; and define another component data series between the candidate data point and the last data point in the data series; and if the minimum difference between the candidate data point and the reference line exceeds a difference threshold: exclude each data point of the data series between the first data point and the last data point from inclusion in the simplified following distance data.

The processor-executable instructions may further cause the system to: access a plurality of images captured by an image capture device positioned at the subject vehicle; and identify the set of images as images of the plurality of images which include the other vehicle positioned in front of the subject vehicle.

The processor-executable instructions may further cause the system to: access a plurality of images captured by an image capture device positioned at the subject vehicle; and identify the set of images as images of the plurality of images which include the other vehicle positioned in front of the subject vehicle and in a common lane of travel with the subject vehicle.

For each image in the subset of images, determining the respective physical distance between the subject vehicle and the other vehicle may comprise: applying a following distance determination model to the respective image, the following distance determination model being a machine learning model trained based on minimization of a following distance loss function for a training set of images representing a respective lead vehicle from a perspective of a following vehicle associated with a label indicating following distance between the lead vehicle and the following vehicle.

For each image in the subset of images, determining the respective physical distance between the subject vehicle and the other vehicle may comprise: determining, by the at least one processor, at least one image attribute based on a positional measure between the other vehicle as represented in the respective image and at least one boundary of the image; and applying, by the at least one processor, a following distance determination model to determine a following distance based on the determined at least one image attribute.

For each image in the subset of images, determining the respective physical distance between the subject vehicle and the other vehicle may comprise: determining, by the at least one processor, a first vertical position in the image representing a bottom of the other vehicle; accessing, by the at least one processor, a second vertical position in the image representing a static physical distance from the subject vehicle; determining a transformed first vertical position by applying, by the at least one processor, an image transformation matrix to the first vertical position; determining a transformed second vertical position by applying, by the at least one processor, the image transformation matrix to the second vertical position; determining an image distance between the transformed first vertical position and the transformed second vertical position; and determining the following distance as a physical distance between the other vehicle and the subject vehicle based on the determined image distance and the static physical distance.

The system may further comprise a communication interface positioned at the subject vehicle, and the processor-executable instructions which cause the system to output the simplified following distance data may cause a communication interface positioned at the subject vehicle to transmit the simplified following distance data to a device remote from the subject vehicle. The system may further comprise a user interface of the device remote from the vehicle to present at least a portion of the following distance data.

The processor-executable instructions may further cause the system to, for each data point in the simplified following distance data: determine, by the at least one processor, whether the respective physical distance between the subject vehicle and the other vehicle for the data point is within a tailgating distance criteria; identify, by the at least one processor, that the subject vehicle is not tailgating the other vehicle at a time corresponding to the data point if the respective physical distance is outside of the tailgating distance criteria; and identify, by the at least one processor, that the subject vehicle is tailgating the other vehicle at a time corresponding to the data point if tailgating criteria are met, wherein the tailgating criteria includes the respective physical distance being within the tailgating distance criteria. The processor-executable instructions may further cause the system to, in response to an identification that the subject vehicle is tailgating the other vehicle, output a tailgating indication. The processor-executable instructions which cause the system to output the tailgating indication may cause a communication interface of the system to transmit the tailgating indication to a management device. The processor-executable instructions may further cause the system to: receive, at a management device of the system, respective simplified following distance data for a plurality of subject vehicles; receive, at the management device, location data for the plurality of subject vehicles; access, by the management device, respective tailgating indications for the plurality of subject vehicles; and for each tailgating indication, associate a location of the respective subject vehicle as indicated in the location data, at a time of the tailgating indication, with a roadway segment corresponding to the location of the subject vehicle. The at least one processor may include at least one processor at the management device, and the processor-executable instructions may further cause the system to: quantify, by the at least one processor of the management device, an amount of tailgating indications for at least one roadway segment of interest; and identify, by the at least one processor of the management device, at least one high-risk roadway segment, by identifying at least one roadway segment where an amount of associated tailgating indications exceeds a tailgating risk threshold.

The system may further comprise a management device; the at least one processor may include at least one processor at the management device; and the processor-executable instructions may further cause the system to: receive, by a management device, respective simplified following distance data for a plurality of subject vehicles; receive, by the management device, respective location data for the plurality of subject vehicles; for each data point in the simplified following distance data for each subject vehicle of the plurality of subject vehicles: associate, by the at least one processor of the management device, a location of the respective subject vehicle at a respective time of the data point with a roadway segment corresponding to the location of the respective vehicle at the respective time; and quantify, by the at least one processor of the management device, following distance for the plurality of subject vehicles for at least one roadway segment of interest.

BRIEF DESCRIPTION OF THE DRAWINGS

Exemplary non-limiting embodiments are described with reference to the accompanying drawings in which:

FIG. 2A is a simplified block diagram of an image capture device according to at least one exemplary implementation.

FIG. 2B is a simplified block diagram of an image capture device according to at least one other exemplary implementation.

FIG. 3 is a schematic view of an operator device in accordance with at least one exemplary implementation.

FIG. 18 is a table showing a list of parameter ranges, for automated generation of images.

FIGS. 20A, 20B, and 20C illustrate a sequence of image data representing moments in time, in accordance with at least one exemplary implementation.

FIG. 51 is a side view of an exemplary scenario illustrating projection of images.

FIG. 59 is an exemplary user interface where tailgating indications or following distance is associated with roadway segments.

FIG. 60 is a flowchart diagram which illustrates a method for associated following distance with roadway segments.

DETAILED DESCRIPTION

Figure 1A:
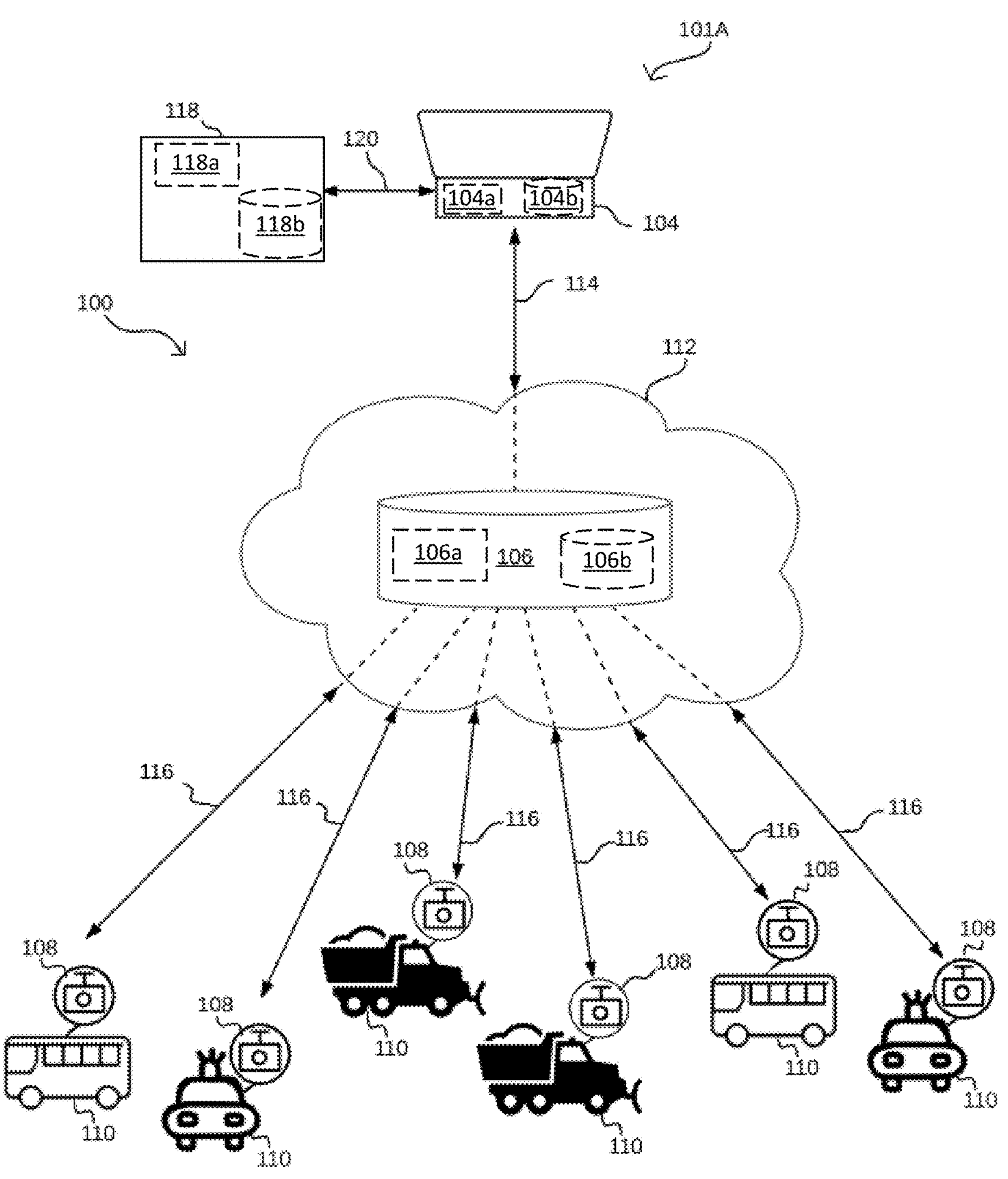
FIG. 1A illustrates a block diagram of an exemplary mobile image system.

The present disclosure details systems and methods for creating training data, for training machine learning models, and for applying machine learning models, for identifying vehicle movement and positioning. The present disclosure sees particular value in detecting travel lane of vehicles, determining distance between vehicles, and identifying when a vehicle is tailgating another vehicle.

Throughout this disclosure, a "following" situation refers to a situation where a "following vehicle" is travelling behind a "lead vehicle", in the same direction as the lead vehicle. In this context, "following" does not necessarily mean that the following vehicle is actively pursuing the lead vehicle (e.g. to the destination of the lead vehicle), but rather that the following vehicle is travelling behind the lead vehicle, for at least a moment in time. Lead vehicles and following vehicles are commonly referred to as first and second vehicles throughout this disclosure.

"Tailgating" generally refers to a situation involving two vehicles travelling in the same direction, where one vehicle is following the other vehicle at an unsafe distance (e.g. too close for the following vehicle to reliably safely stop if needed). In particular, if a following vehicle is tailgating a lead vehicle, sudden braking of the lead vehicle may result in an accident where the following vehicle hits the lead vehicle from behind. For instance, delayed reaction time of the driver of the following vehicle may prevent the following vehicle from decelerating at a sufficient rate so as to avoid rear-ending the lead vehicle. However, if the driver of the following vehicle was alerted of this dangerous circumstance, an accident may be avoided, by causing the driver of the following vehicle to alter operation of the following vehicle to increase the following distance from the lead vehicle.

Models (e.g. artificial intelligence and/or machine learning models) for identifying vehicle positioning and movement, based on data captured by one or more image capture devices (e.g. video cameras or smart video cameras) are disclosed herein. Generally, a machine learning model is trained based on a set of training data, after which the model becomes able to analyze input data and reliably detect features or make determinations based on the input data. In some implementations, a trained model is deployed to an image capture device or a proximate device communicatively coupled to the image capture device, and captured image data is analyzed by the trained model. Such implementations are optimal for alerting the driver to dangerous situations, as analysis can be performed quickly without the need for communication with a remote server. In alternative implementations, captured image data is analyzed in accordance with the trained model remote from the image capture device (e.g. at a central server or processing station). Such implementations are useful for identifying dangerous situations after-the-fact, such as for driver evaluation or collision reconstruction. However, such implementations could also be used to alert the driver to dangerous situations as they happen, albeit after communication of image data to the central server, followed by a message from the server to a device at the vehicle to output an alert to the driver. In yet other implementations, captured image data can be analyzed at an image capture device or a proximate device communicatively coupled to the image capture device, and results can be sent to a remote device (e.g. a central server or processing station), such as for driver evaluation or collision reconstruction. In yet other implementations, captured image data can be analyzed at an image capture device or a proximate device communicatively coupled to the image capture device, for immediate driver feedback, and captured image data can be analyzed at a remote device such as for driver evaluation or collision reconstruction.

Figure 1B:
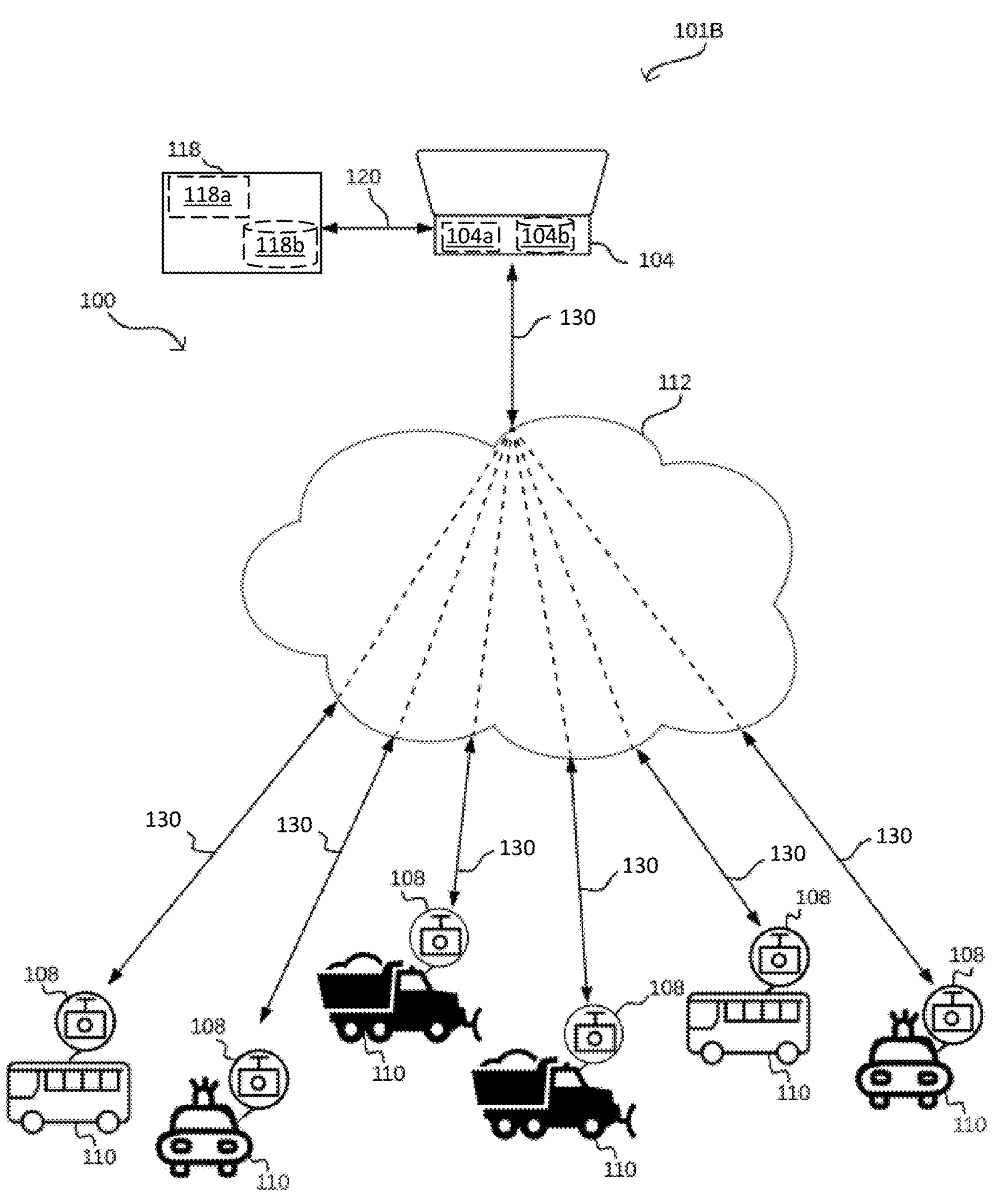
FIG. 1B illustrates a block diagram of another exemplary mobile image system.

FIG. 1A and FIG. 1B illustrate block diagrams of exemplary mobile image systems 101A and 101B, respectively, and exemplary communication network 100 through which mobile image systems 101A and 101B operate. In many of the implementations discussed herein, communication network 100 is optional. That is, in some implementations identification of vehicle positioning and movement can be performed entirely at a device local to a vehicle. Models executed at the device local to the vehicle can be distributed physically (e.g. by connecting the device to another device to transfer the model, or by using a portable storage medium to transfer the model), thus obviating the need for communication network 100. Alternatively, communication network 100 can be used to distribute models to vehicle devices (e.g. by sending models to vehicle devices for download).

Communication network 100 may include one or more computing systems and may be any suitable combination of networks or portions thereof to facilitate communication between network components. Some examples of networks include, Wide Area Networks (WANs), Local Area Networks (LANs), Wireless Wide Area Networks (WWANs), data networks, cellular networks, voice networks, among other networks, which may be wired and/or wireless. Communication network 100 may operate according to one or more communication protocols, such as, General Packet Radio Service (GPRS), Universal Mobile Telecommunications Service (UMTS), GSM®, Enhanced Data Rates for GSM Evolution (EDGE), LTE™, CDMA, LPWAN, Wi-Fi®, Bluetooth®, Ethernet, HTTP/S, TCP, and CoAP/DTLS, or other suitable protocol. Communication network 100 may take other forms as well.

Mobile image system 101A includes a plurality of image capture devices 108, which can comprise (and be referred to herein) as smart video cameras (SVCs), though are not strictly limited as such. The plurality of image capture devices 108 are positioned at (e.g. mounted in/on, or placed within or on) a plurality of vehicles 110. Image capture system 101A also includes cloud server 106, client device 104 and local server 118. Client device 104 is communicatively coupled to local server 118 via communication link 120. Client device 104 is also shown as including at least one processor 104*a* and at least one non-transitory processor-readable storage medium 104*b*. The at least one processor 104*a* can perform acts such as determinations, identification, data analysis, processing, and other appropriate acts, such as acts in the methods described herein. The at least one non-transitory processor-readable storage medium 104*b* can store any appropriate data, including processor-executable instructions which when executed by the at least one processor 104*a* cause the client device 104 to perform acts, such as acts of the methods described herein. An exemplary client device may include a personal computer, server, a system, a combination of subsystems, and devices. Specific and non-limiting examples of an image capture device or smart video camera include a Netradyne® video camera and a Nauto® video camera. Reference to a "camera" in this disclosure can include a smart video camera, but may also include a more basic camera. In this regard, the term "camera" can be used interchangeably with "image capture device". Each image capture device 108 is communicatively coupled to cloud server 106 in cloud 112 via a respective communication link 116. For example, each image capture device 108 and the cloud server 106 are configured to wirelessly communicate to each other. Cloud server 106 is also shown as including at least one processor 106*a* and at least one non-transitory processor-readable storage medium 106*b*. The at least one processor 106*a* can perform acts such as determinations, identification, data analysis, processing, and other appropriate acts, such as acts in the methods described herein. The at least one non-transitory processor-readable storage medium 106*b* can store any appropriate data, including processor-executable instructions which when executed by the at least one processor 106*a* cause the cloud server 106 to perform acts, such as acts of the methods described herein. Cloud server 106 is communicatively coupled to client device 104 via communication link 114. For example, each cloud server 106 and client device 104 are configured to wirelessly communicate to each other. As another example, cloud server 106 and client device 104 are configured to communicate with each over a wired connection. In some implementations, local server 118 may be a remote server from client device 104. Local server 118 is also shown as including at least one processor 118*a* and at least one non-transitory processor-readable storage medium 118*b*. The at least one processor 118*a* can perform acts such as determinations, identification, data analysis, processing, and other appropriate acts, such as acts in the methods described herein. The at least one non-transitory processor-readable storage medium 118*b* can store any appropriate data, including processor-executable instructions which when executed by the at least one processor 118*a* cause the local server 118 to perform acts, such as acts of the methods described herein.

Mobile image system 101B in FIG. 1B includes a plurality of image capture devices 108, positioned at a plurality of vehicles 110, similar to in FIG. 1A. Image system 101B also includes client device 104 and local server 118, similar to in FIG. 1A. In the example of FIG. 1B, client device 104 is communicatively coupled to local server 118 via communication link 120. An exemplary client device may include a personal computer, server, a system, a combination of systems subsystems, and devices. Specific and non-limiting examples of an image capture device include a Netradyne® video camera and a Nauto® video camera. Each image capture device 108 is communicaticvely coupled to client device 104 via a respective communication link 130. For example, each image capture device 108 is configured to wirelessly communicate with client device 104. In some implementations, local server 118 may be a remote server from client device 104. The description of components in mobile image system 101A in FIG. 1A is applicable to similarly labelled components in mobile surveillance system 101B in FIG. 1B.

Specific and non-limiting examples of vehicle types which each of vehicles 110 can be include: a government owned and operated vehicle, (e.g., as a vehicle for snow clearing, infrastructure maintenance, police enforcement), a public transportation vehicle, (e.g., bus, train), and a privately owned vehicle, (e.g., taxi, courier vehicle), among others.

An image capture device 108 may be mounted to or positioned at a vehicle 110 in a manner such that image capture device 108 captures image data of the environment outside the vehicle 110, e.g., towards the windshield, towards a window, atop the vehicle, etc. Additionally, and/or optionally, an image capture device 108 may be mounted to or positioned at a vehicle 110 in a manner such that the image capture device 108 captures image data of the interior of the vehicle. Interior-facing image capture devices 108 may be useful for detecting an event including detecting a person(s) of interest.

Alternatively, and/or optionally, mobile image systems 101A, 101B further include one or more image capture devices 108 coupled to a person and/or object wherein the object is not a vehicle. For example, an image capture device 108 can be coupled to a person, e.g., a helmet of a motorcycle driver.

Now referring to FIG. 2A, shown is a simplified block diagram of exemplary image capture device 108A according to one implementation (as a smart video camera). Image capture device 108A as shown in FIG. 2A can be implemented as any of the image capture devices 108 shown in FIGS. 1A and 1B. Image capture device 108A includes lens 202, optoelectronics 204, at least one processor 206, location module 208 (e.g., including a GPS receiver), wireless communication module 210 (e.g., including a 4G or 5G communication module for providing cellular connectivity) and at least one non-transitory processor-readable storage medium 212. Optionally, the at least one non-transitory processor-readable storage medium 212 includes another non-transitory processor-readable storage medium 214 (or includes any appropriate number of additional non-transitory processor-readable storage mediums). In the context of this disclosure, the term "datastore" refers to a non-transitory processor-readable storage medium. In some implementations, a single non-transitory processor-readable storage medium corresponds to a single datastore. In other implementations, a non-transitory processor-readable storage medium can be virtually partitioned to include a plurality of "datastores". Wireless communication module 210 is operable to communicate (shown as communication interface 216) with other devices (e.g. cloud device 106 or client device 104 discussed with reference to FIGS. 1A and 1B) over a communication network (e.g. cloud 112 discussed with reference to FIGS. 1A and 1B).

Further optionally, the image capture device 108A is shown as including at least one output interface 218, which can provide output to a driver of a vehicle in which the image capture device 108A is installed. For example, output interface 218 can be an audio output device (a speaker) which outputs audio for the driver to hear. As another example, output interface 218 can be a visual output device, such as a light or plurality of lights, or a display which outputs visual signals for the driver to see. As yet another example, output interface 218 can be a haptic output device, such as a vibration device, which outputs haptic signals for the driver to feel. Output interface 218 can be used to provide alerts, warnings, or feedback directly to the driver (such as tailgating indications), as discussed in detail later.

Now referring to FIG. 2B, shown is a simplified block diagram of exemplary image capture device 108B according to one implementation (as a camera which is coupled to a peripheral device, such as a vehicle device). FIG. 2B includes many components with the same reference number as components discussed with reference to FIG. 2A. The description of such components in FIG. 2A is applicable to the similarly numbered components in FIG. 2B. In FIG. 2B, image capture device 108B includes lens 202 and optoelectronics 204. In this implementation, image capture device 108B is itself directed to capturing image data, which is in turn provided to a peripheral device 220 via a communication interface 222 (e.g. a wired or wireless communication interface). In some implementations, peripheral device 220 is vehicle device, such as a telematics monitoring device positioned at a vehicle. In other implementations, peripheral device 220 comprises a collection of components integrated into a vehicle which communicate with each other (e.g. OEM integrated electronics). In FIG. 2B, peripheral device 220 is shown as including the at least one processor 206, the location module 208, the wireless communication module 210, the at least one non-transitory processor-readable storage medium 212, and the output interface 218 similar to the components included in image capture device 108A in FIG. 2A. While not illustrated in FIG. 2B to reduce clutter, the at least one non-transitory processor-readable storage medium 212 optionally includes any appropriate number of additional non-transitory processor-readable storage mediums. Wireless communication module 210 is operable to communicate (shown as communication interface 216) with other devices (e.g. cloud device 106 or client device 104 discussed with reference to FIGS. 1A and 1B) over a communication network (e.g. cloud 112 discussed with reference to FIGS. 1A and 1B).

Collectively, reference to an image capture device 108 or a plurality of image capture devices 108 can include image capture device 108A in FIG. 2A or image capture device 108B in FIG. 2B. Further, reference to an image capture device performing acts (such as in the methods discussed herein) can also refer to the peripheral device 220 performing such acts. For example, reference to an image capture device performing processing, determination, identification, storing of data, transmission, or similar acts can refer to an image capture device and peripheral device in combination performing these acts.

FIG. 3 is a schematic view of an operator device 300, which could be used for model management and use in any of the implementations discussed herein, and in particular is useful as a server-side device. For example, device 300 could be used as client device 104 in FIGS. 1A and 1B, or as a user interface device to provide input to these devices. Device 300 as illustrated includes at least one processor 312, at least one non-transitory processor-readable storage medium 314, and a communication interface 316. The non-transitory processor-readable storage medium 314 can have processor-readable instructions stored thereon which, when executed by the at least one processor 312 cause the device 300 to perform appropriate operations for the methods described herein. Communication interface 316 can be a wired or wireless interface, through which data and inputs can be provided to device 300, and through which data and outputs can be provided by device 300. For example, location data for a plurality of vehicles can be received from a telematics device or system by communication interface 316, for processing and analysis by the at least one processor 312. Resulting analysis can also be output by communication interface 316.

FIG. 3 also illustrates exemplary input and output devices through which a user or operator can interact with device 300. In particular, FIG. 3 shows a display 322, which can display outputs from device 300. Other output devices could be provided such as speakers, or any other appropriate output device. FIG. 3 also shows a keyboard and mouse 324, which can be used to provide inputs to the device 300. Other input devices could also be used, such as a touchscreen, microphone, trackpad, or any other appropriate input device. Although the input and output devices illustrated in FIG. 3 appear in the form of those used with a desktop computer, other forms of devices could also be used, such as portable devices like a laptop, smartphone, PDA, tablet, or any other appropriate device. Further, a device to which a user provides input and receives output can be remote from the device 300. For example, the device including the at least one processor 312, the at least one non-transitory processor-readable storage medium 314, and the communication interface 316 can be a server, which is remote from a workstation or device with which the user interacts.

Figure 4:
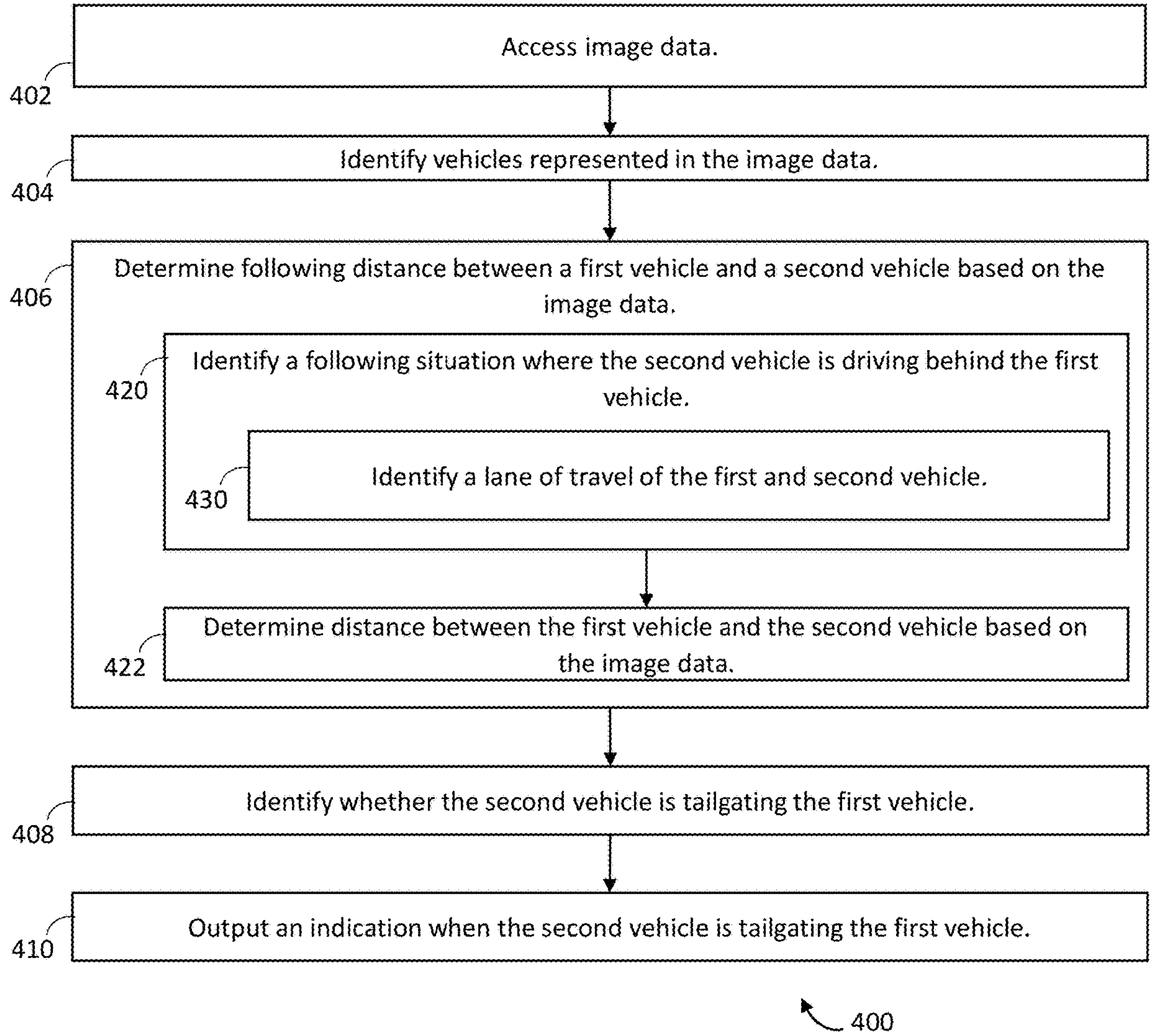
FIG. 4 is a flowchart diagram which illustrates a method for identifying and reporting a tailgating situation in accordance with at least one exemplary implementation.

FIG. 4 is a flowchart diagram which illustrates an exemplary method 400 for identifying and reporting a tailgating situation. Method 400 as illustrated includes acts 402, 404, 406 (including sub-acts 420, 422, and 430), 408, and 410. One skilled in the art will appreciate that additional acts could be added, acts could be removed, or acts could be reordered as appropriate for a given application. With reference to the examples illustrated in FIGS. 1A, 1B, 2A, 2B, and 3, acts can be performed by appropriate components of the discussed systems or devices. For example, method 400 can be performed at an image capture device such as image capture device 108A discussed with reference to FIG. 2A, and/or a peripheral device such as peripheral device 220 discussed with reference to FIG. 2B. As another example, method 400 can be performed at a device remote from a vehicle, such as client device 104 and/or local server 118 discussed with reference to FIGS. 1A and 1B, and/or cloud device 106 discussed with reference to FIG. 1A.

Reference to "at least one processor" or "a processor" performing acts of any of the methods herein can refer to any appropriate processor. Further, at least one non-transitory processor-readable storage medium can store processor-executable instructions, which when executed by a respective at least one processor cause the corresponding system or device to perform a given act of any of the methods discussed herein.

At 402, image data is accessed. The image data is captured by an image capture device (such as image capture device 108A or 108B discussed with reference to FIGS. 2A and 2B), and stored by an appropriate non-transitory processor-readable storage medium (e.g. medium 212 in FIGS. 2A and 2B). In some implementations the image data is transferred from the image capture device to another device (such as from any of image capture device 108 in FIGS. 1A and 1B, to cloud device 106, client device 104, or local server 118, via communication interfaces 114, 116, 120, or 130) as appropriate. The image data is stored by a corresponding non-transitory processor-readable storage medium (e.g. any of mediums 104*b*, 118*b*, or 106*b*, as appropriate), and accessed in accordance with act 402 when method 400 is carried out.

At 404, at least one processor (e.g. processor 206, 104*a*, 118*a*, 106*a*, or 312 as appropriate) analyzes the image data to identify vehicles represented in the vehicle data (if any). For example, the at least one processor can run an object detection model (such as a vehicle detection model) trained to detect vehicles in image data. The YOLO models are exemplary models which are effective in this task.

At 406, a following distance is determined between two vehicles based on the image data. In particular, a following distance is determined between a first vehicle (a lead vehicle) and a second vehicle (a following vehicle) where the image capture device is positioned. The perspective of the image data thus represents a perspective from the second vehicle. Act 406 in method 400 is shown as including sub-acts 420 and 422. Sub-acts 420 and 422 show one exemplary implementation for determining following distance between the two vehicles, and could be replaced by any other appropriate means for determining following distance.

At 420, a following situation is identified where the second vehicle is driving behind the first vehicle. In some implementations, this entails determining a lane of travel of the first vehicle and of the second vehicle, as shown in sub act 430. If the determined lane of travel of the first vehicle is the same as the determined lane of travel of the second vehicle, the first and second vehicle are identified as travelling in the same lane. Alternatively, in some implementations, lanes do not need to be explicitly determined, nor does lane of travel of each vehicle need to be explicitly identified. Instead, a determination is made regarding whether the first vehicle and the second vehicle are travelling in a manner which indicates that the second vehicle is travelling behind the first vehicle. Such implementations are discussed later with reference to FIGS. 24A, 24B, 24C, 25A, and 25B.

At 422, a distance is determined between the first vehicle and the second vehicle. Throughout this disclosure, means for determining distance between two vehicles are discussed. For example, FIG. 21 describes a method for training a machine learning model to estimate distance between two vehicles based on image data. Further, FIGS. 5, 6, 7, 8, 9, 10A, 10B, 11A, 11B, 12A, 12B, 13A, 13B, 14A, 14B, 15A, 15B, 16A, 16B, 16C, 16D, 17A, 17B, 18, 19, 20A, 20B, and 20C pertain to generation of training image data, for use in training such a machine learning model.

At 408, a determination is made as to whether the second vehicle is tailgating the first vehicle. Generally, this entails determining whether the distance between the first vehicle and the second vehicle determined at 422 is within tailgating criteria. Such tailgating criteria can be static or dynamic, and is discussed in more detail later with reference to FIG. 23.

At 410, an indication is output when the second vehicle is tailgating the first vehicle. For example, an alert can be output by a device in the second vehicle (e.g. output interface 218 in FIG. 2A or 2B), informing the driver of the tailgating situation to encourage the driver to increase following distance. As another example, a notification could be triggered at a management device (e.g. client device 104), or sent to the management device from an in-vehicle device, indicating the tailgating situation, for a fleet manager to take corrective action such as enforcing driver training. Such a notification could optionally include any of a timestamp, geographic position data of the vehicle for the tailgating event, speed or acceleration data for the vehicle for the tailgating event, image data for the tailgating event, or any other appropriate data.

To generate a predictive model which determines distance between vehicles based on image data, training image data is generated. Such predictive models are trained based on the generated training data. This disclosure describes generation of simulated training data (in the form of computer-rendered image data). Image data representing real-world tailgating situations, as captured by real-world image capture devices, would be good training data; however, such real-world image data is dangerous to collect. In particular, vehicles would need to engage in tailgating in order to capture image data representing tailgating, and thus said vehicles would need to engage in dangerous situations which the present disclosure aims to avoid. Generating simulated training data avoids such dangerous situations, while still providing reasonably accurate data for training predictive models.

Figure 5:
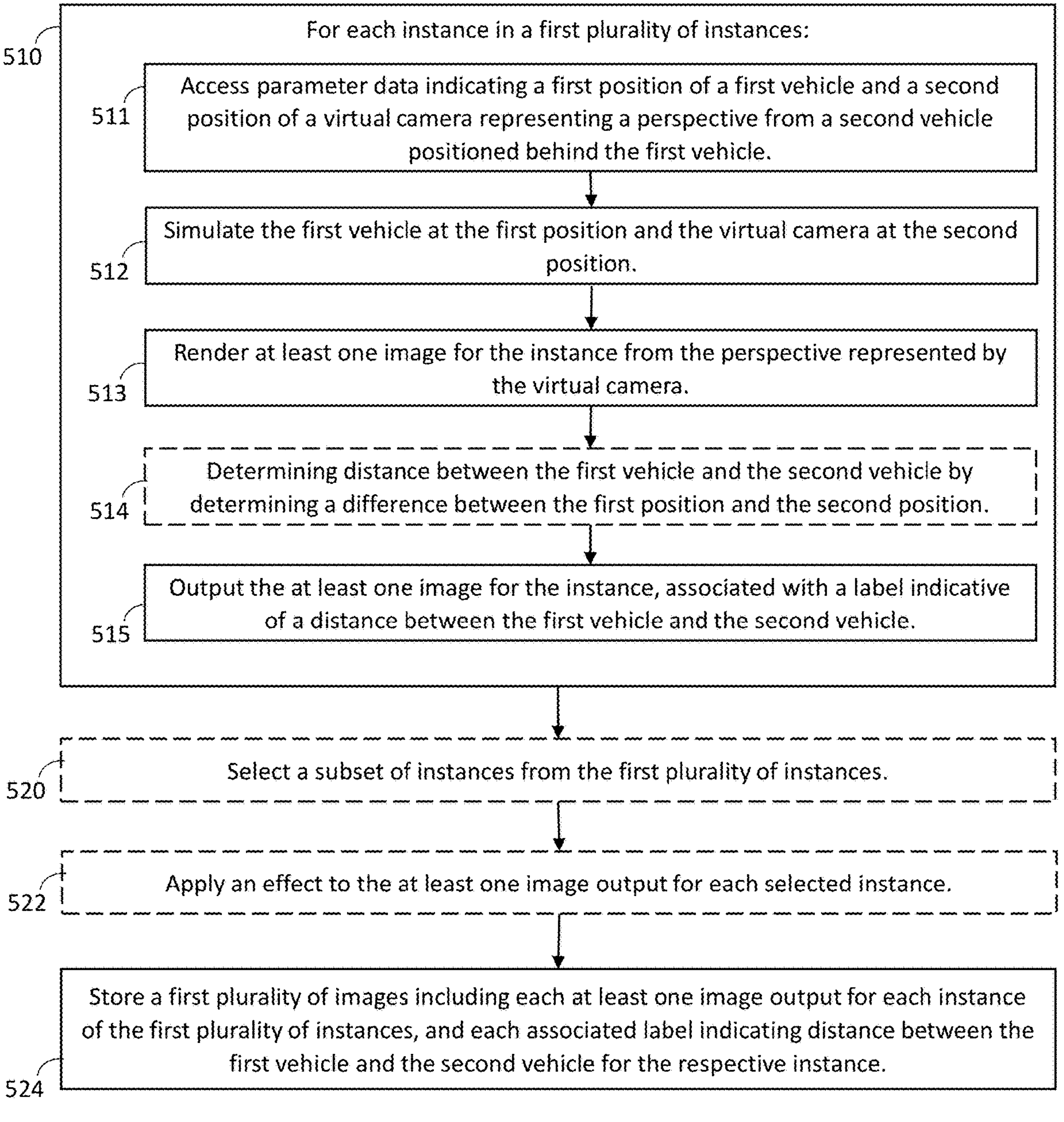
FIG. 5 is a flowchart diagram which illustrates a method for generating simulated training data in accordance with at least one exemplary implementation.

FIG. 5 is a flowchart diagram which illustrates an exemplary method 500 for generating simulated training data in line with the above. Method 500 as illustrated includes acts 510 (including sub-acts 511, 512, 513, 514, and 515), 520, 522, and 524. One skilled in the art will appreciate that additional acts could be added, acts could be removed, or acts could be reordered as appropriate for a given application. Acts of method 500 can be performed by appropriate components of the systems or devices discussed earlier. For example, method 500 can be performed at a device remote from a vehicle, such as client device 104 or local server 118 discussed with reference to FIGS. 1A and 1B, and/or cloud device 106 discussed with reference to FIG. 1A. As another example, method 500 can be performed at a device separate from systems 101A or 101B; for example, device 300 in FIG. 3 could be used to generate simulated training data in accordance with method 500 (even where device 300 is separate from systems 101A and 101B). Such training data could then provided to systems 101A or 101B for training of a predictive model. Alternatively, the predictive model can be trained separately from systems 101A and 101B, with the resulting predictive model being provided to systems 101A and 101B for use.

Reference to "at least one processor" or "a processor" performing acts of any of the methods herein can refer to any appropriate processor. Further, at least one non-transitory processor-readable storage medium can store processor-executable instructions, which when executed by a respective at least one processor cause the corresponding system or device to perform a given act of any of the methods discussed herein.

In method 500, a plurality of instances are simulated where a first vehicle has a respective first position, and a second vehicle is simulated as following the first vehicle. In 510, a number of sub-acts (illustrated as sub-acts 511, 512, 513, 514, and 515) are performed for each instance in a plurality of instances.

At 511, parameter data indicating the first position of the first vehicle, and the second position of a virtual camera representing a perspective from a second vehicle positioned behind the first vehicle is received. The first position and the second position are specific to the instance, such that each instance represents a specific scenario (within the overall context of the dataset) where the first vehicle is being followed by the second vehicle at a specific distance, and each instance is generally different from other instances. Differences between instances can include differences in the following distance between the first vehicle and the second vehicle (due to differences between the first position and the second position for the instance). However, following distance between the first vehicle and the second vehicle is not necessarily unique to the instance in the data set. In particular, the first position and the second position represent positions in space within a virtual environment. Even if the first position and the second position for different instances are the same distance apart (same following distance), respective first positions and second positions can be at different locations within the virtual environment. As a result, a perspective represented by the virtual camera for an instance will be different from other instances, even if following distance is the same.

Positions of vehicles (or cameras in vehicles), such as the first position, second position, and the third position discussed later with reference to FIGS. 8, 9, 10A, and 10B, or any other vehicle position discussed herein, generally refer to a longitudinal position and a lateral position of the vehicle (or camera). Longitudinal and lateral positions do not necessarily need to match global positioning standards, but rather indicate position of the vehicle in different directions, so that the relative positioning between vehicles can be specified. This is particularly pertinent to virtual environments, where a standardized global positioning does not necessarily exist (since the entire world is likely not simulated in the virtual environment). A position of a camera may also specify a height of the camera. Such a height may be specified for example relative to a road surface from which the camera is positioned. Alternatively, such a height may be specified relative to an average, standard, or baseline height where a camera is expected to be positioned or is commonly positioned. As discussed later with reference to FIGS. 11A, 11B, 12A, 12B, 13A, 13B, 14A, and 14B, camera position within a vehicle can have an impact on images captured by said camera, and thus can be important to simulate and/or model.

Figures 6, 7:
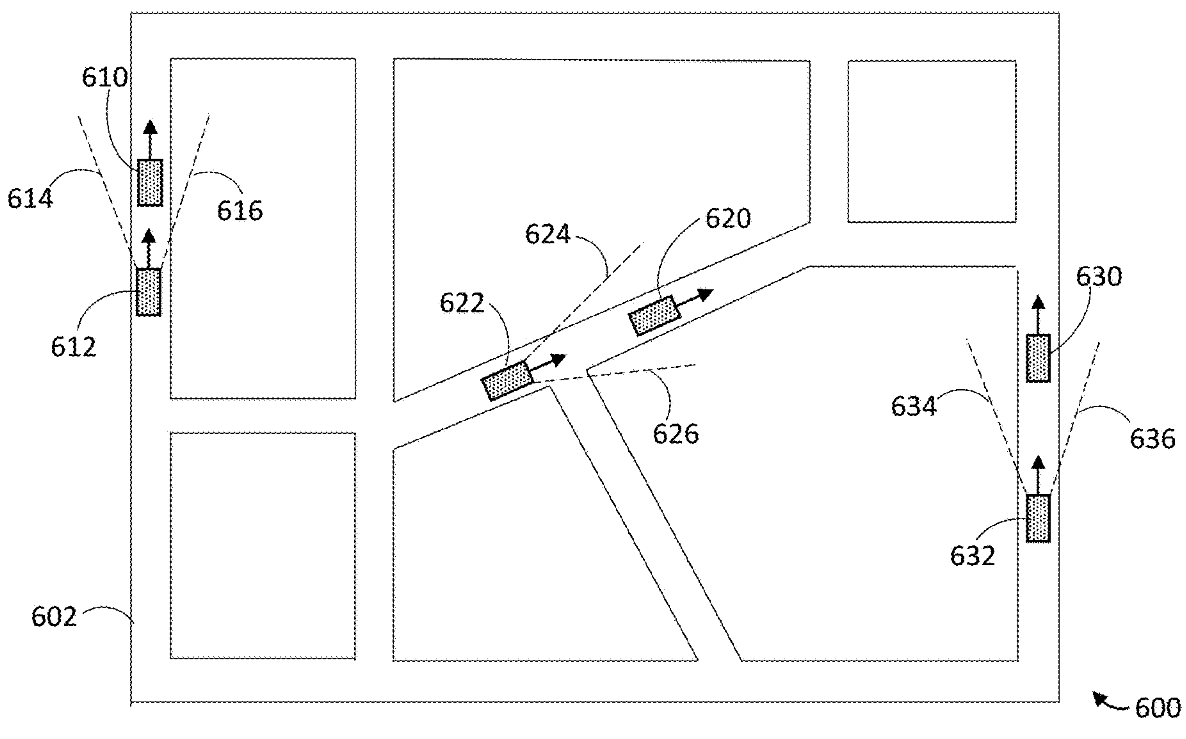
FIG. 6 is a top view of a virtual environment, in accordance with at least one exemplary implementation.
FIG. 7 illustrates an image rendered based on the virtual environment shown in FIG. 6.

At 512, for each instance, the first vehicle at the first position, and the virtual camera at the second position, are simulated in a virtual environment. An example of this is illustrated in FIG. 6, which is a top view of a virtual environment 600, including roadways 602. In environment 600 as shown in FIG. 6, three instances are simulated. In a first instance, a first vehicle 610 is simulated as being followed by a second vehicle 612. A virtual camera is simulated at the position of the second vehicle 612, as shown by field of view lines 614 and 616. In a second instance, a first vehicle 620 is simulated as being followed by a second vehicle 622. A virtual camera is simulated at the position of the second vehicle 622, as shown by field of view lines 624 and 626. In a third instance, a first vehicle 630 is simulated as being followed by a second vehicle 632. A virtual camera is simulated at the position of the second vehicle 632, as shown by field of view lines 634 and 636.

For the first instance, the first position of vehicle 610 and the second position of the virtual camera of the second vehicle 612 are such that the second vehicle 612 is following the first vehicle 610 at a close distance. For the second instance, the first position of vehicle 620 and the second position of the virtual camera of the second vehicle 622 are such that the second vehicle 622 is following the first vehicle 620 at a distance which is greater than the following distance in the first instance. For the third instance, the first position of vehicle 630 and the second position of the virtual camera of the second vehicle 632 are such that the second vehicle 632 is following the first vehicle 630 at a distance which is equal to the following distance in the second instance. However, because the respective second position for the second instance and the third instance is different, a perspective of the virtual camera for the second instance is different from a perspective of the virtual camera for the third instance. Consequently, image data generated for the second instance is different from image data generated for the third instance.

Although FIG. 6 illustrates three simulated instances, one skilled in the art will appreciate that many more instances can be simulated in practice, to generate a large library of simulated instances and consequently a large library of training image data.

Returning to method 500 in FIG. 5, at 513 at least one image is rendered for each instance, from the perspective represented by the virtual camera for that instance. FIG. 7 illustrates an exemplary rendered image 700 in this regard.

Image 700 is rendered from the perspective of a virtual camera positioned in a second vehicle which is following a first vehicle 790. Rendered image 700 shows a horizon 702 and a roadway delineated by road edges 710 and 712. The illustrated roadway includes two separate lanes 720 and 722, separated by dashed center line 714. In the illustrated example, vehicle 790 and the following vehicle are represented as driving in the right-hand lane, though image data can be rendered with vehicles travelling in any appropriate lane.

The virtual environment can be modelled and rendered using any appropriate technology. In some implementations, autonomous vehicle operation software is used to modelled and render the image data. Such software can include, for example, CARLA™, Simulator for Urban Driving in Massive Mixed Traffic (SUMMIT), Procedural Generation Drive (PGDrive), LG Silicon Valley Lab (LGSVL), and NVIDIA DRIVE Sim™.

Based on the first position and second position for an instance, as well as the surrounding environment features, exactly what appears in rendered image data such as image 700 varies per instance. Generally, the closer the first vehicle and the second vehicle are, the larger the first vehicle (vehicle 790 in FIG. 7) will appear in the image data. Conversely, the farther apart the first vehicle and the second vehicle are, the smaller the first vehicle (vehicle 790 in FIG. 7) will appear in the image data.

Returning to method 500 in FIG. 5, at 514 a distance between the first vehicle and the second vehicle (specific to an instance) is determined, by determining a distance between the first position and the second position (for the instance). For example, the at least one processor can determine a vector between the first position and the second position, and determine a length of said vector as the distance between the first position and the second position. Act 514 is drawn in dashed lines, to illustrate that act 514 is optional. In some implementations, instead of act 514, the parameter data accessed at 511 includes an indication of distance between the first position and the second position for the instance.

At 515, the at least one image for the instance (as rendered in act 513) is output. The output at least one image is also associated with a label indicative of the distance between the first vehicle and the second vehicle for the instance. In implementations where the distance between the first position and the second position is determined in act 514, the at least one image is output associated with a label indicative of the determined distance. In implementations where the distance between first position and the second position is included in the parameter data accessed in act 511, the at least one image is output associated with a label which indicates the distance between the first vehicle and the second vehicle (first position and second position) as included in the parameter data for the instance.

Acts 520 and 522 are shown in dashed lines, to illustrate that these acts are optional. Acts 520 and 522 are discussed in detail later, with reference to FIGS. 15A, 15B, 16A, 16B, 16C, 16D, 17A, 17B, 18, and 19.

At 524, a first plurality of images are stored at a non-transitory processor-readable storage medium, which includes each at least one image output for each instance of the plurality of instances. Each of the stored images is stored associated with the respective label indicating distance between the first vehicle and the second vehicle for the respective instance. As a result, the first plurality of images includes a plurality of images representing different instances where a second vehicle is positioned behind a first vehicle, labelled with a distance between the first vehicle and the second vehicle for each instance. In this way, the first plurality of images is an effective set of training data where distance between the first vehicle and the second vehicle is known, so that a machine learning model can be trained to determine distance between the first vehicle and the second vehicle, using the associated distance labels as validation.

Figure 8:
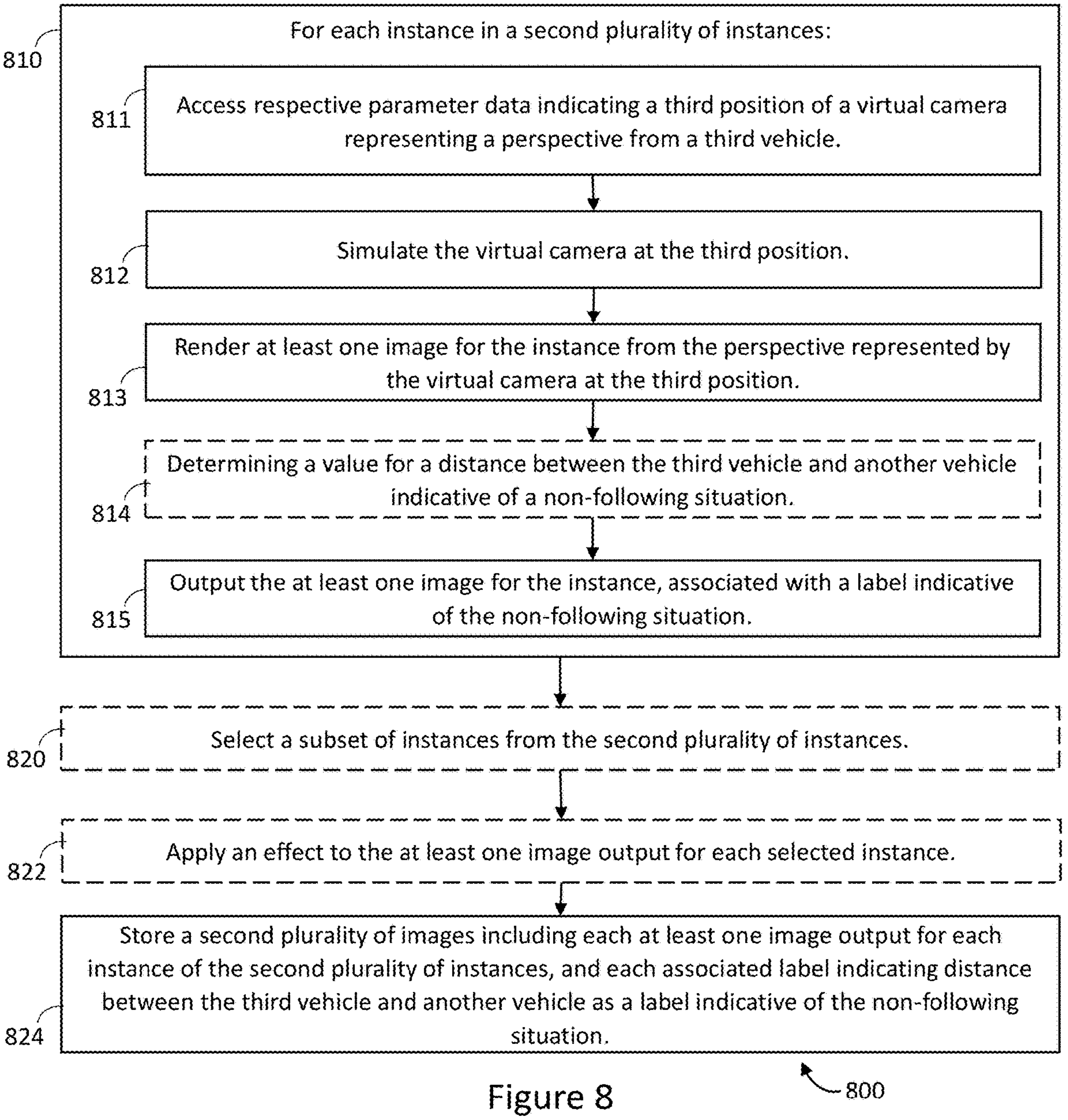
FIG. 8 is a flowchart diagram which illustrates a method for generating simulated training data in accordance with at least one other exemplary implementation.

Method 500 in FIG. 5 is useful for creating training data where a second vehicle is positioned behind a first vehicle, for determining distance therebetween. In some implementations however, it is useful to also generate training data where the second vehicle is not following the first vehicle (or not at a distance close enough to be accurately determinable or important). FIG. 8 is directed to creation of such training data.

FIG. 8 is a flowchart diagram which illustrates an exemplary method 800 for generating simulated training data in line with the above. Method 800 as illustrated includes acts 810 (including sub-acts 811, 812, 813, 814, and 815), 820, 822, and 824. One skilled in the art will appreciate that additional acts could be added, acts could be removed, or acts could be reordered as appropriate for a given application. Acts of method 800 can be performed by appropriate components of the systems or devices discussed earlier, similar to as discussed with reference to method 500 in FIG. 5, and not repeated for brevity.

In method 800, a plurality of instances are simulated where a third vehicle has a third position, as is not following another vehicle (or not at a distance close enough to be accurately determinable or important). In 810, a number of sub-acts (illustrated as sub-acts 811, 812, 813, and 815) are performed for each instance in a plurality of instances.

At 811, parameter data indicating the third position of a virtual camera representing a perspective from the third vehicle is received. The third position is specific to the instance, such that each instance represents a specific scenario (within the overall context of the dataset). As a result, a perspective represented by the virtual camera for an instance will be different from other instances.

Figure 9:
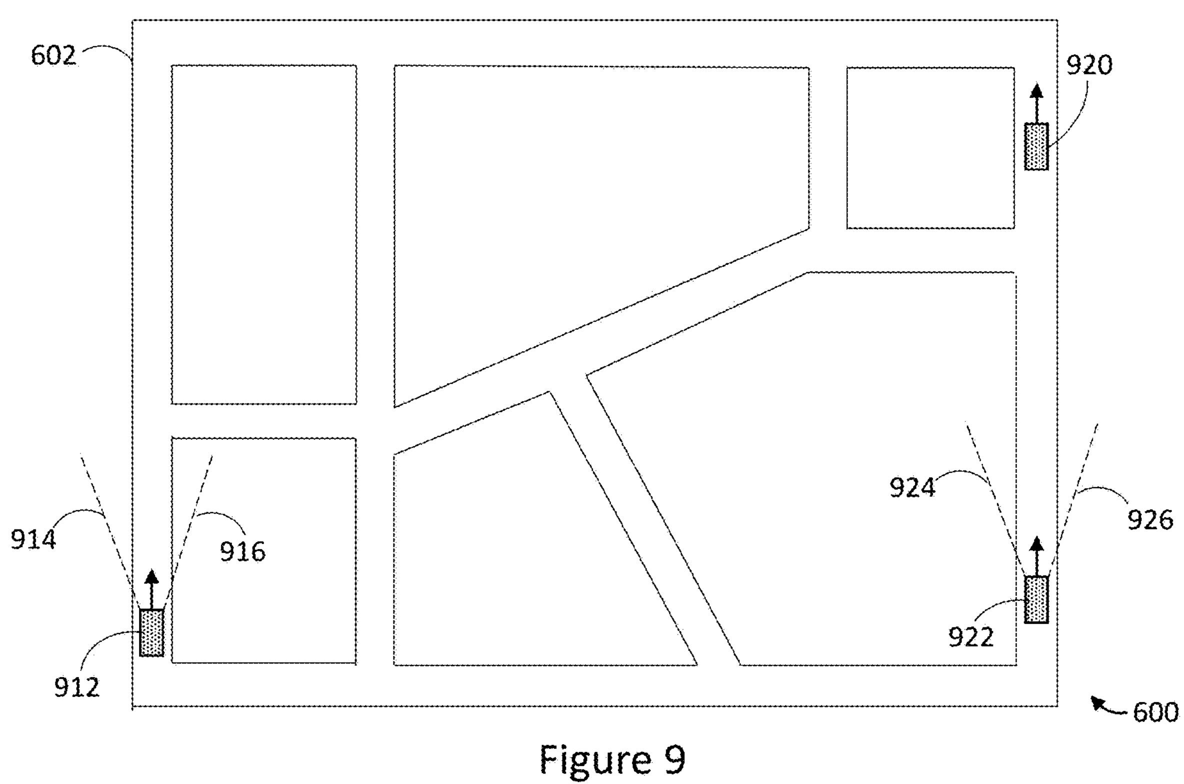
FIG. 9 is a top view of a virtual environment, in accordance with at least one other exemplary implementation.

At 812, for each instance, the virtual camera at the third position is simulated in a virtual environment. An example of this is illustrated in FIG. 9, which is a top view of the virtual environment 600 (similar to as in FIG. 6), including roadways 602. In environment 600 as shown in FIG. 9, two instances are simulated. In a first instance, a third vehicle 912 is not positioned behind (following) another vehicle. A virtual camera is simulated at the position of the third vehicle 912, as shown by field of view lines 914 and 916. In a second instance, a vehicle 920 is simulated as being followed by a third vehicle 922. A virtual camera is simulated at the position of the third vehicle 922, as shown by field of view lines 924 and 926.

For the first instance, the third vehicle 912 is not positioned behind (following) another vehicle. For the second instance, the third vehicle 922 is positioned behind first vehicle 920, but at a great distance. The distance between first vehicle 920 and third vehicle 922 is so great that it is not important for detection of tailgating, and further is possibly not accurately determinable based on image data.

Although FIG. 9 illustrates two simulated instances, one skilled in the art will appreciate that many more instances can be simulated in practice, to generate a large library of simulated instances and consequently a large library of training data.

Figure 10A:
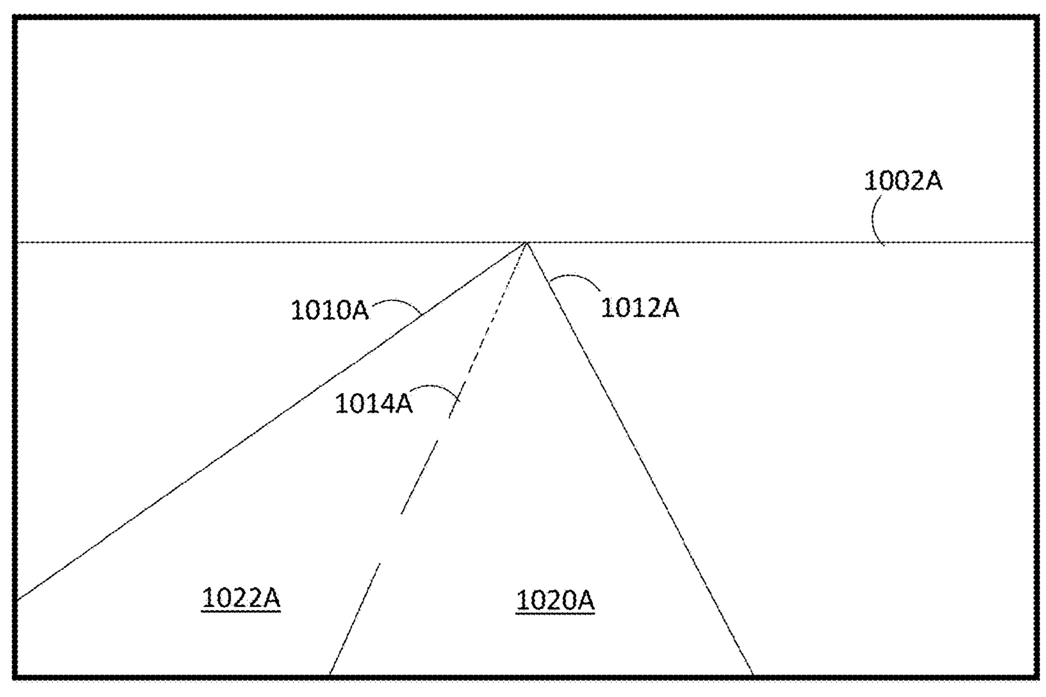
FIGS. 10A and 10B illustrate images rendered based on the virtual environment shown in FIG. 9.
Figure 10B:
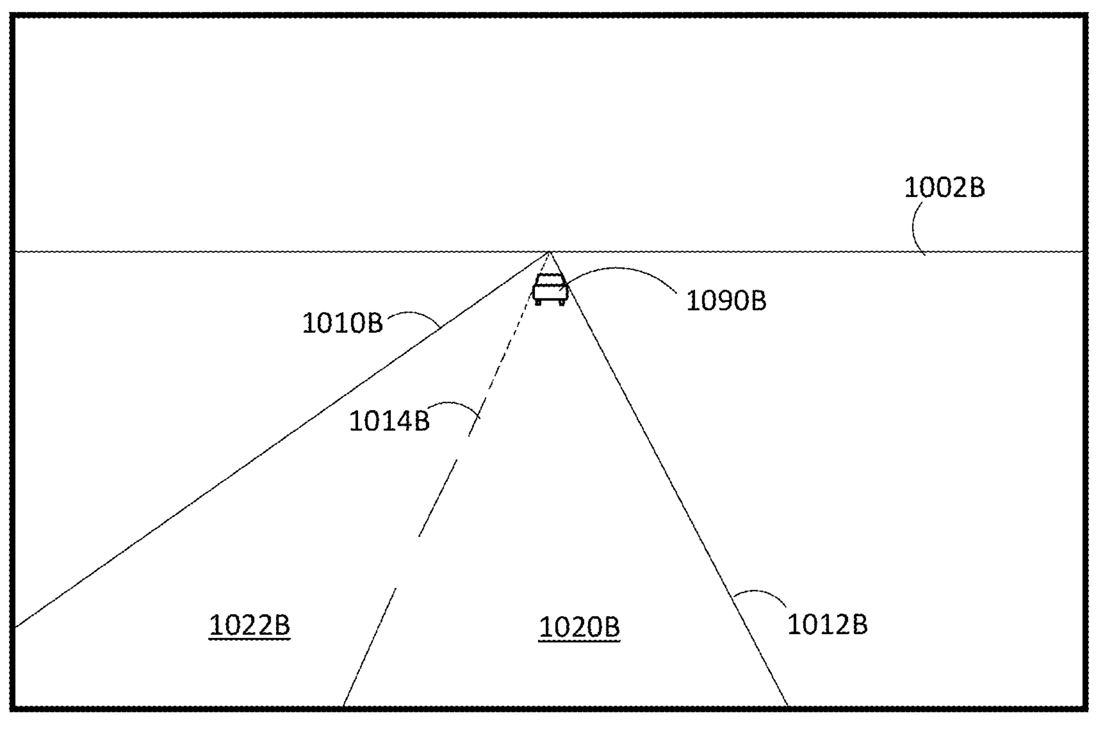

Returning to method 800 in FIG. 8, at 813 at least one image is rendered for each instance, from the perspective represented by the virtual camera for that instance. FIGS. 10A and 10B illustrate exemplary rendered images 1000A and 1000B in this regard.

Image 1000A is rendered from the perspective of a virtual camera positioned in a third vehicle (e.g. third vehicle 912 in FIG. 9) which is not positioned behind or following a first vehicle. Rendered image 1000A shows a horizon 1002A and a roadway delineated by road edges 1010A and 1012A. The illustrated roadway includes two separate lanes 1020A and 1022A, separated by dashed center line 1014A. In the illustrated example, the perspective of the third vehicle is rendered for the third vehicle driving in the right-hand lane, though image data can be rendered with the vehicle travelling in any appropriate lane.

The virtual environment can be modelled and rendered using any appropriate technology, as discussed above with reference to FIG. 7.

Based on the third position for an instance, as well as the surrounding environment features, exactly what appears in rendered image data such as image 1000A varies per instance.

Image 1000B is rendered from the perspective of a virtual camera positioned in a third vehicle (e.g. third vehicle 922 in FIG. 9) which is positioned behind or following a first vehicle (e.g. vehicle 920). Rendered image 1000B shows a horizon 1002B and a roadway delineated by road edges 1010B and 1012B. The illustrated roadway includes two separate lanes 1020B and 1022B, separated by dashed center line 1014B. Image 1000B also includes a rendering of a vehicle 1090B (e.g. corresponding to vehicle 920 in FIG. 9). In image 1000B, the rendering of vehicle 1090B is small, and features thereof are difficult to discern, because vehicle 1090B is a great distance from the position from where the image is rendered (e.g. position of third vehicle 922, and therefore the virtual camera therein, in FIG. 9). As a result, even with a well trained model, distance to the vehicle 920 may not be accurately determinable based on image data. In the illustrated example, the perspective of the third vehicle is rendered for the third vehicle driving in the right-hand lane, though image data can be rendered with the vehicle travelling in any appropriate lane.

The virtual environment can be modelled and rendered using any appropriate technology, as discussed above with reference to FIG. 7.

Based on the third position for an instance, as well as the surrounding environment features, exactly what appears in rendered image data such as image 1000B varies per instance.

Returning to method 800 in FIG. 8, at 814 a value for distance between the third vehicle and another vehicle is determined, which is indicative of a non-following situation for the third vehicle. In this context, a "non-following situation" refers to the third vehicle being in a situation where another vehicle is not being followed (or at least not being followed closely enough for distance to be accurately determinable based on image data, or not being followed closely enough to be relevant to detecting tailgating). In the example of image 1000A in FIG. 10A, the at least one processor determines that the third vehicle is not positioned behind or following another vehicle, and therefore distance to such another vehicle can be determined as any of: a null value, an "infinity" label, as a value so high as to be irrelevant to tailgating detection (e.g. 1 km or higher), or any other appropriate value. In the example of image 1000B in FIG. 10B, a distance between third vehicle 922 and 920 can be determined (e.g. by determining a length of a vector between vehicles 922 and 920). In one implementation, the determined distance can be compared to a threshold, and if the distance exceeds the threshold, the distance between vehicle 920 and 922 is identified as any of: the actual determined distance between vehicle 922 and 920 (which is too great to be relevant to tailgating detection), a null value, an "infinity" label, as a value so high as to be irrelevant to tailgating detection (e.g. 1 km or higher), or any other appropriate value. Such a threshold can be set for example as a limit for meaningful estimations of distance based on image data, or a limit for usefulness in detecting tailgating.

Act 814 is drawn in dashed lines, to illustrate that act 814 is optional. In some implementations, instead of act 814, the parameter data accessed at 811 includes an indication of distance between the third position and another vehicle as corresponding to a non-following situation for the instance.

At 815, the at least one image for the instance (as rendered in act 813) is output. The output at least one image is also associated with a label indicative of the non-following situation (whether this value is determined in act 814, or is included in the parameter data at 811).

Acts 820 and 822 are shown in dashed lines, to illustrate that these acts are optional. Acts 820 and 822 are discussed in detail later, with reference to FIGS. 15A, 15B, 16A, 16B, 16C, 16D, 17A, 17B, 18, and 19.

At 824, a second plurality of images are stored at a non-transitory processor-readable storage medium, which includes each at least one image output for each instance of the plurality of instances. Each of the stored images is stored associated with the respective label indicating the non-following situation for distance between the third vehicle and another vehicle for each instance. As a result, the second plurality of images includes a plurality of images representing different instances where a third vehicle is positioned a great distance from (or not even within sight of) another vehicle, labelled with non-following situation value indicating the third vehicle is not (within the context of the models to be trained) following another vehicle. In this way, the second plurality of images is an effective set of training data where it is known that the third vehicle is not (within the context of models to be trained) following another vehicle, so that a machine learning model can be trained to account for such scenarios, using the associated non-following situation labels as validation.

With reference to acts 511 in method 500 and 811 in method 800, in some implementations accessed parameter is provided/received as user input. For example, in device 300 in FIG. 3, input devices 324 are illustrated (a mouse and keyboard, in the example). A user can use such input devices to input different scenarios for vehicle positions; e.g. a user can manually input positions for vehicles 610, 612, 620, 622, 630, 632, 912, 920, 922, or any other appropriate vehicles simulated in the virtual environment.

In other implementations, with reference to acts 511 in method 500 and 811 in method 800, accessed parameter data is autonomously generated by at least one processor. For example, for each instance in the first plurality of instances (as discussed with reference to method 500 in FIG. 5), the at least one processor autonomously generates the respective parameter data by automatically determining random values for the first position and the second position, within at least one defined distance threshold. The defined distance threshold can be, for example, received as a user input (such as via input devices 324). The distance threshold defines a threshold beyond which distance between two vehicles as determined by image analysis is insufficiently accurate, or beyond which distance between two vehicles is not relevant to tailgating determination. Further, parameter data can be generated based on multiple thresholds for the same nature of parameter data. As one example, multiple distance thresholds can be received, and parameter data can be generated between each received distance threshold. In an example case, a first distance threshold is 1 meter to 5 meters; a second distance threshold is 5 meters to 10 meters; a third distance threshold is 10 meters to 20 meters; a fourth distance threshold is 20 meters to 30 meters; a fifth distance threshold is 30 meters to 40 meters; and a sixth distance threshold is 40 meters to 80 meters. Any appropriate number of thresholds could be implemented for a given application (e.g. a threshold for each 1 meter spacing). In the example, a plurality of situations are simulated, and corresponding image data generated per method 500, for each respective threshold (e.g. for the first distance threshold, the second distance threshold, the third distance threshold, the fourth distance threshold, the fifth distance threshold, the sixth distance threshold, and any other appropriate distance thresholds).

In an exemplary scenario, the at least one processor can autonomously determine a random position within the virtual environment, and randomly determine another position within the virtual environment which is within the distance threshold from the random position. These two randomly generated positions are the first and second positions, and can be determined in either order (i.e. first position is determined first, or second position is determined first). Further, autonomous determination of positions can be constrained based on features of the virtual environment. For example, random determination of positions can be limited to positions which are on roadways of the virtual environment. Further, random determinations of first and second positions of two vehicles can be constrained to positions in a same lane of a roadway of the virtual environment.

In another example, for each instance in the second plurality of instances (as discussed with reference to method 800 in FIG. 8), the at least one processor autonomously generates the respective parameter data by automatically determining a random value for the third position, and randomly generating distance as a null value, or generating distance as a value beyond the defined distance threshold.

With further reference to acts 511 in method 500 and 811 in method 800, in some implementations accessed parameter data further indicates a resolution for the virtual camera. For example, a user can input a camera resolution via input devices 324, or a resolution may be stored in the system based on known camera hardware which the training data is being created for. Regardless, in acts 513 in method 500 and 813 in method 800, rendering an image for a particular instance entails rendering the image at the resolution of the virtual camera specified in the parameter data.

With further reference to acts 511 in method 500 and 811 in method 800, in some implementations accessed parameter data further indicates vehicle types (type of the first vehicle, type of the second vehicle, and/or type of the third vehicle). Such vehicle types can be specific to a particular instance, but are not necessarily unique to an instance. Alternatively or additionally, accessed parameter data further indicates vehicle dimensions or properties (e.g. size and/or weight of the first, second, or third vehicles). Vehicle type, properties (particularly weight), and dimensions can all have an impact on distance determination and tailgating detection. As one example, different vehicles have different dimensions from where a dashcam is mounted and a front of the vehicle (e.g., different vehicles have different lengths of hood). As another example, a heavier vehicle will take typically take longer to stop that a lighter vehicle, and thus unsafe tailgating distance is different between vehicles. By including these vehicle parameters in the respective parameter data, training data can be created which covers a broader range of vehicles and circumstances, and thus when said training data is used to train models, the resulting models should be more robust.

With further reference to acts 511 in method 500 and 811 in method 800, in some implementations accessed parameter data further indicates position and/or orientation of the virtual camera relative to the second vehicle. Position and orientation of a camera impact a resulting image captured by said camera, and thus including such information with the parameter data results in more accurate training data, and thus more accurate models trained based on said data. This principle is illustrated with reference to FIGS. 11A, 11B, 12A, 12B, 13A, 13B, 14A, and 14B discussed below.

Figure 11A:
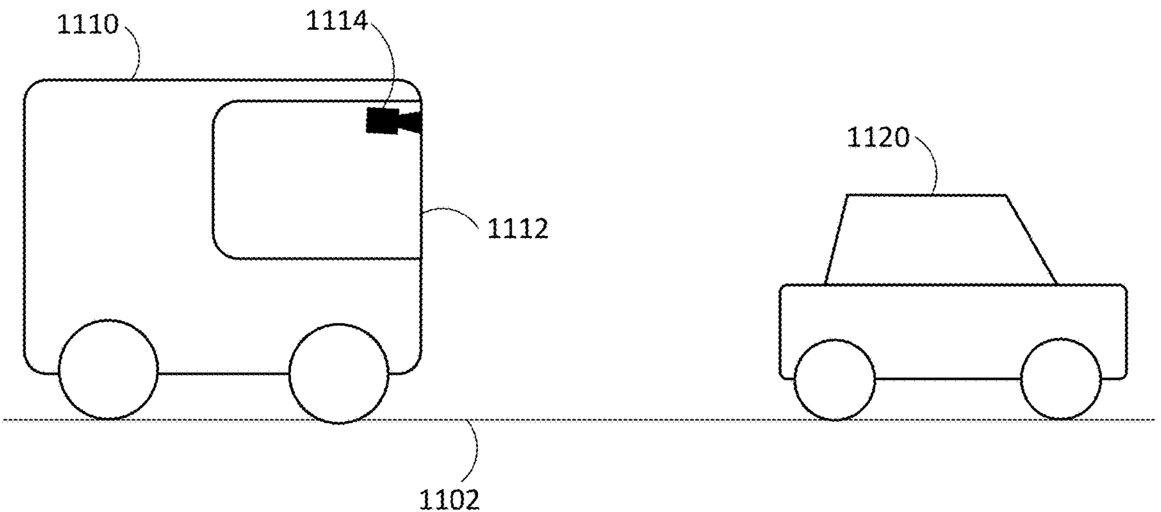
FIGS. 11A and 11B are side views of a vehicle being followed by another vehicle, in accordance with at least two exemplary implementations.
Figure 11B:
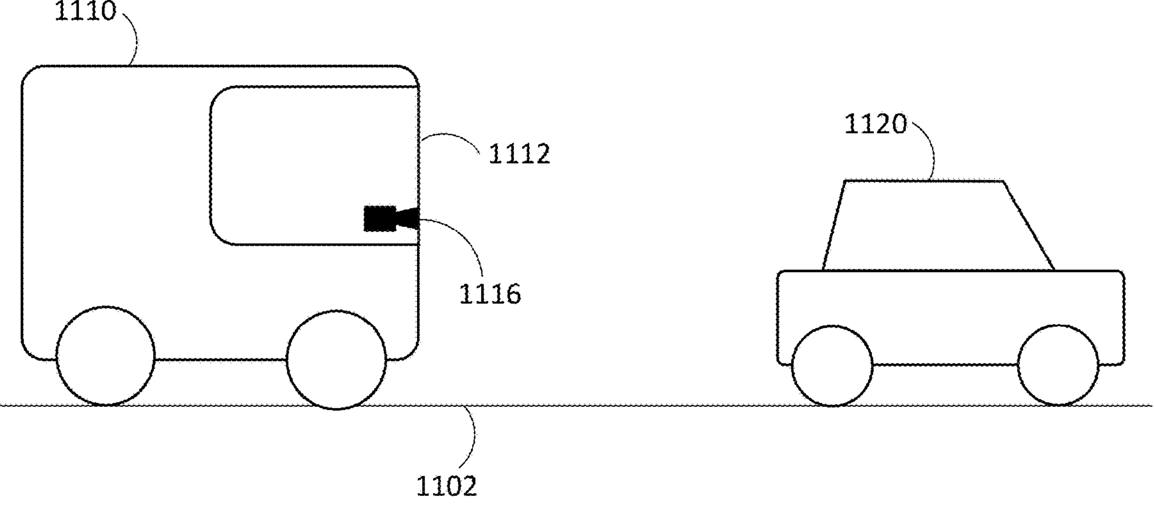

FIGS. 11A and 11B are a side views of a vehicle 1120 being followed by a vehicle 1110. Vehicles 1110 and 1120 are driving on road surface 1102. Vehicle 1110 has a windshield 1112. In FIG. 11A, an image capture device 1114 (a dashcam) is positioned high in vehicle 1110, near the top of windshield 1112. In contrast, in FIG. 11B, an image capture device 1116 is positioned low in vehicle 1110, near the bottom of windshield 1112. Resulting captured images are shown in FIGS. 12A and 12B, discussed below.

Figure 12A:
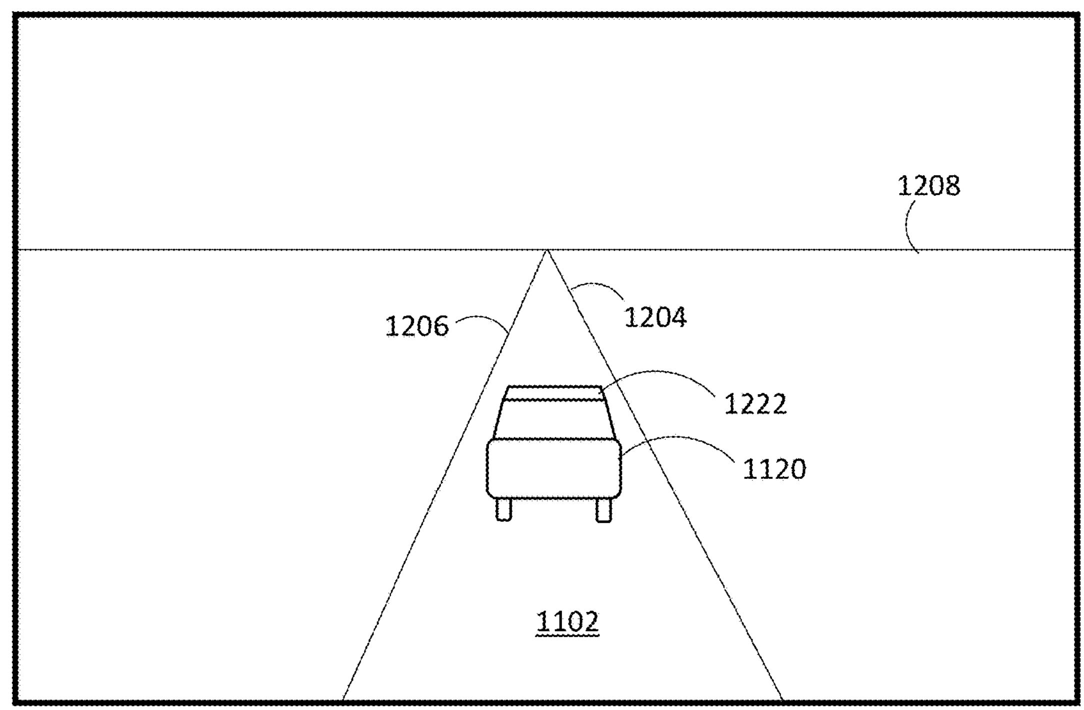
FIGS. 12A and 12B illustrate exemplary images for cameras in the scenarios illustrated in FIGS. 11A and 11B.
Figure 12B:
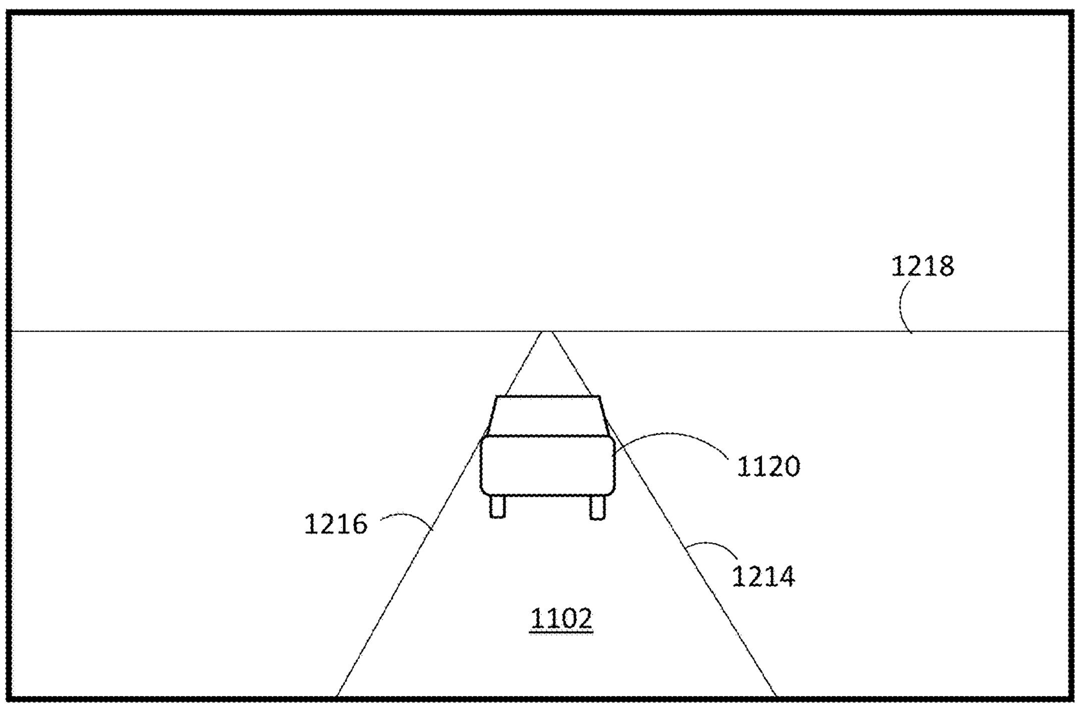

FIG. 12A shows an image 1200 captured by image capture device 1114 in FIG. 11A; that is, an image captured by an image capture device positioned high in vehicle 1110. In image 1200, vehicle 1120 can be seen, driving on roadway 1102 (as bounded by edges 1204 and 1206), toward horizon 1208. Due to the perspective of image capture device 1114, rooftop 1222 of vehicle 1120 can be seen. FIG. 12B shows an image 1210 captured by an image capture device 1116 in FIG. 11B; that is, an image captured by an image capture device positioned low in vehicle 1110. In image 1210, vehicle 1120 can be seen, driving on roadway 1102 (as bounded by edges 1214 and 1216), toward horizon 1218. In contrast to image 1200, in image 1210 the roof 1222 of vehicle 1120 is not as visible due to the perspective of image capture device 1116. Further, horizon 1218 appears lower in image 1210 compared to horizon 1208 in image 1200, due to the perspective of image capture device 1116 compared to the perspective of image capture device 1114.

Figure 13A:
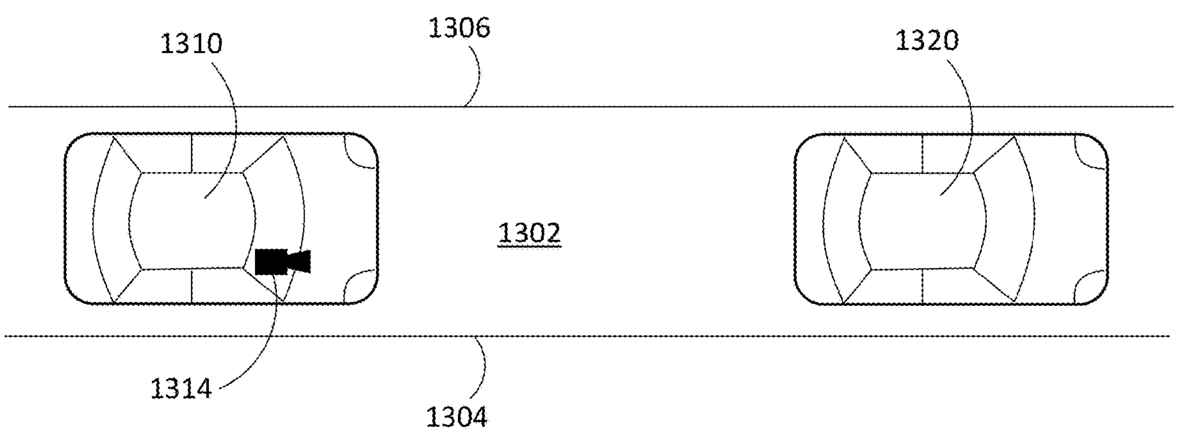
FIGS. 13A and 13B are top views of a vehicle being followed by another vehicle, in accordance with at least two exemplary implementations.
Figure 13B:
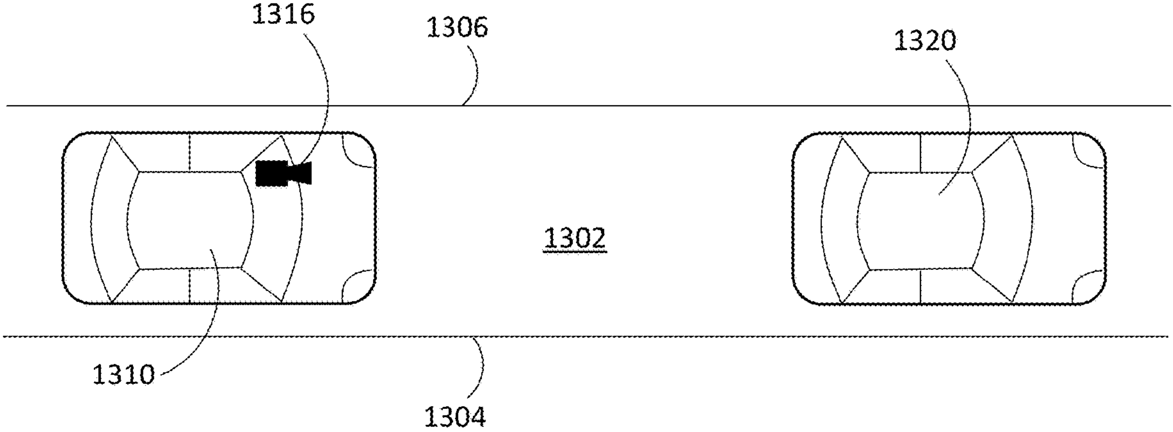

FIGS. 13A and 13B are top views of a vehicle 1320 being followed by a vehicle 1310. Vehicles 1310 and 1320 are driving on roadway 1302, defined by edges 1304 and 1306. In FIG. 13A, an image capture device 1314 (a dashcam) is positioned towards a right side of vehicle 1310. In contrast, in FIG. 13B, an image capture device 1316 is positioned towards a left side of vehicle 1310. Resulting captured images are shown in FIGS. 14A and 14B, discussed below.

Figure 14A:
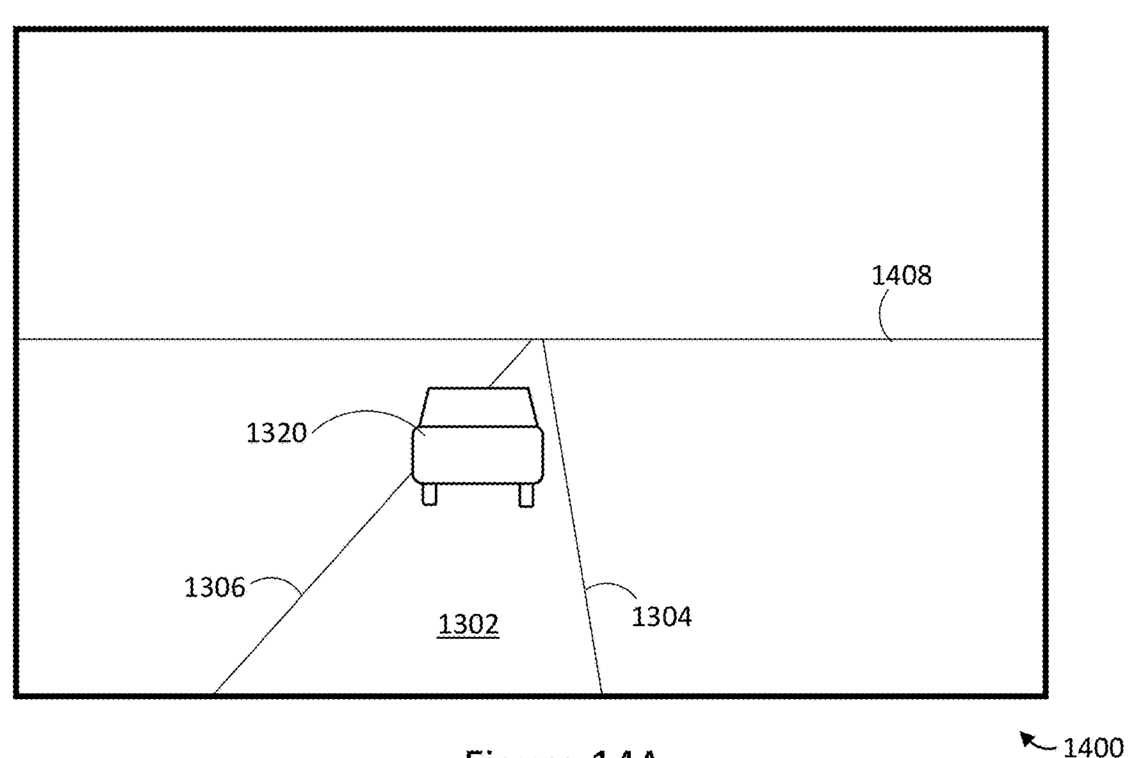
FIGS. 14A and 14B illustrate exemplary images for cameras in the scenarios illustrated in FIGS. 13A and 13B.
Figure 14B:
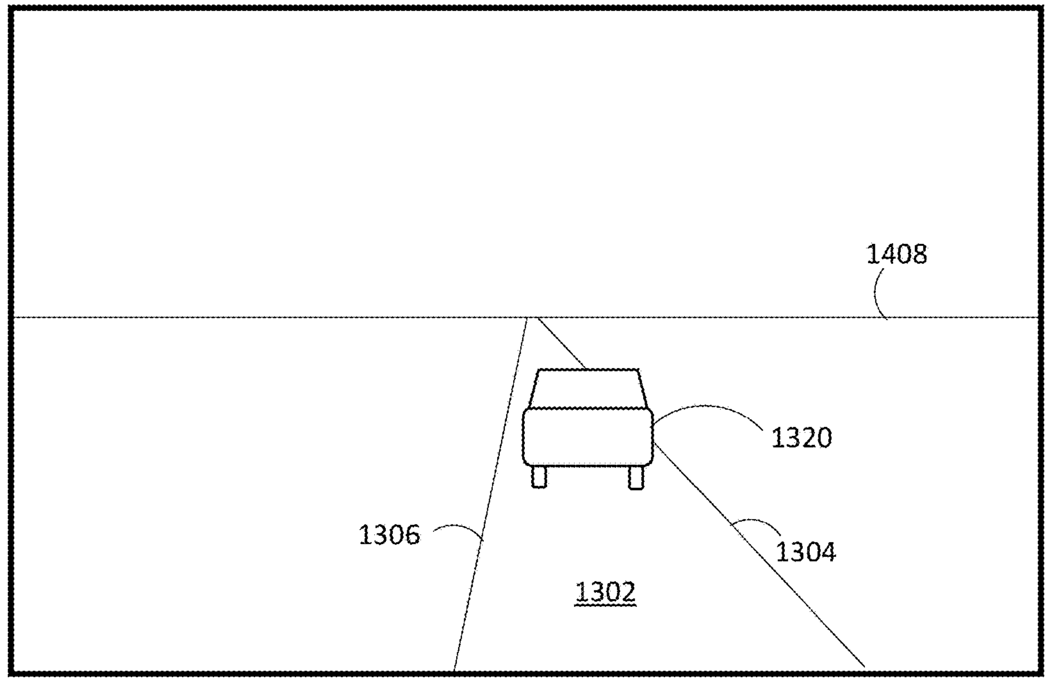

FIG. 14A shows an image 1400 captured by image capture device 1314 in FIG. 13A; that is, an image captured by an image capture device positioned towards the right side of vehicle 1310. In image 1400, vehicle 1320 can be seen, driving on roadway 1302 (as bounded by edges 1304 and 1306), toward horizon 1408. FIG. 14B shows an image 1410 captured by an image capture device 1316 in FIG. 13B; that is, an image captured by an image capture device positioned towards the left side of vehicle 1310. In image 1410, vehicle 1320 can be seen, driving on roadway 1302 (as bounded by edges 1304 and 1306), toward horizon 1408. In image 1400, the roadway 1302 appears more on the left side, due to the perspective of image capture device 1314. In contrast, in image 1410 the roadway 1302 appears more on the right side due to the perspective of image capture device 1316.

FIGS. 11A, 11B, 12A, 12B, 13A, 13B, 14A, and 14B illustrate effects of image capture device positioning within a vehicle on resulting image data which is captured. While these Figures illustrate scenarios where one vehicle follows another on a roadway, similar discussion applies to more complicated situations. For example, roadways could have more lanes, more vehicles can be present on said roadways, roadways may not be straight, etc. Generally, such complex situations are not illustrated so as to avoid cluttering the figures.

With further reference to acts 511 in method 500 and 811 in method 800, in some implementations accessed parameter data further indicates attributes of the virtual camera. Attributes impact a resulting image captured by said camera, and thus including such information with the parameter data results in more accurate training data, and thus more accurate models trained based on said data. Exemplary camera attributes indicated in the parameter data could include, for example, resolution, lens focal length, lens type, or any other appropriate attributes. This principle is illustrated with reference to FIGS. 15A and 15B discussed below.

Figure 15A:
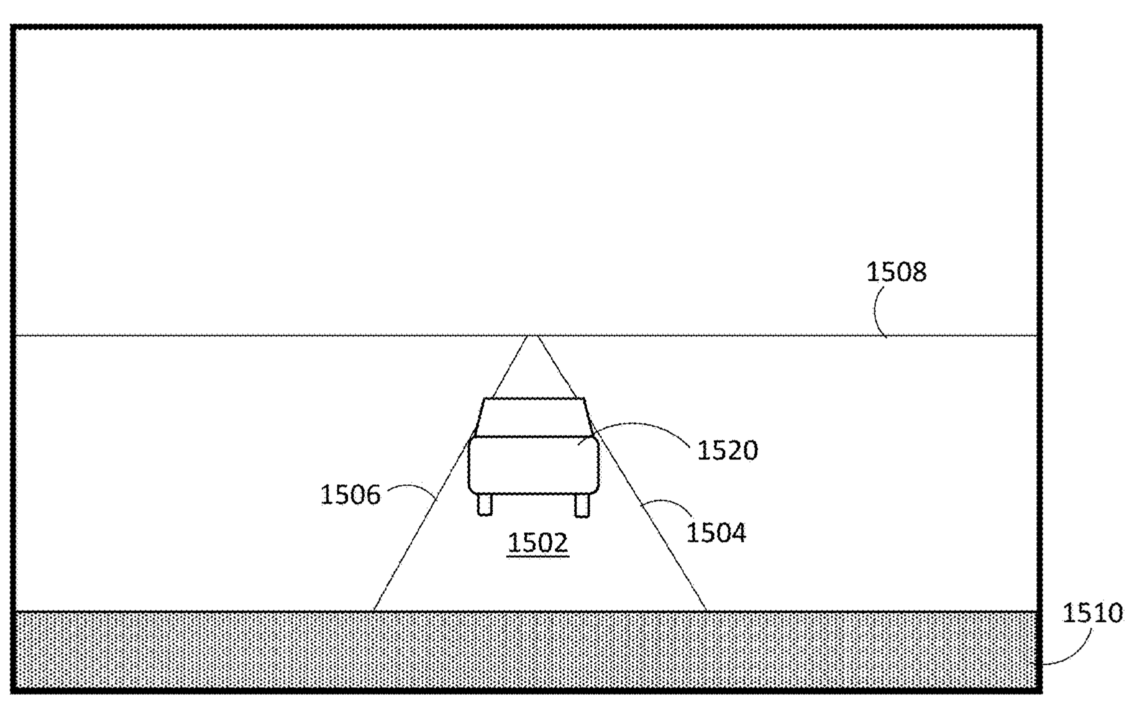
FIGS. 15A and 15B illustrate image data for cameras having different attributes in at least two exemplary implementations.
Figure 15B:
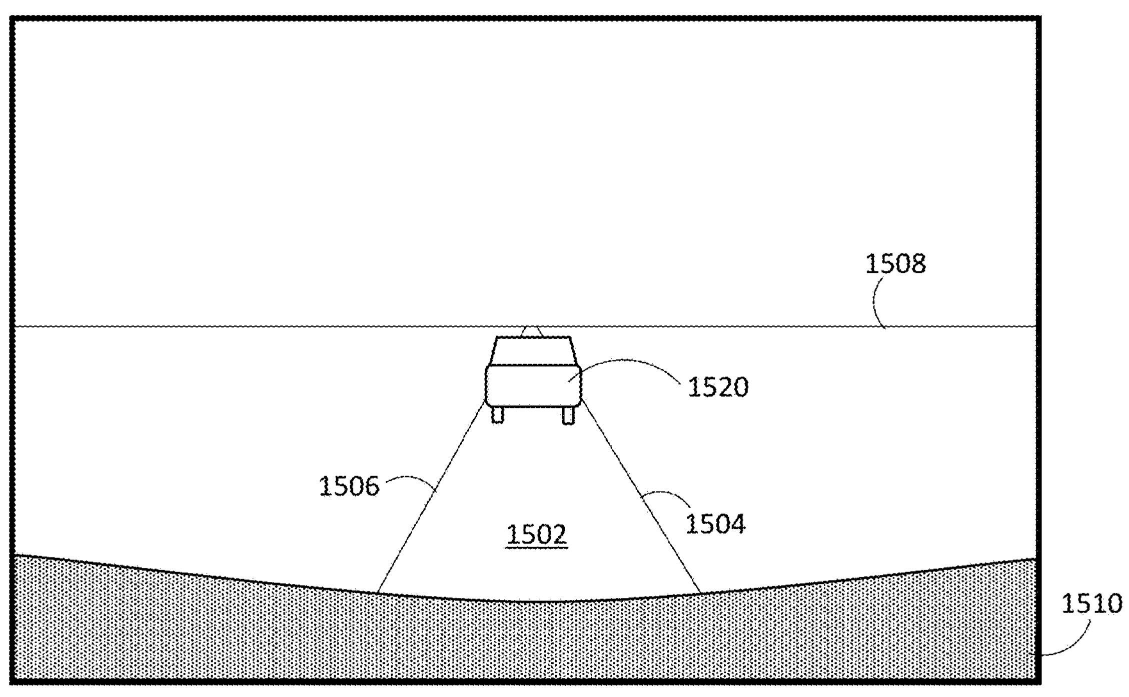

FIGS. 15A and 15B illustrate image data 1500A and 1500B, respectively, as captured by cameras having different attributes. In particular, image data 1500A and 1500B represent the same scene of a vehicle 1520 travelling on roadway 1502 defined by edges 1504 and 1506, towards horizon 1508. A dash 1510 of a vehicle behind vehicle 1520 is also shown in FIGS. 15A and 15B. Image data 1500A represents data captured using a "standard" or "normal" lens (e.g. a lens which most closely approximates human vision, typically a lens with a focal length between 35 mm and 50 mm). Image data 1500B represents data captured using a wide-angle or fish-eye lens (e.g. a lens which captures light over a wider region than a normal lens, typically with a shorter focal length than a normal lens). As a result of the different lens attributes, vehicle 1520 appears farther away from the camera in image 1500B than in image 1500A. Further, features of image 1500B appear distorted. Namely, dash 1510 of the vehicle carrying the camera appears straight in image 1500A, but is curved upwards at the periphery of image 1500B due to the difference in lens attributes.

When rendering images (as in act 513 of method 500 or act 813 of method 800), the properties of the camera can be accounted for, and images rendered as if they were captured by such a camera. Alternatively, subsets of images can be selected, and camera distortion effects applied after the image data is rendered, as discussed later with reference to FIG. 19.

With further reference to acts 511 in method 500 and 811 in method 800, in some implementations accessed parameter data further indicates environmental conditions, or information from which environmental conditions can be derived. Environmental conditions impact a resulting image captured by said camera, and thus including such information with the parameter data results in more accurate training data, and thus more accurate models trained based on said data. This principle is illustrated in FIGS. 16A, 16B, 16C, and 16D discussed below.

In some implementations, the parameter data indicates weather conditions and/or lighting conditions. For example, the parameter data could indicate rain, snow, sleet, fog, sun, clouds, or any other appropriate weather conditions. In some implementations, the parameter data indicates time of day and/or date, from which weather conditions and/or lighting conditions can be generated, estimated, or retrieved (e.g. from a weather service). When simulating vehicles in the virtual environment and rendering images (as in acts 512 and 513 of method 500 or acts 812 and 813 of method 800), the environment and environment conditions can also be simulated, which results in visible changes in the image data. Alternatively, subsets of images can be selected, and environmental distortion effects applied after the image data is rendered, as discussed later with reference to FIG. 19.

FIGS. 16A, 16B, 16C, and 16D discussed below show a variety of environmental conditions represented in image data. Each of FIGS. 16A, 16B, 16C, and 16D show image data where a vehicle 1620 is travelling on roadway 1602 (as bounded by edges 1604 and 1606), towards horizon 1608. The image data is shown from the perspective of a camera in a vehicle behind vehicle 1620. There are two (or more) taillights 1622 positioned on a rear end of vehicle 1620.

Figure 16A:
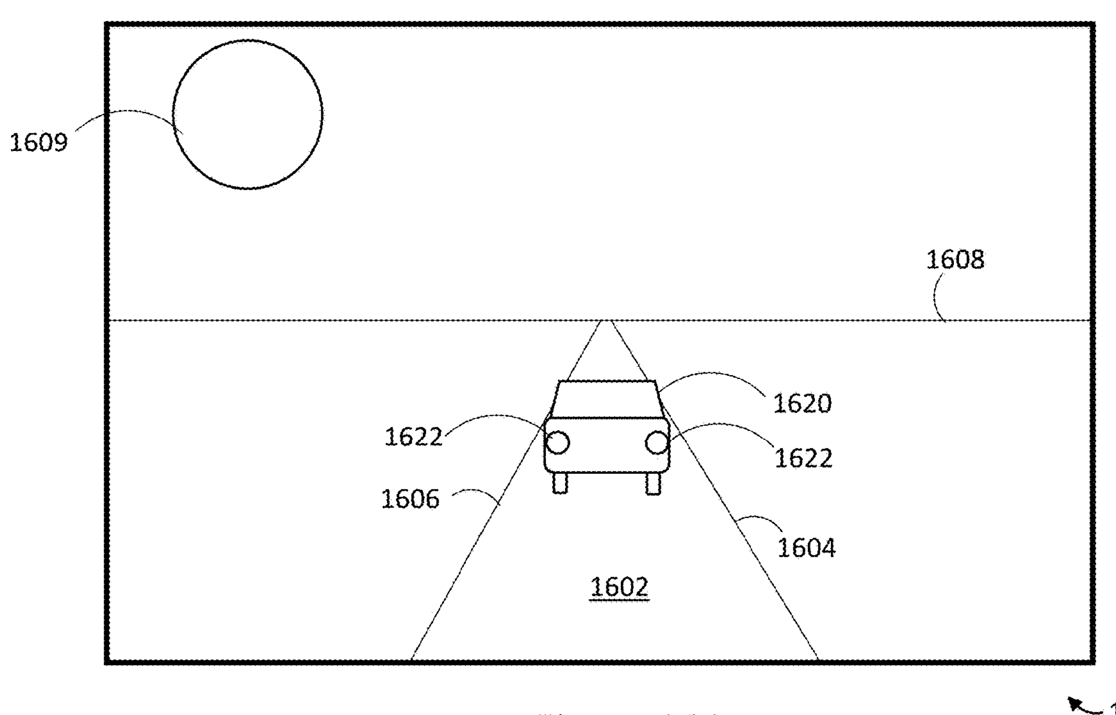
FIGS. 16A, 16B, 16C, and 16D illustrate image data where environmental conditions are represented.

FIG. 16A shows image data 1600A, which represents a clear, sunny day. Sun 1609 can be seen in the sky of image 1600A. To this end, the respective parameter data can include an indication of sun position, altitude, azimuth, intensity, or any other appropriate aspects of the sun. Further, the respective parameter data may indicate that the weather is clear or sunny, but may not indicate a position of the sun. In such cases the sun may not be included in image data 1600A, or sun position, altitude, azimuth, intensity, or other aspects could be procedurally determined by the at least one processor of the device generating image data 1600A. Alternatively, the respective parameter data may only indicate time of day and/or date, and the at least one processor of the device generating image data 1600A may determine that is it daytime, and aspects of the sun and lighting conditions can be based on historical weather data, and image data is generated accordingly.

Figure 16B:
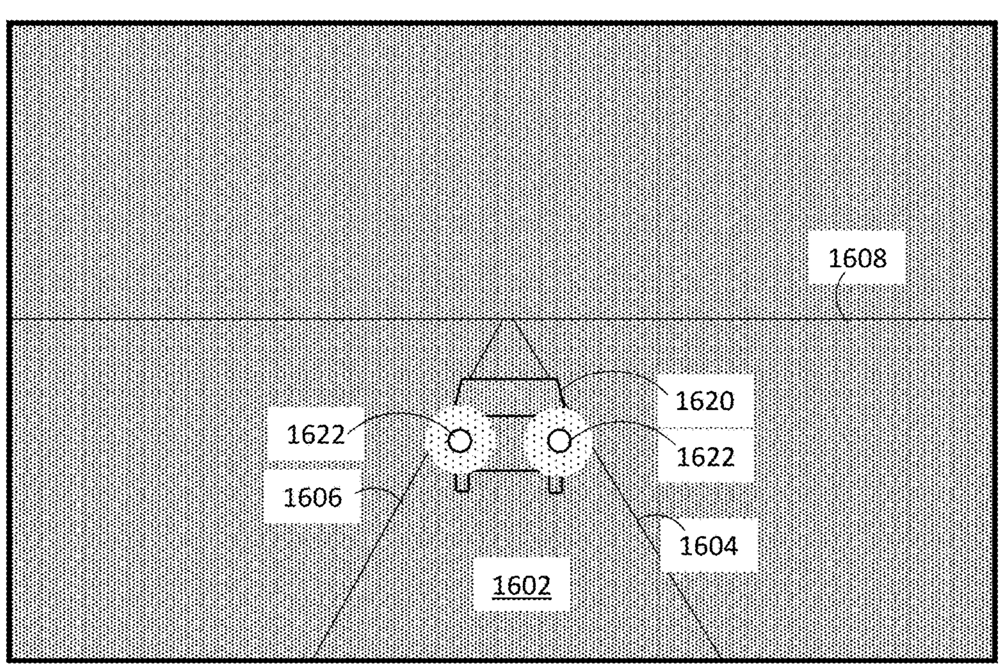

FIG. 16B shows image data 1600B, which is relatively dark compared to image 1600A. For example, the respective parameter data may indicate that it is night time, and as such image 1600B is generated to be dark. Alternatively, the respective parameter data may indicate that it is cloudy, and thus image 1600B is generated to be darker than for a sunny day as in image 1600A. FIG. 1600B is also shown with taillights 1622 emitting light, due to being active. In some implementations, the respective parameter data may only indicate time of day and/or date, and the at least one processor of the device generating image data 1600A may determine that is it nighttime, and aspects of lighting conditions (e.g. due to moon cycle) can be based on historical weather data. The at least one processor may also rendering lighting due to streetlights.

Figure 16C:
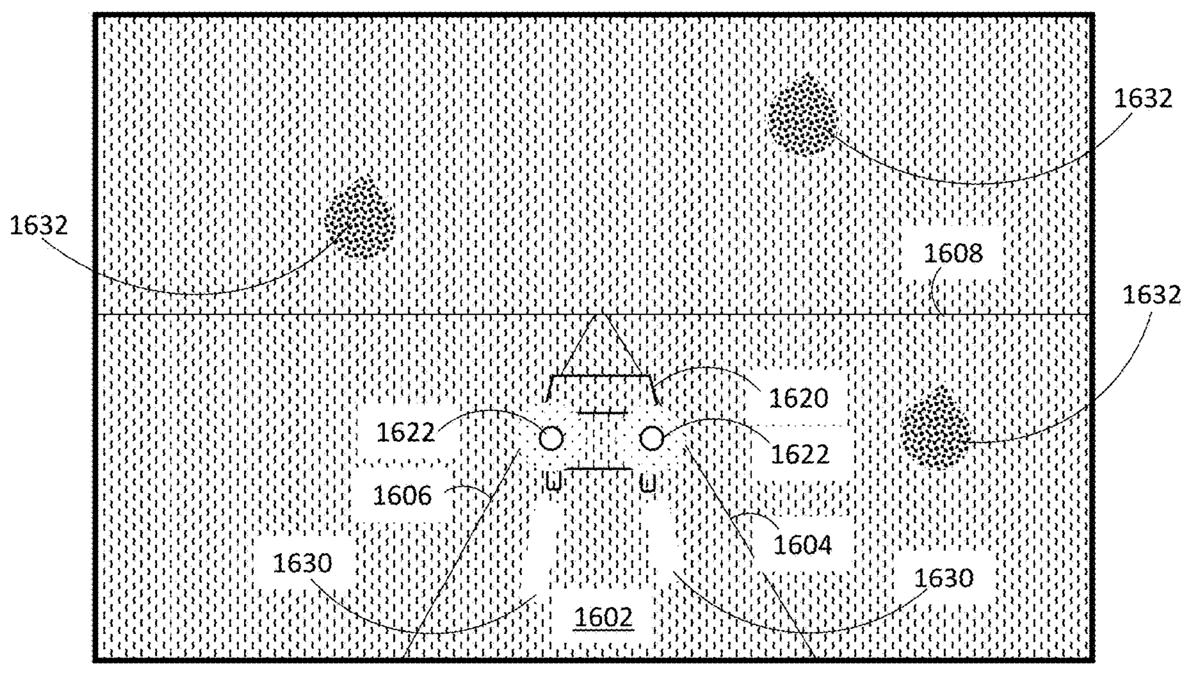

FIG. 16C shows image 1600C, which shows precipitation. For example, the respective parameter data may indicate that rain, hail, sleet, snow, or other precipitation is falling. Corresponding precipitation is rendered in image 1600C. Further, other visual effects due to precipitation can also be rendered. For example, FIG. 16C also shows spots 1632, which represent wetness (e.g. rain drops or snowflakes) in front of the camera (e.g. on the windshield or lens of the camera in the vehicle behind vehicle 1620). As another example, FIG. 16C also shows wetness 1630 (e.g. puddles or sheen from water) on roadway 1602.

Figure 16D:
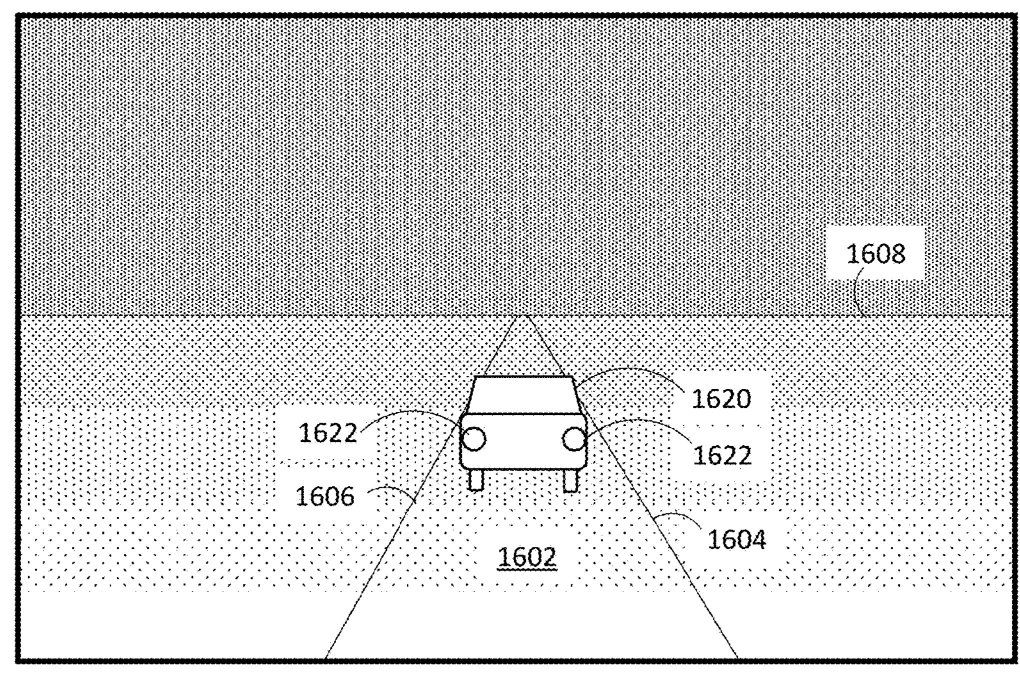

FIG. 16D shows image 1600D, which shows fog. For example, the respective parameter data may indicate fog intensity, fog distance, fog fall, and/or any other aspects related to fog. Corresponding fog is rendered in image 1600D. The fog is shown as obscuring visibility farthest from the camera, while having limited impact on visibility close to the camera.

Other attributes of the environment can also be indicated in the respective parameter data, to be rendered in image data. As an example, atmospheric light scattering properties (scattering intensity, Rayleigh Scattering scale, Mie Scattering scale, etc.) can be indicated in the respective parameter data. Rendered image data can account for such scattering properties (e.g. by rendering sky with appropriate hue, saturation, and gradient). As another example, properties of vehicle 1620 can be indicated in the respective parameter data, such as vehicle color, vehicle dimensions, and/or vehicle model. Rendered image data can account for such vehicle properties (e.g. by rendering the vehicle of appropriate size, shape, and color).

Figure 17A:
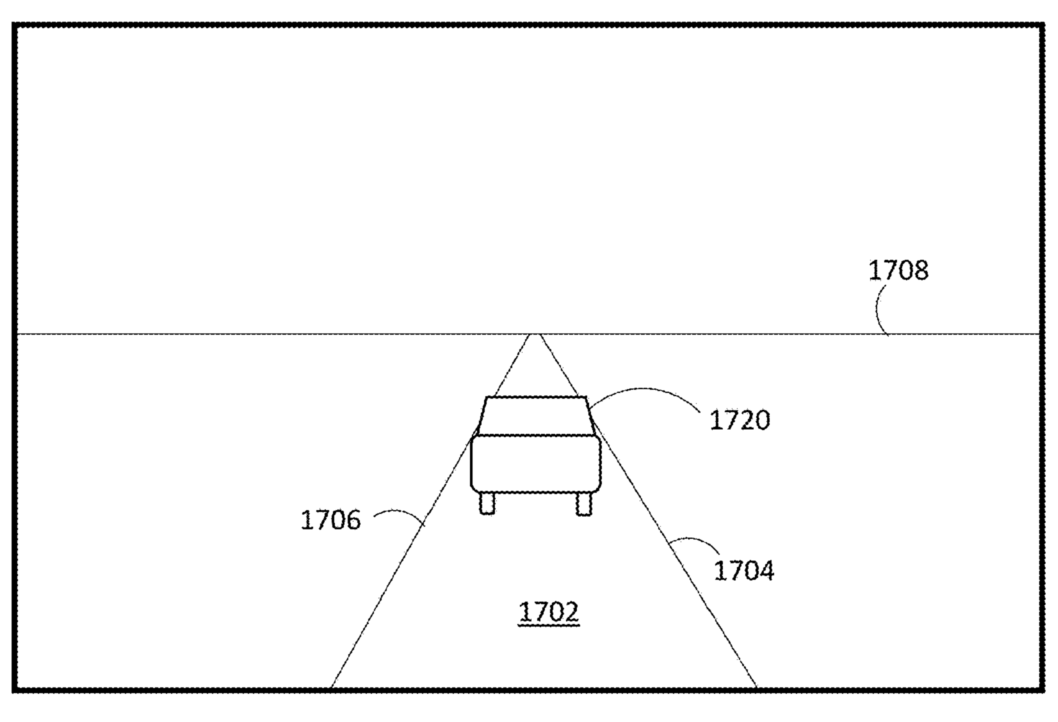
FIGS. 17A and 17B illustrate image data where technical effects are represented.
Figure 17B:
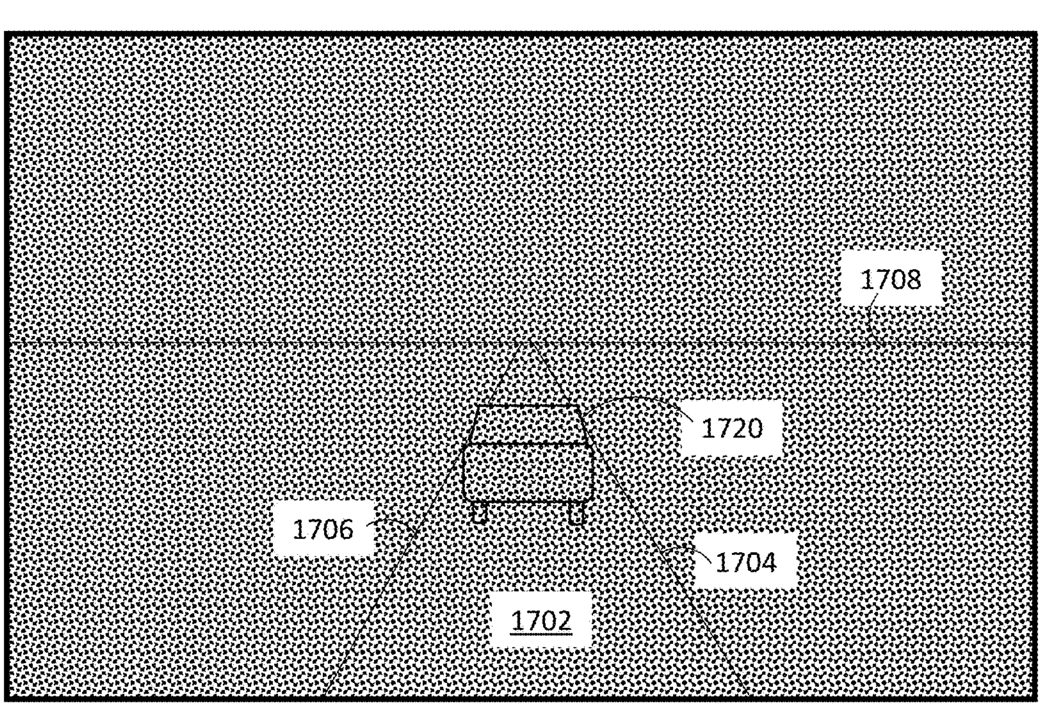

Beyond environmental effects, image data can also show rendered technical effects. FIGS. 17A and 17B discussed below show a variety of technical effects represented in image data. Each of FIGS. 17A and 17B show image data where a vehicle 1720 is travelling on roadway 1702 (as bounded by edges 1704 and 1706), towards horizon 1708. The image data is shown from the perspective of a camera in a vehicle behind vehicle 1720.

FIG. 17A shows image data 1700A, which represents clear image data with no technical artifacting. For comparison, FIG. 17B shows image data 1700B, which features technical artifacting or effects. FIG. 17B in particular shows noise in image 1700B. Other technical artifacts or effects can include any of blurring, compression losses, adversarial image modification, image saturation modifications, and changes in pixel value distribution, as non-limiting examples. Respective parameter data can include an indication of any number of technical effects or artifacting to be rendered in image data.

When rendering images (as in act 513 of method 500 or act 813 of method 800), technical effects can also be simulated, which results in visible changes in the image data. Alternatively, subsets of images can be selected, and technical distortion effects applied after the image data is rendered, as discussed below with reference to FIG. 19.

Respective parameter data for each generated image can be input manually; that is, an operator could input values for a number of properties for each image to be generated via a user input device such as those discussed earlier. However, in order to generate a large library of training images (which will result in a more robust model trained based on the training images), parameter data can be autonomously generated by at least one processor. To this end, instructions can be provided (e.g. by a user via a user input device) regarding ranges of parameters for image generation.

FIG. 18 is a table showing a list of parameter ranges, for automated generation of respective parameter data for a plurality of images to be generated. In the left column, a plurality of different parameters are listed. One skilled in the art will appreciate that the list of parameters is merely exemplary, and additional parameters could be added, or parameters could be removed, as appropriate for a given application.

In some implementations, prior to act 511 in method 500 or act 811 in method 800 (that is, prior to accessing respective parameter data, for subsequent generation of image data for a particular instance), individual parameter data is generated for the particular instance. That is, specific values for each parameter of interest are provided, and method 500 or method 800 proceed to generate image data for the instance based on the specific values provided.

In other implementations, in act 511 in method 500 or act 811 in method 800, general parameter data is accessed (e.g. such as the list shown in FIG. 18, where a range for each parameter of interest is provided). In act 511 or act 811, specific parameter data for the particular instance is generated within the range specific in the general parameter data.

In some implementations, image data can be generated, and image distortion effects (whether environmental or technical) can be applied afterwards to the generate image data. In particular, from the plurality of instances for which image data is generated (the first plurality of instances in method 500 and/or the second plurality of instances in method 800), a subset of instances is selected. For each instance of the subset of instances, at least one distortion effect (e.g. camera attributes as discussed with reference to FIGS. 15A and 15B; environment effects as discussed with reference to FIGS. 16A, 16B, 16C, and 16D; and/or technical effects as discussed with reference to FIGS. 17A and 17B) is applied to the at least one image output for the instance. An illustrative example is shown in FIG. 19.

Figure 19:
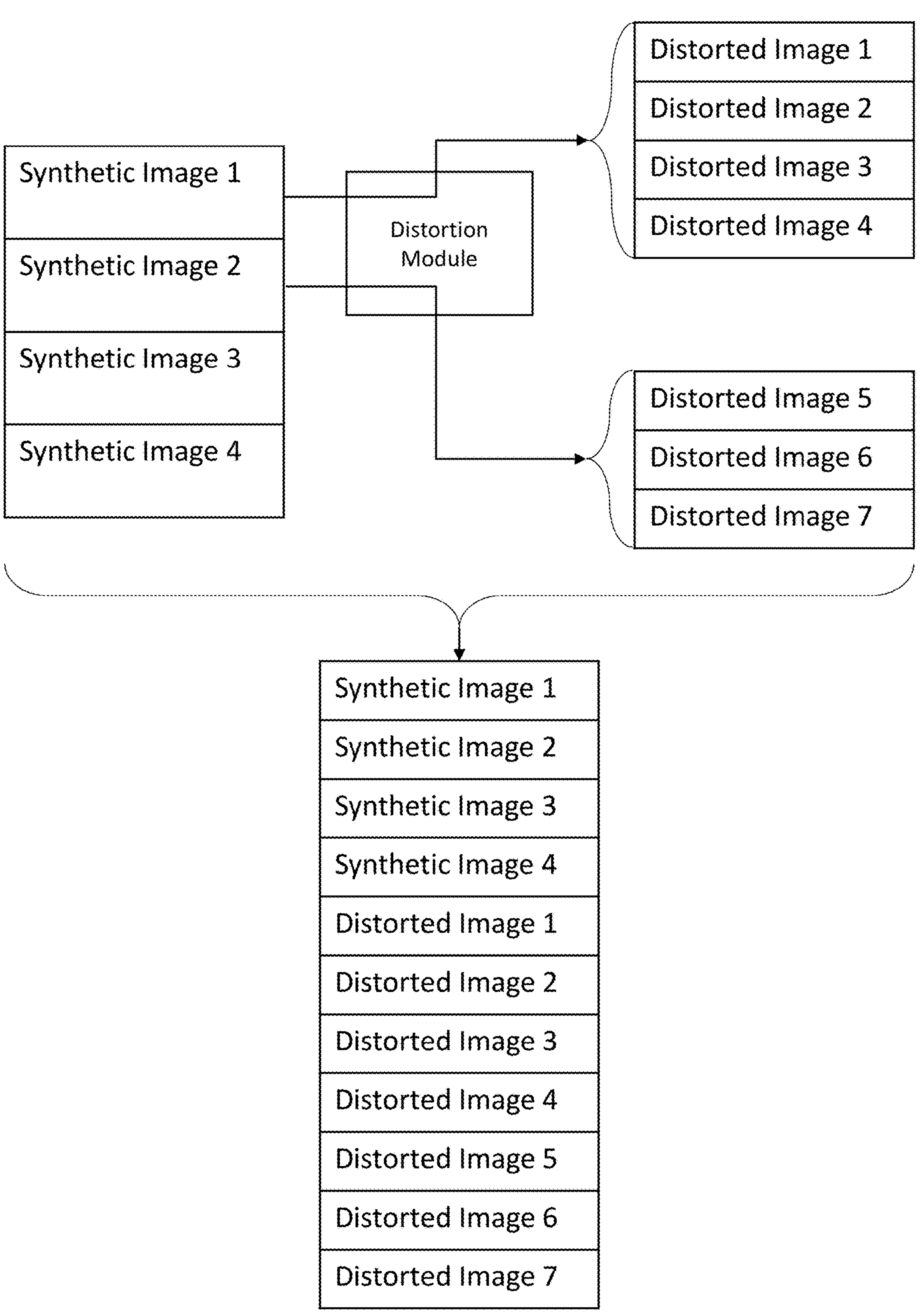
FIG. 19 is a block diagram of applying distortion effects to images, in accordance with at least one exemplary implementation.

FIG. 19 shows Synthetic image data generated for four instances, in an implementation where a single image is generated for each instance. One skilled in the art will appreciate that the disclosure of FIG. 19 is fully applicable to more or fewer instances, and to instances where a plurality of images are generated (such as discussed later with reference to FIGS. 20A, 20B, and 20C). In the example of FIG. 19, "Synthetic Image 1" represents an image generated for a first instance, "Synthetic Image 2" represents an image generated for a second instance, "Synthetic Image 3" represents an image generated for a third instance, and "Synthetic Image 4" represents an image generated for a fourth instance. A subset of instances are selected; in the illustrated example, the first and second instances (for which synthetic images 1 and 2 are generated) are selected.

Synthetic image 1 is run through a distortion module, which applies distortion effects thereto. In the illustrated example, four different distortion "schemes" are applied to Synthetic Image 1, to generate four respective distorted images, labelled "Distorted Image 1", "Distorted Image 2", Distorted Image 3", and "Distorted image 4". Distortion "scheme" refers to a specific type, collection, magnitude, or other properties of distortion, which result in different distorted images. For example, a 25% downscale-upscale distortion (described later) can be applied to Synthetic Image 1 to generate Distorted Image 1; a 50% downscale-upscale distortion can be applied to Synthetic Image 1 to generate Distorted image 2; a raindrop effect can be applied to Synthetic Image 1 to generate Distorted Image 3; a combination of a raindrop effect and a 50% downscale-upscale distortion can be applied to Synthetic Image 1 to generate Distorted Image 4.

Generally, a greater variety of distorted images, with varying distortions applied thereto, to varying degrees, and in combination with other distortions, will result in a large data set which simulates many different scenarios, camera configurations, and data pipelines, and thus will generally result in training data which, when used to a train a machine learning model, will result in the machine learning model being more robust. Every possible type of distortion, and every possible combination of distortion effects, is not listed herein for brevity. However, generally the disclosure can be applied to arrive at a set of distortion effects (and combinations of distortion effects) which result in meaningful training data representative of real-world effects. Some example distortions are discussed below.

A downscale-upscale distortion refers to a process where an image is downscaled by a certain amount (e.g. to 25%, 50%, 75%, or any other appropriate resolution), and then upscaled back to the original resolution. Such a process simulates blurring effects, artifacting, motion, low sensor quality, compression loss, and other image data effects. Generally, the lower the resolution which the image is downscaled to, the greater the resulting distortions.

A compress-decompress distortion refers to a process where an image is compressed using a lossy compression technology (i.e. a technology where some original data is lost), and subsequently decompressed. Such a process simulates compression artifacting.

A noise distortion refers to a process where random noise is introduced into an image. For example, a noise filter can be applied over the image. An adversarial effect distortion similarly introduces noise into an image, but said noise is very specific and designed to cause a trained model to produce false output when analyzing such an image.

Blur distortion refers to applying a blur filter to an image.

Pixel value distortion refers to distorting pixel values within an image (e.g. to oversaturate, undersaturate, discolor an image, brighten, or darken an image).

Motion distortion refers to applying a motion filter to an image, e.g. by blurring or skewing the image in a direction to simulate movement during image capture.

A lens-obstruction effect distortion refers to a process where effects of external substances on the camera lens are simulated. For example, water spots such as those illustrated in FIG. 1600C as 1632 can be positioned in the image to simulate water on the lens. Similar distortion effects could be applied to simulate snow on the lens, dirt on the lens, oil/smudges on the lens, humidity/fog on the lens, or any other pertinent obstructions.

Environmental distortion to simulate environment effects can be applied, such as lens flare, image level adjustments (brightness, contrast, etc.), pixel values can be adjusted, environmental filters can be applied or overlayed (e.g. precipitation filters).

Camera property distortions could also be applied, such as warping areas of the image to simulate focal length effects.

Applying effects to image data (whether the effects are related to camera properties, environmental conditions, technical effects, or other effects) can be referred to as domain randomization.

Figure 20C:
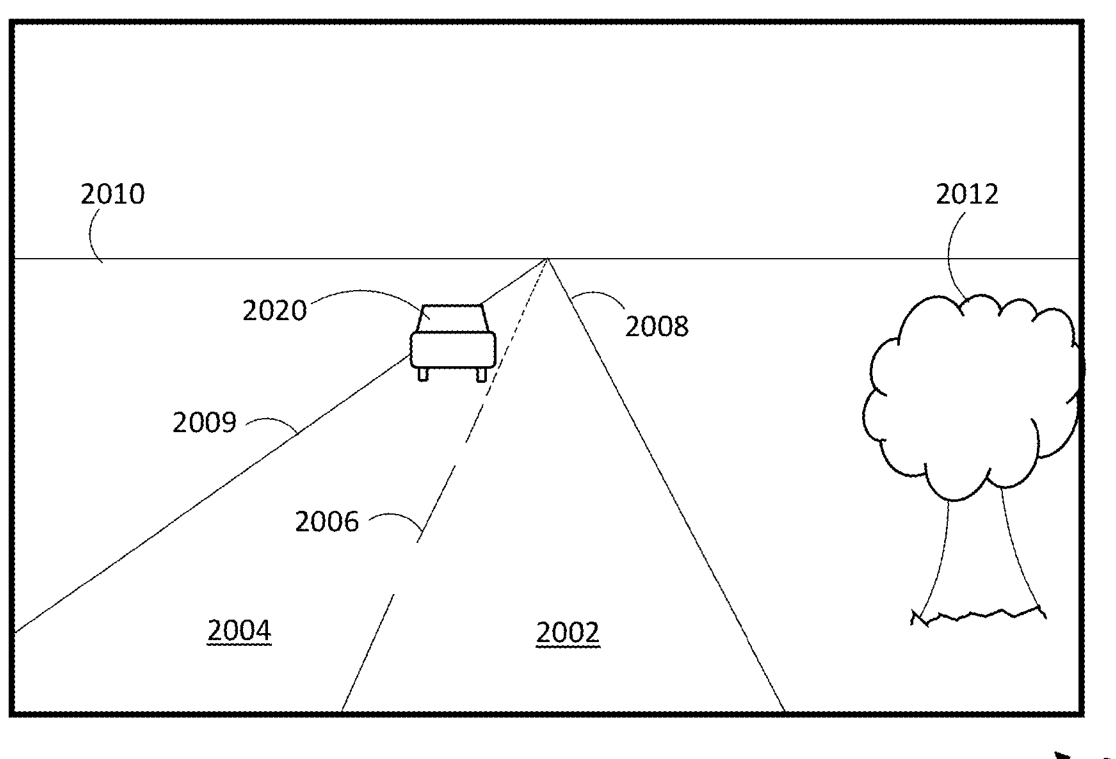

The example images rendered in acts 513 in method 500 and 813 in method 800 have thus far been illustrated as being single images rendered for each respective instance. These are valid implementations of methods 500 and 800, but in alternative implementations, a plurality of images can be rendered for respective single instances. FIGS. 20A, 20B, and 20C illustrate a plurality of respective images 2000A, 2000B, and 2000C which could be rendered in such an implementation, where images 2000A, 2000B, and 2000C represent moments in time.

FIGS. 20A, 20B, and 20C each show a vehicle 2020 driving along a roadway shown by edges 2008 and 2009, towards a horizon 2010. The roadway has two lanes 2002 and 2004, separated by dividing line 2006. A vehicle is driving behind vehicle 2020, and has the camera which the perspective of each of images 2000A, 2000B, and 2000C represents. Each of images 2000A, 2000B, and 2000C also shows tree 2012 which is stationary.

In image 2000A, vehicle 2020 is shown driving in lane 2002, relatively close to the vehicle in which the camera is positioned (relative to images 2000B and 2000C). In image 2000A, tree 2012 is shown relatively far from the vehicle in which the camera is positioned (relative to images 2000B and 2000C).

Image 2000B represents a moment in time after the moment shown in image 2000A. In image 2000B, vehicle 2020 is in the process of changing lanes, from lane 2002 to lane 2004, and is thus driving over dividing line 2006.

Further, the vehicle in which the camera is positioned has moved forward, such that stationary tree 2012 appears closer to the camera than in image 2000A. Further still, vehicle 2020 is moving faster than the vehicle in which the camera is positioned, and consequently distance between the two vehicles has grown, such that vehicle 2020 appears further from the camera in image 2000B than in image 2000A.

Image 2000C represents a moment in time after the moment shown in image 2000B. In image 2000C, vehicle 2020 has finished changing lanes, and is now travelling in lane 2004. Further, the vehicle in which the camera is positioned has moved even further forward, such that stationary tree 2012 appears even closer to the camera than in image 2000B. Further still, vehicle 2020 is moving faster than the vehicle in which the camera is positioned, and consequently distance between the two vehicles has grown even more, such that vehicle 2020 appears even further from the camera in image 2000C than in image 2000B.

More or fewer images could be rendered, as appropriate for a given application. By rendering a plurality of images for each instance, training data is more detailed, such that a model trained based on such data will be capable of analyzing vehicle movement over time, instead of trying to understand a situation based on a static image.

In order to render such data, acts 512 and 812 in methods 500 and 800 entail simulating movement of the first vehicle (vehicle 2020 in FIGS. 20A-20C) and the virtual camera over each respective moment in time represented by the plurality of images for the instance. To achieve this, the parameter data accessed at 511 or 811 may further indicate speed, direction of travel, movement path, or any other appropriate information for the vehicles being simulated (the first vehicle, virtual camera, and third vehicles listed in methods 500 and 800).

Figure 21:
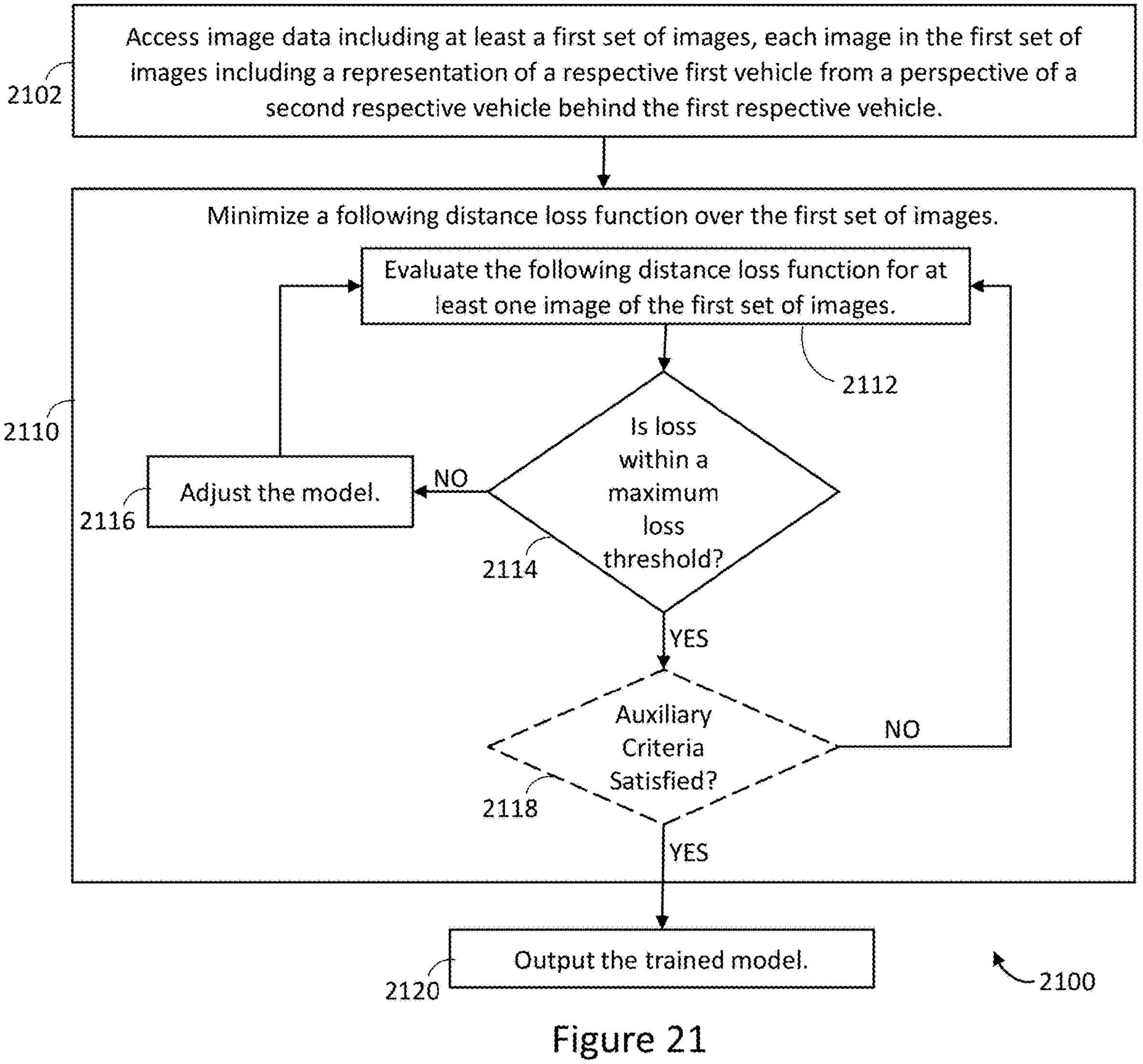
FIG. 21 is a flowchart diagram which illustrates a method for training a machine learning model, in accordance with at least one exemplary implementation.

Returning to method 400 in FIG. 4, at 406 a following distance is determined between a first vehicle and second vehicle based on image data. To achieve this, a machine learning model is trained to determine following distance. FIG. 21 illustrates one example of how such a machine learning model can be trained. FIG. 21 is one exemplary implementation, and other implementations for training the machine learning model can be implemented instead.

FIG. 21 is a flowchart diagram which illustrates an exemplary method 2100 for training a machine learning model. Method 2100 as illustrated includes acts 2102, 2110 (including sub-acts 2112, 2114, 2116, and 2118), and 2120. One skilled in the art will appreciate that additional acts could be added, acts could be removed, or acts could be reordered as appropriate for a given application. As an example, sub-act 2118 is shown in dashed lines to highlight that this sub-act is optional. Acts of method 2100 can be performed by appropriate components of the systems or devices discussed earlier, similar to as discussed with reference to method 500 in FIG. 5, and not repeated for brevity. Importantly, a system or device which performs method 2100 is not necessarily the same hardware which generates training data (as in methods 500 and 800 discussed earlier) or the same hardware which applies the trained model (e.g. as in method 2200 discussed later with reference to FIG. 22). In this way, training data generation, model training, and model execution can be performed by discrete systems or devices most suited to the task. For example, a central server (e.g. any of client device 104, cloud server 106, or local server 118) can perform training data generation and model training, and a device at a vehicle (e.g. image capture device 108A or peripheral device 220) can apply the model based on image data captured at the vehicle. However, in some implementations, a single device or system can perform all of generating training data, training a machine learning model, and applying the machine learning model.

At 2102, image data is accessed by at least one processor of the device performing method 2100. The image data includes at least a first set of images, such as the first plurality of images output at 524 in method 500 discussed with reference to FIG. 5. The accessed image data can be labelled real-world data, or as discussed above can be image data generated via simulation. As above, each image in the first set of images includes a representation of a respective first vehicle from a perspective of a second respective vehicle behind the first vehicle. That is, each image represents a respective instance where a second vehicle is positioned behind (following) a first vehicle. Further, each image in the first set of images is associated with a distance label indicating a distance between the respective first vehicle and the respective second vehicle. Further still, each image in the first set of images is associated with a respective vehicle presence label which indicates whether the first vehicle is present within a meaningful following situation with the second vehicle. In particular, the vehicle presence label can indicate one or both of (i) whether the first vehicle and the second vehicle are within a presence threshold distance of each other, or (ii) whether the first vehicle and the second vehicle are travelling in a same lane of travel. That is, the vehicle presence label indicates whether the second vehicle is actually following the second vehicle (i.e. is within a close enough distance to be meaningful, and/or the second vehicle is actually behind the second vehicle and not in a different lane).

At 2110, a following distance loss function is minimized over the first set of images. Equation (1) below shows the loss function for this exemplary implementation:

$$L = P * |D - d| + (P - p)^2 \tag{1}$$

In Equation (1), L represents loss. P is the vehicle presence label, where a label of 0 indicates the first vehicle is not within the vehicle presence threshold, and a label of 1 indicates the first vehicle is within the vehicle presence threshold. Vehicle presence as determined by the model is indicated by p, and is a decimal number between 0 and 1 which represents confidence by the model that the first vehicle is within the vehicle presence threshold (where a higher value means greater confidence, and vice-versa). D is the value for distance indicated in the distance label, and d is the value for distance as determined by the model.

The first term in Equation (1), $P*|D-d|$, represents the distance regression loss. That is, the difference between the distance as indicated in the label and the distance determined by the model. Where P=1, (vehicle presence label for a particular image indicates that the first vehicle is within the vehicle presence threshold), the first term becomes $|D-d|$, which represents difference between the distance label and the distance determined by the model (i.e., how accurately the model determined distance, where a higher value indicates greater inaccuracy than a low value). Where P=0, (vehicle presence label for a particular image indicates that the first vehicle is not within the vehicle presence threshold), the first term becomes 0, such that loss L becomes only the second term.

The second term in Equation (1), $(P-p)^2$, represents classification loss. That is, the difference between the vehicle presence as indicated in the vehicle presence label and as determined by the model (i.e., how inaccurately the model classifies whether a vehicle is within the vehicle presence threshold).

In the process of generating training data as discussed earlier with reference to FIGS. 5 and 8, which can be used to train a model using Equation (1), outputting at least one image for an instance (as in acts 515 and 815) further comprises outputting the at least one image associated with a vehicle presence label indicative of whether the distance between the first vehicle and the second vehicle with within the vehicle presence threshold. In some cases, the vehicle presence label is input by a user, whereas in other the vehicle presence label for a given instance is generated as part of method 500 or 800, based on the distance between the first vehicle and the second vehicle (the distance between the first position and the second position).

In some exemplary implementations, the vehicle presence threshold is set to 40 meters. However, any vehicle presence threshold could be used, as appropriate for a given application.

In the example of FIG. 21, act 2110 includes sub-acts 2112, 2114, 2116, 2118. At 2112, the following distance loss function is evaluated by the at least one processor for at least one image of the first set of images. That is, for the at least one image, the model is applied to determine p and d, and subsequently loss L is determined in accordance with Equation (1).

At 2114, the determined loss L is compared to a maximum loss threshold by the at least one processor. If determined loss L is not within the maximum loss threshold, method 2100 proceeds to act 2116 where the model is adjusted (e.g. by adjusting weights and biases of the model with the aim of reducing loss). In one exemplary implementation, back-propagation is implemented to adjust weights and biases of the model. One skilled in the art can implement any appropriate model structure and means for adjusting the model, as appropriate for a given application. After the model is adjusted at 2116, method 2100 returns to act 2112, where the following distance function is evaluated for at least one image of the first set of images. The at least one image for which the following distance loss function is evaluated can be the same at least one image as before, such that the adjustments to the model are "tested" against the same image data. Alternatively, the at least one image for which the following distance loss function is evaluated can be a different at least one image, such that the model is adjusted by moving through the first set of images.

Acts 2112, 2114, and 2116 can be iterated any appropriate number of times, until loss is within the maximum loss threshold at 2114, in which case method 2100 proceeds to 2118. At 2118, auxiliary criteria for the model are evaluated. If the auxiliary criteria are not satisfied, method 2100 returns to act 2112, where the following distance loss function is evaluated. Auxiliary criteria can include various criteria. As one example, auxiliary criteria can require that the loss function be within a maximum loss threshold for each image in the first set of images. That is, even if the loss function is within a maximum loss threshold for a first image, the auxiliary criteria can require that each image be evaluated prior to outputting the trained model. As another example, auxiliary criteria can require that the loss function be within a maximum loss threshold for at least a defined amount of images in the first set of images. That is, even if the loss function is within a maximum loss threshold for a first image, the auxiliary criteria can require that the loss function be within the maximum loss threshold for a defined amount (e.g. 90%) of the images in the first set of images. As another example, auxiliary criteria can require that the loss function be evaluated for at least a defined amount of images (e.g. 90%) in the first set of images.

Act 2118 is optional. In one exemplary implementation, evaluating the following distance loss function for at least one image of the first set of images in act 2112 comprises evaluating the following distance loss function for each image of the first set of images (or for a defined amount of images in the first set of images), such that criteria regarding quantity of images to be evaluated are inherently satisfied.

If the auxiliary criteria are satisfied at 2118 (or if act 2118 is not included), method 2100 proceeds to act 2120. At 2120, the model is considered as a "trained" model, and is output for use. For example, the trained model can be sent to another device for storage, distribution, and/or application, or can be stored at a non-transitory processor-readable storage of the device which performed the training.

Exemplary implementations and usage scenarios for method 2100 (in particular act 2110) are discussed below.

In a first example, at 2112 the distance loss function is determined for a first image. The first image is associated with vehicle presence label $P_1=1$ and distance label $D_1=3$ m. In this case, the model determines vehicle presence $p_1=0.9$ and distance as $d_1=2.5$ m. With these values, evaluating Equation (1) results in a distance loss $L_1=0.51$. At 2114, loss $L_1$ is compared to a maximum loss threshold, which in this example is 0.25. Since 0.51 is greater than 0.25, loss $L_1$ is not within the maximum loss threshold, and method 2100 proceeds to act 2116. At 2116, the model is adjusted per a machine learning adjustment process, after which method 2100 proceeds to a second iteration of act 2112. In this first example, the second iteration of act 2112 is run again on the first image. As a result of the adjustments to the model at 2116, the model now determines vehicle presence $p_2=0.95$ and distance as $d_2=2.9$ m. As a result, Equation (1) evaluates to loss $L_2=0.1025$. In a second iteration of act 2114, loss $L_2$ is compared to the maximum loss threshold of 0.25. Since 0.1025 is less than 0.25, loss $L_2$ is within the maximum loss threshold. If no auxiliary criteria are specified (i.e. act 2118 is not included), method 2100 proceeds to act 2120, where the trained model is output.

For a case where an auxiliary criteria is specified in the first example, which requires that the loss be within the maximum loss threshold for each image in the first set of images, at 2118 the method returns to 2112. The following distance function is evaluated for a second image at 2112, and method 2100 proceeds to sub-act 2114 (and 2116 if appropriate) similar to as discussed regarding the first image. This cycle is repeated for each image in the first set of images.

In the first example, the model is trained by repeating evaluation of the distance loss function for a first image. As discussed above, this can be performed for each image in the first set of images, until the distance loss function as evaluated for each image is within the maximum loss threshold. Alternatively, this can be performed until the distance loss function as evaluated for a threshold amount of images, such as 90% of the images, is within the maximum loss threshold. In this way, loss can be minimized for each image (or a satisfactory amount of images) in the first set of images.

In a second example, at 2112 the distance loss function is determined for the first image similarly as discussed above for the first example. As above, evaluating Equation (1) results in a distance loss $L_1=0.51$. At 2114, loss $L_1$ is compared to a maximum loss threshold, which in this example is 0.25. Since 0.51 is greater than 0.25, loss $L_1$ is not within the maximum loss threshold, and method 2100 proceeds to act 2116. At 2116, the model is adjusted per a machine learning adjustment process, after which method 2100 proceeds to a second iteration of act 2112. In this second example, the second iteration of act 2112 is run instead on a second image. The second image is associated with vehicle presence label $P_2=1$ and distance label $D_2=2$ m. In this case, the model determines vehicle presence $p_2=0.93$ and distance as $d_2=1.7$ m. With these values, evaluating Equation (1) results in a distance loss $L_2=0.3049$. At 2114, loss $L_2$ is compared to a maximum loss threshold, which in this example is 0.25. Since 0.3049 is greater than 0.25, loss $L_2$ is not within the maximum loss threshold, and method 2100 proceeds to act 2116. At 2116, the model is again adjusted per a machine learning adjustment process, after which method 2100 proceeds to a third iteration of act 2112. In this second example, the third iteration of act 2112 is run instead on a third image. The third image is associated with vehicle presence label $P_3=1$ and distance label $D_3=3.5$ m. In this case, the model determines vehicle presence $p_3=0.95$ and distance as $d_3=3.3$ m. With these values, evaluating Equation (1) results in a distance loss $L_3=0.2025$. In a third iteration of act 2114, loss $L_3$ is compared to the maximum loss threshold of 0.25. Since 0.2025 is less than 0.25, loss $L_3$ is within the maximum loss threshold. If no auxiliary criteria are specified (i.e. act 2118 is not included), method 2100 proceeds to act 2120, where the trained model is output.

For a case where an auxiliary criteria is specified in the second example, which requires that the loss be within the maximum loss threshold for each image in the first set of images, at 2118 the method returns to 2112. The following distance function is evaluated for a fourth image at 2112, and method 2100 proceeds to sub-act 2114 (and 2116 if appropriate) similar to as discussed regarding the first image. This cycle is repeated for each image in the first set of images. Further, because the loss function for the first and second images was determined as being greater than the maximum loss threshold, sub-acts 2112, 2114, and 2116 (as appropriate) are performed again for the first and second images.

In the second example, the model is trained by iteratively evaluating the distance loss function, on different images. In this way, loss can be minimized for a plurality of images (or a satisfactory amount of images) in the first set of images.

Figure 22:
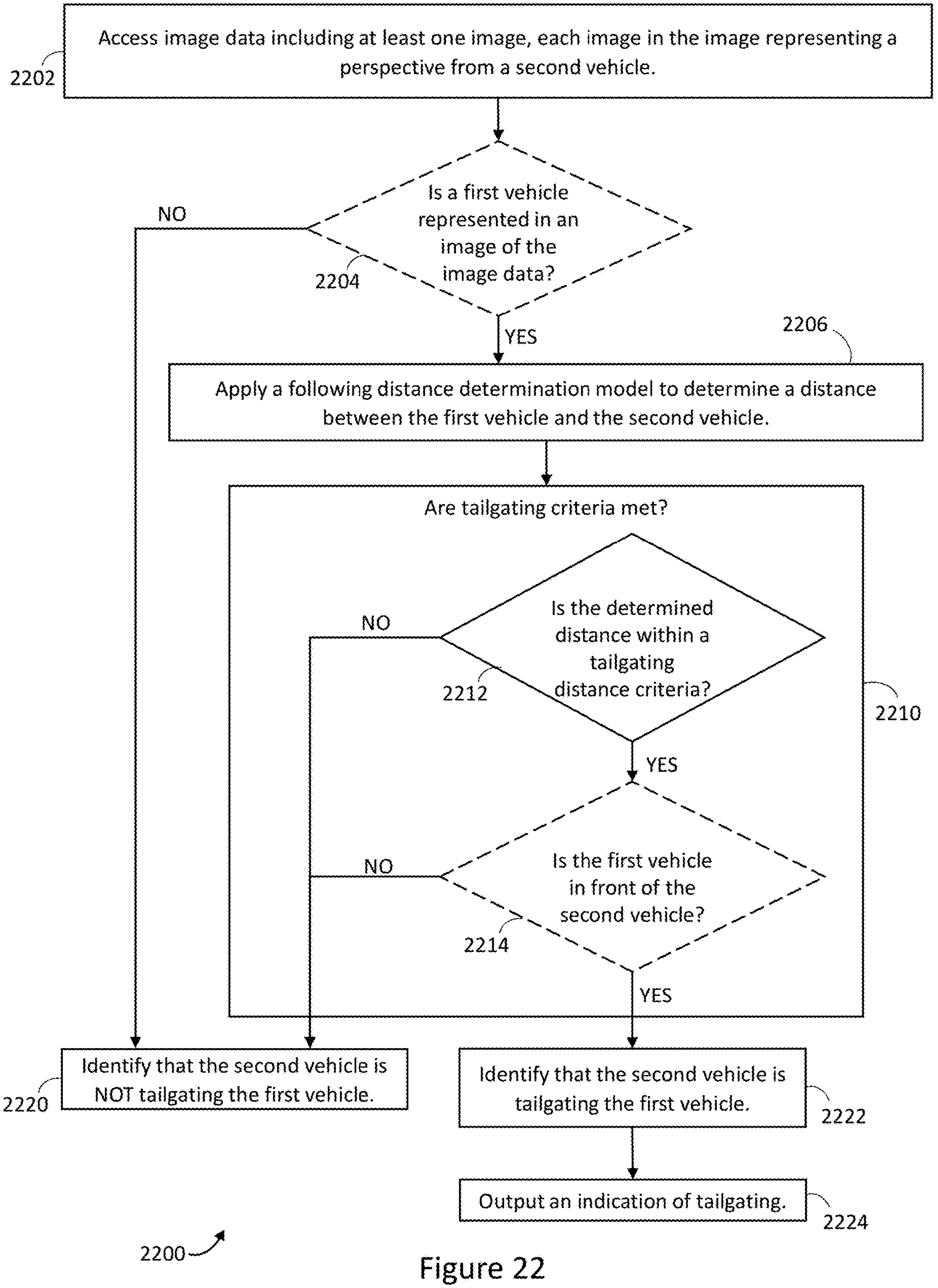
FIG. 22 is a flowchart diagram which illustrates a method for detecting tailgating, in accordance with at least one exemplary implementation.

Once the model is trained, it can be used in detection of tailgating. In this regard, FIG. 22 is a flowchart diagram which illustrates an exemplary method 2200 for detecting tailgating. Method 2200 can be applied to real-world images (images captured by an image sensor) to detect real-world tailgating. Further, method 2200 can also be applied to simulated images (images generated by simulation), for the purposes of testing, validation, training of other models, or any other appropriate application. Method 2200 as illustrated includes acts 2202, 2204, 2206, 2210 (including sub-acts 2212 and 2214), 2220, 2222, and 2224. One skilled in the art will appreciate that additional acts could be added, acts could be removed, or acts could be reordered as appropriate for a given application. As one example, act 2204 is shown in dashed lines to highlight that this act is optional (e.g. identifying whether the first vehicle is represented in the image data may be inherently performed as part of sub-act 2212 later). As another example, sub-act 2214 is shown in dashed lines to highlight that this sub-act is optional (e.g. for single lane roadways). Acts of method 2200 can be performed by appropriate components of the systems or devices discussed earlier, similar to as discussed with reference to method 500 in FIG. 5, and not repeated for brevity. Importantly, a system or device which performs method 2200 is not necessarily the same hardware which generates training data (as in methods 500 and 800 discussed earlier) or the same hardware which trains the model (as in method 2100 discussed earlier). In this way, training data generation, model training, and model execution can be performed by discrete systems or devices most suited to the task. For example, a central server (e.g. any of client device 104, cloud server 106, or local server 118) can perform training data generation and model training, and a device at a vehicle (e.g. image capture device 108A or peripheral device 220) can apply the model based on image data captured at the vehicle. However, in some implementations, a single device or system can perform all of generating training data, training a machine learning model, and applying the machine learning model.

At 2202, image data including at least one image is accessed. Each image in the image data represents a perspective from a second vehicle (which may be following a first vehicle, as is to be determined by method 2200). FIGS. 7, 10A, 10B, 12A, 12B, 14A, 14B, 15A, 15B, 16A, 16B, 16C, 16D, 17A, 17B, 20A, 20B, and 20C discussed earlier show images from the perspective of a second vehicle, which may or may not be travelling behind a first vehicle. While these images are discussed in the context of simulation, the discussion of the nature of the images also applies to real-world images, and what is visually expressed in the Figures is also fully applicable to real world images.

In some implementations, accessing the image data in act 2202 comprises accessing stored image data (e.g. simulated or captured image data which is stored at a non-transitory processor-readable storage medium). In other implementations, accessing the image data in act 2202 comprises capturing the image data (e.g. image data from an image capture device is provided directly to at least one processor which applies the tailgating detection algorithm). In yet other implementations, accessing the image data comprises receiving the image data by a communication interface of the system or device which is performing method 2200 (e.g. from a remote device or datastore).

At 2204, the at least one processor determines whether a first vehicle is represented in an image of the image data. For example, the at least one processor can run a feature or object detection model (such as a YOLO model) to detect vehicles in the image data. If a first vehicle is not represented in an image of the image data, then method 2200 proceeds to act 2220, where the at least one processor determines that the second vehicle is not tailgating the first vehicle (since there is no first vehicle to tailgate). If a first vehicle is detected in the image data at 2204 (or if act 2204 is not performed), method 2200 proceeds to act 2206.

At 2206, the at least one processor applies a following distance determination model to determine a distance between the first vehicle and the second vehicle. The applied model can be any of the models discussed herein, such as a model trained as discussed with reference to FIG. 21. "Applying" a model generally refers to providing the at least one image to the model as input, and received a determined distance between the first vehicle and the second vehicle as output. As mentioned above, in some implementations the model may also be used to determine whether the first vehicle is represented in the image data (at least in a manner which is useful for determining distance between the first vehicle and the second vehicle), in place of act 2204 discussed above. For example, the model can be trained to output a null value (or a value which indicates a distance so great tailgating is not possible), which indicates that the second vehicle is not following the first vehicle to any extent close to tailgating.

At 2210, the at least one processor determines whether tailgating criteria are met. In method 2200 in FIG. 22, two tailgating criteria are discussed with reference to sub-acts 2212 and 2214, though one skilled in the art will appreciate that any number of tailgating criteria could be implemented as appropriate for a given application. Further, both of the tailgating criteria shown in sub-acts 2212 and 2214 are not required; in particular sub-act 2214 is shown in dashed lines to illustrate optionality of this criteria. Further, although FIG. 22 shows sub-act 2212 followed by sub-act 2214, tailgating criteria can be evaluated in any appropriate order.

At 2212, the at least one processor determines whether the distance determined at 2206 is within tailgating distance criteria. That is, the at least one processor determines whether the distance between the first vehicle and the second vehicle is an unsafe distance.

Generally, tailgating distance criteria is dependent on speed of travel of the vehicles. Equation (2) below illustrates an exemplary tailgating threshold distance. For implementations which use tailgating threshold distance as tailgating distance criteria, when a distance between two vehicles is less than the tailgating threshold distance, the tailgating distance criteria is satisfied.

$$D_T = \frac{4m * v}{10\ \text{km/h}} \tag{2}$$

In Equation (2), $D_T$ represents tailgating threshold distance, and v represents speed (typically of the second vehicle) in kilometers per hour (km/h). Stated differently, in Equation (2), a safe following distance is approximately four meters for every 10 km/h of speed of the vehicle. In the example, v represents speed of the second vehicle. This is because the speed of the second vehicle is more readily available (e.g. is collected by a telematics monitoring device installed in the second vehicle, or by hardware associated with the image capture device in the second vehicle). Speed of the first vehicle is often more difficult to obtain, because the first vehicle may not be associated with the same telematics system as the second vehicle, and therefore data may not be collected from the first vehicle. However, in some implementations the speed of the first vehicle could be determined relative to the speed of the second vehicle, by determining a difference in distance between the first vehicle and the second vehicle over time. In other implementations, the speed of the first vehicle could be determined by a machine learning model trained to estimate vehicle speed. In yet other implementations, the first vehicle can be part of the same telematics system as the first vehicle, and therefore speed data for the first vehicle may be accessible.

Figure 23:
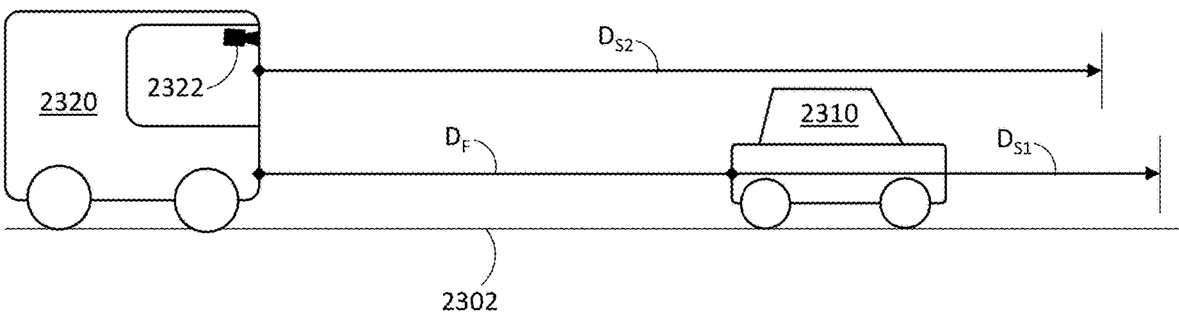
FIG. 23 is a side view of a vehicle being followed by another vehicle, in accordance with at least one exemplary implementation.

Equation (2) above is a generalization. More factors can be taken into account to arrive at a more specific tailgating distance criteria, thus reducing false positive and false negative tailgating determinations. FIG. 23 and Equation (3) discussed below provide an example.

FIG. 23 is a side view of a second vehicle 2320 having image capture device 2322, positioned behind a first vehicle 2310. Both vehicles 2310 and 2320 are travelling in the same direction on ground surface 2302. FIG. 23 shows a following distance Dr between the first vehicle and the second vehicle. FIG. 23 also shows a minimum stopping distance $D_{S1}$ of vehicle 2310 (i.e., in how short a distance is vehicle 2310 capable of stopping) and a maximum stopping distance $D_{S2}$ of vehicle 2320 (i.e., what is the longest distance vehicle 2320 is expected to be able to stop within). $D_{S1}$ is shown as starting from the rear of vehicle 2310, such that $D_{S1}$ represents the point of vehicle 2310 which vehicle 2320 would hit if a collision were to occur. However, $D_{S1}$ can start from any appropriate point of vehicle 2310, where a distance between the rear of vehicle 2310 and the start point of $D_{S1}$ is taken into account in determining tailgating in Equation (3) below. $D_{S1}$ and $D_{S2}$ are discussed in more detail later. In this example, the tailgating criteria for distance is evaluated based on Equation (3) below.

$$\text{Tailgating when: } D_{S2} > (D_F + D_{S1}) \tag{3}$$

In Equation (3), if vehicle 2320 is not able to stop within the distance presently between the vehicles, plus the distance for vehicle 2310 to stop, then the following distance $D_F$ is considered as within tailgating distance criteria.

Stopping distances for vehicles (such as $D_{S1}$ and $D_{S2}$ above, collectively $D_S$) can take into account a number of factors, such as vehicle speed, vehicle weight (weight of vehicle itself, possibly including load), road coefficient of friction (e.g. based on weather data indicating good weather, rain, snow, etc.), driver response time (e.g. based on a historical driver profile), or any other appropriate factors.

In the interests of safety, it is generally preferred to bias determination of a stopping distance for a lead vehicle (e.g. vehicle 2310 in FIG. 23) with factors in favor of the vehicle stopping quickly. For example, as it is generally difficult to determine a load weight of a vehicle based on image data, the lead vehicle can be assumed to be unloaded, such that the vehicle weight is estimated only as the weight of the vehicle itself. In this regard, the weight of the vehicle could be determined (or approximated) by identifying the model of the vehicle (or at least class of the vehicle) using a feature or object detection model. As another example, the driver of the lead vehicle may be assumed to have fast reaction times (e.g. above average reaction times), since actual reaction times of the driver of the lead vehicle are likely unknown.

Similarly in the interests of safety, it is generally preferred to bias determination of a stopping distance for a following vehicle (e.g. vehicle 2320 in FIG. 23) with factors in favor of the vehicle stopping slowly. For example, vehicle load can be estimated based on acceleration, vehicle RPM, and actual speed (see for example U.S. Patent Application No. 63/279,737; Ser. Nos. 17/532,209; 17/979,119; 63/413,035; 63/430,514; 63/445,753; and Ser. No. 18/111,951, the entirety of which are incorporated by reference herein); when estimating vehicle load for the purpose of determining stopping distance, this determination can be biased to estimate the vehicle to be heavier than it may actually be. As another example, road coefficient of friction can be assumed to be low if a weather service says that there is a moderate chance of rain, even if water on the road is not explicitly identified based on image data.

Returning to method 2200 in FIG. 22, if the following distance is NOT within a tailgating distance criteria, method 2200 proceeds to act 2220, where the at least one processor identifies that the second vehicle is not tailgating the first vehicle. If the following distance IS within a tailgating distance criteria, and if sub-act 2214 (or any other tailgating criteria) are not included, method 2200 proceeds to act 2222, where the at least one processor identifies that the second vehicle is tailgating the first vehicle. If on the other hand sub-act 2214 is included, then method 2200 proceeds to act 2214, where the at least one processor determines whether the first vehicle is in front of the second vehicle. Examples are discussed below with reference to FIGS. 24A, 24B, and 24C. Although method 2200 in FIG. 22 shows sub-act 2212 before sub-act 2214, the order of these acts can be reverse in alternative implementations. That is, prior to whether determined distance is within tailgating criteria (or even prior to even applying the following distance model in act 2206), the at least one processor can first determine whether the first vehicle is in front of the second vehicle. Alternatively, in some implementations act 2214 can be included inherently in the following distance determination model applied at 2206. As an example, where the model is trained based on a loss function which includes vehicle presence detection (as discussed earlier with reference to Equation (1)), and such vehicle presence detection accounts for vehicle lane of travel (or whether the second vehicle is actually following the first vehicle), distance determination by the model as in act 2206 may only produce meaningful distance determinations for situations where the first vehicle is in front of the second vehicle. In such an implementation, acts 2214 would be redundant, and can be omitted.

Figure 24A:
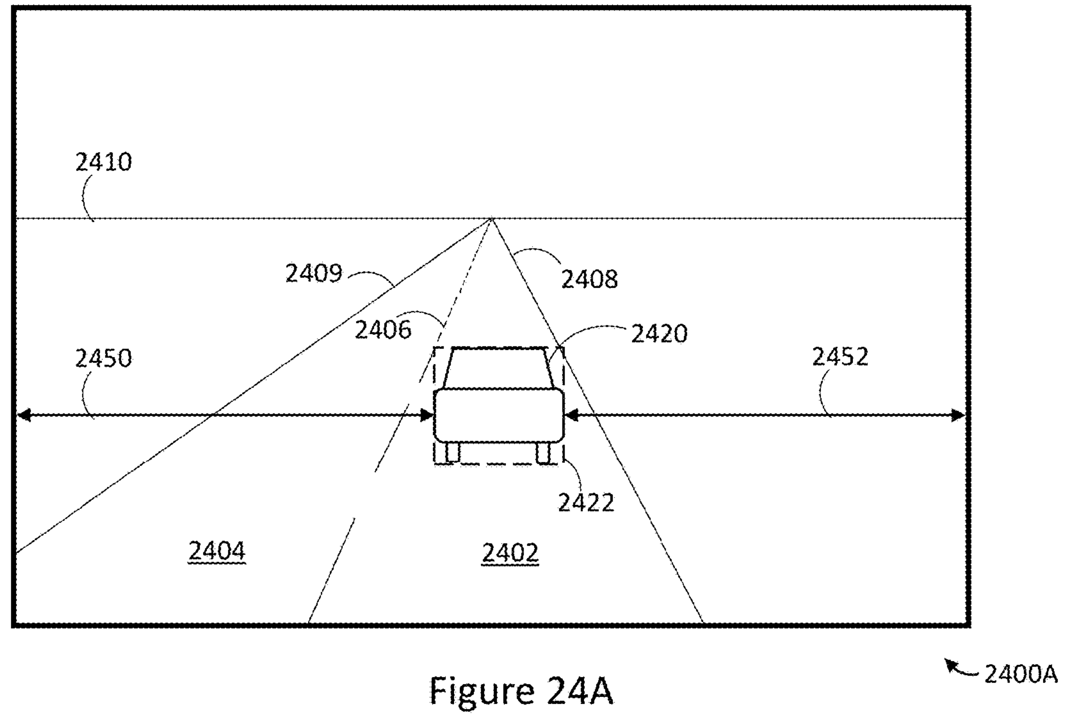
FIGS. 24A, 24B, and 24C illustrate exemplary images for cameras, showing a lead vehicle in different horizontal positions.
Figure 24B:
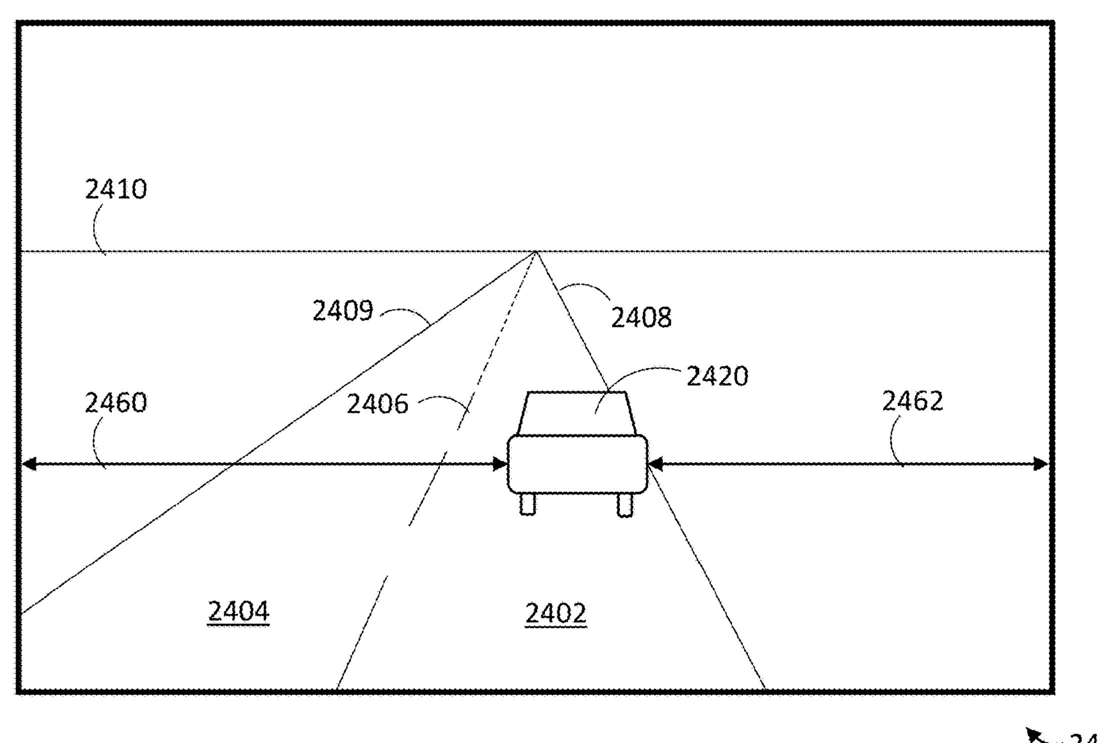
Figure 24C:
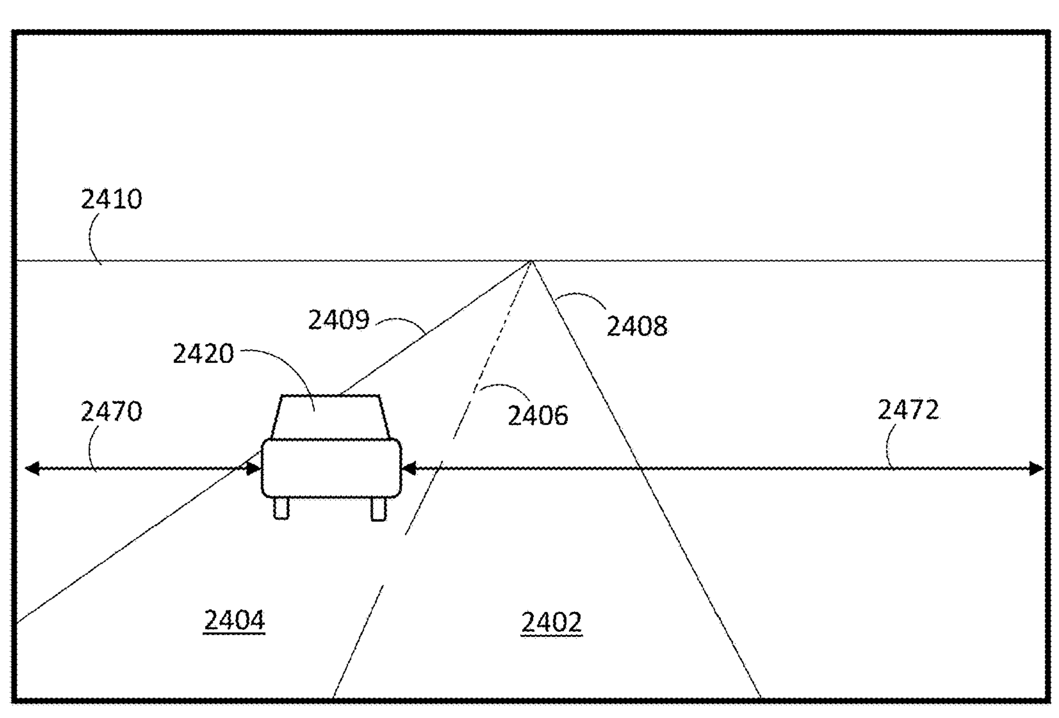

FIGS. 24A, 24B, and 24C each show a vehicle 2420 driving along a roadway shown by edges 2408 and 2409, towards a horizon 2410. The roadway has two lanes 2402 and 2404, separated by dividing line 2406. A vehicle is driving behind vehicle 2420, and has the camera which the perspective of each of images 2400A, 2400B, and 2400C represents.

In accordance with act 2204 of method 2200, vehicle 2420 is identified in images 2400A. In FIG. 24A, bounding box 2422 is shown around vehicle 2420, representing where a feature detection model determines vehicle 2420 as being. Vehicle 2420 can be identified with a similar bounding box in FIGS. 24B and 24C as well, but such a bounding box is not illustrated to reduce clutter.

In one exemplary implementation, a feature detection model is applied to identify road lanes (e.g. based on road edges 2408, 2409, and dividing line 2406). Once lanes are identified, the at least one processor determines a lane of travel of the vehicle carrying the image capture device (in the illustrated example, lane 2402). Vehicles travelling in the same lane as the vehicle with the image capture device are considered to be "in front" of the second vehicle in the context of sub-act 2214 in method 2200. In this exemplary implementation, vehicle 2420 in image 2400A and vehicle 2420 in image 2400B are considered "in front" of the second vehicle, whereas vehicle 2420 in image 2400C is not considered "in front" of the second vehicle.

In another exemplary implementation, distances from the edges of captured images are used to determine whether the lead vehicle (vehicle 2420 in the illustrated example) are travelling "in front" of the second vehicle in the context of method 2200.

In this regard, FIG. 24A shows a left-distance 2450 representing a distance of vehicle 2420 from the left edge of image 2400A. Such a left-distance 2450 can be determined as a distance from the left edge of bounding box 2422 to the left edge of image 2400A. Alternatively, such a left-distance 2450 can be determined as a distance from a feature on the left side of vehicle 2420 to the left edge of image 2400A. FIG. 24A also shows a right-distance 2452 representing a distance of vehicle 2420 from the right edge of image 2400A. Such a right-distance distance 2452 can be determined as a distance from the right edge of bounding box 2422 to the right edge of image 2400A. Alternatively, such a right-distance 2452 can be determined as a distance from a feature on the right side of vehicle 2420 to the right edge of image 2400A. The left-distance and right-distance can be represented, for example, as numbers of pixels in the image data. A difference between the left-distance and the right-distance is determined by the at least one processor (e.g. by subtraction). If the determined distance is within a horizontal distance threshold, the first vehicle (vehicle 2420 in the example) is determined as being in front of the second vehicle in sub-act 2214 in method 2200.

In the example of FIG. 24A, left-distance 2450 and right-distance 2452 are nearly identical, such that a difference therebetween is small (and within the horizontal distance threshold). As a result, in the example of FIG. 24A, vehicle 2420 is determined as being in front of the second vehicle in sub-act 2214 in method 2200, such that (provided the second vehicle is determined to be within a tailgating distance in sub-act 2212) method 2200 proceeds to act 2222, where the at least one processor identifies that the second vehicle is tailgating the first vehicle.

FIG. 24B shows a left-distance 2460 representing a distance of vehicle 2420 from the left edge of image 2400B, and shows a right-distance 2462 representing a distance of vehicle 2420 from the right edge of image 2400B. In this example, vehicle 2420 is positioned further to the right than in FIG. 24A. As a result, left-distance 2460 and right distance 2462 have some difference. However, this difference is relatively small (representing less than half a road lane), such that the difference is within the horizontal distance threshold. As a result, in the example of FIG. 24B, vehicle 2420 is determined as being in front of the second vehicle in sub-act 2214 in method 2200, such that (provided the second vehicle is determined to be within a tailgating distance in sub-act 2212) method 2200 proceeds to act 2222, where the at least one processor identifies that the second vehicle is tailgating the first vehicle.

FIG. 24C shows a left-distance 2470 representing a distance of vehicle 2420 from the left edge of image 2400C, and shows a right-distance 2472 representing a distance of vehicle 2420 from the right edge of image 2400C. In this example, vehicle 2420 is positioned further to the left than in FIGS. 24A and 24B. As a result, left-distance 2470 and right-distance 2472 have a significant difference (representing an entire road lane), such that the difference is outside of the horizontal distance threshold. As a result, in the example of FIG. 24C, vehicle 2420 is determined as NOT being in front of the second vehicle in sub-act 2214 in method 2200. As a result, method 2200 proceeds to act 2220, where the at least one processor identifies that the second vehicle is NOT tailgating the first vehicle.

In some scenarios, the first vehicle driving in front of a second vehicle does not necessarily result in image data where the first car appears horizontally centered in the image data. For example, as discussed above with reference to FIGS. 13A, 13B, 14A, and 14C, a horizontal positioning of an image capture device at the second vehicle results in different perspectives of the first vehicle as represented in captured image data. One way to address this is to install image capture devices to be as close as possible to a horizontal center of vehicles. However, this is not always possible or practical. For example, obstructions may prevent installation of an image capture device near a horizontal center of a vehicle; image capture devices may already be installed away from the horizontal center; or installers may not always install image capture devices in horizontal central location for any number of reasons.

In view of the above, calibration can be performed such that the horizontal distance threshold accounts for non-centered bias of the image data (e.g. due to the image capture device being positioned away from a horizontal center of the second vehicle in the context of method 2200 of FIG. 22). This is discussed below with reference to FIGS. 25A and 25B.

Figure 25A:
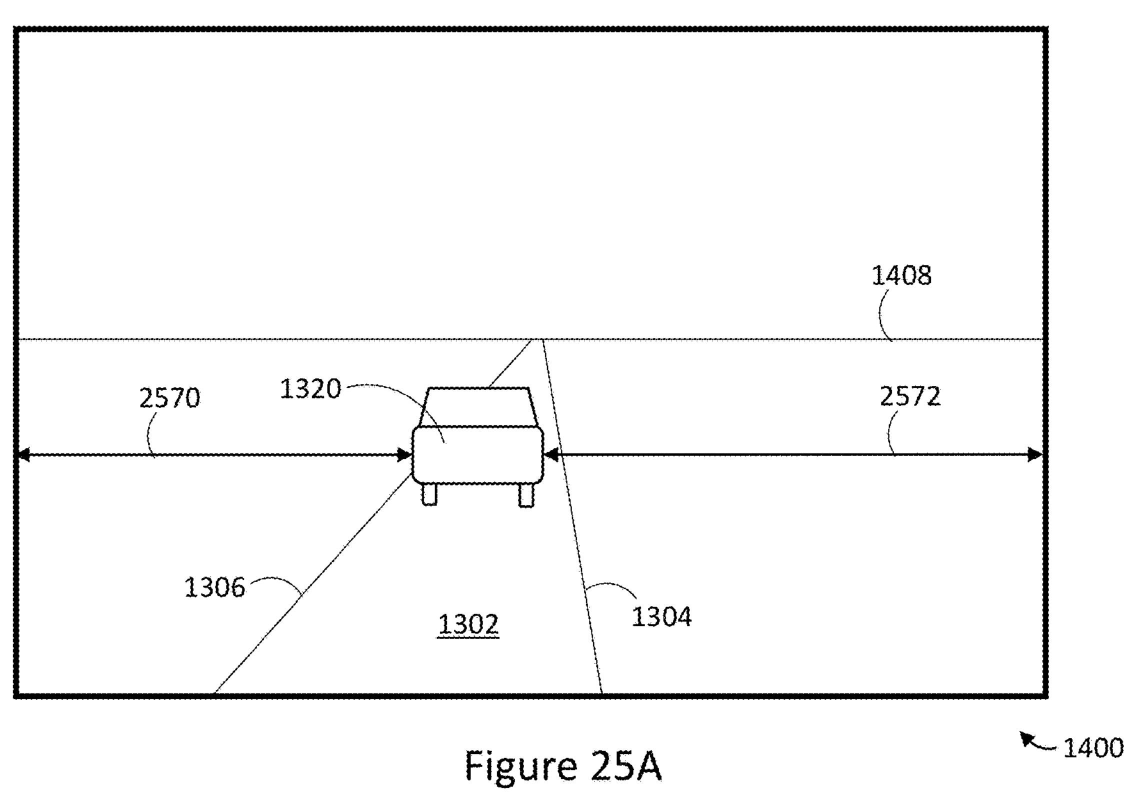
FIGS. 25A and 25B illustrate exemplary images for cameras in the scenarios illustrated in FIGS. 13A and 13B, highlighting horizontal position of a lead vehicle.
Figure 25B:
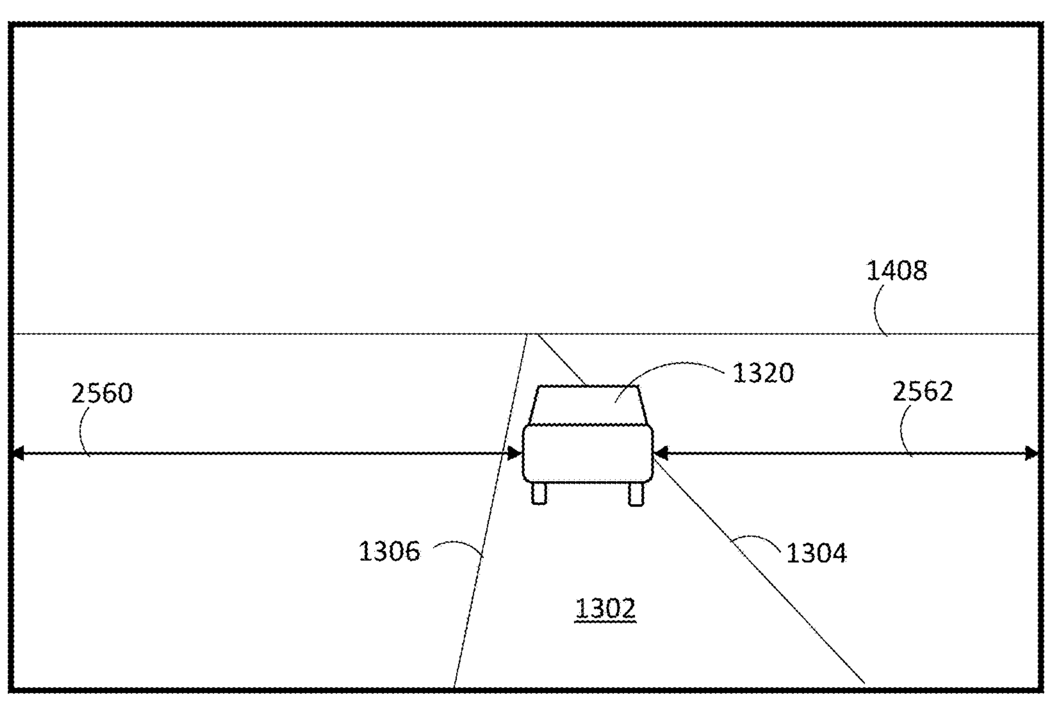

FIGS. 25A and 25B illustrate image data 1400 and 1410, as shown in FIGS. 14A and 14B respectively. The description of FIGS. 14A and 14B is applicable to FIGS. 25A and 25B, and is not repeated for brevity. In addition to what is discussed with reference to FIG. 14A, FIG. 25A also shows a left-distance 2570 from the left edge of image data 1400, and a right-distance 2572 from the right edge of image 1400. In the case of FIG. 25A, the second vehicle (vehicle 1310 in FIG. 13A) is travelling behind the first vehicle (vehicle 1320), but left-distance 2570 is smaller than right-distance 2572, due to the perspective of image capture device 1314 in FIG. 13A. To address this, for determining whether the first vehicle is in front of the second vehicle at 2214 in method 2200, the system can be calibrated, such that the horizontal distance threshold represents a value around a difference between left-distance 2570 and right-distance 2572. For example, an actual "center" which represents horizontal alignment in front of vehicle 1310 in image data 1400 is a positive value resulting from subtracting left-distance 2570 from right-distance 2572. In this example, the horizontal distance threshold represents a threshold around said positive value. As another example, an actual "center" which represents horizontal alignment in front of vehicle 1310 in image data 1400 is a negative value resulting from subtracting right-distance 2572 from left-distance 2570. In this example, the horizontal distance threshold represents a threshold around said negative value.

In the case of FIG. 25B, the second vehicle (vehicle 1310 in FIG. 13A) is travelling behind the first vehicle (vehicle 1320), but left-distance 2560 is larger than right-distance 2562, due to the perspective of image capture device 1316 in FIG. 13B. To address this, for determining whether the first vehicle is in front of the second vehicle at 2214 in method 2200, the system can be calibrated, such that the horizontal distance threshold represents a value around a difference between left-distance 2560 and right-distance 2562. For example, an actual "center" which represents horizontal alignment in front of vehicle 1310 in image data 1410 is a negative value resulting from subtracting left-distance 2560 from right-distance 2562. In this example, the horizontal distance threshold represents a threshold around said negative value. As another example, an actual "center" which represents horizontal alignment in front of vehicle 1310 in image data 1410 is a positive value resulting from subtracting right-distance 2562 from left-distance 2560. In this example, the horizontal distance threshold represents a threshold around said positive value.

Generally, an optimal horizontal distance threshold is determined as appropriate for a specific application or implementation. This is because different camera hardware, different camera positioning, different vehicle features, or any number of other factors can influence optimal horizontal distance threshold.

Returning to method 2200 in FIG. 22, after the second vehicle is identified as tailgating the first vehicle at 2222, method 2200 proceeds to act 2224. At 2224, an indication of tailgating is output. Such output can take any appropriate form, but some non-limiting examples are discussed below.

Figures 26, 27:
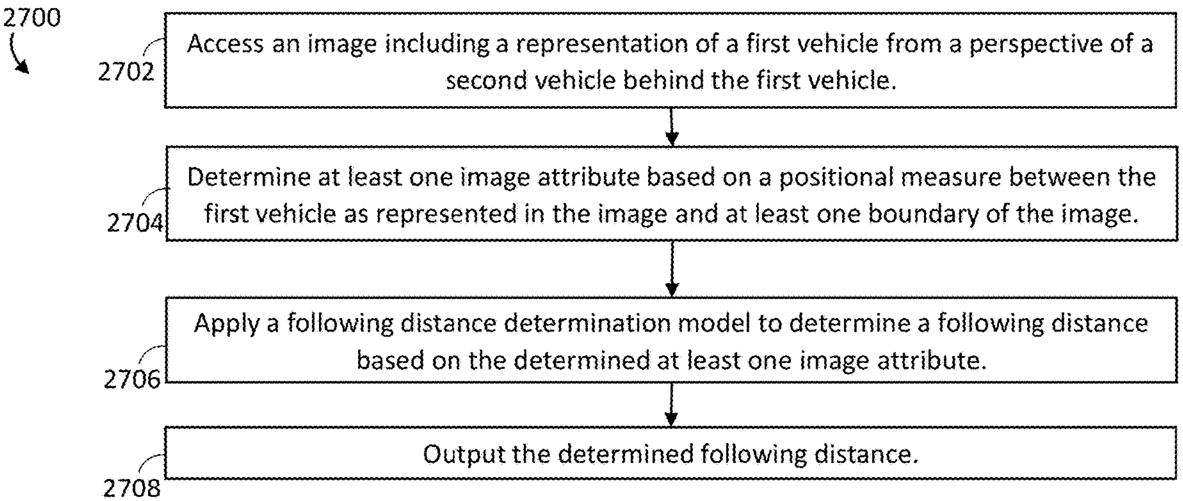
FIG. 26 illustrates an alert via a user interface, in accordance with at least one exemplary implementation.
FIG. 27 is a flowchart diagram which illustrates a method for determining following distance, in accordance with at least one exemplary implementation.

In some implementations, outputting the indication of tailgating comprises outputting an alert to a driver of the second vehicle (such as by output interface 218 in FIG. 2A or 2B). Such an alert serves to warn the driver of the dangerous situation, so that the driver can take action to remedy it. In this regard, FIG. 26 illustrates an exemplary user interface 2600 where a visual alert is displayed indicating the tailgating situation. Such a visual user interface could comprise any appropriate display in the second vehicle, such as an infotainment display built into the second vehicle, an accessory device (such as a tablet or smartphone) used by the driver (e.g. for navigation, logging, or vehicle management), a navigation device, or any other display appropriate for a given application. In some implementations, an audio output device can present an audio alert to the driver, such as a statement of the situation, or an alarm sound. In some implementations, multiple forms of alert can be presented in tandem. For example, a visual alert can be displayed as shown in FIG. 26, and an audio alarm can be sounded which prompts the user to look at the visual alert.

FIG. 26 also shows an outputting of a determined following distance (15 meters, in the illustrated example). This indication can be output together with a tailgating alert, as shown in FIG. 26, but this is not necessarily required. In some implementations, an indication of following distance can be output to a driver of the vehicle, even without a warning of tailgating, or even without a tailgating situation. For example, following distance could be displayed as one piece of information among many pieces of information on a dashboard display. Further, an indication of following distance can be presented by any appropriate output device, including a display or audio devices as discussed earlier.

In some implementations, outputting the indication of tailgating comprises transmitting an alert, notification, or report of the tailgating situation to a management device (such as any of client device 104, cloud server 106, or local server 118 discussed with reference to FIG. 1A or 1B). Such an alert is useful for evaluating driver performance, providing rewards for safe driving (e.g. for drivers where minimal dangerous situations are reported), and taking disciplinary or training action for unsafe driving (e.g. for drivers where excess dangerous situations are reported). Such reporting does not necessarily need to be in real-time (although it can be), since administrative actions based on driver performance are typically taken some time after any instances of poor driving. Consequently, in some implementations, act 2224 in method 2222 comprises storing an indication or report of tailgating, and later reported any stored indications to a management device together in a scheduled (or requested) report.

Outputting an indication of tailgating as in act 2224 is not limited to outputting a single indication of tailgating. In some implementations, an indication of tailgating can be output to the driver (e.g. as discussed with reference to FIG. 26), and can be output to a management device as discussed above.

FIG. 27 is a flowchart diagram which illustrates an exemplary method 2700 for determining following distance. Method 2700 can be applied to real-world images (images captured by an image sensor) to detect real-world following distance. Further, method 2700 can also be applied to simulated images (images generated by simulation), for the purposes of testing, validation, training of other models, or any other appropriate applications. Method 2700 as illustrated includes acts 2702, 2704, 2706, and 2708. One skilled in the art will appreciate that additional acts could be added, acts could be removed, or acts could be reordered as appropriate for a given application. Acts of method 2700 can be performed by appropriate components of the systems or devices discussed earlier, similar to as discussed with reference to method 500 in FIG. 5, and not repeated for brevity. Importantly, a system or device which performs method 2700 is not necessarily the same hardware which generates training data (as in methods 500 and 800 discussed earlier) or the same hardware which trains the model (as in method 2100 discussed earlier). In this way, training data generation, model training, and model execution can be performed by discrete systems or devices most suited to the task. For example, a central server (e.g. any of client device 104, cloud server 106, or local server 118) can perform training data generation and model training, and a device at a vehicle (e.g. image capture device 108A or peripheral device 220) can apply the model based on image data captured at the vehicle. However, in some implementations, a single device or system can perform all of generating training data, training a machine learning model, and applying the machine learning model. Examples of training of the distance detection model used in method 2700 are discussed in more detail later with reference to FIGS. 38 and 39.

Method 2700 can be implemented for example within the context of detecting tailgating. For example, method 2700 in FIG. 27 can be implemented as act 2206 in method 2200 in FIG. 22. In this way, method 2700 can be used to determine following distance between two vehicles, and method 2200 can use the determined following distance to identify tailgating between the two vehicles.

Figure 28:
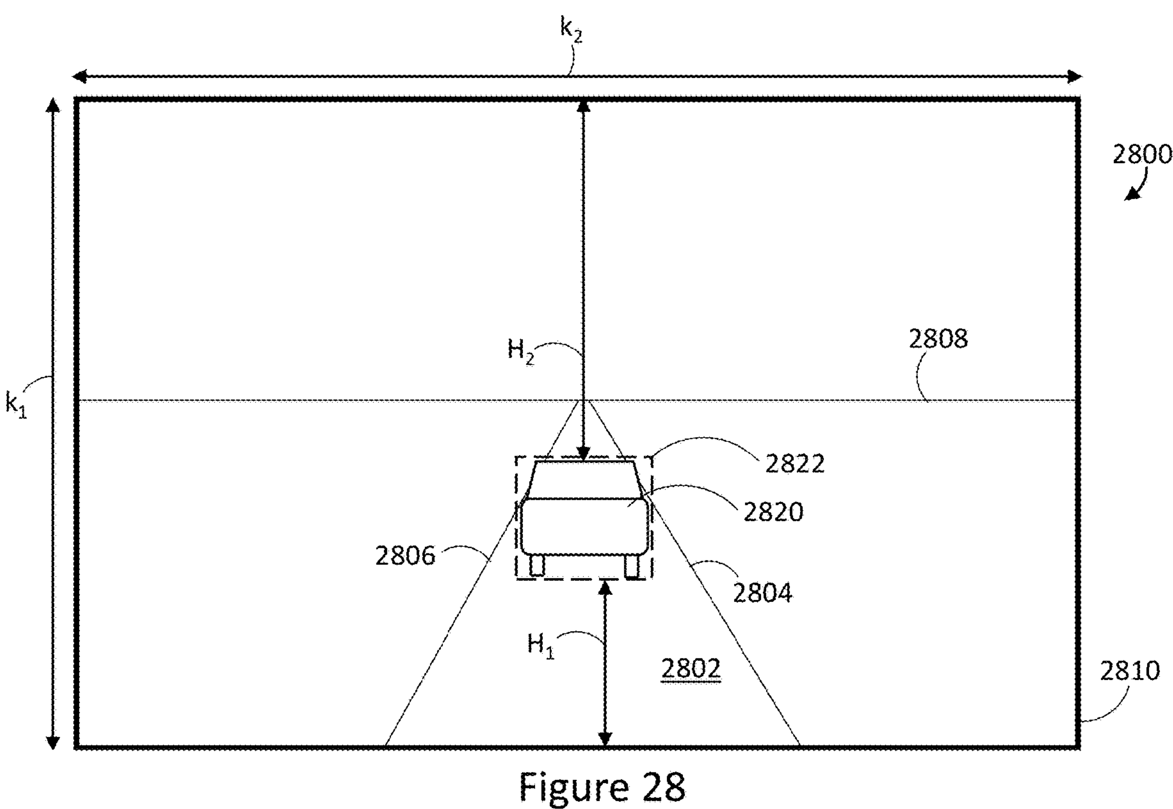
FIGS. 28 and 29 illustrate exemplary images based on which following distance can be determined, in accordance with at least two exemplary implementations.

Method 2700 is discussed below in the context of a first example scenario illustrated in FIG. 28. However, method 2700 is applicable to many different scenarios, as discussed later with reference to FIGS. 29, 31, 32, 33, 34, 35, and 36. FIG. 28 illustrates an image 2800 having a boundary 2810, a height $k_1$, and a width $k_2$. Image 2800 shows a vehicle 2820 (the first vehicle in method 2700) driving along a roadway 2802 shown by edges 2804 and 2806, towards a horizon 2808. A vehicle (the second vehicle in method 2700) is driving behind vehicle 2820, and carries the image capture device which the perspective of image 2800 represents (i.e., the camera which captures image 2800).

Returning to method 2700, at 2702, an image is accessed including a representation of a first vehicle from a perspective of a second vehicle behind the first vehicle. In the example of FIG. 28, the accessed image is image 2800. In some implementations, accessing the image comprises capturing the image, by at least one image capture device positioned at the second vehicle. In other implementations, accessing the image comprises receiving the image by a device or system performing method 2700 (e.g., a server which performs method 2700 can receive the image as transmitted from an image capture device at a vehicle which captured the image). In yet other implementations, accessing the image comprises accessing the image as stored in at least one non-transitory processor-readable storage medium (e.g., the image is previously captured by an image capture device, and stored at a non-transitory processor-readable storage medium at a vehicle or at a server for later retrieval when performing method 2700).

At 2704, at least one processor of the system or device performing method 2700 determines at least one image attribute based on a positional measure between the first vehicle as represented in the image and at least one boundary of the image. Such a positional measure can be based on physical features of the vehicle represented in the image (e.g. pixels of the image representing edge features of the vehicle), or by identifying delineations of the vehicle. For example, a feature detection model (such as the YOLO detection model) can be run on the image, to identify the first vehicle in the image. A bounding box (such as bounding box 2822 in image 2800 shown in FIG. 28) can be identified which approximates boundaries of the first vehicle (vehicle 2820) in the image. The at least one positional measure can be based on such a bounding box, as discussed in several examples herein.

In some exemplary implementations, a feature detection model can be applied to identify road lanes, such as discussed for example with reference to FIGS. 24A, 24B, and 24C. Once lanes are identified, the at least one processor determines a lane of travel of the vehicle carrying the image capture device. Vehicles travelling in the same lane as the vehicle with the image capture device are considered to be "in front" of the second vehicle in the context of determining following distance in method 2700. Such lane analysis or similar determinations are not necessarily included in method 2700, however. In other implementations, such lane determination could happen in the context of a larger method instead, such as detecting tailgating conditions as in method 2200.

In the example of FIG. 28, the positional measure includes a distance $H_1$ from a bottom boundary of the image 2800 (e.g. a bottom edge of boundary 2810) to a bottom of the first vehicle 2820 (or a bottom of the bounding box 2822) in the image 2800. Distance $H_1$ represents a distance along the image, and can be expressed in any appropriate units. A particularly convenient unit is number of pixels, such that distance $H_1$ represents a number of pixels from a bottom edge of image 2800 to a bottom of vehicle 2820 (or bottom of bounding box 2822). In some implementations, $H_1$ can be normalized by dividing by image size (e.g. $H_1/k_1k_2$). Such a normalized measure can be included in the at least one image attribute, and produces similar results regardless of image size. In this way, the measure can be applied to different sizes of images (e.g. from different image capture devices, or preprocessed/cropped in different ways), and still produce predictable results.

Optionally, in the example of FIG. 28, the positional measure can also include another distance $H_2$ from a top boundary of the image 2800 to a top of the first vehicle 2820 (or a top of the bounding box 2822) in the image 2800.

At 2706 in method 2700, the at least one processor applies a following distance determination model to determine the following distance based on the at least one image attribute determined at 2704. This model is trained to predict or determine following distance based on the at least one image attribute, as opposed to by analysis of the image itself. Detailed discussion of such a model and how it can be trained can be found later with reference to FIGS. 38 and 39.

Generally, the further a leading vehicle is from a tailgating vehicle (the greater the physical distance between the first and second vehicle in method 2700), the larger distance $H_1$ will be, and the smaller the distance $H_2$ will be. This is because a further away vehicle will typically appear higher up in images captured by a front-facing camera in a vehicle. As such, in the example of FIG. 28, the model will generally determine following distance as proportional to distance $H_1$ (and optionally inversely proportional to distance $H_2$).

At 2708, the determined following distance is output. In an exemplary implementation where method 2700 is used to determine following distance in act 2206 of method 2200, outputting the following distance can include preparing the following distance for a next act in the method 2200 (e.g. by storing the determined following distance in at least one non-transitory processor-readable storage medium). In another exemplary implementation, outputting the following distance can include outputting the following distance to a driver of the second vehicle, such as via a display or audio output device. In yet another exemplary implementation, outputting the following distance can include providing the determined following distance to a database (e.g. at a device or server such as client device 104, cloud server 106, or local server 118 in FIGS. 1A and 1B). Such a database or server can use determined following distances logged over time, for example for analyzing driver behavior for safe or unsafe conduct.

Figure 29:
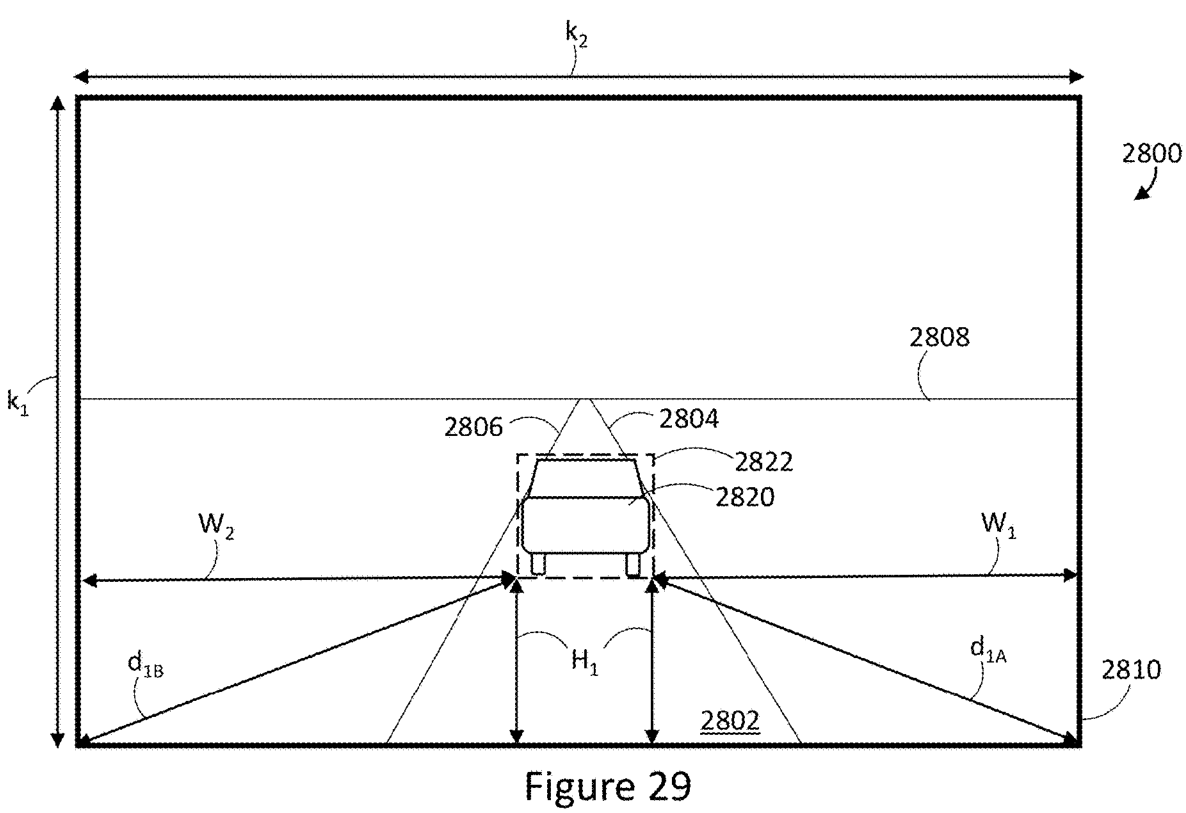

FIG. 29 illustrates another exemplary implementation for method 2700 in FIG. 27. FIG. 29 illustrates image 2800 (similar to as shown in FIG. 28), which shows a vehicle 2820 (the first vehicle in method 2700) driving along a roadway 2802 shown by edges 2804 and 2806, towards a horizon 2808. A vehicle (the second vehicle in method 2700) is driving behind vehicle 2820, and carries the image capture device which the perspective of image 2800 represents (i.e., the camera which captures image 2800). Description of image 2800 and what is represented therein with reference to FIG. 28 is fully applicable to FIG. 29.

FIG. 29 shows a distance $H_1$ between a bottom of vehicle 2820 (or a bottom of bounding box 2822) and a bottom of image boundary 2810, similar to as in FIG. 28. FIG. 29 also shows a distance $W_1$ between a right side of vehicle 2820 (or a right side of bounding box 2822) and a right side of image boundary 2810. FIG. 29 also shows a distance $W_2$ between a left side of vehicle 2820 (or a left side of bounding box 2822) and a left side of image boundary 2810.

FIG. 29 shows a first positional measure $d_{1A}$ between a first corner of the image boundary 2810 and a first corner of the first vehicle 2820. Further, FIG. 29 also shows a second positional measure $d_{1B}$ between a second corner of the image boundary 2810 and a second corner of the first vehicle 2820. In the illustrated example, the first positional measure $d_{1A}$ extends between a bottom-right corner of boundary 2810 and a bottom-right corner of bounding box 2822, and the second positional measure $d_{1B}$ extends between a bottom-left corner of boundary 2810 and a bottom-left corner of bounding box 2822. However, a given positional measure can be chosen to extend between any corners as appropriate for a given implementation or application. Several examples are discussed later with reference to FIGS. 31, 32, 33, 34, 35, and 36. First positional measure $d_{1A}$ and second positional measure $d_{1B}$ can be determined by Pythagoras's theorem in accordance with Equations (4) and (5) below:

$$d_{1A}^2 = H_1^2 + W_1^2 \tag{4}$$

$$d_{1B}^2 = H_1^2 + W_2^2 \tag{5}$$

With reference to method 2700 in FIG. 27, in the example of FIG. 29, the first positional measure $d_{1A}$ and the second positional measure $d_{1B}$ can themselves be the at least one image attribute in act 2704. Alternatively, the first positional measure $d_{1A}$ and the second positional measure $d_{1B}$ can be used to determine the at least one image attribute in act 2704. In particular, the at least one image attribute can be determined as a cumulative measure of the first positional measure $d_{1A}$ and the second positional measure $d_{1B}$. Equation (6) discussed below illustrates an exemplary cumulative measure in this regard:

$$M_C = \frac{d_{1A}^2 + d_{1B}^2}{k_1 k_2} \tag{6}$$

In Equation (6), $M_C$ is a cumulative measure usable as the at least one image attribute in act 2704 of method 2700. The denominator $k_1k_2$ (product of image height and width) represents size of the image. By summing $d_{1A}^2$ and $d_{1B}^2$, and dividing by the image size ($k_1k_2$), a normalized measure is determined which produces similar results regardless of image size. In this way, the measure can be applied to different sizes of images (e.g. from different image capture devices, or preprocessed/cropped in different ways), and still produce predictable results. However, dividing by $k_1k_2$ is not necessary. For example, in some implementations image resolution can be controlled (e.g. by only providing images of a certain resolution, scaling the image to have a certain resolution, and/or cropping the image to have a certain resolution.

Determining the at least one image attribute as including a cumulative measure of $d_{1A}$ and $d_{1B}$ advantageously compensates for features which are not indicative of following distance. For example, if vehicle 2820 is positioned towards the left side of image 2810, $W_2$ will be smaller, whereas $W_1$ will be larger. This in turn results in a larger $d_{1A}$ compared to a smaller $d_{1B}$, even for the same following distance. On the other hand, if vehicle 2820 is positioned towards the right side of image 2810, $W_2$ will be larger, whereas $W_1$ will be smaller. This in turn results in a larger dis compared to a smaller $d_{1A}$, even for the same following distance. By combining $d_{1B}$ with $d_{1A}$ as a cumulative measure, horizontal positioning of the vehicle 2820 within the image is compensated for, such that the cumulative measure is more indicative of following distance.

Efficacy of the cumulative measure can be determined as discussed with reference to Equations (7) and (8) below. First, $d_{1A}^2$ and $d_{1B}^2$ in Equation (6) can be substituted with their equivalents in Equations (4) and (5), which results in Equation (7) below:

$$M_C = \frac{H_1^2 + W_1^2 + H_1^2 + W_2^2}{k_1 k_2} = \frac{2H_1^2 + W_1^2 + W_2^2}{k_1 k_2} \tag{7}$$

By differentiating $M_C$ with respect to $H_1$, a quantity of change in $M_C$ per unit change of $H_1$ can be determined, as shown in Equation (8) below:

$$\frac{dM_C}{dH_1} = \frac{4H_1}{k_1 k_2} \tag{8}$$

As can be seen in Equation (8), $M_C$ (as normalized by dividing by $k_1k_2$) changes at a rate of 4 times $H_1$ (also as normalized by dividing by $k_1k_2$). If normalization is omitted (the division by $k_1k_2$ is not performed, for both $M_C$ or $H_1$ as the image attribute), $M_C$ still changes at a rate of 4 times $H_1$. That is, $M_C$ is 4 times more sensitive than $H_1$. Thus, $M_C$ can be useful for determining following distance more accurately than relying on $H_1$ as discussed above with reference to FIG. 28. This is illustrated in FIGS. 30A and 30B discussed below.

Figure 30A:
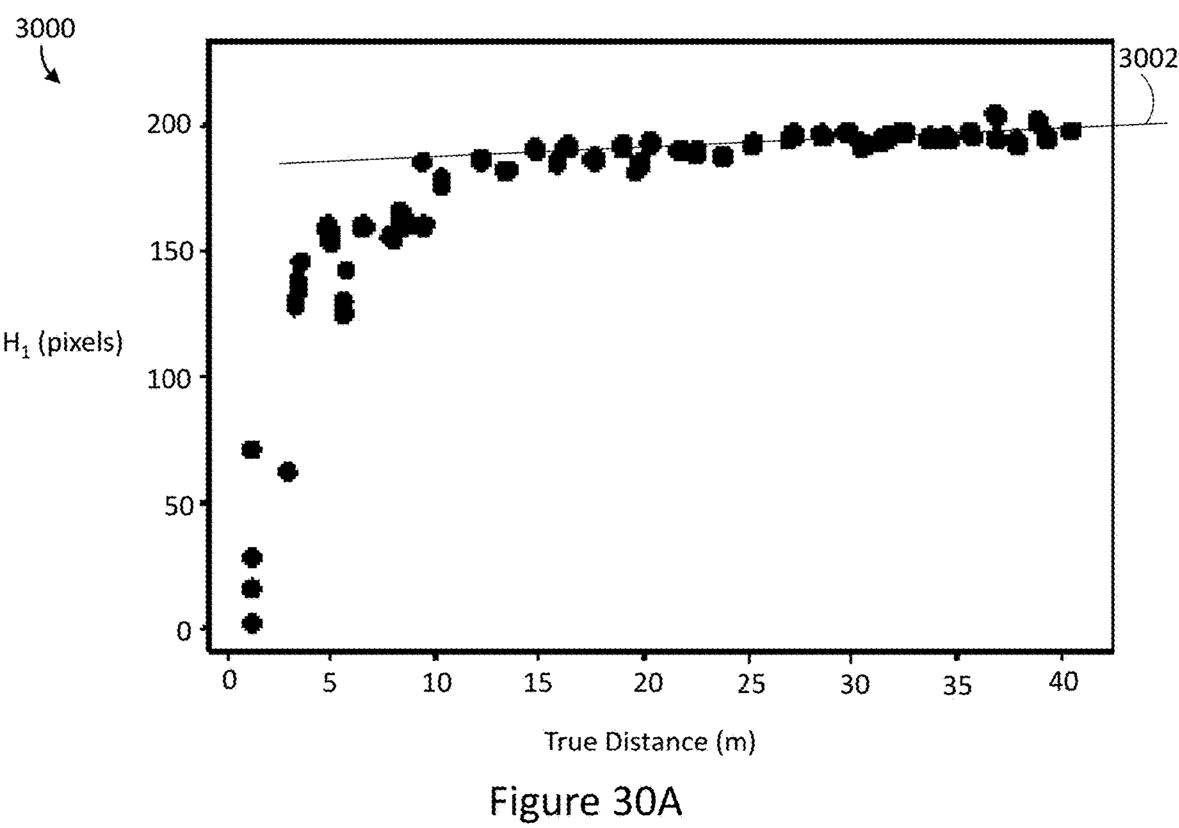
FIGS. 30A and 30B illustrate plots which show image attributes versus true following distance, in accordance with at least two exemplary implementations.
Figure 30B:
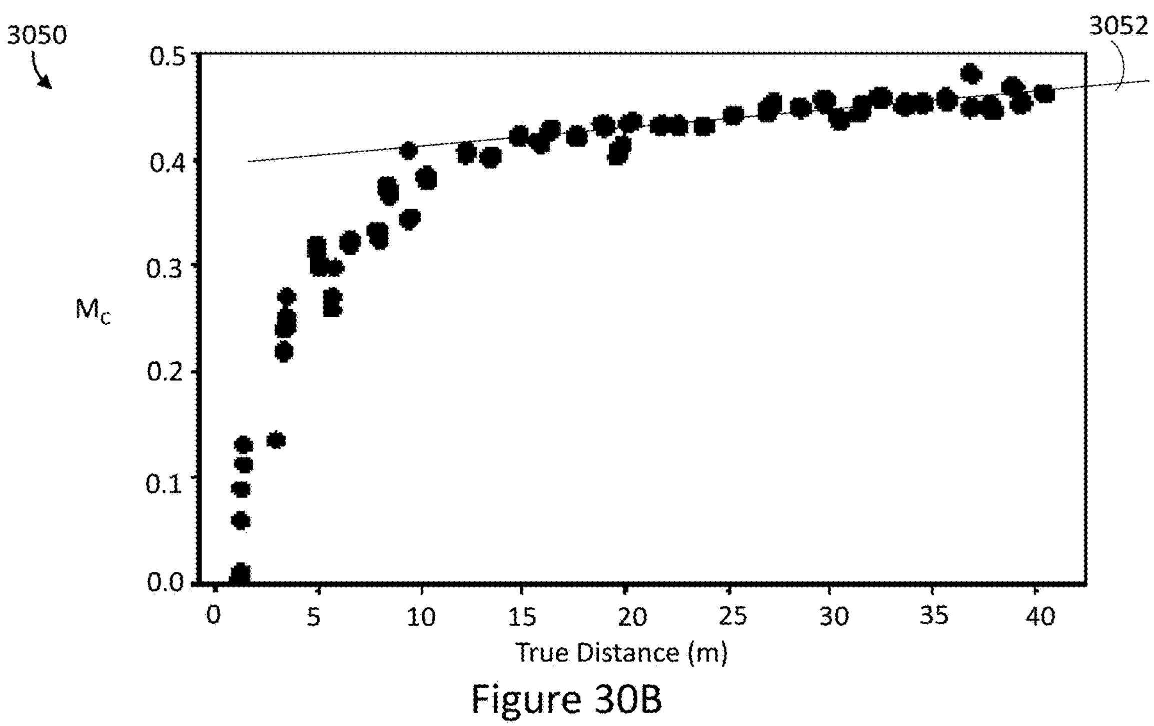

FIG. 30A illustrates an exemplary plot 3000 and FIG. 30B illustrates an exemplary plot 3050. Both plots 3000 and 3050 show results of determining following distance in accordance with method 2700 in FIG. 27, using sample images showing respective first vehicles in front of respective second vehicles, with a known following distance. The sample images used for both 30A and 30B were 416 pixels high by 416 pixels wide, and represent images captured by an image capture device having a field of view of 110°. The images were generated by simulation, as discussed earlier, but the discussion is fully applicable to real-world captured images as well.

For plot 3000 in FIG. 30A, the image attribute used in act 2704 of method 2700 is distance from a bottom of the image to a bottom of the first vehicle (i.e. the image attribute is $H_1$ as discussed with reference to FIG. 28). For this reason, plot 3000 shows the known following distance (True Distance in meters) on the horizontal axis, versus the image attribute $H_1$ in pixels. For plot 3050 in FIG. 30B, the image attribute used in act 2704 of method 2700 is the cumulative measure $M_C$ discussed with reference to Equations (6), (7), and (8) above. For this reason, plot 3050 shows the known following distance (True Distance in meters) on the horizontal axis, versus the image attribute $M_C$.

As can be seen in both plots 3000 and 3050, the image attribute changes significantly with True Distance from a distance of 0 meters to a distance of approximately 10 to 15 meters. At true distances greater than this, change in $H_1$ and $M_C$ becomes notably smaller. That is, at following distances greater than 15 meters, change in position of the first vehicle in the image due to change in following distance becomes low.

For the size and quality of images used in the example of FIG. 30A, following distances between 15 meters and 40 meters are represented by an image attribute change in a range of about 10 pixels (i.e. $H_1$ ranges from about 190 pixels to about 200 pixels, for following distances between 15 meters and 40 meters). FIG. 30A shows a fit line 3002 for the data points where True Distance is greater than 15 meters. Fit line 3002 has low slope (i.e. is nearly parallel to the horizontal axis). To summarize, using the image attribute $H_1$ alone in act 2704 (with the size and quality of images used in the example of FIG. 30A) tends to produce unreliable estimates for following distances greater than 15 meters.

FIG. 30B shows a fit line 3052 for the data points where True Distance is greater than 15 meters. Fit line 3052 has a higher slope than fit line 3002 for plot 3000. As a result, for following distances greater than 15 meters, using the image attribute $M_C$ in act 2704 (with the size and quality of images used in the example of FIG. 30B) tends to produce more reliable estimates for following distances greater than 15 meters, compared to using image attribute $H_1$, because $M_C$ is more sensitive to changes in following distance than $H_1$ is.

In some implementations, multiple cumulative measures can be included in the at least one image attribute used in act 2704 of method 2700. Examples are discussed below with reference to FIGS. 31, 32, 33, 34, 35, and 36.

Figure 31:
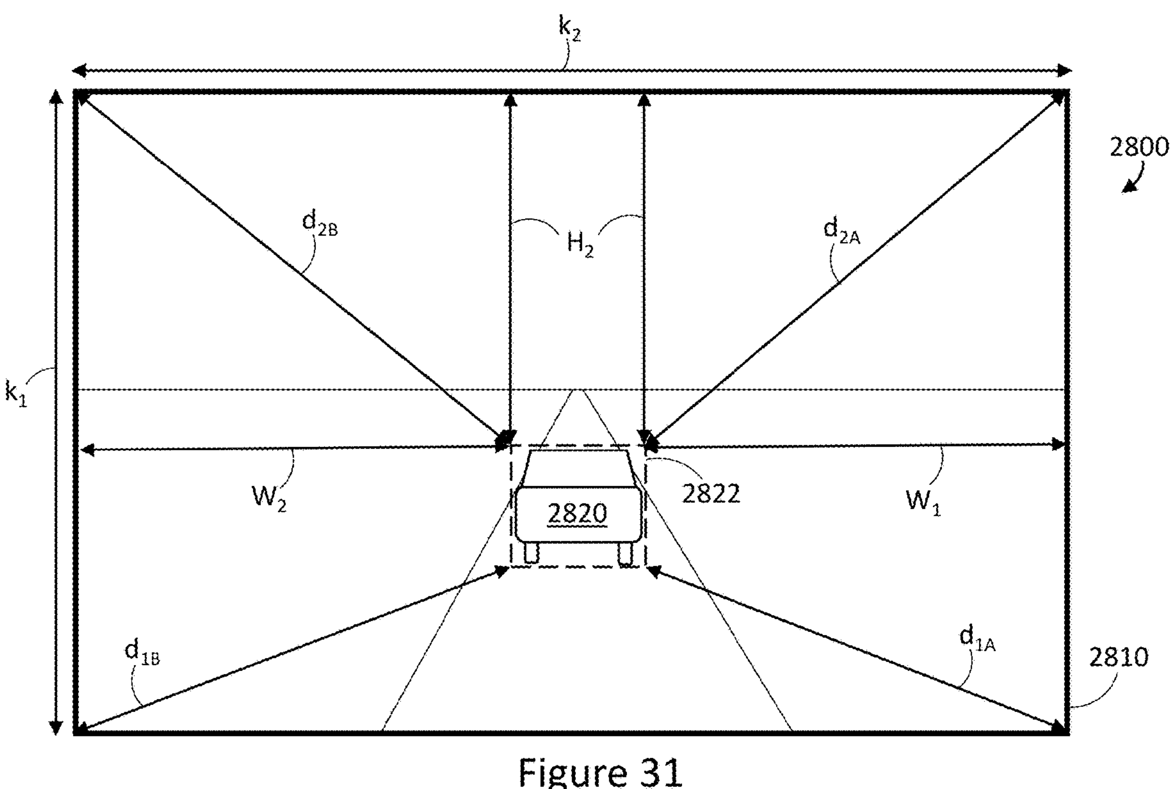
FIGS. 31, 32, 33, 34, 35, and 36 illustrate exemplary images based on which following distance can be determined, in accordance with at least six exemplary implementations.

FIG. 31 illustrates image 2800 (similar to as shown in FIG. 28), which shows a vehicle 2820 (the first vehicle in method 2700) driving along a roadway. A vehicle (the second vehicle in method 2700) is driving behind vehicle 2820, and carries the image capture device which the perspective of image 2800 represents (i.e., the camera which captures image 2800). Description of image 2800 and what is represented therein with reference to FIG. 28 is fully applicable to FIG. 31. Several features represented in the image 2800 are not expressly labelled in FIG. 31 to reduce clutter, but said features are still present in the image as described with reference to FIG. 28.

FIG. 31 shows positional measures $d_{1A}$ and $d_{1B}$, which can be calculated as described with reference to FIG. 29, and combined as a first cumulative measure $M_{C1}$. First cumulative measure $M_{C1}$ can be determined using Equations (6) and/or (7) as discussed above.

FIG. 31 shows a distance $H_2$ between a top of vehicle 2820 (or a top of bounding box 2822) and a top of image boundary 2810, similar to as in FIG. 28. FIG. 31 also shows distance $W_1$ between a right side of vehicle 2820 (or a right side of bounding box 2822) and a right side of image boundary 2810. FIG. 31 also shows distance $W_2$ between a left side of vehicle 2820 (or a left side of bounding box 2822) and a left side of image boundary 2810.

FIG. 31 also shows positional measure $d_{2A}$ between a top-right corner of bounding box 2822 and a top-right corner of the image boundary 2810. Positional measure $d_{2A}$ can be determined in accordance with Equation (4) above, substituting $H_2$ for $H_1$. FIG. 31 also shows positional measure $d_{2B}$ between a top-left corner of bounding box 2822 and a top-left corner of the image boundary 2810. Positional measure $d_{2B}$ can be determined in accordance with Equation (5) above, substituting $H_2$ for $H_1$. Positional measures $d_{2A}$ and $d_{2B}$ can be combined as a second cumulative measure $M_{C2}$. Second cumulative measure $M_{C2}$ can be determined using Equations (6) and/or (7) as discussed above, substituting $d_{2A}$ for $d_{1A}$ and $d_{2B}$ for $d_{1B}$.

The determined first cumulative measure $M_{C1}$ and second cumulative measure $M_{C2}$ can be used as the at least one image attribute in act 2704 of method 2700. The inclusion of additional cumulative measure further increases accuracy of the following distance determination.

Any number of appropriate cumulative measures can be determined as appropriate for a given application, as discussed further with reference to FIGS. 32, 33, 34, 35, and 36 below.

Figure 32:
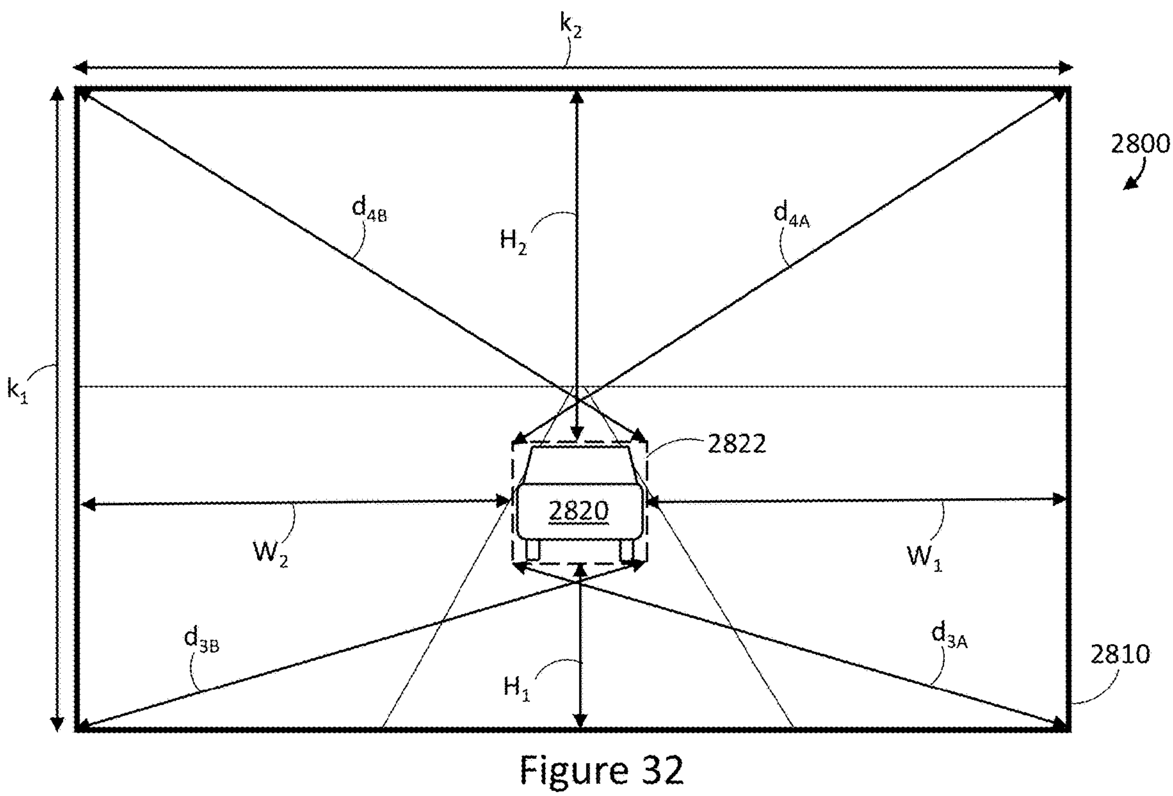

FIG. 32 illustrates image 2800 (similar to as shown in FIG. 28), which shows a vehicle 2820 (the first vehicle in method 2700) driving along a roadway. A vehicle (the second vehicle in method 2700) is driving behind vehicle 2820, and carries the image capture device which the perspective of image 2800 represents (i.e., the camera which captures image 2800). Description of image 2800 and what is represented therein with reference to FIG. 28 is fully applicable to FIG. 32. Several features represented in the image 2800 are not expressly labelled in FIG. 32 to reduce clutter, but said features are still present in the image as described with reference to FIG. 28.

FIG. 32 builds on the positional measures shown in FIG. 31. In particular, FIG. 32 shows distances $H_1$ and $H_2$, similar to as in FIG. 28. FIG. 32 also shows distances $W_1$ and $W_2$ similar to as in FIGS. 29 and 31. FIG. 32 also shows positional measure $d_{3A}$ between a bottom-left corner of bounding box 2822 and a bottom-right corner of the image boundary 2810, and positional measure $d_{3B}$ between a bottom-right corner of bounding box 2822 and a bottom-left corner of the image boundary 2810. FIG. 32 also shows positional measure $d_{4A}$ between a top-left corner of bounding box 2822 and a top-right corner of the image boundary 2810, and positional measure $d_{4B}$ between a top-right corner of bounding box 2822 and a top-left corner of the image boundary 2810. Positional measures $d_{3A}$, $d_{3B}$, $d_{4A}$, $d_{4B}$ can be determined based on Pythagoras's theorem, by Equations (9)-(12) below:

$$d_{3A}^2 = H_1^2 + (k_2 - W_2)^2 \tag{9}$$

$$d_{3B}^2 = H_1^2 + (k_2 - W_1)^2 \tag{10}$$

$$d_{4A}^2 = H_2^2 + (k_2 - W_2)^2 \tag{11}$$

$$d_{4B}^2 = H_2^2 + (k_2 - W_1)^2 \tag{12}$$

A third cumulative measure $M_{C3}$ can be determined using Equation (6) as discussed above, substituting $d_{3A}$ for $d_{1A}$ and $d_{3B}$ for $d_{1B}$. A fourth cumulative measure $M_{C4}$ can be determined using Equation (6) as discussed above, substituting $d_{4A}$ for $d_{1A}$ and $d_{4B}$ for $d_{1B}$.

The determined first cumulative measure $M_{C1}$, second cumulative measure $M_{C2}$, third cumulative measure $M_{C3}$, and fourth cumulative measure $M_{C4}$, can be used as the at least one image attribute in act 2704 of method 2700. The inclusion of additional cumulative measure further increases accuracy of the following distance determination. Alternatively, any subset of cumulative measures could be used as the at least one image attribute; there is no requirement that all or specific cumulative measures be used.

Figure 33:
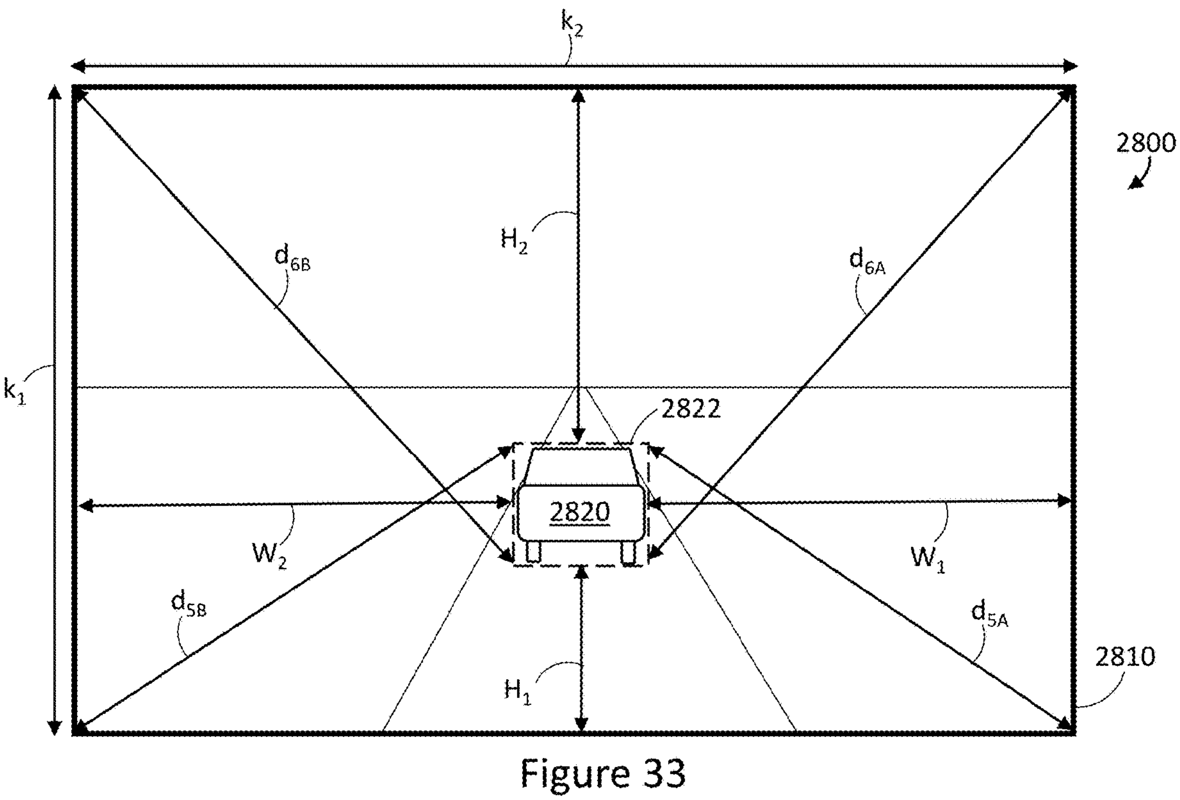

FIG. 33 illustrates image 2800 (similar to as shown in FIG. 28), which shows a vehicle 2820 (the first vehicle in method 2700) driving along a roadway. A vehicle (the second vehicle in method 2700) is driving behind vehicle 2820, and has the camera which the perspective of image 2800 represents (i.e., the camera which captures image 2800). Description of image 2800 and what is represented therein with reference to FIG. 28 is fully applicable to FIG. 33. Several features represented in the image 2800 are not expressly labelled in FIG. 33 to reduce clutter, but said features are still present in the image as described with reference to FIG. 28.

FIG. 33 builds on the positional measures shown in FIGS. 31 and 32. In particular, FIG. 33 shows distances $H_1$ and $H_2$, similar to as in FIG. 28. FIG. 33 also shows distances $W_1$ and $W_2$ similar to as in FIGS. 29 and 31. FIG. 33 also shows positional measure $d_{5A}$ between a top-right corner of bounding box 2822 and a bottom-right corner of the image boundary 2810, and positional measure $d_{5B}$ between a top-left corner of bounding box 2822 and a bottom-left corner of the image boundary 2810. FIG. 33 also shows positional measure $d_{6A}$ between a bottom-right corner of bounding box 2822 and a top-right corner of the image boundary 2810, and positional measure des between a bottom-left corner of bounding box 2822 and a top-left corner of the image boundary 2810. Positional measures $d_{5A}$, $d_{5B}$, $d_{6A}$, and des can be determined based on Pythagoras's theorem, by Equations (13)-(16) below:

$$d_{5A}^2 = (k_1 - H_2)^2 + W_1^2 \tag{13}$$

$$d_{5B}^2 = (k_1 - H_2)^2 + W_2^2 \tag{14}$$

$$d_{6A}^2 = (k_1 - H_1)^2 + W_1^2 \tag{15}$$

$$d_{6B}^2 = (k_1 - H_1)^2 + W_2^2 \tag{16}$$

A fifth cumulative measure $M_{CS}$ can be determined using Equation (6) as discussed above, substituting $d_{5A}$ for $d_{1A}$ and $d_{5B}$ for $d_{1B}$. A sixth cumulative measure $M_{C6}$ can be determined using Equation (6) as discussed above, substituting $d_{6A}$ for $d_{1A}$ and $d_{6B}$ for $d_{1B}$.

Figure 34:
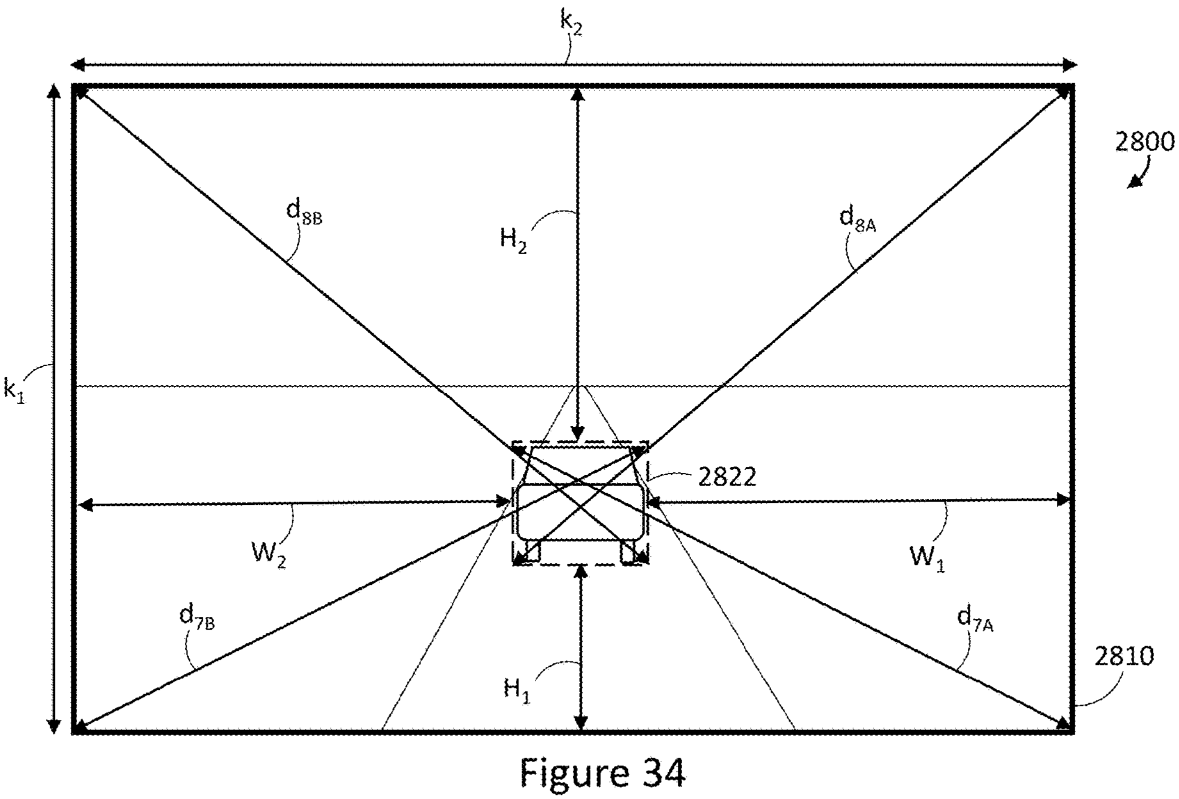

FIG. 34 illustrates image 2800 (similar to as shown in FIG. 28), which shows a vehicle labelled by bounding box 2822 (the first vehicle in method 2700) driving along a roadway. A vehicle (the second vehicle in method 2700) is driving behind the first vehicle, and carries the image capture device which the perspective of image 2800 represents (i.e., the camera which captures image 2800). Description of image 2800 and what is represented therein with reference to FIG. 28 is fully applicable to FIG. 34. Several features represented in the image 2800 are not expressly labelled in FIG. 34 to reduce clutter, but said features are still present in the image as described with reference to FIG. 28.

FIG. 34 builds on the positional measures shown in FIGS. 31, 32, and 33. In particular, FIG. 34 shows distances $H_1$ and $H_2$, similar to as in FIG. 28. FIG. 34 also shows distances $W_1$ and $W_2$ similar to as in FIGS. 29 and 31. FIG. 34 also shows positional measure $d_{7A}$ between a top-left corner of bounding box 2822 and a bottom-right corner of the image boundary 2810, and positional measure $d_{7B}$ between a top-right corner of bounding box 2822 and a bottom-left corner of the image boundary 2810. FIG. 34 also shows positional measure $d_{8A}$ between a bottom-left corner of bounding box 2822 and a top-right corner of the image boundary 2810, and positional measure das between a bottom-right corner of bounding box 2822 and a top-left corner of the image boundary 2810. Positional measures $d_{7A}$ $d_{7B}$, $d_{7A}$, das can be determined based on Pythagoras's theorem, by Equations (17)-(20) below:

$$d_{7A}^2 = (k_1 - H_2)^2 + (k_2 - W_2)^2 \tag{17}$$

$$d_{7B}^2 = (k_1 - H_2)^2 + (k_2 - W_1)^2 \tag{18}$$

$$d_{8A}^2 = (k_1 - H_1)^2 + (k_2 - W_2)^2 \tag{19}$$

$$d_{8B}^2 = (k_1 - H_1)^2 + (k_2 - W_1)^2 \tag{20}$$

A seventh cumulative measure $M_{C7}$ can be determined using Equation (6) as discussed above, substituting $d_{7A}$ for $d_{1A}$ and $d_{7B}$ for $d_{1B}$. An eight cumulative measure $M_{CS}$ can be determined using Equation (6) as discussed above, substituting $d_{8A}$ for $d_{1A}$ and $d_{8B}$ for $d_{1B}$.

The determined first cumulative measure $M_{C1}$, second cumulative measure $M_{C2}$, third cumulative measure $M_{C3}$, fourth cumulative measure $M_{C4}$, fifth cumulative measure $M_{CS}$, sixth cumulative measure $M_{C6}$, seventh cumulative measure $M_{C7}$, and eighth cumulative measure $M_{C8}$, can be used as the at least one image attribute in act 2704 of method 2700. The inclusion of additional cumulative measures further increases accuracy of the following distance determination. In the illustrated example, if all eight cumulative measures are used, the at least one image attribute is based on respective positional measures between each corner of the image boundary 2810 and each corner of the first vehicle as represented in the image. Alternatively, any subset of cumulative measures could be used as the at least one image attribute; there is no requirement that all or specific cumulative measures be used.

Figure 35:
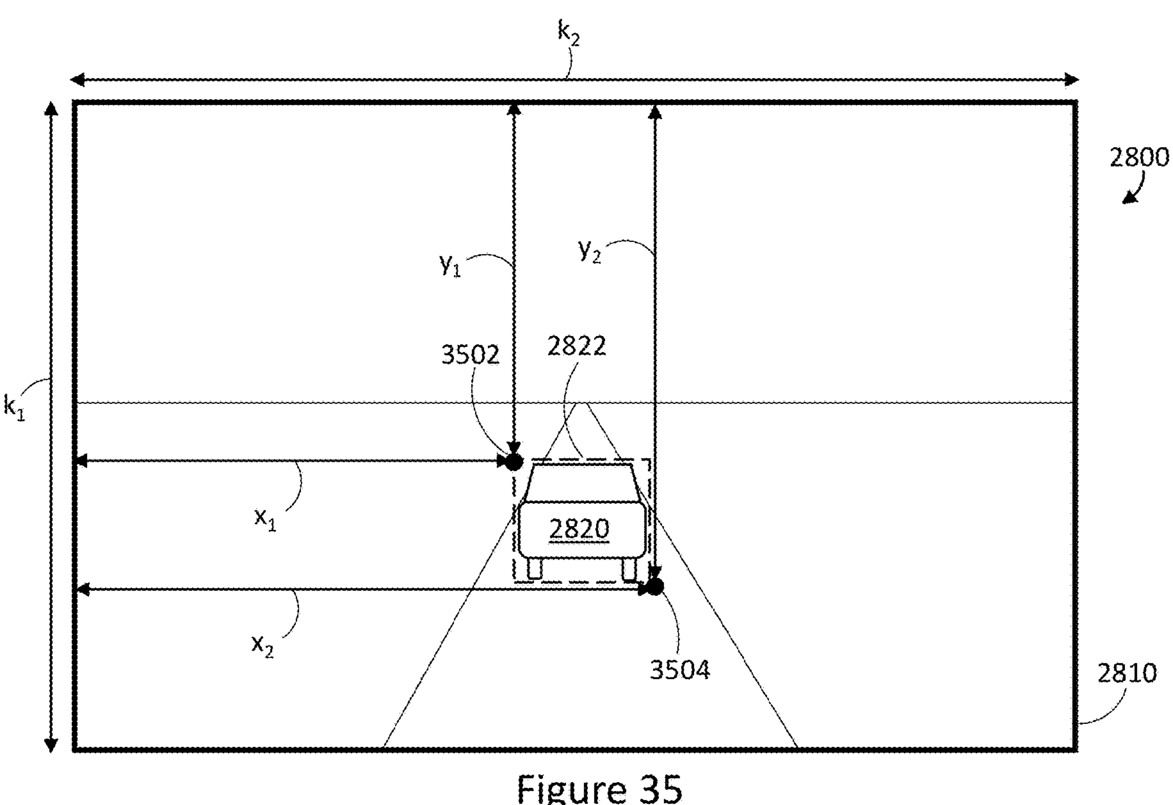

FIG. 35 illustrates image 2800 (similar to as shown in FIG. 28), which shows a vehicle 2820 (the first vehicle in method 2700) driving along a roadway. A vehicle (the second vehicle in method 2700) is driving behind vehicle 2820, and carries the image capture device which the perspective of image 2800 represents (i.e., the camera which captures image 2800). Description of image 2800 and what is represented therein with reference to FIG. 28 is fully applicable to FIG. 35. Several features represented in the image 2800 are not expressly labelled in FIG. 35 to reduce clutter, but said features are still present in the image as described with reference to FIG. 28.

FIG. 35 illustrates alternative or additional positional measures that can be used for the at least one image attribute in act 2704 of method 2700. In particular, FIG. 35 shows a first positional measure of top-left corner 3502 of vehicle 2820 (or bounding box 2822). The first positional measure of corner 3502 includes a horizontal position $x_1$ from a left boundary of image 2800 and a vertical position $y_1$ from a top boundary of image 2800. However, others measures of position are possible (e.g. from other boundaries of the image 2800). In the example of FIG. 35, a second positional measure of a second corner 3504 of vehicle 2820 (or bounding box 2822) is shown, as being a horizontal position $x_2$ from the left boundary of image 2800 and a vertical position $y_2$ from the top boundary of image 2800. By using the position of one or more corners of the vehicle as the at least one image attribute in act 2704 of method 2700, the following distance determination model can determine following distance based on the position and/or scale of the vehicle in the image.

Figure 36:
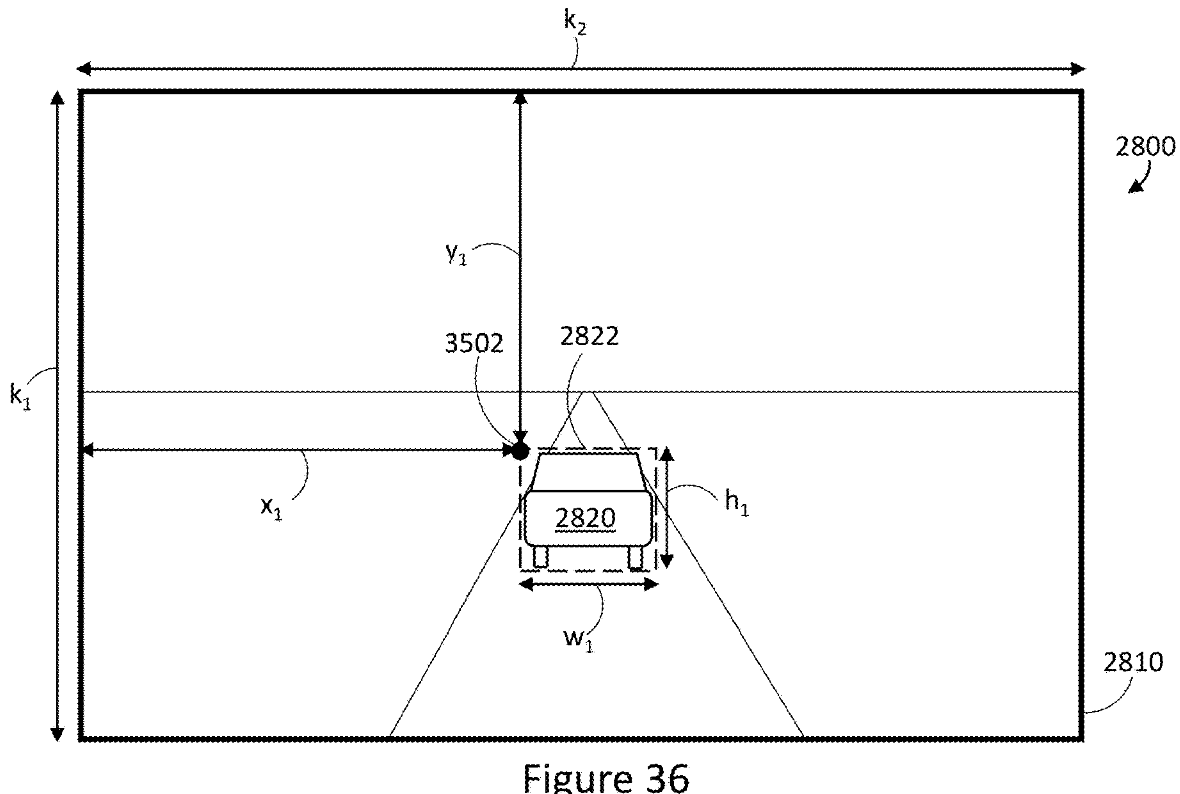

FIG. 36 illustrates image 2800 (similar to as shown in FIG. 28), which shows a vehicle 2820 (the first vehicle in method 2700) driving along a roadway. A vehicle (the second vehicle in method 2700) is driving behind vehicle 2820, and carries the image capture device which the perspective of image 2800 represents (i.e., the camera which captures image 2800). Description of image 2800 and what is represented therein with reference to FIG. 28 is fully applicable to FIG. 36. Several features represented in the image 2800 are not expressly labelled in FIG. 36 to reduce clutter, but said features are still present in the image as described with reference to FIG. 28.

FIG. 36 illustrates alternative or additional positional measures that can be used for the at least one image attribute in act 2704 of method 2700. In particular, FIG. 36 shows a first positional measure of top-left corner 3502 of vehicle 2820 (or bounding box 2822) similar to FIG. 35. The first positional measure of corner 3502 includes a horizontal position $x_1$ from a left boundary of image 2800 and a vertical position $y_1$ from a top boundary of image 2800. However, others measures of position are possible (e.g. from other boundaries of the image 2800). In the example of FIG. 36, a scale measure of the vehicle is also shown, and can be included in the at least one image attribute. The illustrated scale measure includes a height $h_1$ and a width $w_1$ of the vehicle as represented in the image. By using the position of a corner of the vehicle in conjunction with a scale measure of the vehicle as the at least one image attribute in act 2704 of method 2700, the following distance determination model can determine following distance based on the position and scale of the vehicle in the image.

FIGS. 28, 29, 31, 32, 33, 34, 35, and 36 show several different positional measures for a particular image 2800. However, the use of the same image is merely for ease of discussion; determination of these positional measures can be applied to any number of different images, for any number of different following scenarios.

Figure 37:
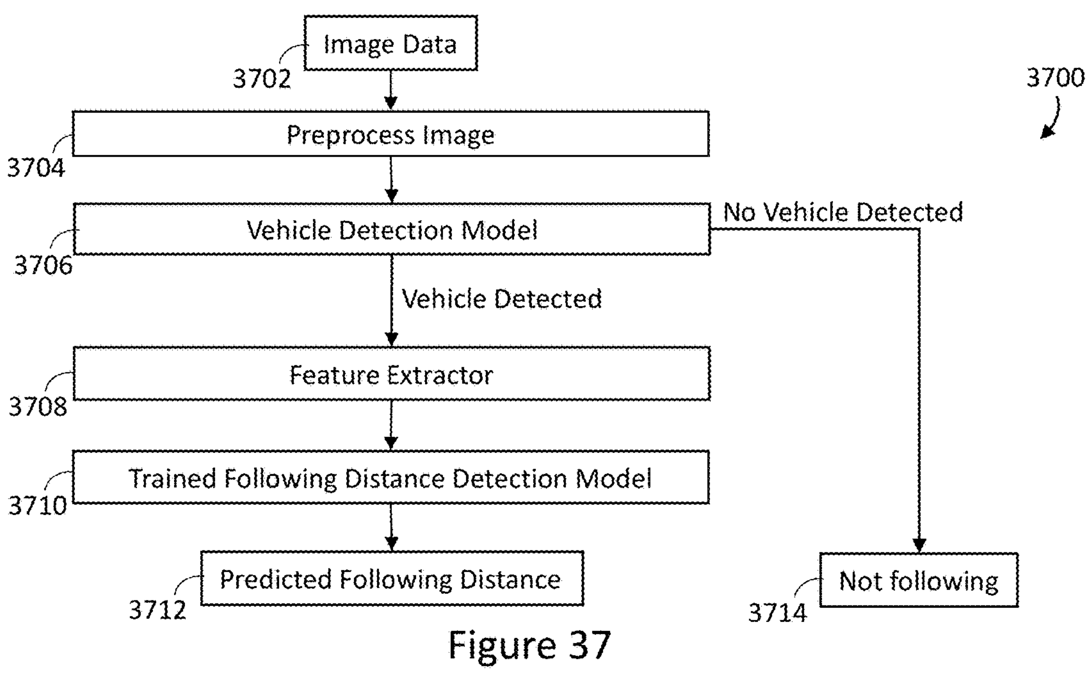
FIG. 37 illustrates an exemplary pipeline for determining following distance, in accordance with at least one exemplary implementation.

FIG. 37 is a schematic diagram which illustrates an exemplary pipeline 3700 for determining following distance. In this regard, pipeline 3700 is an exemplary implementation of method 2700 in FIG. 27.

In pipeline 3700, image data 3702 is accessed as described earlier (e.g. received, retrieved from storage, or captured by an image capture device). At 3704, at least one processor optionally preprocesses the data as appropriate. For example, the image data can be cropped to a defined resolution, or image correction can be applied such as distortion to compensate for skewing in the image due to properties of the image capture device.

At 3706, a vehicle detection model is run on the image. The vehicle detection model can be a model specifically trained to detect vehicles, or can be a general object detection model which is capable of detecting vehicles. As an example, the YOLO 5 model can be run on the image data. If no vehicle is detected, or no vehicle is detected as being in front of a vehicle having a perspective which the image data represents, an indication of not following a vehicle is output at 3714.

If a vehicle is detected, a feature extractor 3708 (e.g. a feature extraction model) is run on the image data (e.g. by any appropriate at least one processor) to identify specific features, such as those discussed above with reference to FIGS. 28, 29, 31, 32, 33, 34, 35, and 36. For example, any of the discussed positional measures can be identified, and any appropriate cumulative measures can be determined by feature extractor 3708. Extracted features are input to a trained following distance detection model 3710. Model 3710 can be trained to determine following distance based on the specific extracted features, as discussed later with reference to FIGS. 38 and 39. Model 3710 takes the extracted features as input, and outputs an indication of predicted following distance 3712.

By using a feature extractor to identify specific (numerical) features, which are subsequently used by a trained model, efficiency of the pipeline is increased compared to providing the entire image data to a following distance detection model. This is because the specifically identified features are much smaller as data, compared to the hundreds, thousands, or even millions of pixels in an image.

Figure 38:
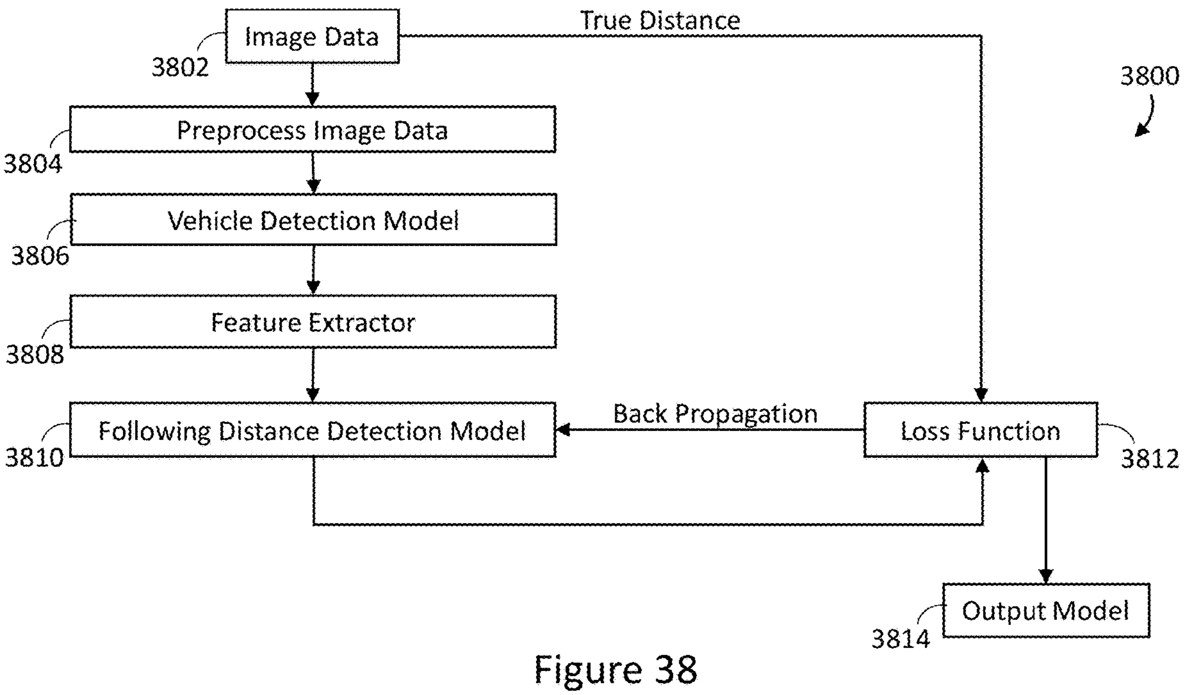
FIG. 38 illustrates an exemplary pipeline for training a following distance determination model, in accordance with at least one exemplary implementation.

FIG. 38 is a schematic diagram which illustrates an exemplary pipeline 3800 for training a following distance detection model. In this regard, pipeline 3800 is an exemplary implementation of method 3900 in FIG. 39 discussed later.

In pipeline 3800, image data 3802 is accessed as described earlier (e.g. received, retrieved from storage, or captured by an image capture device). Image data 3802 includes a plurality of images representing following situations (situations where a first vehicle is in front of a second vehicle). Image data 3802 includes distance labels or metadata which indicates a true distance between a vehicle represented in each image (first vehicle) and a vehicle having a perspective which the image data represents (second vehicle). Such data can be labelled real-world data, or simulated data as discussed earlier.

At 3804, at least one processor optionally preprocesses the image data as appropriate. For example, the image data can be cropped to a defined resolution, or image correction can be applied such as distortion to compensate for skewing in images due to properties of the image capture device.

At 3806, a vehicle detection model is run on at least one image of the plurality of images. The vehicle detection model can be a model specifically trained to detect vehicles, or can be a general object detection model which is capable of detecting vehicles. As an example, the YOLO 5 model can be run on at least one image in the plurality of images.

A feature extractor 3808 (e.g. a feature extraction model) is run on the at least one image to identify specific features related to detected vehicles, such as those discussed above with reference to FIGS. 28, 29, 31, 32, 33, 34, 35, and 36. For example, any of the discussed positional measures can be identified, and any appropriate cumulative measures can be determined by feature extractor 3808. Extracted features are provided to train a following distance detection model 3810.

For the at least one image, the following distance detection model predicts following distance between the first vehicle and the second vehicle. The predicted following distance is input to a loss function 3812. In this example, the loss function represents a difference between the predicted following distance and the true distance as indicated in the distance label or metadata for the image. Results from the loss function are provided back to the following distance detection model (e.g. by back propagation), so that the following distance detection model can be trained and refined. The process of determining a following distance, evaluating loss function 3812, and providing feedback to train the model, can be repeated as necessary until a satisfactory level of accuracy is achieved (loss function 3812 produces a low enough loss). For example the process can be repeated for each image in the plurality of images, can be repeated multiple times for any number of images, or any other appropriate scheme. The model as trained can be output at 3814 (e.g. stored at a non-transitory processor-readable storage medium for later use, or transmitted to another device). Further examples are discussed below with reference to FIG. 39.

Figure 39:
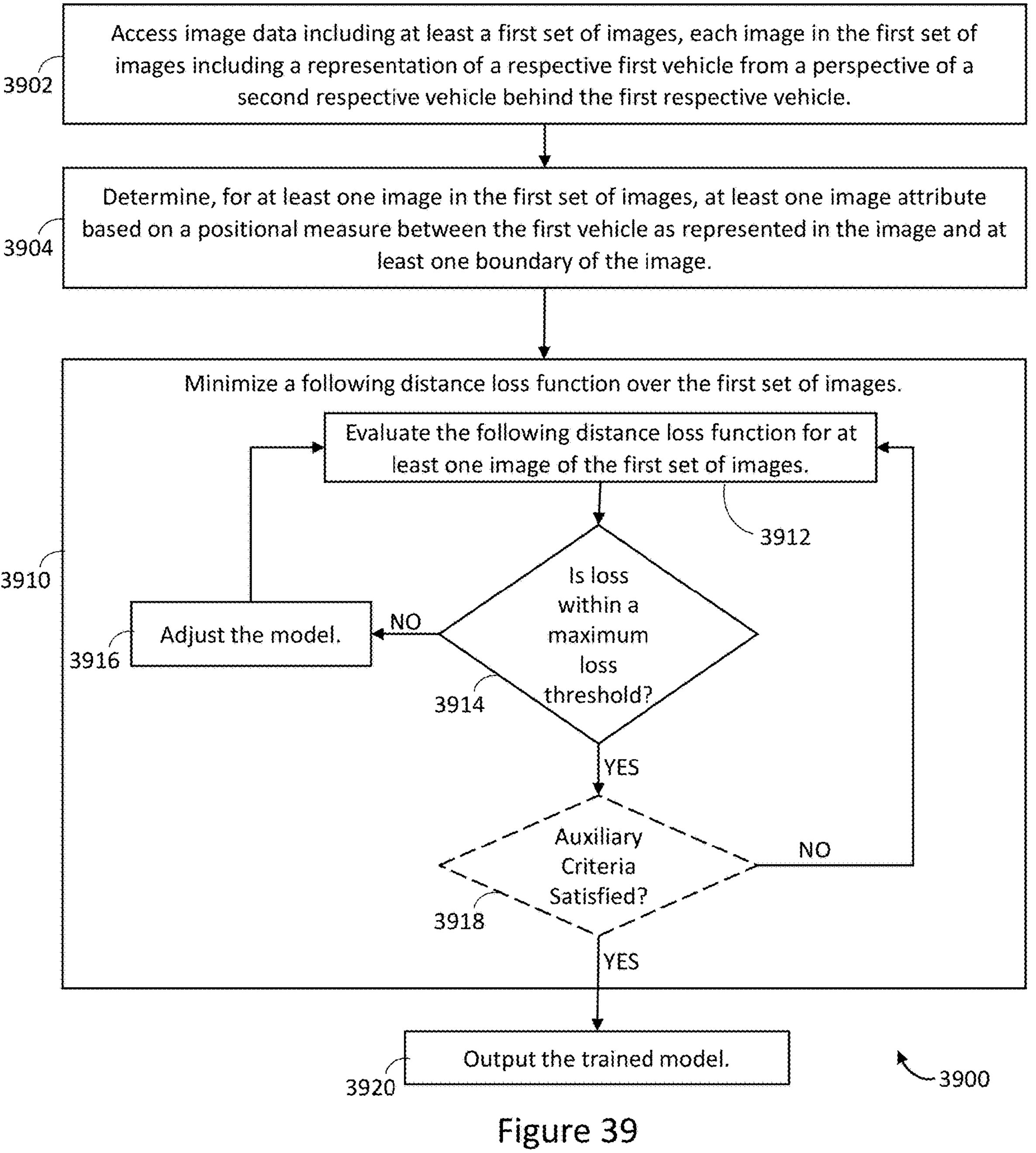
FIG. 39 is a flowchart diagram which illustrates a method for training a following distance determination model, in accordance with at least one exemplary implementation.

FIG. 39 is a flowchart diagram which illustrates an exemplary method 3900 for training a machine learning model. Method 3900 as illustrated includes acts 3902, 3904, 3910 (including sub-acts 3912, 3914, 3916, and 3918), and 3920. One skilled in the art will appreciate that additional acts could be added, acts could be removed, or acts could be reordered as appropriate for a given application. As an example, sub-act 3918 is shown in dashed lines to highlight that this sub-act is optional. Acts of method 3900 can be performed by appropriate components of the systems or devices discussed earlier, similar to as discussed with reference to method 500 in FIG. 5, and not repeated for brevity. Importantly, a system or device which performs method 3900 is not necessarily the same hardware which generates training data (as in methods 500 and 800 discussed earlier) or the same hardware which applies the trained model (e.g. as in method 2700 discussed earlier with reference to FIG. 27). In this way, training data generation, model training, and model execution can be performed by discrete systems or devices most suited to the task. For example, a central server (e.g. any of client device 104, cloud server 106, or local server 118) can perform training data generation and model training, and a device at a vehicle (e.g. image capture device 108A or peripheral device 220) can apply the model based on image data captured at the vehicle. However, in some implementations, a single device or system can perform all of generating training data, training a machine learning model, and applying the machine learning model. Method 3900 is similar to method 2100 discussed earlier with reference to FIG. 21, but focuses on determination of image attributes and training the model based on these image attributes. In other respects, description of method 2100 is applicable to method 3900.

At 3902, image data is accessed by at least one processor of the device performing method 3900. The image data includes at least a first set of images, such as the first plurality of images output at 524 in method 500 discussed with reference to FIG. 5. The accessed image data can be labelled real-world data, or as discussed above can be image data generated via simulation. As above, each image in the first set of images includes a representation of a respective first vehicle from a perspective of a second respective vehicle behind the first vehicle. That is, each image represents a respective instance where a second vehicle is positioned behind (following) a first vehicle. Further, each image in the first set of images is associated with a distance label indicating a distance between the respective first vehicle and the respective second vehicle.

At 3904, for at least one image in the first set of images, at least one image attribute is determined by the at least one processor. The at least one image attribute is based on a positional measure between the first vehicle as represented in the image, and at least one boundary of the image. The at least one image attribute can be determined for examples as discussed earlier with reference to FIG. 28, 29, 31, 32, 33, 34, 35, or 36, or in any other appropriate manner.

At 3910, a following distance loss function is minimized over the first set of images. In the example of FIG. 39, act 3910 includes sub-acts 3912, 3914, 3916, 3918. At 3912, the following distance loss function is evaluated by the at least one processor for at least one image of the first set of images. That is, for the at least one image, the model is applied to determine following distance, and loss is determined as a difference between determined following distance and respective distances label for the at least one image.

At 3914, the determined loss is compared to a maximum loss threshold by the at least one processor. If the determined loss is not within the maximum loss threshold, method 3900 proceeds to act 3916 where the model is adjusted (e.g. by adjusting weights and biases of the model with the aim of reducing loss). In one exemplary implementation, back-propagation is implemented to adjust weights and biases of the model. One skilled in the art can implement any appropriate model structure and means for adjusting the model, as appropriate for a given application. After the model is adjusted at 3916, method 3900 returns to act 3912, where the following distance function is evaluated for at least one image of the first set of images. The at least one image for which the following distance loss function is evaluated can be the same at least one image as before, such that the adjustments to the model are "tested" against the same image data. Alternatively, the at least one image for which the following distance loss function is evaluated can be a different at least one image, such that the model is adjusted by moving through the first set of images.

Acts 3912, 3914, and 3916 can be iterated any appropriate number of times, until loss is within the maximum loss threshold at 3914, in which case method 3900 proceeds to 3918. At 3918, auxiliary criteria for the model are evaluated. If the auxiliary criteria are not satisfied, method 3900 returns to act 3912, where the following distance loss function is evaluated. Auxiliary criteria can include various criteria. As one example, auxiliary criteria can require that the loss function be within a maximum loss threshold for each image in the first set of images. That is, even if the loss function is within a maximum loss threshold for a first image, the auxiliary criteria can require that each image be evaluated prior to outputting the trained model. As another example, auxiliary criteria can require that the loss function be within a maximum loss threshold for at least a defined amount of images in the first set of images. That is, even if the loss function is within a maximum loss threshold for a first image, the auxiliary criteria can require that the loss function be within the maximum loss threshold for a defined amount (e.g. 90%) of the images in the first set of images. As another example, auxiliary criteria can require that the loss function be evaluated for at least a defined amount of images (e.g. 90%) in the first set of images.

Act 3918 is optional. In one exemplary implementation, evaluating the following distance loss function for at least one image of the first set of images in act 3912 comprises evaluating the following distance loss function for each image of the first set of images (or for a defined amount of images in the first set of images), such that criteria regarding quantity of images to be evaluated are inherently satisfied.

If the auxiliary criteria are satisfied at 3918 (or if act 3918 is not included), method 3900 proceeds to act 3920. At 3920, the model is considered as a "trained" model, and is output for use. For example, the trained model can be sent to another device for storage, distribution, and/or application, or can be stored at a non-transitory processor-readable storage of the device which performed the training.

Exemplary scenarios for training models (and how auxiliary criteria are implemented) are discussed with reference to FIG. 21. These exemplary scenarios are fully applicable to the example of FIG. 39, but for the loss function being different, and the exemplary scenarios are not repeated for brevity.

Figure 40:
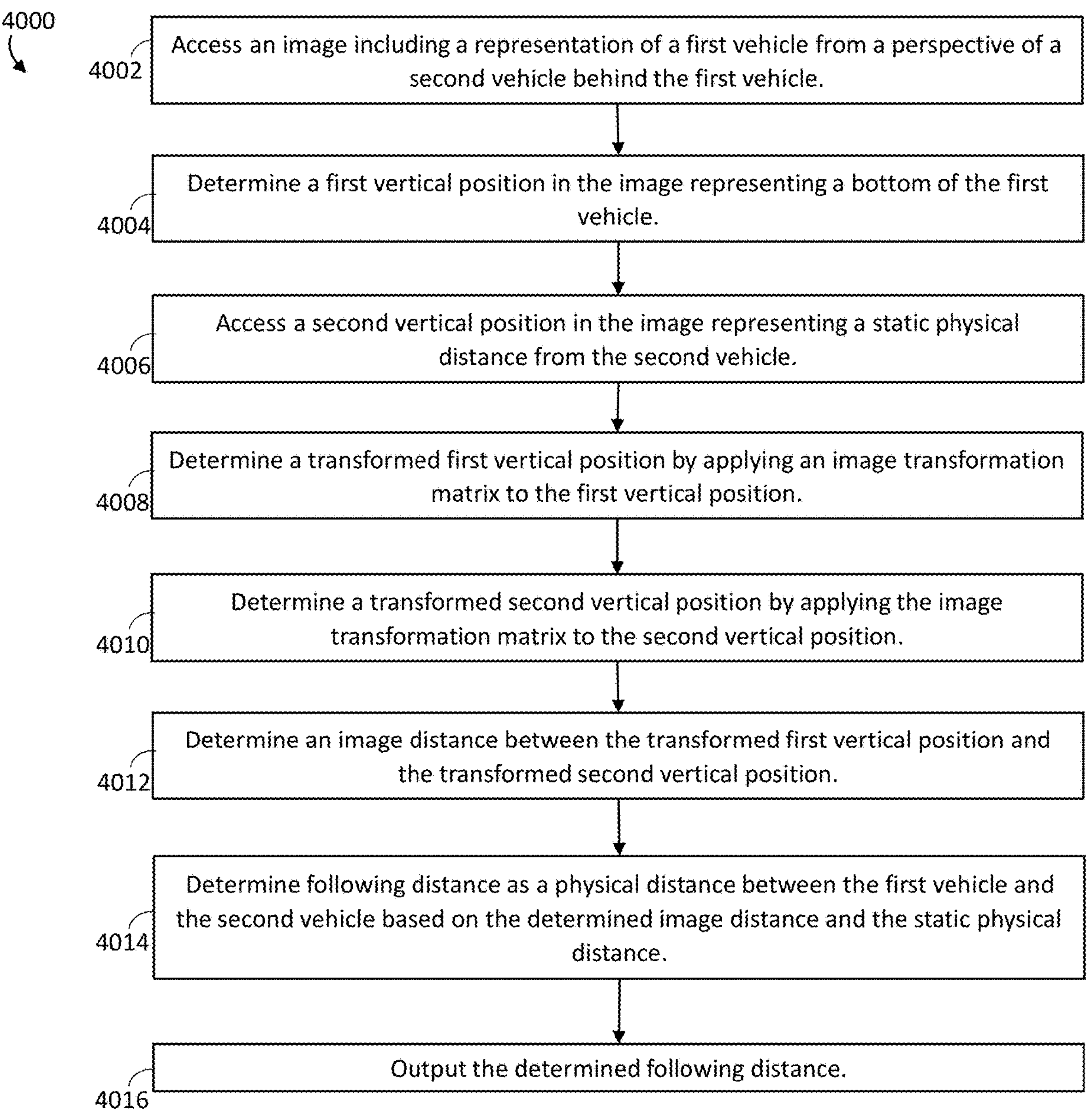
FIG. 40 is a flowchart diagram which illustrates a method for determining following distance, in accordance with at least one exemplary implementation.

FIG. 40 is a flowchart diagram which illustrates another exemplary method 4000 for determining following distance. Method 4000 can be applied to real-world images (images captured by an image sensor) to detect real-world following distance. Further, method 4000 can also be applied to simulated images (images generated by simulation), for the purposes of testing, validation, training of other models, or any other appropriate applications. Method 4000 as illustrated includes acts 4002, 4004, 4006, 4008, 4010, 4012, 4014, and 4016. One skilled in the art will appreciate that additional acts could be added, acts could be removed, or acts could be reordered as appropriate for a given application. Acts of method 4000 can be performed by appropriate components of the systems or devices discussed earlier, similar to as discussed with reference to method 500 in FIG. 5, and not repeated for brevity.

Method 4000 can be implemented for example within the context of detecting tailgating. For example, method 4000 in FIG. 40 can be implemented as act 2206 in method 2200 in FIG. 22. In this way, method 4000 can be used to determine following distance between two vehicles, and method 2200 can use the determined following distance to identify tailgating between the two vehicles as discussed earlier.

Figure 41:
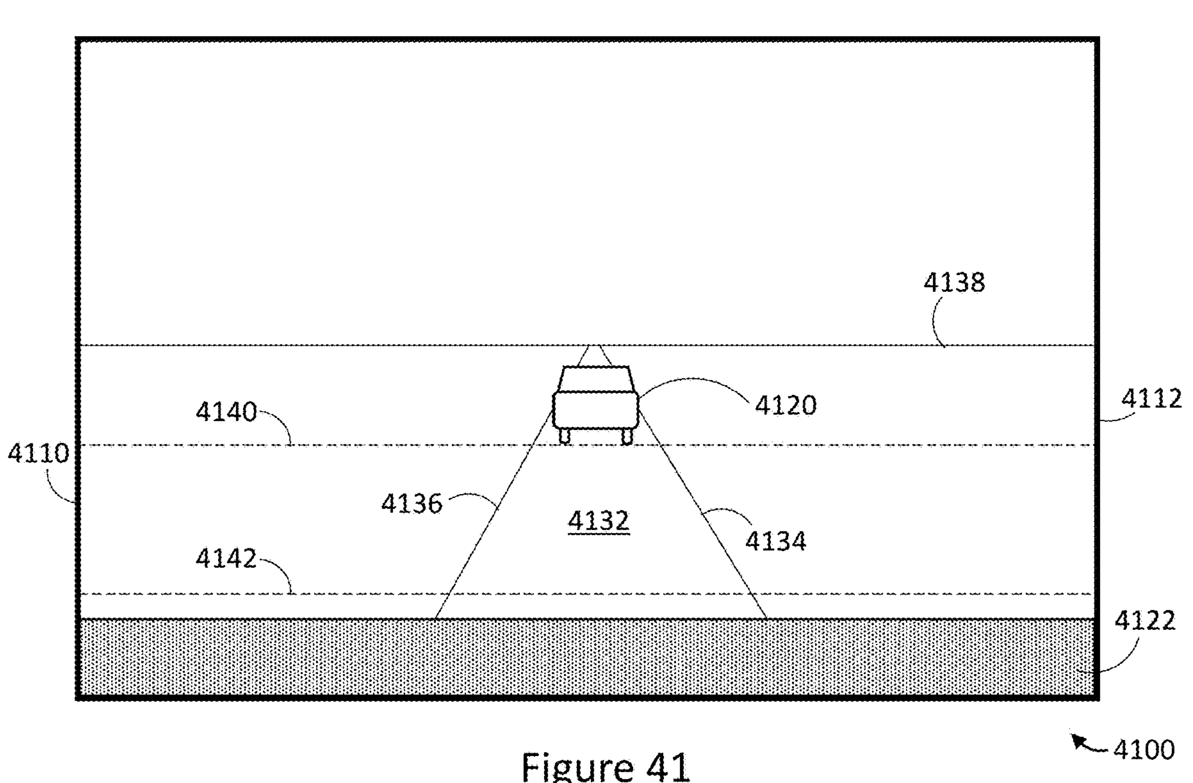
FIG. 41 illustrates an exemplary image based on which following distance can be determined, in accordance with at least one exemplary implementation.

Method 4000 is discussed below in the context of a first exemplary scenario illustrated in FIG. 41. However, method 4000 is applicable to many different scenarios. FIG. 41 illustrates an image 4100 having a left boundary 4110 and a right boundary 4112. Image 4100 shows a vehicle 4120 (the first vehicle in method 4000) driving along a roadway 4132 shown by edges 4134 and 4136, towards a horizon 4138. A vehicle (the second vehicle in method 4000) is driving behind vehicle 4120, and carries the image capture device which the perspective of image 4100 represents (i.e., the camera which captures image 4100). A hood 4122 of the second vehicle is visible at the bottom of image 4100.

Returning to method 4000, at 4002, an image is accessed by a system or device performing method 4000. The image includes a representation of a first vehicle from a perspective of a second vehicle behind the first vehicle. The image further represents a common lane of travel of the first vehicle and the second vehicle. Image 4100 shown in FIG. 41 is an exemplary image which can be accessed in this regard, where vehicle 4120 is the first vehicle, hood 4122 is part of the second vehicle, roadway 4132 includes the common lane of travel as shown by boundaries 4134 and 4136. While roadway 4132 in FIG. 41 is shown as a single-lane road to reduce clutter, the present disclosure is fully applicable to multi-lane roadways, where the first vehicle and the second vehicle travel in one common lane of multiple possible lanes. In some implementations, accessing the image comprises capturing the image, by at least one image capture device positioned at the second vehicle. In other implementations, accessing the image comprises receiving the image by a device or system performing method 4000 (e.g., a server which performs method 4000 can receive the image as transmitted from an image capture device at a vehicle which captured the image). In yet other implementations, accessing the image comprises accessing the image as stored in at least one non-transitory processor-readable storage medium (e.g., the image is previously captured by an image capture device, and stored at a non-transitory processor-readable storage medium at a vehicle or at a server for later retrieval when performing method 4000).

At least one processor of the system or device which performs method 4000 can optionally preprocess the accessed image data as appropriate. For example, the image data can be cropped to a defined resolution, or image correction can be applied such as distortion to compensate for skewing in the image due to properties of the image capture device. As examples, radial distortion and/or tangential distortion of the image data can be compensated for. In some implementations, the accessed image data is already pre-processed to be of a desired resolution and/or to have distortion corrected, prior to access and utilization in method 4000.

Further, in some implementations preliminary analysis can be performed to determine whether an image includes a representation of a first vehicle from a perspective of a second vehicle behind the first vehicle. An example of such analysis is discussed earlier with reference to FIG. 22, and is fully applicable to method 4000 in FIG. 40. In particular, in some cases the first vehicle may not be represented in the image, or may be represented in a way that is not relevant, such as being represented so far away from the second vehicle that tailgating considerations are not relevant. In such cases method 4000 can be largely averted. In other cases, multiple vehicles may appear in the image, and the image can be analyzed to determine which vehicle (if any) qualifies as the first vehicle in the context of method 4000. This can be achieved by determining which vehicle (if any) is traveling in front of (in a common lane of travel as) the second vehicle. If multiple vehicles are travelling in a common lane of travel with the second vehicle, the closest vehicle can be selected as the first vehicle. Exemplary techniques for detecting a vehicle in front of another vehicle are discussed earlier with reference to FIGS. 24A, 24B, 24C, 25A, and 25B and are fully applicable in the context of method 4000 in FIG. 40. As another example, determination of the first vehicle can be performed based on lane boundaries, as discussed later with reference to FIGS. 51 and 52.

At 4004, at least one processor determines a first vertical position in the image representing a bottom of the first vehicle. In this regard, FIG. 41 shows first vertical position 4140 representing a bottom of first vehicle 4120 as it appears in image 4100. First vertical position 4140 is shown as a line which extends horizontally across image 4100 to illustrate that the first vertical position 4140 may be only a height coordinate in the image, regardless of horizontal position. Alternatively, the first vertical position 4140 may also include a horizontal coordinate, for example centered at the first vehicle 4120 or centered in roadway 4132 (or the common lane of travel). Further, the bottom of the first vehicle 4120 in FIG. 41 is shown as the bottom of tires of the vehicle 4120, but other reference points could be used, such as a bottom of a chassis of vehicle 4120.

In order to determine the first vertical position, a variety of techniques could be used. In one example, an object detection model (such as a YOLO model) can be run on image 4100, to output a bounding box which surrounds vehicle 4120 (similar to bounding box 2422 shown in FIG. 24A, and not shown in FIG. 41 to reduce clutter). A bottom coordinate of such a bounding box can be used as the first vertical position. Alternatively, a feature detection model can be utilized which identifies specific features of vehicle 4120, and identifies a particular feature which is identified as delineating the "bottom" of the first vehicle (e.g. a rear bumper of the first vehicle).

At 4006, a second vertical position 4142 in the image is accessed (e.g. by the at least one processor). The second vertical position 4142 represents a static physical distance from the second vehicle. In this regard, the second vertical position 4142 can be determined during a calibration of the image capture device installed in the second vehicle, where a particular image distance (e.g. number of pixels) from a bottom boundary of images captured by the image capture device is correlated to a particular physical distance from the second vehicle. In the example of FIG. 41, the second vertical position 4142 is shown as being slightly above hood 4122 of the second vehicle (slightly ahead of the front of the second vehicle in physical space). However, other specific positions are possible as the second vertical position 4142, such as a position on hood 4122, or a position at a very front of hood 4122. The second vertical position 4142 can be stored in at least one non-transitory processor-readable storage medium of the system performing method 4000, and accessed (or retrieved) as needed. An exemplary (non-limiting) procedure for calibrating the image capture device and determining the second vertical position 4142 is discussed below with reference to FIG. 42.

Figure 42:
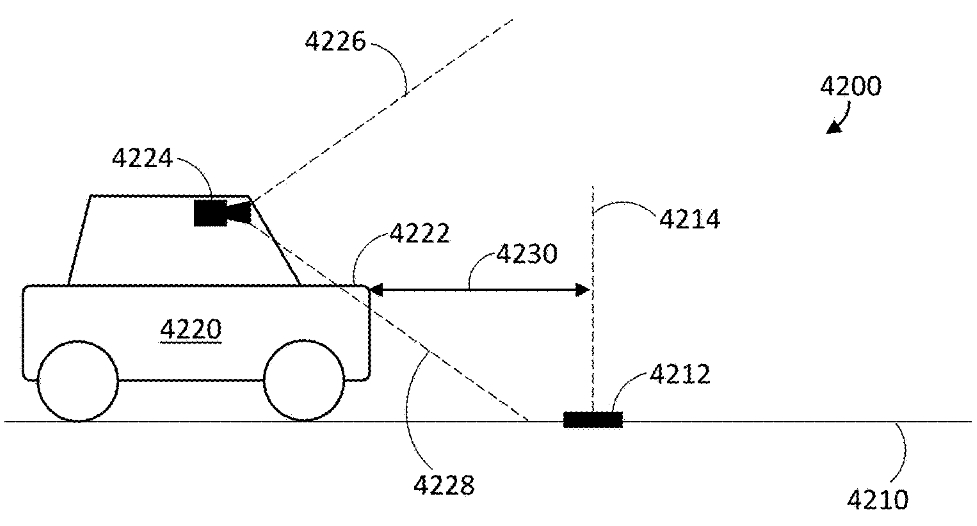
FIG. 42 is a side view of an exemplary scenario for calibrating an image capture device.

FIG. 42 is a side view of an exemplary scenario 4200, in which a vehicle 4220 is positioned on a surface 4210. In scenario 4200, vehicle 4220 is stationary. A marker 4212 is also positioned on surface 4210, and a projection 4214 is shown extending upwards from marker 4212 (perpendicular to surface 4210). An image capture device 4224 is positioned at vehicle 4220, and captures image data within a field of view shown by field of view lines 4226 and 4228. A hood 4222 of vehicle 4220 is partially captured within field of view lines 4226 and 4228. A physical distance 4230 between a front of vehicle 4220 and marker 4212 (or projection 4214 from marker 4212) is shown, and could be determined for example by manual measurement. This physical distance 4230 can then be correlated to an image distance in image data captured by image capture device 4224, the image distance corresponding to where marker 4212 appears in the captured image data. That is, a static physical distance (physical distance 4230) is determined which is represented by the second vertical position accessed in act 4006 of method 4000.

In some implementations, the static physical distance can be 0, such as by placing marker 4212 immediately adjacent vehicle 4220. This can simplify distance calculations, by may not be possible in all configurations, particularly if the marker 4212 cannot be seen in the field of view of image capture device 4224.

FIG. 42 illustrates one exemplary procedure for correlating the second vertical position and a static physical distance. However, other implementations are possible, such as using an object (e.g. a sign) instead of a surface-based marker. Further, the procedure described in FIG. 42 does not need to be performed in the context of method 4000 in FIG. 40, but rather can be performed prior to said method, as part of an initialization or calibration of the image capture device in the second vehicle.

Due to perspective, in ordinary image data from an image capture device in a vehicle, the relationship between following distance in the real world (physical distance between the first and second vehicles in image 4100) and image distance in the image data (e.g. quantity of pixels between the first vehicle and the second vehicle as representing in image 4100) is not fixed. That is, the higher up a pixel is vertically in the image (the further forward in physical space the pixel represents), the greater the distance represented by the pixel. Consequently, it is challenging to determine following distance between vehicles based on image data. To address this, method 4000 in FIG. 40 transforms the image data (or at least key points of the image data) to arrive at a fixed relationship between image distance and physical distance (e.g. physical distance between the first and second vehicles). This is discussed with reference to acts 4008 and 4010 below. This fixed relationship can be expressed, for example, as a ratio between a number of pixels in the image and physical distance represented by said number of pixels. For example, a ratio of image distance to physical distance could be 1 meter per 10 pixels, 1 meter per 50 pixels, 1 meter per 100 pixels, or any other appropriate ratio. Further, in some cases two different fixed relationships can be used, such as a first ratio between a first number of pixels in a horizontal direction of the image and physical distance represented by said number of pixels, and a second ratio between a second number of pixels in a vertical direction of the image and physical distance represented by said number of pixels. In one illustrative example, one meter of physical distance is represented by 75.998 pixels in the horizontal direction (x axis), whereas one meter of physical distance is represented by 109.202 pixels in the vertical direction (y axis). These numbers are merely exemplary, and any ratio could be used as appropriate for a given application.

In act 4008, the at least one processor determines a transformed first vertical position by applying an image transformation matrix to the first vertical position determined in act 4004. In act 4010, the at least one processor determines a transformed second vertical position by applying the image transformation matrix to the second vertical position. The image transformation matrix is a matrix which, when applied to image data for a particular image capture device setup, transforms the image data to a bird's eye view of the image. That is, the image transformation matrix transforms the image data to a top-down view, where there is a fixed relationship between physical following distance and image distance (e.g., image distance can be converted to physical distance by applying a fixed ratio which relates image distance to physical distance). That is, in the transformed image, a pixel represents a set physical distance, regardless of the position of the pixel in the image. This is discussed in detail below with reference to FIG. 43. How the image transformation matrix can be obtained is discussed later with reference to FIGS. 44, 45, and 46.

Figure 43:
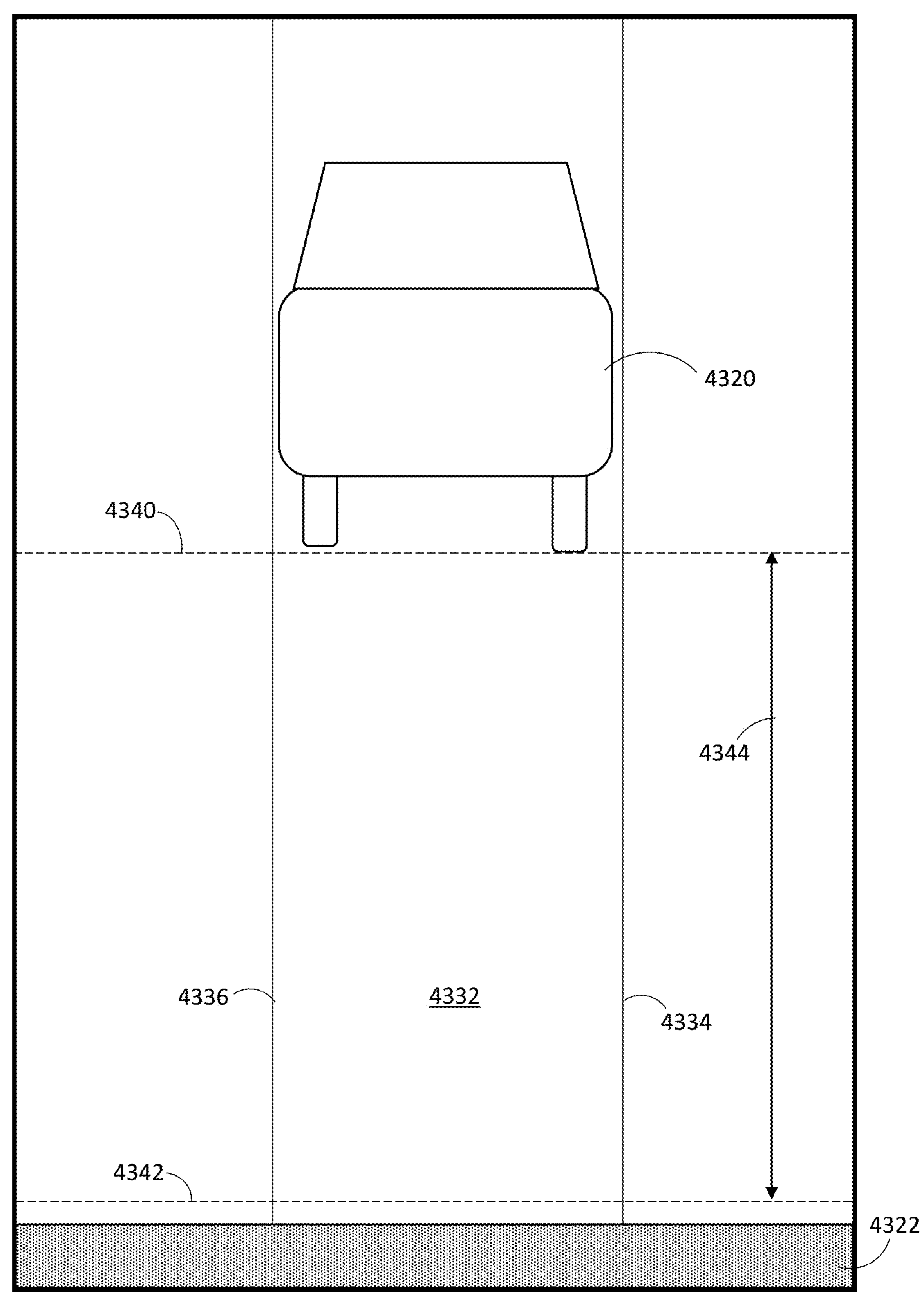
FIG. 43 illustrates an exemplary image as transformed in accordance with an image transformation matrix.

FIG. 43 illustrates transformed image data 4300, based on the image 4100 discussed with reference to FIG. 41. In particular, transformed image data 4300 represents a portion of image 4100 extending from a bottom of image 4100 to above vehicle 4120 as represented in image 4100. Transformed image data 4300 can be obtained by applying the image transformation matrix to image 4100 (or a portion thereof). Transformed image data 4300 is shown in FIG. 43 as including representation 4332 of roadway 4132, as shown by representations 4334 and 4336 of boundaries 4134 and 4136, respectively. Transformed image data 4300 further includes representation 4320 of vehicle 4120, and representation 4322 of hood 4122 of the second vehicle. A transformed first vertical position 4340 is also shown in FIG. 43, which represents a transformation of the first vertical position as determined in act 4008. A transformed second vertical position 4342 is also shown in FIG. 43, which represents a transformation of the second vertical position as determined in act 4010.

The transformed image data (such as shown in FIG. 43) does not need to have the same resolution or aspect ratio as image data prior to transformation. This can be seen by comparing FIGS. 41 and 43, where transformed image data 4300 is significantly taller than wide, compared to image 4100. Further, in some respects, the transformed image data may not be a completely faithful reproduction of how the scene would actually appear if viewed from the top view. For example, while representation 4320 may represent a shape and scale of vehicle 4120 as transformed, image data 4100 may not include data which shows what an actual top of vehicle 4120 looks like. In this regard, representation 4320 may be image data representing a rear of vehicle 4120, transformed to a shape and scale of a top view of vehicle 4120.

In some implementations, acts 4008 and 4010 of method 4000 can entail transforming a significant portion of the image, such as shown in FIG. 43, and identifying the transformed first vertical position 4340 and the transformed second vertical position 4342 in the transformed image data. However, this is not strictly necessary, and instead the image transformation matrix can be applied directly to the first vertical position and the second vertical position to determine the transformed first vertical position and the transformed second vertical position. This approach can significantly reduce computational burden of method 4000.

Returning to method 4000 in FIG. 40, at 4012, the at least one processor determines an image distance between the transformed first vertical position and the transformed second vertical position. This is shown by way of example in FIG. 43 as image distance 4344. The image distance can be, for example, a quantity of pixels between the transformed first vertical position and the transformed second vertical position.

At 4014, the at least one processor determines following distance as a physical distance between the first vehicle and the second vehicle based on the image distance determined at 4012 and the static physical distance discussed with reference to FIGS. 41 and 42. In particular, a ratio of physical distance to image distance is applied to the image distance determined at 4012 (image distance 4344 in the example of FIG. 43) to determine a physical distance represented by the determined image distance. How such a ratio of physical distance to image distance can be determined is discussed later with reference to FIGS. 47, 48, 49, and 50. The static physical distance discussed with reference to act 4006 is added to the determined physical distance to arrive at following distance between the first vehicle and the second vehicle.

At 4016, the determined following distance is output. In an exemplary implementation where method 4000 is used to determine following distance in act 2206 of method 2200, outputting the following distance can include preparing the following distance for a next act in the method 2200 (e.g. by storing the determined following distance in at least one non-transitory processor-readable storage medium). In another exemplary implementation, outputting the following distance can include outputting the following distance to a driver of the second vehicle, such as via a display or audio output device. In yet another exemplary implementation, outputting the following distance can include providing the determined following distance to a database (e.g. at a device or server such as client device 104, cloud server 106, or local server 118 in FIGS. 1A and 1B). Such a database or server can use determined following distances logged over time, for example for analyzing driver behavior for safe or unsafe conduct.

Figure 44:
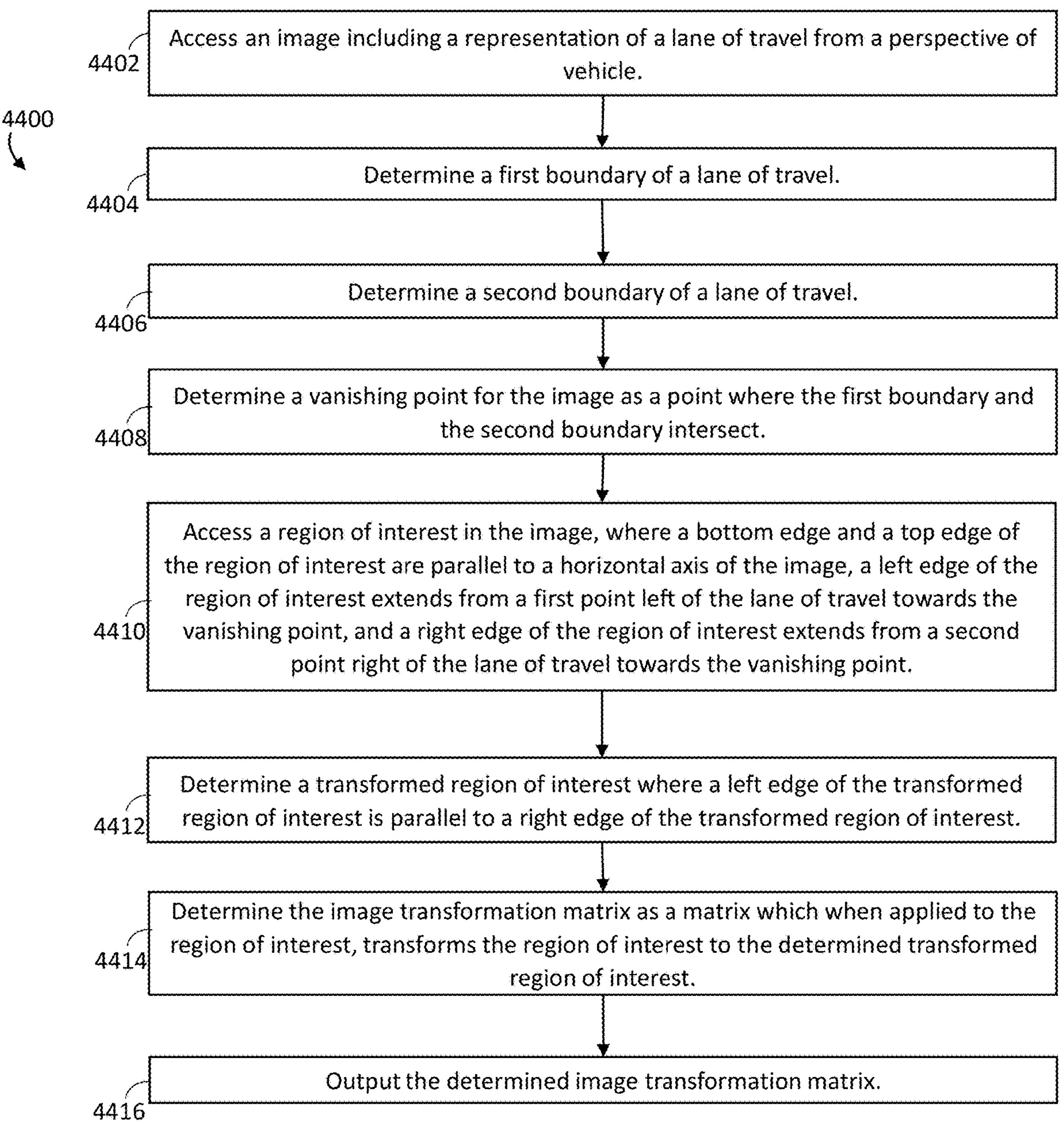
FIG. 44 is a flowchart diagram which illustrates a method for determining an image transformation matrix, in accordance with at least one exemplary implementation.

FIG. 44 is a flowchart diagram which illustrates an exemplary method 4400 for determining an image transformation matrix such as that utilized in method 4000 in FIG. 40. Method 4400 as illustrated includes acts 4402, 4404, 4406, 4408, 4410, 4412, 4414, and 4416. One skilled in the art will appreciate that additional acts could be added, acts could be removed, or acts could be reordered as appropriate for a given application. Acts of method 4400 can be performed by appropriate components of the systems or devices discussed earlier, similar to as discussed with reference to method 500 in FIG. 5, and not repeated for brevity. Importantly, a system or device which performs method 4400 is not necessarily the same hardware which determines following distance (as in methods 4000 discussed earlier). In this way, calibration of an image capture device and use of image data captured by an image capture device can be performed by discrete systems or devices most suited to the task. However, in some implementations, a single device or system can perform all of calibration of an image capture device and use of image data captured by said image device.

Figure 45:
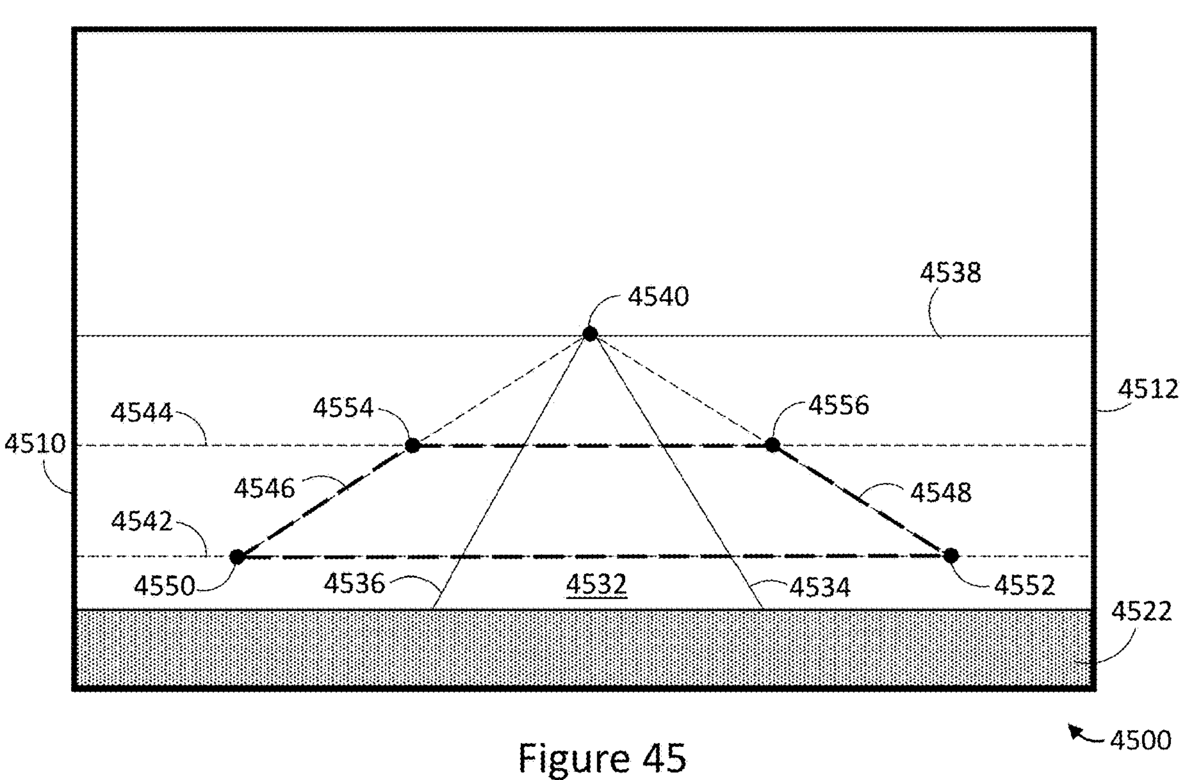
FIG. 45 illustrates an exemplary image with a region of interest labelled, in accordance with at least one exemplary implementation.

Method 4400 is discussed below in the context of a first example scenario illustrated in FIGS. 45 and 46. However, method 4400 is applicable to many different scenarios. FIG. 45 illustrates an image 4500 having a left boundary 4510 and a right boundary 4512. Image 4500 includes a roadway 4532 shown by edges 4534 and 4536, towards a horizon 4538. A vehicle carries the image capture device which the perspective of image 4500 represents (i.e., the camera which captures image 4500). A hood 4522 of the vehicle is visible at the bottom of image 4500. FIG. 45 also illustrates a number of lines and points which annotate image 4500, and are discussed below in the context of method 4400.

Returning to method 4400, at 4402 an image is accessed by a system or device performing method 4400. The image includes a representation of a lane of travel from a perspective of a vehicle. Image 4500 shown in FIG. 45 is an exemplary image which can be accessed in this regard, where hood 4522 is part of the vehicle, roadway 4532 includes the lane of travel as shown by boundaries 4534 and 4536. While roadway 4532 in FIG. 45 is shown as a single-lane road to reduce clutter, the present disclosure is fully applicable to multi-lane roadways, where the vehicle travels in one of multiple possible lanes. Further, while not shown in FIG. 45 to reduce clutter, it is possible for other vehicles to be represented in the image (possibly traveling in the same lane of travel). In this regard, image data such as image 4100 in FIG. 41 could also be accessed and used in the context method 4400. In such a case, the common lane of travel in image 4100 can be the lane of travel referred to in method 4400. In some implementations, accessing the image comprises capturing the image, by at least one image capture device positioned at the second vehicle. In other implementations, accessing the image comprises receiving the image by a device or system performing method 4400 (e.g., a server which performs method 4400 can receive the image as transmitted from an image capture device at a vehicle which captured the image). In yet other implementations, accessing the image comprises accessing the image as stored in at least one non-transitory processor-readable storage medium (e.g., the image is previously captured by an image capture device, and stored at a non-transitory processor-readable storage medium at a vehicle or at a server for later retrieval when performing method 4400).

At least one processor of the system or device performing method 4400 can optionally preprocess the accessed image as appropriate. For example, the image data can be cropped to a defined resolution, or image correction can be applied such as distortion to compensate for skewing in the image due to properties of the image capture device. As examples, radial distortion and/or tangential distortion of the image data can be compensated for. In some implementations, the accessed image data is already pre-processed to be of a desired resolution and/or to have distortion corrected, prior to access and utilization in method 4400.

At 4404, at least one processor of the system performing method 4400 determines a first boundary of the lane of travel. At 4406, the at least one processor determines a second boundary of the lane of travel. In the example of image 4500 of FIG. 45, the at least one processor identifies boundaries 4534 and 4536 of roadway 4532, for example by applying a feature detection model to the image 4500. In an example, the at least one processor can detect lanes in the form of a segmentation mask, where pixels forming lane markings are labeled as lane marking pixels, while other pixels are labelled as background pixels.

Determining the first boundary and the second boundary can entail determining a mathematical representation for each boundary, for example in accordance with Equation (21) below.

$$y = mx + b \tag{21}$$

Equation (21) is a mathematical representation of a straight line, where y is a vertical value, m is slope of the line, x is a horizontal value, and b is the y intercept (where the line crosses the vertical axis when x=0). Determining the first boundary at 4404 can entail determining a first slope $m_1$ and a first y intercept $b_1$ for the first boundary. Likewise, determining the second boundary at 4406 can entail determining a second slope $m_2$ and a second y intercept $b_2$ for the second boundary. Equation (21) is merely exemplary, and alternative equations or mathematical representations for lines could be used instead.

In some scenarios, many lane markings for a plurality of lanes of travel may be visible in an image being analyzed. In such a case, where an origin of the image is at the top-left of the image, lines having negative slope can be considered as being left of the vehicle which carries the image capture device (vehicle having hood 4122 in image 4100), and lines having positive slope can be considered as being right of the vehicle which carries the image device, from the perspective of the image capture device. Further, from a midpoint of the image, the closest line having negative slope can be considered as a left boundary of a lane of travel of the vehicle carrying the image capture device (vehicle having hood 4122 in image 4100), and the closest line having positive slope can be considered as a right boundary of a lane of travel of the vehicle carrying the image capture device. This left boundary and right boundary can be the first boundary and the second boundary determined at 4404 and 4406.

At 4408, the at least one processor determines a vanishing point for the image as a point where the first boundary and the second boundary intersect each other. For example, the equation for the first boundary and the equation for the second boundary can be combined (e.g. one equation substituted into the other) to determine coordinates for the vanishing point. The coordinates for the vanishing point can be expressed as $x_{vp}$ and $y_{vp}$. In the example of FIG. 45, the vanishing point is labelled as 4540.

At 4410, a region of interest in the image is accessed. This region of interest is shown in FIG. 45 delineated by bottom edge 4542, top edge 4544, left edge 4546, and right edge 4548. As can be seen in FIG. 45, the region of interest is trapezoidal. The region of interest is accentuated by bold dashed lines, but the edges are shown extending beyond the region of interest so that said edges can be more clearly understood. The top edge (4544 in FIG. 45) and the bottom edge (4542 in FIG. 45) are parallel to a horizontal axis of the image. The left edge (4546 in FIG. 45) extends from a point (4550 in FIG. 45) left of the left boundary 4536 towards the vanishing point (4540 in FIG. 45). The right edge (4548 in FIG. 45) extends from a point (4552 in FIG. 45) right of the right boundary 4534 towards the vanishing point (4540 in FIG. 45). For convenience, in some implementations the point 4550 can be positioned at the left boundary 4510 of image 4500, and the point 4552 can be positioned at the right boundary 4512 of image 4500. In such implementations, the left edge of the region of interest extends from the left boundary 4510 of the image 4500 towards the vanishing point 4540, and the right edge of the region of interest extends from the right boundary 4512 of the image towards the vanishing point 4540.

The region of interest can be accessed in different ways. In some implementations, the region of interest may be received at least partially as user input. In particular, a user of the system or device performing method 4400 may interact with a user input device to provide at least some attributes of the region of interest. For example, the user may input a position of the top edge (e.g. 4544), the bottom edge (e.g. 4542), a point on the left edge (e.g. 4550), and a point on the right edge (e.g. 4552). As another example, the user may input only the position of the top edge and the bottom edge, and the left edge and right edge can be inferred by the at least one processor (e.g. as edges extending from boundaries 4510 and 4512 of the image towards the vanishing point 4540). In other implementations, the region of interest can be autonomously determined or generated by the at least one processor, by defining the edges of the region of interest within reasonable limits. In particular, the bottom edge of the region of interest should be above a hood of the vehicle as represented in the image data (e.g. hood 4522 in FIG. 45); the top edge should be below the horizon 4538 (and below vanishing point 4540), and preferably low enough in the image such that boundaries of the lane of travel are clearly visible. The left edge and the right edge of the region of interest can be determined by the at least one processor (e.g. as edges extending from boundaries 4510 and 4512 of the image towards the vanishing point 4540, or from randomly determined points 4550 and 4552).

Returning to method 4400, at 4412, the at least one processor determines a transformed region of interest where a left edge of the transformed region of interest is parallel to a right edge of the transformed region of interest. As can be seen in FIG. 45, the region of interest is trapezoidal. FIG. 46 illustrates a transformed region of interest determined in accordance with act 4412. In particular, FIG. 46 illustrates a transformed region of interest 4600 having a top edge 4644 and a bottom edge 4642 parallel to each other; and a left edge 4646 and a right edge 4648 parallel to each other. As a result, transformed region of interest 4600 is rectangular (and possibly square). The four corners of transformed region of interest 4600 are bottom-left corner 4650 (which represents point 4550 of the pre-transformation region of interest), bottom-right corner 4652 (which represents point 4552 of the pre-transformation region of interest), top-left corner 4654 (which represents point 4554 of the pre-transformation region of interest), and top-right corner 4656 (which represents point 4556 of the pre-transformation region of interest). FIG. 46 also shows representation 4632 of roadway 4532, and representations 4634 and 4636 of boundaries 4534 and 4536, respectively, which are also shown as parallel to each other due to the transformation of the region of interest.

To determine the transformed region of interest, coordinates of the four corners are determined by the at least one processor which will result in edges 4646 and 4648 being parallel. To achieve this, the width of top edge 4644 and the width of the bottom edge 4642 should be equal. Thus, setting one corner as an origin, e.g. by setting top-left corner 4654 to have coordinates of (0,0), the remaining corners can be defined relative thereto by an arbitrary size (e.g. 720, in this example). In particular, top-right corner 4656 can have coordinates of (719,0); bottom-left corner 4650 can have coordinates of (0,719), and bottom-right corner 4652 can have coordinates of (719,719). This results in a square transformed region of interest, but in some implementations the vertical size may be different from the horizontal size, which results in a rectangular transformed region of interest.

The at least one processor determines a transformation matrix H (which can also be referred to as a homography matrix), which when applied to points of the region of interest, results in the points of the transformed region of interest, as shown in Equation (22) below.

$$\begin{bmatrix} u_t \\ v_t \\ 1 \end{bmatrix} = H \begin{bmatrix} u \\ v \\ 1 \end{bmatrix} \tag{22}$$

In Equation (22), u and v are coordinates in the input image, and $u_t$ and $v_t$ are corresponding coordinates in the transformed image. With reference to the example of FIGS. 45 and 46, for the top-left corner (points 4554 and 4654), (u, v)=(379, 480) and ($u_t$, $v_t$)=(0, 0); for the top-right corner (points 4556 and 4656), (u, v)=(821, 480) and ($u_t$, $v_t$)=(719, 0); for the bottom-left corner (points 4550 and 4650), (u, v)=(189, 600) and ($u_t$, $v_t$)=(0, 719); and for the bottom-right corner (points 4552 and 4652), (u, v)=(1074, 600) and ($u_t$, $v_t$)=(719, 719).

Based on the provided region of interest and transformed region of interest points, an image transformation matrix H can be determined, for example using a known function. The open computer vision library (OpenCv) includes such a function as "getPerspectiveTransform". For the exemplary points listed above, H can be calculated as:

$$H = \begin{bmatrix} -0.5406 & -0.85595 & 615.75 \\ 2.1171*10^{-16} & -3.9869 & 1913.7 \\ 1.5066*10^{-19} & -0.0027757 & 1 \end{bmatrix}$$

In addition to determining the image transformation matrix H, a ratio of image distance to physical distance for the vertical axis of the image (as transformed according to the image transformation matrix) can also be determined. This can be performed in multiple ways, some examples of which are discussed below with reference to FIGS. 47, 48, 49, and 50.

Figure 47:
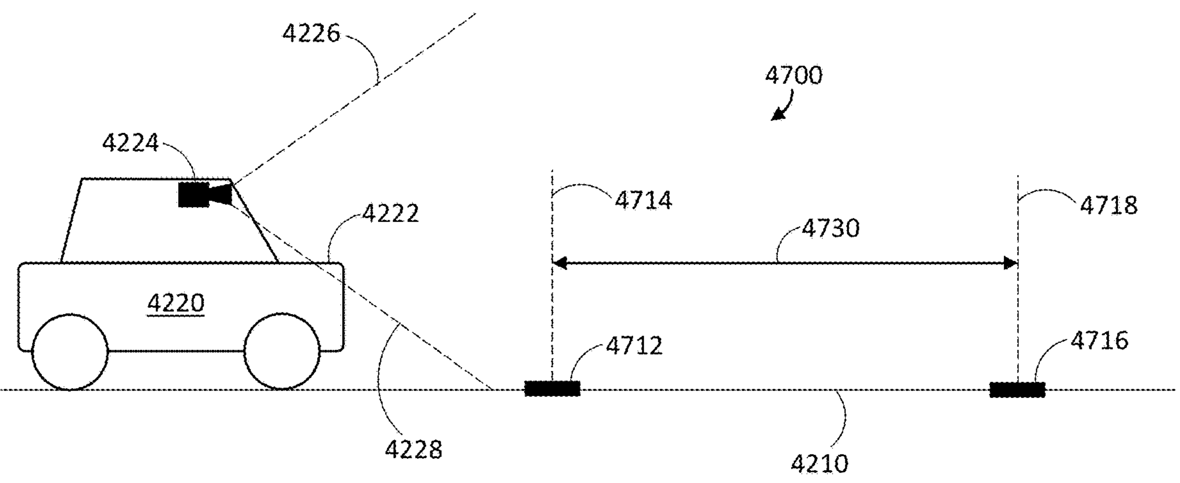
FIG. 47 is a side view of an exemplary scenario for calibrating an image capture device.

FIG. 47 is a side view of an exemplary scenario 4700, in which a vehicle 4220 is positioned on a surface 4210, similar to as discussed above with reference to FIG. 42. In scenario 4700, vehicle 4220 is stationary. A first marker 4712 is also positioned on surface 4210, and a projection 4714 is shown extending upwards from first marker 4712 (perpendicular to surface 4210). A second marker 4716 is also positioned on surface 4210, and a projection 4718 is shown extending upwards from second marker 4716 (perpendicular to surface 4210). An image capture device 4224 is positioned at vehicle 4220, and captures image data within a field of view shown by field of view lines 4226 and 4228. A hood 4222 of vehicle 4220 is partially captured within field of view lines 4226 and 4228. A physical distance 4730 between first marker 4712 (or projection 4714 from first marker 4712) and second marker 4716 (or projection 4718 from second marker 4716) is shown, and could be determined for example by manual measurement. This physical distance 4730 can then be correlated to an image distance in image data captured by image capture device 4224 (or more specifically to transformed image data). This is discussed below with reference to FIG. 48.

Figure 46:
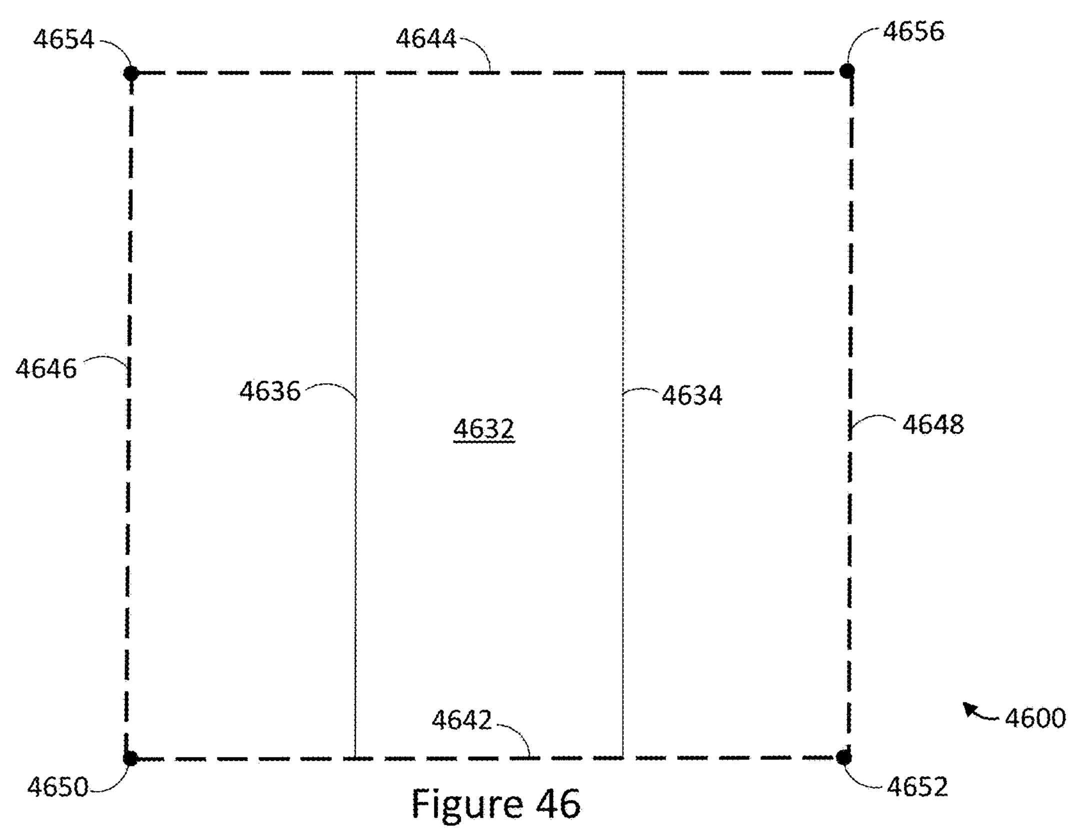
FIG. 46 illustrates an exemplary transformed region of interest as transformed in accordance with an image transformation matrix.
Figure 48:
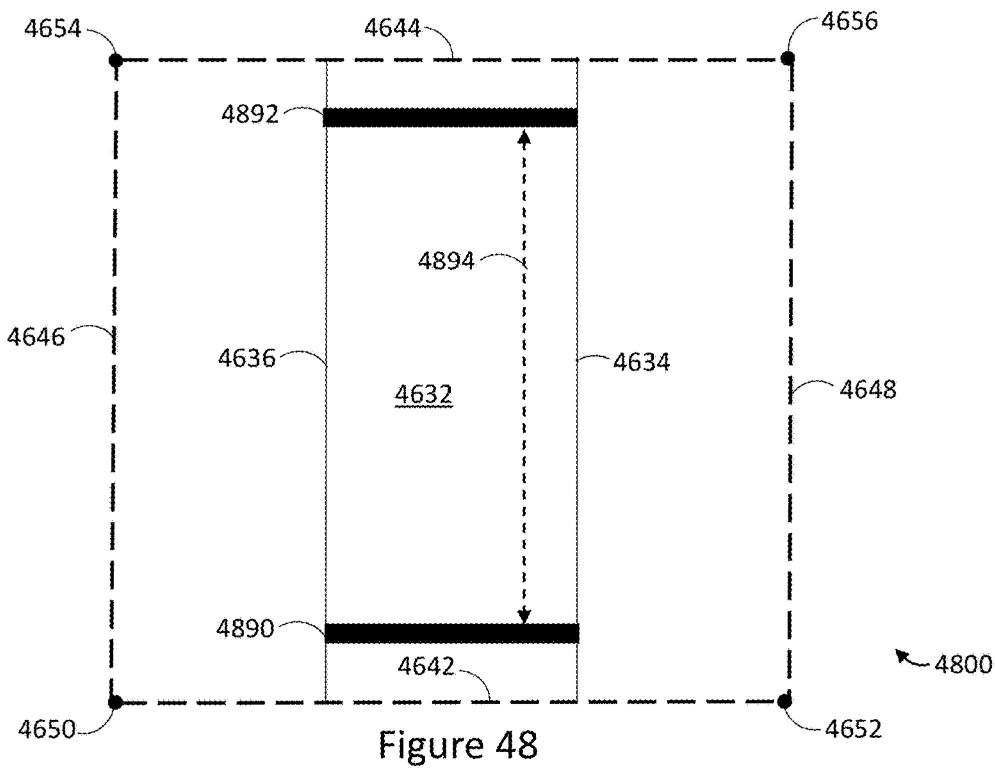
FIG. 48 illustrates another exemplary transformed region of interest as transformed in accordance with an image transformation matrix.

FIG. 48 illustrates a transformed region of interest 4800, similar to transformed region of interest 4600 as shown in FIG. 46. Similar numerical labels are used in FIG. 48 that are discussed earlier with reference to FIG. 46; such discussion is not repeated for brevity. FIG. 48 additionally shows representation 4890 of first marker 4712, and representation 4892 of second marker 4716 (as transformed versions of image data captured by image capture device 4224). FIG. 48 further shows image distance 4894 between representation 4890 and representation 4892. The at least one processor can determine a ratio between physical distance 4730 in FIG. 47 and image distance 4894 in FIG. 48. Such a ratio is a ratio of image distance to physical distance for a vertical axis of the image as transformed in accordance with the image transformation matrix, which can be applied in the context of method 4000 to determine following distance. In the example of FIGS. 47 and 48, the physical distance 4730 is coaxial to the lane of travel of vehicle 4220, and the image distance 4894 is coaxial to the roadway 4632 as represented in the transformed region of interest.

FIGS. 47 and 48 illustrate one exemplary procedure for determining a ratio between physical distance and image distance. However, this approach entails physical setup to calibrate (laying of markers 4712 and 4716, and positioning of vehicle 4220), and therefore increases labor to execute. Other implementations are possible, such as the example discussed below with reference to FIGS. 49 and 50.

In another implementation, the at least one processor can first determine a ratio of image distance to physical distance for a horizontal axis of an image (as transformed according to the image transformation matrix), based on a received measurement for a lane of travel and an image distance width of the lane of travel as represented in image data captured by an image capture device in a vehicle.

Figure 49:
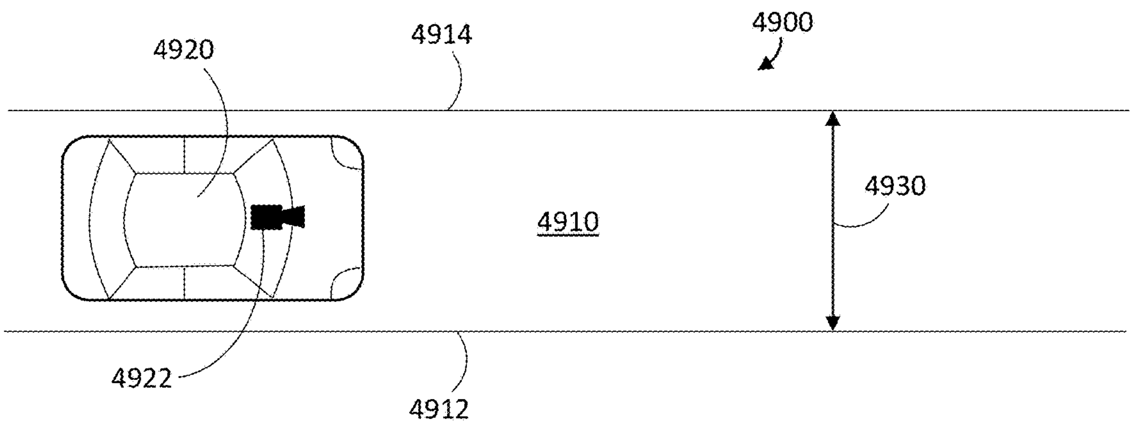
FIG. 49 is a top view of an exemplary scenario for calibrating an image capture device.

FIG. 49 is a top view of a scenario 4900. In scenario 4900, a vehicle 4920 is positioned on (e.g. driving along) a roadway 4910, delineated by boundaries 4912 and 4914. Vehicle 4920 carries an image capture device 4922 which captures image data. A physical distance 4930 corresponding to a width of the roadway 4910 is also illustrated. Physical distance 4930 could be obtained, for example, by manual measurement, or by measurement from available image data such as satellite image data, or from a database of road features which includes lane size information for roadway 4910.

Figure 50:
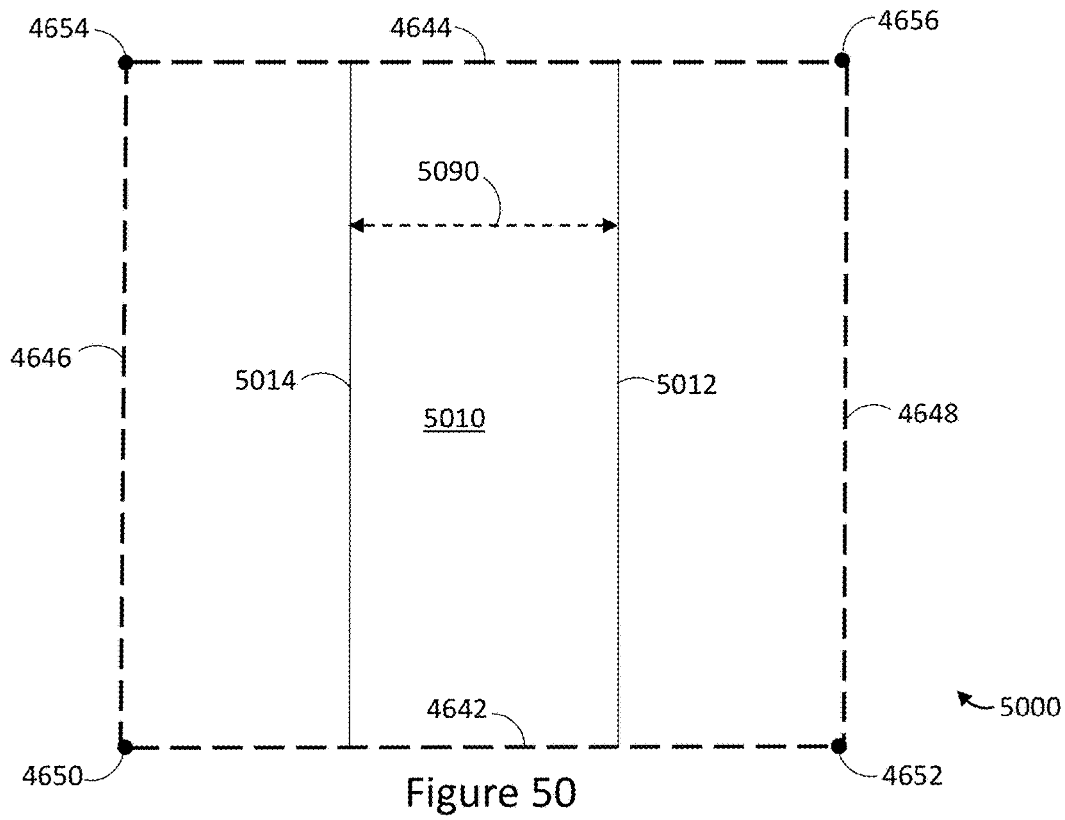
FIG. 50 illustrates another exemplary transformed region of interest as transformed in accordance with an image transformation matrix.

FIG. 50 illustrates a transformed region of interest 5000, similar to transformed region of interest 4600 as shown in FIG. 46. Similar numerical labels are used in FIG. 50 that are discussed earlier with reference to FIG. 46; such discussion is not repeated for brevity. FIG. 50 illustrates a transformed region of interest in image data captured by image capture device 4922 while driving along roadway 4910. FIG. 50 shows representation 5010 of roadway 4910, representation 5012 of boundary 4912, and representation 5014 of boundary 4914. FIG. 50 additionally shows image distance 5090 between representations 5012 and 5014. The at least one processor can determine a ratio between physical distance 4930 in FIG. 49 and image distance 5090 in FIG. 50. Such a ratio is a ratio of image distance to physical distance for a horizontal axis of the image (as transformed according to the image transformation matrix) which can be applied in the context of method 4000 to determine following distance.

To determine following distance, a ratio of image distance to physical distance for a vertical axis of the image can be determined by the at least one processor, based on the ratio of image distance to physical distance for the horizontal axis of the image as discussed with reference to FIGS. 49 and 50, and based on the image transformation matrix used to transform the image data. An exemplary methodology to this is discussed in detail below with reference to FIG. 51.

FIG. 51 is a side view of an exemplary scenario 5100. In scenario 5100, a surface 5190 is shown, on which a vehicle can drive. An image capture device (camera) 5110 is also shown, with a field of view shown at least in part by field of view lines 5112 and 5114 (though the field of view can extend further than the field of view lines). Image capture device 5110 can be for example a camera mounted in a vehicle (which is why image capture device 5110 is shown elevated from surface 5190). Such a vehicle is not illustrated in FIG. 51, to reduce clutter. A world coordinate system is illustrated by Y axis $Y_w$ and Z axis $Z_w$, and has an origin in front of the image capture device 5110 (and aligned with a virtual image capture device 5120 which is discussed in more detail later). The world coordinate system also includes an X axis $X_w$, which is not illustrated because it extends out of (normal to) the page. The world coordinate system can be used to specify positions in the real world.

FIG. 51 also shows an image $I_p$ captured by image capture device 5110. The image $I_p$ is a projection (hence the subscript label p) of the real world as seen by image capture device 5110 onto a two-dimensional plane having axis $U_p$ (not shown because it extends into the page) and $V_p$ (shown in the example as extending downwards due to the convention where a top-left corner of an image is the origin, though other conventions could be used instead as appropriate).

For a particular image capture device (camera), a set of camera matrices can be used which converts real-world coordinates with respect to the camera to pixel coordinates for an image captured by the image capture device, in accordance with Equation (23) below.

$$\begin{bmatrix} u_p \\ v_p \\ 1 \end{bmatrix} = M[r_1 r_2 r_3 t] \begin{bmatrix} x_w \\ y_w \\ z_w \\ 1 \end{bmatrix} \tag{23}$$

Generally, when the image capture device captures image data, the image data is a two-dimensional projection of the three-dimensional world in the field of view of the camera. In this regard, $x_w$, $y_w$, and $z_w$ represent an x value, a y value, and a z value for a real-world coordinate in a world coordinate system (i.e. in the $X_w$ axis, $Y_w$ axis, and $Z_w$ axis discussed above). $u_p$ represents a horizontal value (in the $U_p$ axis), and $v_p$ represents a vertical value (in the $V_p$ axis), respectively, in a two-dimensional image (e.g. image $I_p$) captured by the camera, which corresponds to projected position of the real-world coordinate.

The matrix $[r_1 r_2 r_3 t]$ represents an Extrinsic Matrix for the camera, which converts world coordinates for the world coordinate system to coordinates in a camera coordinate system, and depends on position and orientation of the camera. The matrix $[r_1 r_2 r_3 t]$ is a 4 by 4 matrix where $r_1$, $r_2$, and $r_3$ are rotational vectors and t is a translation vector. Vectors $r_1$, $r_2$, and $r_3$ have the convenient property where the length of each vector is 1, which will be utilized later. In some implementations the extrinsic matrix is not strictly necessary (or is an identity matrix), in particular if the origin of the world coordinate system is set as the camera position in the world and corresponding axes are aligned (such that the world coordinate system and the camera coordinate system are equivalent). This is not the case in the example of FIG. 51, however. Further, the matrix M represents an Intrinsic Matrix for a camera which converts points from the camera coordinate system to a pixel coordinate system, and is dependent on properties of the camera such as focal length, pixel dimensions, resolution, etc. The Equation (23) combines the Extrinsic Matrix for the camera with the Intrinsic Matrix for the camera, (by multiplying the Intrinsic Matrix and the Extrinsic Matrix together, in the example). Intrinsic and Extrinsic Camera matrices are known in the art, as discussed for example at the following article, the entirety of which is incorporated by reference herein:

https://towardsdatascience.com/what-are-intrinsic-and-extrinsic-camera-parameters-in-computer-vision-7071b72fb8ec In the example of FIG. 51, since the surface 5190 is planar, all points of interest lie in the $z_w$=0 plane. Consequently, Equation (23) can be reduced to Equation (24) below.

$$\begin{bmatrix} u_p \\ v_p \\ 1 \end{bmatrix} = M[r_1 r_2 t] \begin{bmatrix} x_w \\ y_w \\ 1 \end{bmatrix} \tag{24}$$

To convert a real-world coordinate to a coordinate in a two-dimensional image transformed in accordance with image transformation matrix H discussed earlier, we can combine Equations (22) and (24), such as by using the matrix containing $u_p$ and $v_p$ from Equation (24) as the matrix containing input coordinates u and v in Equation (22), to arrive at Equation (25) below.

$$\begin{bmatrix} u_t \\ v_t \\ 1 \end{bmatrix} = HM[r_1 r_2 t] \begin{bmatrix} x_w \\ y_w \\ 1 \end{bmatrix} \tag{25}$$

As discussed earlier, the image as transformed by image transformation matrix H represents a top view (bird's eye view) of the scene. FIG. 51 illustrates a virtual image capture device 5120, which corresponds to a position and orientation of an image capture device which could have captured the transformed image. Virtual image capture device 5120 virtually would capture a field of view shown by field of view lines 5122 and 5124, to capture an image $I_t$ having a horizontal axis $U_t$ (not shown because it extends into the page) and a vertical axis $V_t$. Image $I_t$ represents an transformed version of image $I_p$; that is, image $I_p$ multiplied by the image transformation matrix H is image $I_t$. Notably, the world coordinate system (axes $X_w$, $Y_w$, and $Z_w$) is the same for both image capture device 5110 and virtual image capture device 5120. Further, axis $Z_w$ is aligned with a center of virtual image capture device 5120; that is, axis $Z_w$ extends through virtual image capture device 5120, to a center of image $I_t$.

A vertical image distance for image $I_t$ (e.g. number of pixels along axis $V_t$) of a point from the center of the two-dimensional image, when the real-world coordinate which the point is a projection of is 1 meter (or some other appropriate set distance) offset from a center axis of the virtual image capture device 5120 (i.e. 1 meter offset from the $Z_w$ axis along the $Y_w$ axis) can be represented as $r_y$. Further, from the property of similar triangles (the angle to a real-world coordinate from a camera is equal to the angle from the camera to a two-dimensional projection of the coordinate as captured by the camera), a position of a projected coordinate in image $I_t$ is proportional to the $y_w$ position of the coordinate. Consequently, for a real-world coordinate D a distance d along the $Y_w$ axis, the vertical image distance of a projection of coordinate D from a center of the image $I_t$ is $r_y$*d. That is, $r_y$ represents a ratio of vertical image distance in the transformed image $I_t$ to physical distance along the $Y_w$ axis (or pixels in the image per meter in the real world).

Further, the relationship between image distance and position of the real-world coordinate is not necessarily the same in the horizontal direction and the vertical direction of the transformed image. To this end, an image distance in the horizontal direction ($U_t$ axis) of a point from the center of the two-dimensional image $I_t$, when the coordinate which the point is a projection of is offset horizontally from the $Z_w$ axis (i.e. along the $X_w$ axis) by 1 meter (or some other appropriate set distance) can be represented as $r_x$. The above relationships can be expressed as in Equations (26) and (27) below.

$$u_t = r_x x_w + C_x \tag{26}$$

$$v_t = r_y y_w + C_y \tag{27}$$

In the scenario 5100 the virtual image capture device 5120 is positioned with an optical center aligned with axis $Z_w$. As a result, coordinates in virtual images which could be captured by virtual image capture device 5120 (or images transformed in accordance with matrix H) are offset from a center of said image (due to the convention that an origin of image data is at a top-left corner of the image data, though other conventions could be used as appropriate). Consequently, Equation (26) includes an offset for the optical center $C_x$ (in the $U_t$-axis) of virtual image capture device 5120, and Equation (27) includes an offset for the optical center $C_y$ (in the $V_t$-axis) of virtual image capture device 5120. Thus, Equation (26) expresses that a horizontal coordinate in the image $I_t$ can be determined based on the horizontal image distance to physical distance ratio $r_x$ multiplied by the real-world horizontal distance (in the $X_w$ direction), accounting for horizontal offset from the origin of the image data (top left corner of the image $I_t$). Similarly, Equation (27) expresses that a vertical coordinate in the image $I_t$ can be determined based on the vertical image distance to physical distance ratio $r_y$ multiplied by the real-world distance in the $Y_w$ direction, accounting for offset from the origin of the image data (top left corner of the image $I_t$).

Putting Equations (26) and (27) in matrix form results in Equation (28) below:

$$\begin{bmatrix} u_t \\ v_t \\ 1 \end{bmatrix} = \begin{bmatrix} r_x & 0 & C_x \\ 0 & r_y & C_y \\ 0 & 0 & 1 \end{bmatrix} \begin{bmatrix} x_w \\ y_w \\ 1 \end{bmatrix} \tag{28}$$

Comparing Equations (25) and (28) results in Equation (29) below.

$$\begin{bmatrix} u_t \\ v_t \\ 1 \end{bmatrix} = HM[r_1 r_2 t] \begin{bmatrix} x_w \\ y_w \\ 1 \end{bmatrix} = \begin{bmatrix} r_x & 0 & C_x \\ 0 & r_y & C_y \\ 0 & 0 & 1 \end{bmatrix} \begin{bmatrix} x_w \\ y_w \\ 1 \end{bmatrix} \tag{29}$$

Equation (29) can be simplified to Equation (30) below.

$$HM[r_1 r_2 t] = \begin{bmatrix} r_x & 0 & C_x \\ 0 & r_y & C_y \\ 0 & 0 & 1 \end{bmatrix} \tag{30}$$

As mentioned earlier, vectors $r_1$ and $r_2$ each have a length of 1. Consequently, solving Equation (30) using known linear algebra techniques (row and column operations) results in Equation (31) below.

$$r_y = r_x \frac{\|h_1\|}{\|h_2\|} \tag{31}$$

In Equation (31), $h_1$ is the first column of $(HM)^{-1}$, and $h_2$ is the second column of $(HM)^{-1}$. Equation (31) expresses a relationship between a ratio of image distance to physical distance for a vertical axis of the image ($r_y$) to a ratio of image distance to physical distance for a horizontal axis of the image ($r_x$), for an image captured by image capture device 5110. Using this relationship, a ratio of image distance to physical distance for a horizontal axis of the image, such as determined as discussed with reference to FIGS. 49 and 50, can be converted to a ratio of image distance to physical distance for a vertical axis of the image. This in turn can be used to determine following distance as discussed with reference to at least FIGS. 40-43.

The procedures described above and with reference to FIGS. 47, 48, 49, 50 and 51 do not need to be performed in the context of method 4000 in FIG. 40, but rather can be performed prior to said method, as part of an initialization or calibration of the image capture device in the second vehicle.

Figure 52:
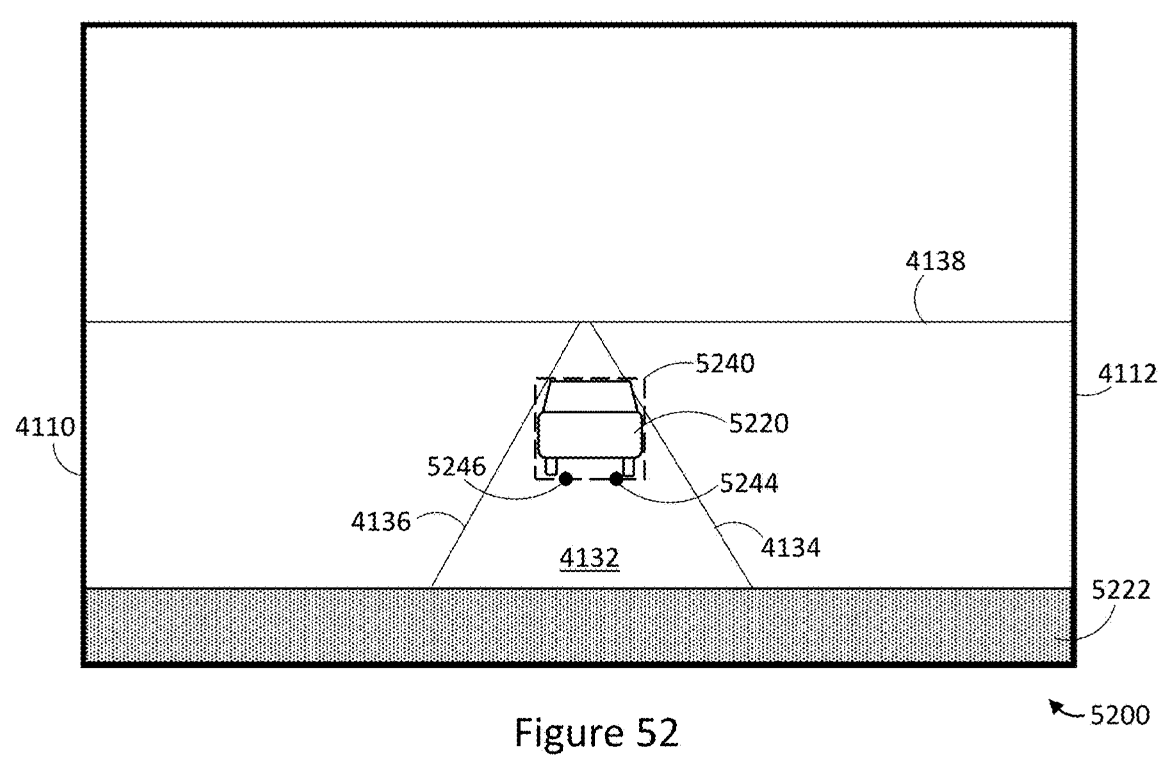
FIGS. 52 and 53 illustrate exemplary images for determining whether a vehicle is within a lane of travel, in accordance with at least two exemplary implementations.
Figure 53:
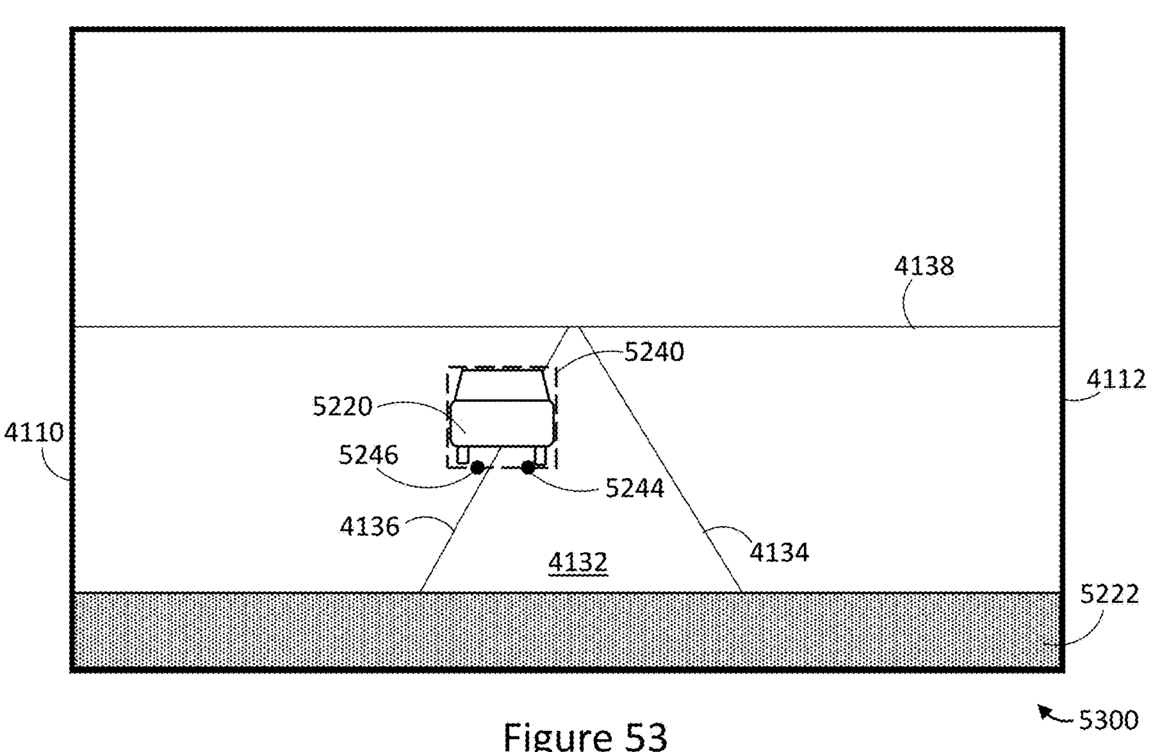

In the context of many of the methods discussed herein (such as method 2200 in FIG. 22 and method 4000 in FIG. 40), it is desirable to determine whether a vehicle represented in image data is travelling in a same lane of travel as a vehicle carries an image capture device. FIGS. 52 and 53 discussed below illustrate an exemplary technique in this regard. FIG. 52 illustrates an image 5200 similar to image 4100 described with reference to FIG. 41. The description of FIG. 41 is generally applicable to FIG. 52, and description of similarly labelled elements is not repeated for brevity. Image 5200 shows a vehicle 5220 (similar to vehicle 4120, the first vehicle in method 4000) driving along a roadway 4132 shown by edges 4134 and 4136, towards a horizon 4138. A vehicle (the second vehicle in method 4000) is driving behind vehicle 5220, and carries the image capture device which the perspective of image 5200 represents (i.e., the camera which captures image 5200). A hood 5222 of the second vehicle is visible at the bottom of image 5200.

At least one processor of any of the systems or devices discussed herein can identify vehicle 5220, such as by executing an object detection model. Vehicle 5220 is shown as being identified with a bounding box 5240 in the example of FIG. 52. To determine whether vehicle 5220 is within a same lane of travel as the vehicle carrying the image capture device which captures image 5200 (the vehicle having hood 5222), points 5244 and 5246 can be identified for vehicle 5220. In the illustrated example, point 5244 represents a distance which is one-third of a width of bounding box 5240 from a right edge of bounding box 5240. Similarly, point 5246 represents a distance which is one-third of a width of bounding box 5240 from a left edge of bounding box 5240. The exact positions of points 5244 and 5246 can be selected as appropriate for a given application.

Further, at least one processor of any of the systems or devices discussed herein can identify boundaries 4134 and 4136 using any of the techniques discussed earlier (for example as discussed with reference to acts 4404 and 4406 in FIG. 44), and not repeated for brevity.

In the illustrated implementation, vehicle 5220 can be determined as travelling in the same lane as the second vehicle having hood 5222 if both points 5244 and 5246 lie within the boundaries of the lane of travel of the second vehicle (the lane bounded by boundaries 4134 and 4136 in the example of FIG. 52). Since this is true in FIG. 52, FIG. 52 shows an example where vehicle 5220 is positioned in front of, and in the same lane as, the vehicle having hood 5222.

FIG. 53 illustrates an image 5300 similar to image 5200 described above. The description of FIG. 52 is generally applicable to FIG. 53, and description of similarly labelled elements is not repeated for brevity. One difference between FIG. 52 and FIG. 53 is that in FIG. 53, vehicle 5220 is positioned further to the left, such that point 5246 is positioned left of boundary 4136. As a result, vehicle 5220 in FIG. 53 can be considered as not being in the same lane of travel as the vehicle having hood 5222.

In some implementations, vehicle 5220 may be determined as travelling in the same lane as the second vehicle having hood 5222 if EITHER of points 5244 and 5246 lie within the boundaries of the lane of travel of the second vehicle (the lane bounded by boundaries 4134 and 4136 in the example of FIG. 52). Such an implementation favors detection of vehicles which can still pose a tailgating risk, even as they are transitioning into or out of the lane of travel, as an example. In such an implementation, vehicle 5220 in FIG. 53 would be considered as being in the same lane of travel as the vehicle having hood 5222.

Figure 54:
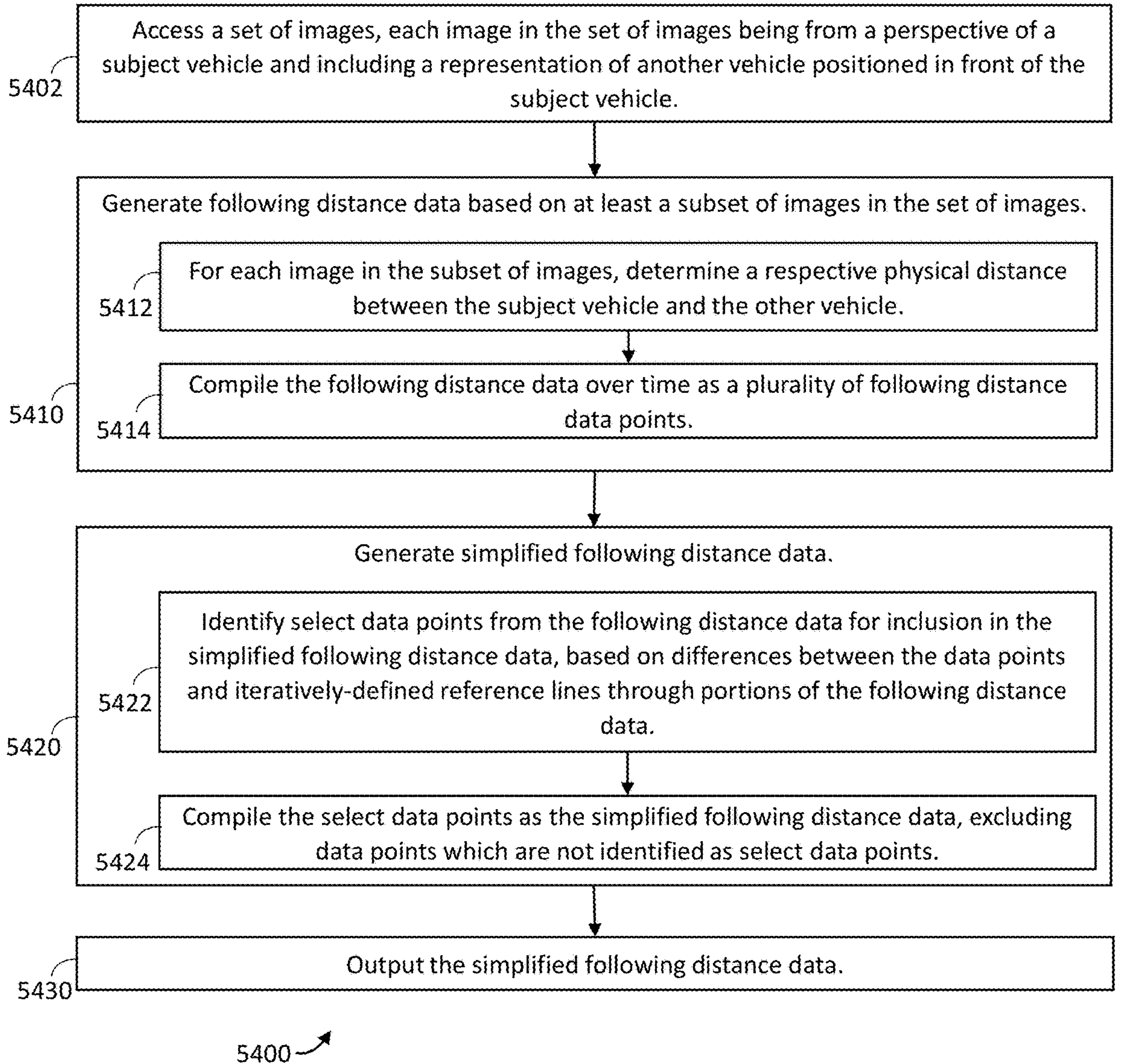
FIG. 54 is a flowchart diagram which illustrates a method for tracking following distance data over time, in accordance with at least one exemplary implementation.

FIG. 54 is a flowchart diagram which illustrates an exemplary method 5400 for producing following distance data over time. Method 5400 as illustrated includes acts 5402, 5410 (including sub-acts 5412 and 5414), 5420 (including sub-acts 5422 and 5424), and 5430. One skilled in the art will appreciate that additional acts could be added, acts could be removed, or acts could be reordered as appropriate for a given application. Acts of method 5400 can be performed by appropriate components of the systems or devices discussed earlier, similar to as discussed with reference to method 500 in FIG. 5, and not repeated for brevity. In a particularly advantageous implementation, method 5400 is generally performed at a vehicle device positioned at a vehicle (such as a device at any of vehicles 110 in FIG. 1A or 1B, image capture device 108A in FIG. 2A, or peripheral device 220 in FIG. 2B). For example, acts of generating, determining, and identifying can be performed by at least one processor of the vehicle device (such as processor 206). Further, acts of compiling can be performed by at least one processor of the vehicle device (such as processor 206), and/or by at least one non-transitory processor-readable storage medium of the vehicle device which stored the compiled data (such as non-transitory processor-readable storage mediums 212 or 214). Further, outputting of data can be performed by a communication interface of the vehicle device, such as communication interface 216.

At 5402, a set of images is accessed. Each image in the set of images is from a perspective of a subject vehicle, and includes a representation of another vehicle positioned in front of the subject vehicle. That is, each image in the set of images represents a following situation, where the subject vehicle is "following" a lead vehicle (another vehicle). Further, each image in the set of images is associated with a respective time. That is, each image can be timestamped (e.g. visually on the image itself, or as metadata associated with the image). Such a timestamp typically corresponds to a time when the image was captured.

Each image in the set of images does not need to represent the same "other" vehicle (or the same lead vehicle). Rather, the set of images can represent a plurality of different following situations where the subject vehicle is positioned behind any other vehicle. $I_t$ is an objective of method 5400 to monitor following distance over time, as pertinent to the subject vehicle, regardless of what other vehicle the subject vehicle is actually following.

The set of images accessed in act 5402 can for example include images akin to those illustrated in FIGS. 7, 12A, 12B, 14A, 14B, 15A, 15B, 16A, 16B, 16C, 16D, 17A, 17B, 20A, 20B, 20C, 24A, 24B, 24C, 25A, 25B, 28, 29, 31, 32, 33, 34, 35, 36, 41, 43, 52, and 53, as non-limiting examples. In some implementations, accessing the set of images comprises capturing each image in the set of the images, by at least one image capture device positioned at the subject vehicle. In other implementations, accessing the set of images comprises receiving the set of images by a device or system performing method 5400 (e.g., a device which performs method 5400 can receive the set of images as captured and provided by a separate image capture device at the subject vehicle). In yet other implementations, accessing the set of images comprises accessing the set of images as stored in at least one non-transitory processor-readable storage medium (e.g., the image is previously captured by an image capture device, and stored at a non-transitory processor-readable storage medium at a device for later retrieval when performing method 5400).

At least one processor of the system or device performing method 5400 (e.g. of the vehicle device, such as processor 206) can optionally preprocess the accessed set of images as appropriate. For example, the images can be cropped to a defined resolution, or image correction can be applied such as distortion to compensate for skewing in the image due to properties of the image capture device. As examples, radial distortion and/or tangential distortion of the set of images can be compensated for. In some implementations, the accessed set of images is already pre-processed to be of a desired resolution and/or to have distortion corrected, prior to access and utilization in method 5400.

Further, prior to method 5400 (or as a first step in act 5400), the set of images can be identified, extracted, or filtered from a plurality of images as captured by an image capture device positioned at the subject vehicle. In particular, at least one processor which performs method 5400 can access a plurality of images captured by the image capture device, and identify the set of images as images of the plurality of images which include another vehicle positioned in front of the subject vehicle. That is, the at least one processor can analyze the plurality of images to identify images which represent a following situation where the subject vehicle is positioned behind another vehicle (lead vehicle), and only the identified images can be included in the set of images. Such identification of a following situation can be performed by running an object detection model on the plurality of images, as discussed in detail earlier with reference to at least FIGS. 4, 22, 37, 38, and 41, and not repeated for brevity.

Further still, identifying the set of images as images of the plurality of images which include another vehicle positioned in front of the subject vehicle can further comprise identifying the set of images as images of the plurality of images which include another vehicle positioned in front of the subject vehicle AND in a common lane of travel with the subject vehicle, as discussed earlier with reference to at least FIGS. 24A, 24B, 24C, 25A, 25B, 40, 52, and 53.

At 5410, following distance data is generated (by the at least one processor of the device which performs method 5400), based on at least a subset of image in the set of images. In particular, the set of images may include a large number of images at a high frequency. For example, an image capture device may capture image data at 15, 30, or 60 frames per second (as non-limiting examples). That is, the set of images may include 15, 30, 60 (or any other appropriate number) of images for each second of time. Following distance over time likely does not need to be determined or logged at this frequency. Instead, following distance over time can be determined at a lower frequency (e.g. 1 Hz, 0.2 Hz, 0.1 Hz; that is once per second, once per 5 seconds, or once per 10 seconds, though any other appropriate frequency could be utilized instead for a given application). Consequently, the subset of images based on which the following distance data may be generated could include only images from the set of images at a preferred frequency (e.g. every $15^{th}$, $30^{th}$, $60^{th}$, $150^{th}$, $300^{th}$, $600^{th}$, image, as non-limiting examples). This advantageously reduces processing burden of method 5400.

In some implementations, the set of images as accessed can already be reduced to include only images at a desired frequency of the image data, or accessing the set of images may comprise selectively accessing images at the desired frequency. Alternatively, the set of images may already include only images at a desired frequency for the following distance data. In such implementations, generating following distance data based on at least a subset of images in the set of images comprises generating the following distance data based on all of the images in the set of images.

Act 5410 in FIG. 54 includes sub-acts 5412 and 5414.

At 5412, for each image in the subset of images, the at least one processor determines a respective physical distance between the subject vehicle and the other vehicle. This can be performed in accordance with any of the following distance determination techniques or models described herein, including the techniques described with reference to FIGS. 4, 5, 8, 27, 28, 29, 30A, 30B, 31, 32, 33, 34, 35, 36, 37, 38, 39, 40, 41, 42, 43, 44, 45, 46, 47, 48, 49, 50, 51, 52, and 53. Some of these techniques is briefly summarized below, but the full details thereof are not repeated for brevity.

In some implementations act 5412 comprises applying a following distance determination model to respective image, the following distance determination model being a machine learning model trained based on minimization of a following distance loss function for a training set of images representing a respective lead vehicle from a perspective of a following vehicle associated with a label indicating following distance between the lead vehicle and the following vehicle. Such an implementation is described in detailed earlier with reference to at least FIGS. 21 and 22.

In some implementations act 5412 comprises determining, by the at least one processor, at least one image attribute based on a positional measure between the other vehicle as represented in the respective image and at least one boundary of the image; and applying, by the at least one processor, a following distance determination model to determine a following distance based on the determined at least one image attribute. Such an implementation is described in detail earlier with reference to at least FIGS. 27, 28, 29, 30A, 30B, 31, 32, 33, 34, 35, 36, 37, 38, and 39.

In some implementations act 5412 comprises determining, by at least one processor, a first vertical position in the image representing a bottom of the other vehicle; accessing, by the at least one processor, a second vertical position in the image representing a static physical distance from the subject vehicle; determining a transformed first vertical position by applying, by the at least one processor, an image transformation matrix to the first vertical position; determining a transformed second vertical position by applying, by the at least one processor, the image transformation matrix to the second vertical position; determining an image distance between the transformed first vertical position and the transformed second vertical position; and determining the following distance as a physical distance between the other vehicle and the subject vehicle based on the determined image distance and the static physical distance. Such an implementation is described in detail earlier with reference to at least FIGS. 40, 41, 42, 43, 44, 45, 46, 47, 48, 49, 50, 51, 52, and 53.

Returning to method 5400 in FIG. 54, at 5414, following distance data over time is compiled as a plurality of following distance data points. Each following distance data point represents the physical distance for a respective image in the subset of images (as determined at 5412) at the time associated with the respective image in the subject of images. That is, each following distance data point includes physical distance (following distance) as determined at 5412, and an associated timestamp indicative of when the following distance occurred. In this way, the following distance data as compiled at 5414 represents following distance over time for the subject vehicle.

Following distance can change relatively quickly. For example, a lead vehicle (other vehicle in method 5400) can slow down abruptly, such that a following vehicle (subject vehicle in method 5400) will also have to adjust its speed accordingly, which commonly results in a change in following distance. As a result, it is desirable to determine following distance over time at a reasonably high frequency (though not necessarily as high frequency as captured image data, as described above). However, when driving there are also commonly long periods where following distance does not change (e.g. highway driving where vehicles are moving at similar speeds), or where a following situation does not occur (e.g. open road). Reporting following distance at a high frequency over such periods is a waste of transmission bandwidth. In view of this, it is desirable to determine and report following distance data at a reasonably high frequency when there are changes in following distance, while avoiding excessive reporting of following distance data for periods where following distance does not change. This is the focus of act 5420 in method 5400. In this context, what is meant by "reporting" following distance data is where a vehicle device determines following distance, and transmits an indication of following distance to another device (e.g. a management device or central server).

At 5420, the at least one processor generates simplified following distance data. This includes sub-acts 5422 and 5424 discussed below.

At 5422, the at least one processor selects data points from the following distance data for inclusion in the simplified following distance data, based on differences between the data points and iteratively-defined reference lines through portions of the following distance data. Examples of how sub-act 5422 can be performed are discussed later with reference to FIGS. 55A, 55B, 55C, 55D, and 56.

At 5424, the at least one processor compiles the select data points as the simplified following distance data, and excludes data points which are not identified as select data points.

At 5430, the simplified following distance data is output. As an example, at least one communication interface of the vehicle device transmits the simplified following distance data, to be received by a server or management device (e.g. cloud server 106, client device 104, or local server 118 in FIGS. 1A and 1B).

Figures 55A, 55B:
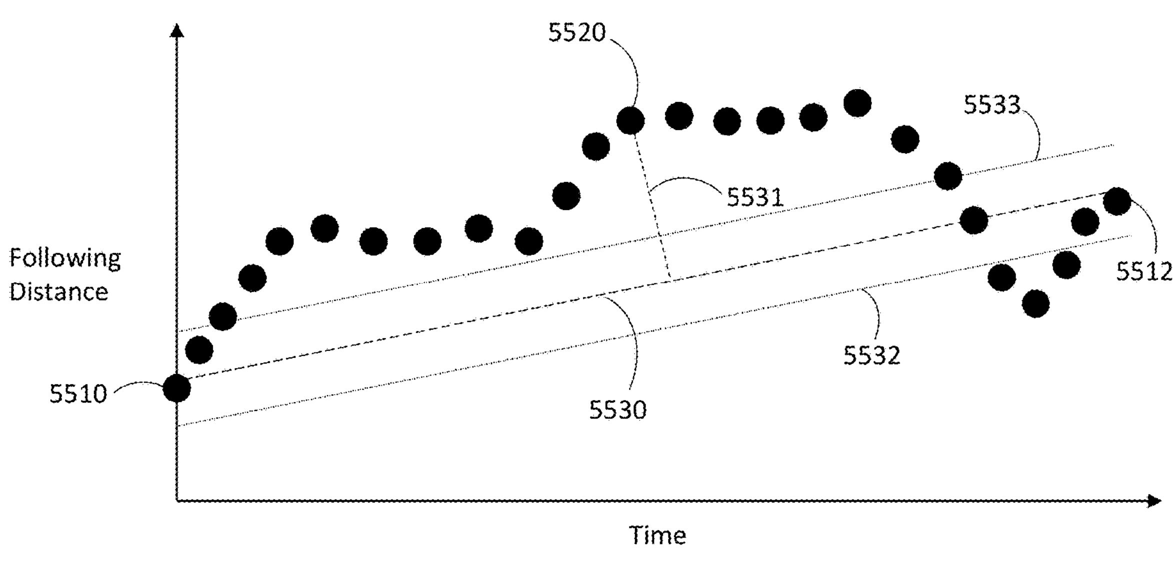
FIGS. 55A, 55B, 55C, and 55D illustrate exemplary following distance data plots, where simplified following distance data is determined in accordance with at least one illustrated implementation.

FIG. 55A is an exemplary plot which illustrates a hypothetical set of following distance data as a plurality of following distance data points. FIGS. 55A, 55B, 55C, and 55D are plots which illustrate an exemplary process for generating simplified following distance data from the following distance data shown in FIG. 55A (an example of acts 5420 in method 5400 illustrated in FIG. 54). While FIGS. 55A, 55B, 55C, and 55D discuss this process with reference to exemplary hypothetical following distance data, the process can be applied to any appropriate following distance data.

FIG. 55A illustrates following distance data corresponding to following distance data as determined at act 5410 in method 5400 in FIG. 54. In the example of FIG. 55A each black circle represents a point of following distance data. The following distance data in FIGS. 55A-55D is shown using hypothetical data to illustrate the process of simplifying the data. As such the actual following distance units are not labelled.

In the example of FIGS. 55A-55D, a "difference" between a given data point and a reference line represents a difference in following distance represented by the data point and following distance represented by the reference line. In this way, selecting data points from the following distance data for inclusion in the simplified following distance data, based on differences of the data points to iteratively-defined reference lines defined through portions of the following distance data includes selecting data points from the following distance data for inclusion in the simplified following distance data, based on differences in following distance between following distances represented by the data points to iteratively-defined reference lines defined through portions of the following distance data.

Each point of data in FIGS. 55A-55D is not expressly labelled, to reduce clutter. Generally, however, data illustrated as a black circle indicates data which is not (or has not yet been) excluded from the simplified following distance data. Data which has been excluded from the simplified following distance data is illustrated as white circles in FIGS. 55B-55D.

In FIG. 55A, a reference line 5530 is defined between end points 5510 and 5512 of the following distance data. In the example of FIGS. 55A-55D, reference line 5530 is a first reference line of a set of iteratively-defined reference lines as mentioned above in sub act 5422 of method 5400. End points 5510 and 5512 can be defined in various ways. In some implementations, end points 5510 and 5512 can be defined as the start and end, respectively, of a trip or journey by the vehicle (e.g. when the vehicle is activated or moved, until the vehicle is deactivated or stops moving). In some implementations, end points 5510 and 5512 can be defined as the start and end, respectively, of a region of data of interest. For example, a user can provide input indicating that the data from point 5510 to point 5512 is of interest, and the generation of simplified following distance data is performed over this region of interest. What is considered a region of "interest" is highly application and situation specific, and could for example refer to a region where simplification of following distance data is considered likely to be effective (e.g. journeys over long, straight roads). In some implementations, end points 5510 and 5512 can be defined periodically from within a greater set of following distance data. That is, the simplification of following distance can be performed for sections of a large following distance data set, where one of said sections is defined by end points 5510 and 5512.

In the exemplary implementation, the simplified following distance data is generated by selecting data points from the following distance data, based on differences of the data points to corresponding reference lines. In the scenario of FIG. 55A, a minimum difference between respective data points (data points sequentially between end points 5510 and 5512) and corresponding reference line 5530 is determined. Generally, a reference line "corresponding" to data points refers to the reference line covering a period of time which the data points also cover.

Further, a candidate data point of the following distance data is identified, where a minimum difference between the data point and the reference line 5530 is greater than a minimum difference between other data points being compared (sequential points between points 5510 and 5512) and the reference line 5530. That is, a candidate data point of the following distance data between points 5510 and 5512 is identified which is the most different from the reference line 5530. In FIG. 55A, this candidate data point is labelled as point 5520, with the minimum difference between point 5520 and reference line 5530 illustrated by line 5531 (perpendicular to reference line 5530).

Following identification of point 5520, a determination is made as to whether the minimum difference between candidate data point 5520 and reference line 5530 exceeds a difference threshold. In practical applications, such a difference threshold could for example be 1 meter, though other difference thresholds are possible as appropriate for a given application. In FIG. 55A, a difference threshold is illustrated around reference line 5530 as threshold lines 5532 and 5533. Candidate data point 5520 lies a distance from reference line 5530, outside of said difference threshold. Consequently, candidate data point 5520 is selected as a select data point for inclusion in the simplified following distance data in act 5422 of method 5400.

Further, the iteratively-defined reference lines are updated to include reference lines which intersect select data point 5520, as is shown in FIG. 55B.

FIG. 55B illustrates the following distance data shown in FIG. 55A. In FIG. 55B, a reference line 5535 is defined between select data point 5520 and end point 5512 of the following distance data. Further in FIG. 55B, a reference line 5540 is defined between end point 5510 and select data point 5520 of the following distance data. In the example of FIGS. 55A-55D reference lines 5535 and 5540 are second and third reference lines of the set of iteratively-defined reference lines as mentioned above.

As discussed earlier with reference to act 5422 in method 5400, the simplified following distance data is generated by selecting data points from the following distance data, based on differences of the data points to reference lines. In the scenario of FIG. 55B, for reference line 5535, a minimum difference between respective data points (data points sequentially between point 5520 and 5512) and reference line 5535 is determined. A candidate data point of the following distance data is identified, where a minimum difference between the candidate data point and the reference line 5535 is greater than a minimum difference between other data points being compared (sequential data points between points 5020 and 5012) and the reference line 5035. That is, a candidate data point of the following distance data between points 5520 and 5512 is identified which is the most different from the reference line 5535. In FIG. 55B, this candidate data point is labelled as point 5521, with the minimum difference between point 5521 and reference line 5535 illustrated by line 5536 (perpendicular to reference line 5535).

Following identification of candidate data point 5521, a determination is made as to whether the minimum difference between candidate data point 5521 and reference line 5535 exceeds a difference threshold. In FIG. 55B, a difference threshold is illustrated around reference line 5535, shown as threshold lines 5537 and 5538. As can be seen in FIG. 55B, candidate data point 5521 lies outside of threshold lines 5537 and 5538, and therefore the minimum difference is outside of the difference threshold. Consequently, candidate data point 5521 is selected as a select data point for inclusion in the simplified following distance data.

Further in the scenario of FIG. 55B, for reference line 5540 in FIG. 55B, a minimum difference between respective data points (data points sequentially between end point 5510 and point 5520) and reference line 5540 is determined.

Further, a candidate data point of the following distance data is identified, where a minimum difference between the candidate data point and the reference line 5540 is greater than a minimum difference between other data points being compared (sequential data points between points 5510 and 5520) and the reference line 5540. That is, a candidate data point of the following distance data between points 5510 and 5520 is determined which is the most different from the reference line 5540. In FIG. 55B, this candidate data point is labelled as candidate data point 5522, with the minimum difference between candidate data point 5522 and reference line 5540 illustrated by line 5541 (perpendicular to reference line 5540).

Following determination of point 5522, a determination is made as the whether the minimum difference between point 5522 and reference line 5540 exceeds a difference threshold. In FIG. 55B, a difference threshold is illustrated around reference line 5540, shown as threshold lines 5542 and 5543. As can be seen in FIG. 55B, candidate data point 5522 lies outside of threshold lines 5542 and 5543, and therefore the difference is outside of the difference threshold. Consequently, candidate data point 5522 is selected as a select data point for inclusion in the simplified following distance data.

Figure 55C:
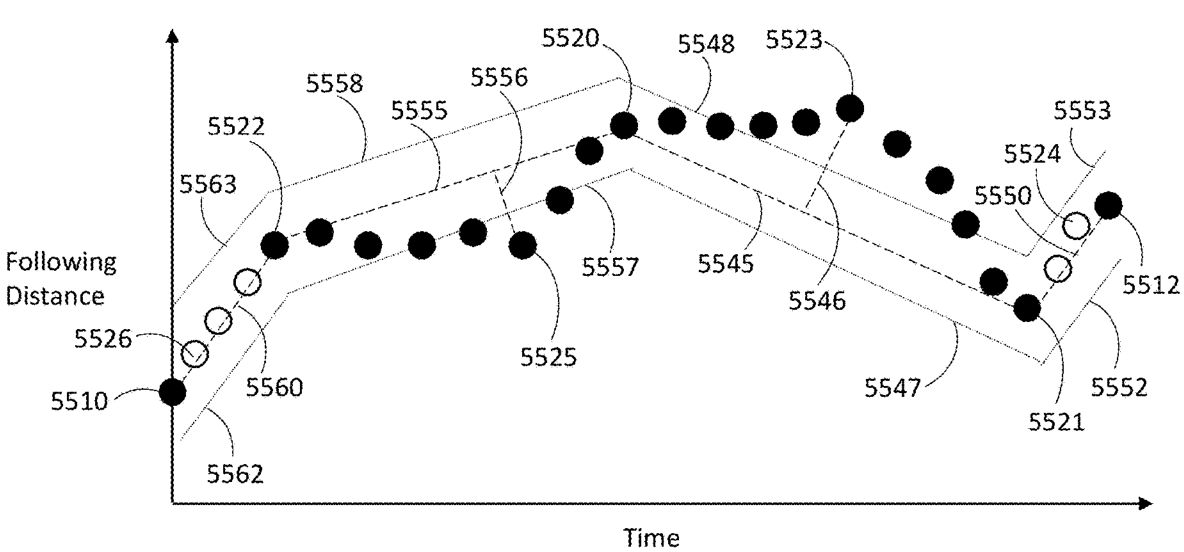

Further, the iteratively-defined reference lines are updated to include reference lines which intersect select data points 5521 and 5522, as is shown in FIG. 55C.

FIG. 55C illustrates the following distance data shown in FIG. 55A. In FIG. 55C, a reference line 5545 is defined between point 5520 and point 5521 of the following distance data. Further in FIG. 55C, a reference line 5550 is defined between point 1021 and end point 1012 of the following distance data. Further still in FIG. 55C, a reference line 5555 is defined between point 5522 and point 5520 of the following distance data. Further still in FIG. 55C, a reference line 5560 is defined between end point 5510 and point 5522 of the following distance data. In the example of FIGS. 55A-55D, reference lines 5545, 5550, 5555, and 5560 are fourth, fifth, sixth, and seventh reference lines of the set of iteratively-defined reference lines as mentioned above.

As mentioned earlier, the simplified following distance data is generated by selecting data points from the following distance data, based on differences of the data points to reference lines. In the scenario of FIG. 55C, for reference line 5545, a minimum difference between respective data points (data points sequentially between point 5520 and point 5521) and reference line 5545 is determined.

Further, a candidate data point of the following distance data is identified, where a minimum difference between the candidate data point and the reference line 5545 is greater than a minimum difference between other data points being compared (sequential points between points 5520 and 5521) and the reference line 5545. That is, a candidate data point of the following distance data between points 5520 and 5521 is identified which is the most different from the reference line 5545. In FIG. 55C, this candidate data point is labelled as candidate data point 5523, with a distance from reference line 5545 labelled as line 5546.

Following determination of candidate data point 5523, a determination is made as to whether the minimum difference between candidate data point 5523 and reference line 5545 exceeds a difference threshold. In FIG. 55C, a difference threshold is illustrated around reference line 5545, shown as threshold lines 5547 and 5548. As can be seen in FIG. 55C, candidate data point 5523 lies outside of threshold lines 5547 and 5548, and therefore the difference is greater than the difference threshold. Consequently, candidate data point 5523 is selected as a select data point for inclusion in the simplified following distance data.

Further in the scenario of FIG. 55C, for reference line 5550, a minimum difference between respective data points (data points sequentially between point 5521 and end point 5512) and reference line 5550 is determined.

A candidate data point of the following distance data is identified, where a minimum difference between the candidate data point and the reference line 5550 is greater than a minimum difference between other data points being compared (sequential points between points 5521 and 5512) and the reference line 5550. That is, a candidate data point of the following distance data between points 5521 and 5512 is identified which is the most different from the reference line 5550. In FIG. 55C, this candidate data point is labelled as candidate data point 5524.

Following determination of candidate data point 5524, a determination is made as the whether the minimum difference between candidate data point 5524 and reference line 5550 exceeds a difference threshold. In FIG. 55C, a difference threshold is illustrated around reference line 5550, shown as threshold lines 5552 and 5553. As can be seen in FIG. 55C, candidate data point 5524 lies within threshold lines 5552 and 5553, and therefore the difference is within the difference threshold. Consequently, candidate data point 5524 is not selected for inclusion in the simplified following distance data. Further, because candidate data point 5524 is the most different point from reference line 5550 between points 5521 and 5512, every other point between points 5521 and 5512 is also within the difference threshold illustrated by threshold lines 5552 and 5553. Consequently, every point between points 5521 and 5512 is not selected for inclusion in the simplified following distance data. This is shown in FIG. 55C with these points being illustrated in white.

Further in the scenario of FIG. 55C, for reference line 5555, a minimum difference between respective data points (data points sequentially between points 5522 and point 5520) and reference line 5555 is determined.

Further, a candidate data point of the following distance data is identified, where a minimum difference between the candidate data point and the reference line 5555 is greater than a minimum difference between other data points being compared (sequential points between points 5522 and 5520) and the reference line 5555. That is, a candidate data point of the following distance data between points 5522 and 5520 is identified which is the most different from the reference line 5555. In FIG. 55C, this data point is labelled as candidate data point 5525, with a distance from reference line 5555 labelled as line 5556.

Following determination of candidate data point 5525, a determination is made as to whether the minimum difference between candidate data point 5525 and reference line 5555 exceeds a difference threshold. In FIG. 55C, a difference threshold is illustrated around reference line 5555, shown as threshold lines 5557 and 5558. As can be seen in FIG. 55C, candidate data point 5525 lies outside of threshold lines 5557 and 5558, and therefore the difference is greater than the difference threshold. Consequently, candidate data point 5525 is selected as a select data point for inclusion in the simplified following distance data.

Further in the scenario of FIG. 55C, for reference line 5560, a minimum difference between respective data points (data points sequentially between point 5510 and point 5522) and reference line 5560 is determined.

A candidate data point of the following distance data is identified, where a minimum difference between the candidate data point and the reference line 5560 is greater than a minimum difference between other data points being compared (sequential points between points 5510 and 5522) and the reference line 5560. That is, a data point of the following distance data between points 5510 and 5522 is identified which is the most different from the reference line 5560. In FIG. 55C, this data point is labelled as candidate data point 5526.

Following determination of candidate data point 5526, a determination is made as the whether the minimum difference between candidate data point 5526 and reference line 5560 exceeds a difference threshold. In FIG. 55C, a difference threshold is illustrated around reference line 5560, shown as threshold lines 5562 and 5563. As can be seen in FIG. 55C, candidate data point 5526 lies within threshold lines 5562 and 5563, and therefore the difference is within the difference threshold. Consequently, candidate data point 5526 is not selected for inclusion in the simplified following distance data. Further, because candidate data point 5526 is the most different point from reference line 5560 between points 5510 and 5522, every other point between points 5510 and 5522 is also within the difference threshold illustrated by threshold lines 5562 and 5563. Consequently, every point between points 5510 and 5522 is not selected for inclusion in the simplified following distance data. This is shown in FIG. 55C with these points being illustrated in white.

Figure 55D:
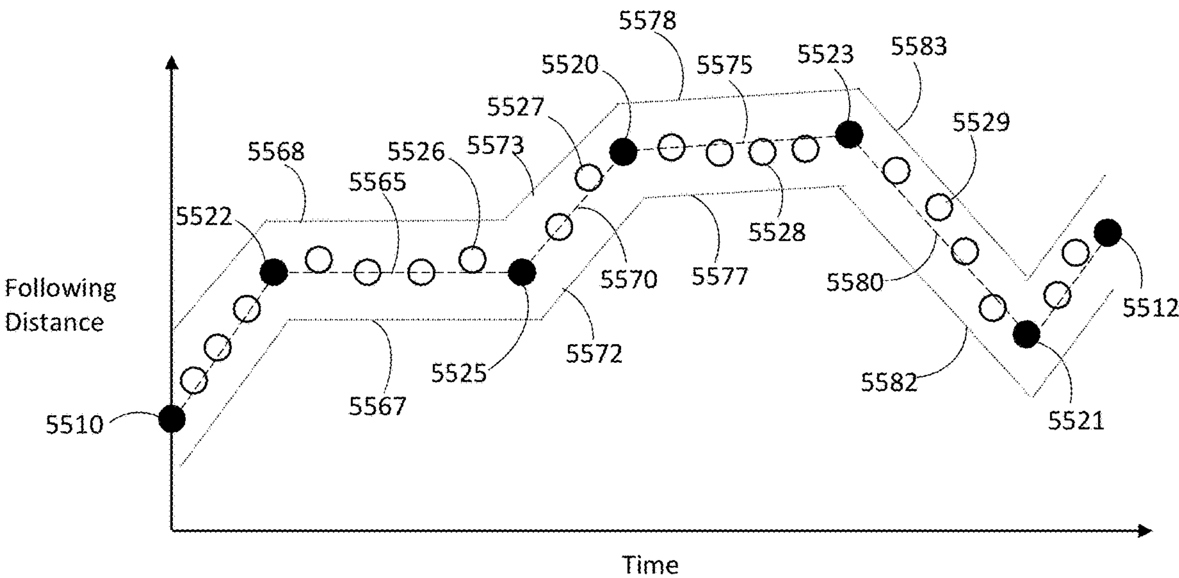

Further, the iteratively-defined reference lines are updated to include reference lines which intersect select data points 5525 and 5523, as is shown in FIG. 55D.

FIG. 55D illustrates the following distance data shown in FIG. 55A. In FIG. 55D, a reference line 5565 is defined between select data point 5522 and select data point 5525 of the following distance data. Further in FIG. 55D, a reference line 5570 is defined between select data point 5525 and select data point 5520 of the following distance data. Further still in FIG. 55D, a reference line 5575 is defined between select data point 5520 and select data point 5523 of the following distance data. Further still in FIG. 55D, a reference line 5580 is defined between select data point 5523 and select data point 5521 of the following distance data. In the example of FIGS. 55A-55D, reference lines 5565, 5570, 5575, and 5580 are eight, ninth, tenth, and eleventh reference lines of the set of iteratively-defined reference lines as mentioned above.

As mentioned earlier, the simplified following distance data is generated by selecting data points from the following distance data, based on differences of the data points to reference lines. In the scenario of FIG. 55D, for reference line 5565, a minimum difference between respective data points (data points sequentially between points 5522 and 5525) and reference line 5565 is determined.

Further, a candidate data point of the following distance data is identified, where a minimum difference between the candidate data point and the reference line 5565 is greater than a minimum difference between other data points being compared (sequential points between points 5522 and 5525) and the reference line 5565. That is, a candidate data point of the following distance data between select data points 5522 and 5525 is identified which is the most different from the reference line 5565. In FIG. 55D, this candidate data point is labelled as point 5526.

Following identification of candidate data point 5526, a determination is made as the whether the minimum difference between candidate data point 5526 and reference line 5565 exceeds a difference threshold. In FIG. 55D, a difference threshold is illustrated around reference line 5565, shown as threshold lines 5567 and 5568. As can be seen in FIG. 55D, candidate data point 5526 lies within threshold lines 5567 and 5568, and therefore the difference is within the difference threshold. Consequently, candidate data point 5526 is not selected for inclusion in the simplified following distance data. Further, because candidate data point 5526 is the most different point from reference line 5565 between points 5522 and 5525, every other point between points 5522 and 5525 is also within the difference threshold illustrated by threshold lines 5567 and 5568. Consequently, every point between points 5522 and 5525 is not selected for inclusion in the following distance data. This is shown in FIG. 55D with these points being illustrated in white.

Further in the scenario of FIG. 55D, for reference line 5570 in FIG. 55D, a candidate data point of the following distance data is identified, where a minimum difference between the candidate data point and the reference line 5570 is greater than a minimum difference between other data points being compared (sequential points between points 5525 and 5520) and the reference line 5570. That is, a candidate data point of the following distance data between select data points 5525 and 5520 is identified which is the most different from the reference line 5570. In FIG. 55D, this candidate data point is labelled as candidate data point 5527.

Following identification of candidate data point 5527, a determination is made as to whether the minimum difference between candidate data point 5527 and reference line 5570 exceeds a difference threshold. In FIG. 55D, a difference threshold is illustrated around reference line 5570, shown as threshold lines 5572 and 5573. As can be seen in FIG. 55D, candidate data point 5527 lies within threshold lines 5572 and 5573, and therefore the difference is within the difference threshold. Consequently, candidate data point 5527 is not selected for inclusion in the simplified following distance data. Further, because candidate data point 5527 is the most different point from reference line 5570 between points 5525 and 5520, every other point between points 5525 and 5520 is also within the difference threshold illustrated by threshold lines 5572 and 5573. Consequently, every point between points 5525 and 5520 is not selected for inclusion in the simplified following distance data. This is shown in FIG. 55D with these points being illustrated in white.

Further in the scenario of FIG. 55D, for reference line 5575 in FIG. 55D, a candidate data point of the following distance data is identified, where a minimum difference between the candidate data point and the reference line 5575 is greater than a minimum difference between other data points being compared (sequential points between points 5520 and 5523) and the reference line 5575. That is, a candidate data point of the following distance data between points 5520 and 5523 is identified which is the most different from the reference line 5575. In FIG. 55D, this candidate data point is labelled as candidate data point 5528.

Following identification of candidate data point 5528, a determination is made as to whether the minimum difference between candidate data point 5528 and reference line 5575 exceeds a difference threshold. In FIG. 55D, a difference threshold is illustrated around reference line 5575, shown as threshold lines 5577 and 5578. As can be seen in FIG. 55D, candidate data point 5528 lies within threshold lines 5577 and 5578, and therefore the difference is within the difference threshold. Consequently, candidate data point 5528 is not selected for inclusion in the simplified following distance data. Further, because candidate data point 5528 is the most different point from reference line 5575 between points 5520 and 5523, every other point between points 5520 and 5523 is also within the difference threshold illustrated by threshold lines 5577 and 5578. Consequently, every point between points 5520 and 5523 is not selected for inclusion in the simplified following distance data. This is shown in FIG. 55D with these points being illustrated in white.

Further in the scenario of FIG. 55D, for reference line 5580 in FIG. 55D, a candidate data point of the following distance data is identified, where a minimum difference between the candidate data point and the reference line 5580 is greater than a minimum difference between other data points being compared (sequential points between points 5523 and 5521) and the reference line 5580. That is, a candidate data point of the following distance data between points 5523 and 5521 is identified which is the most different from the reference line 5580. In FIG. 55D, this candidate data point is labelled as candidate data point 5529.

Following identification of candidate data point 5529, a determination is made as to whether the minimum difference between candidate data point 5529 and reference line 5580 exceeds a difference threshold. In FIG. 55D, a difference threshold is illustrated around reference line 5580, shown as threshold lines 5582 and 5583. As can be seen in FIG. 55D, candidate data point 5529 lies within threshold lines 5582 and 5583, and therefore the difference is within the difference threshold. Consequently, candidate data point 5529 is not selected for inclusion in the simplified following distance data. Further, because candidate data point 5529 is the most different point from reference line 5580 between points 5523 and 5521, every other point between points 5523 and 5521 is also within the difference threshold illustrated by threshold lines 5582 and 5583. Consequently, every point between points 5523 and 5521 is not selected for inclusion in the simplified following distance data. This is shown in FIG. 55D with these points being illustrated in white.

In FIG. 55D, the following distance data has been reduced to select data points which indicate end points of respective reference lines. That is, in FIG. 55D, the following distance data has been reduced from 26 data points to 7 select data points. Reference lines 5560, 5565, 5570, 5575, 5580, and 5550 between these 7 select data points show a piece-wise following distance plot of the subject vehicle which approximates following distance for the subject vehicle (within the above discussed difference thresholds), while requiring significantly less data points to illustrate. In essence, the select data points 5510, 5522, 5525, 5520, 5523, 5521, and 5512 illustrate inflection points, where a fuel level of the vehicle begins to change significantly enough to be of note.

The process of simplification of following distance data discussed with reference to FIGS. 55A-55D can be referred to as "curve logging", and is discussed in significant detail in U.S. Pat. No. 11,022,444, the entirety of which is incorporated by reference herein.

Figure 56:
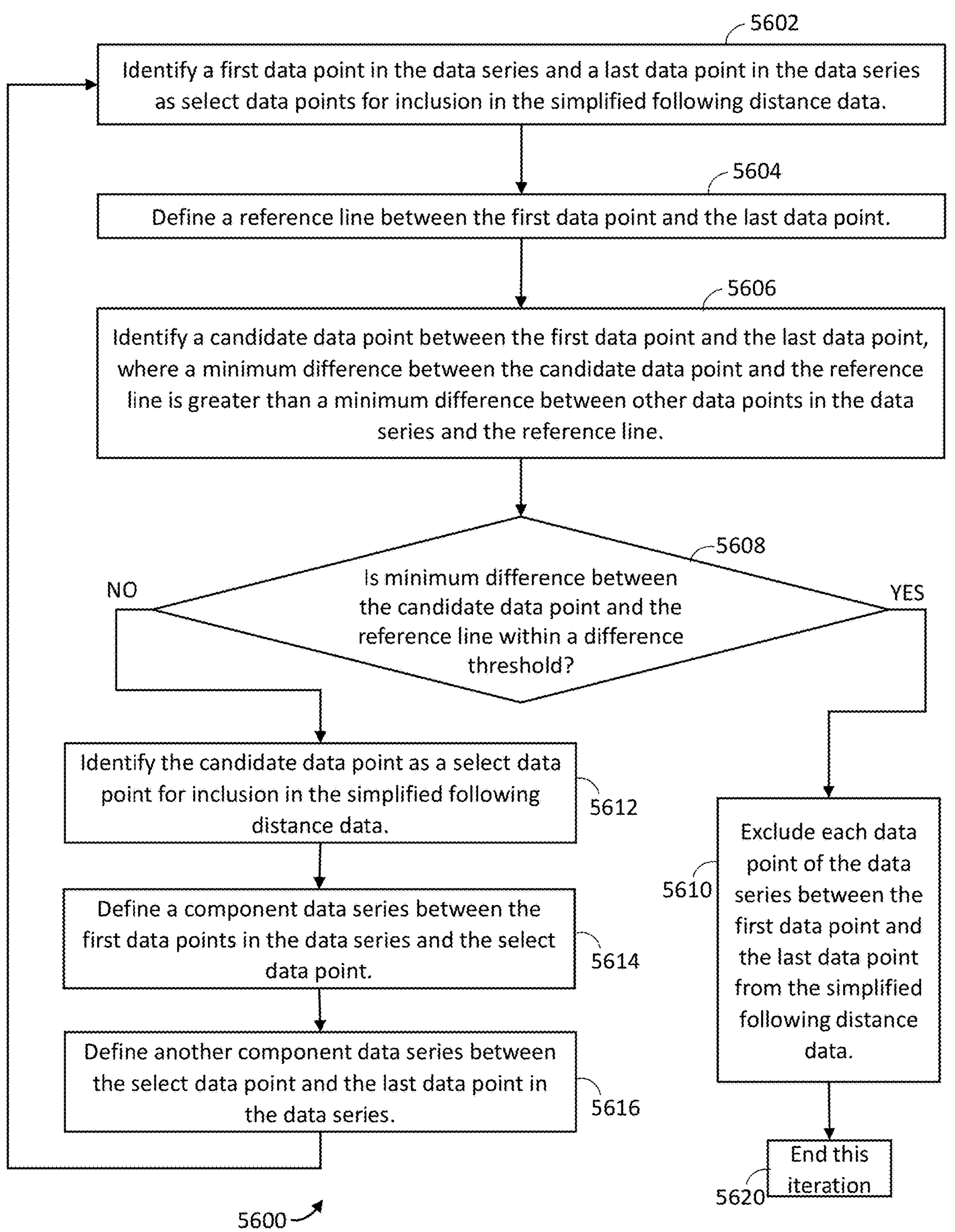
FIG. 56 is a flowchart diagram which illustrates a method for simplifying following distance data, in accordance with at least one exemplary implementation.

FIG. 56 is a flowchart diagram which illustrates an exemplary method 5600 for generating simplified following distance data as in act 5420 of method 5400. Method 5600 as illustrated includes acts 5602, 5604, 5606, 5608, 5610, 5612, 5614, 5616, and 5620. One skilled in the art will appreciate that additional acts could be added, acts could be removed, or acts could be reordered as appropriate for a given application. Acts of method 5600 can be performed by appropriate components of the systems or devices discussed earlier. In particular, acts of method 5600 can be performed by the same hardware which performs act 5420 in method 5400, discussed earlier and not repeated for brevity. Method 5600 as illustrated shows a detailed process by which the example simplification of FIG. 55A-55D can be performed.

The acts of method 5600 are performed for each data series in the following distance data, until all data points are within a distance threshold of a corresponding reference line. In this context, what is meant by "data series" is a sequence of data points, between a first chronological data point of the data series and a last chronological data point of the data series. The following distance data includes at least one data series of following distance data points. With reference to the example of FIGS. 55A-55D, the following distance data shown in FIG. 55A corresponds to a data series of following distance data, having a first chronological data point 5510 and a last chronological data point 5512. The method 5600 is recursive, in that a data series can be broken down into multiple "component data series", as discussed in detail later with reference to acts 5614 and 5616. Method 5600 is also performed for component data series defined from an original data series.

At 5602, a first data point in the data series and a last data point in the data series are identified as select data points for inclusion in the simplified following distance data. In a first iteration of method 5600, with reference to the example data series of FIG. 55A, data point 5510 (the first data point) and data point 5512 (the last data point) are identified for inclusion in the simplified following distance data.

At 5604, a reference line is defined the first data point and the last data point. In a first iteration of method 5600, with reference to the example data series of FIG. 55A, this is reference line 5530 between points 5510 and 5512.

At 5606, a candidate data point is identified between the first data point and the last data point. A minimum difference between the candidate data point and the reference line is greater than a minimum difference between other data points in the data series and the reference line. In a first iteration of method 5600, with reference to the example data series of FIG. 55A, the candidate data point is point 5520 as discussed earlier.

At 5608, a determination is made as to whether the minimum difference between the candidate data point and the reference line is within a difference threshold. If the minimum difference is within the difference threshold, the method proceeds to act 5610, where each data point of the data series between the first data point and the second data point is excluded from inclusion in the simplified following distance data (and eventually to act 5620, where the respective iteration is ended). In a first iteration of method 5600, with reference to the example data series of FIG. 55A, this is not the case. Rather, the candidate data point 5520 is outside the difference threshold as discussed earlier, and so method 5600 proceeds to act 5612.

At 5612, the candidate data point is identified as a select data point for inclusion in the simplified following distance data. In a first iteration of method 5600, with reference to the example data series of FIG. 55A, the candidate data point 5520 is identified as a select data point for inclusion in the simplified following distance data, as discussed earlier.

At 5614, a component data series is defined between the first data point in the data series and the select data point. In a first iteration of method 5600, with reference to the example data series of FIG. 55A, the component data series is defined as data points between point 5510 and 5520. At 5616, another component data series is defined between the select data point and the last data point in the data series. In a first iteration of method 5600, with reference to the example data series of FIG. 55A, the other component data series is defined as data points between point 5520 and 5512. The illustrated order of acts 5614 and 5616 can be changed as appropriate, or the acts can be performed together.

The component data series and the other component data series as defined in acts 5614 and 5616 are treated as data series in the context of method 5600, and thus method 5600 is iterated again for the component data series and the other component data series. This is illustrated by way of example in FIG. 55B (discussed in detail earlier). In particular, data points 5520 and 5512 are identified for inclusion in the simplified following distance data (per act 5602), reference line 5535 is defined between data points 5520 and 5512 (per act 5604), a candidate data point 5521 is identified (per act 5606), a minimum difference between the candidate data point 5521 and reference line 5535 is determined to be outside of a difference threshold (per act 5608), the candidate data point 5521 is identified as a select data point for inclusion in the simplified following distance data (per act 5612), a component data series is defined between the data point 5520 and data point 5521 (per act 5614), and another component data series is defined between the data point 55210 and data point 5512 (per act 5616). Further, data points 5510 and 5520 are identified for inclusion in the simplified following distance data (per act 5602), reference line 5540 is defined between data points 5510 and 5520 (per act 5604), a candidate data point 5522 is identified (per act 5606), a minimum difference between the candidate data point 5522 and reference line 5540 is determined to be outside of a difference threshold (per act 5608), the candidate data point 5522 is identified as a select data point for inclusion in the simplified following distance data (per act 5612), a component data series is defined between the data point 5510 and data point 5522 (per act 5614), and another component data series is defined between the data point 5522 and data point 5520 (per act 5616).

FIG. 56C discussed earlier illustrates further iterations of method 5600. FIG. 56C is already discussed in detail, and this discussion is not repeated for brevity. To summarize, however, in the iterations of FIG. 55C, data points from certain component series generated in the previous iteration are excluded from the simplified following distance data (namely, data points between point 5510 and 5522, and data points between point 5521 and 5512 are excluded, by virtue of being within the difference threshold per act 5608). After act 5610 is performed (based on the determination at 5608), the respective iteration is ended at 5620 without defining new component data series for that iteration. However, method 5600 is iterated for each data series or component data series. Consequently, in the example of FIG. 56D, further component data series are still defined in accordance with acts 5614 and 5616, due to iterations of other previously defined component data series. In particular, new component data series between points 5222 and 5525; between points 5525 and 5520; between points 5520 and 5523; and between point 5523 and 5521 are defined.

FIG. 56D discussed earlier illustrates further iterations of method 5600. FIG. 56D is already discussed in detail, and this discussion is not repeated for brevity. To summarize, however, in the iterations of FIG. 55D, data points from the component series generated in the previous iteration are excluded from the simplified following distance data (namely, data points between points 5522 and 5525, data points between points 5525 and 5520, data points between points 5520 and 5523, and data points between points 5523 and 5521 are excluded, by virtue of being within the difference threshold per act 5608). In FIG. 56D, all data series and component data series are resolved, such that all data points in each data series are within a distance threshold of a corresponding reference line. That is, for each data series and component data series, method 5600 proceeds through act 5610, and eventually act 5620 where each respective iteration is ended without defining further component data series. Consequently, recursion (iteration) is finished, and method 5600 is complete.

Following distance over time is a useful metric for evaluating driver behavior over time, and taking appropriate action based thereon. In particular, a driver can be associated with a vehicle or vehicles over time, and a following distance record can be established for the driver. In an example, a driver may consistently leave significant and safe following distance from lead vehicles, and thus may not trigger tailgating warnings, and thus may not be flagged by an automated driver coaching system. Such a diligent record may be identified over time, and the driver may be rewarded or recognized for their excellent driving habits. In another example, a driver may historically leave significant and safe following distance from lead vehicles, but over time this following distance may decrease, even if no or few specific tailgating instances are identified (for example as discussed below with reference to FIG. 57). Regardless, consistent close following distance can lead to increased risk of tailgating situations, and so the Driver's trend towards reduced following distance can be identified and acted upon, for example by coaching or reminding the driver to increase following distance.

Figure 57:
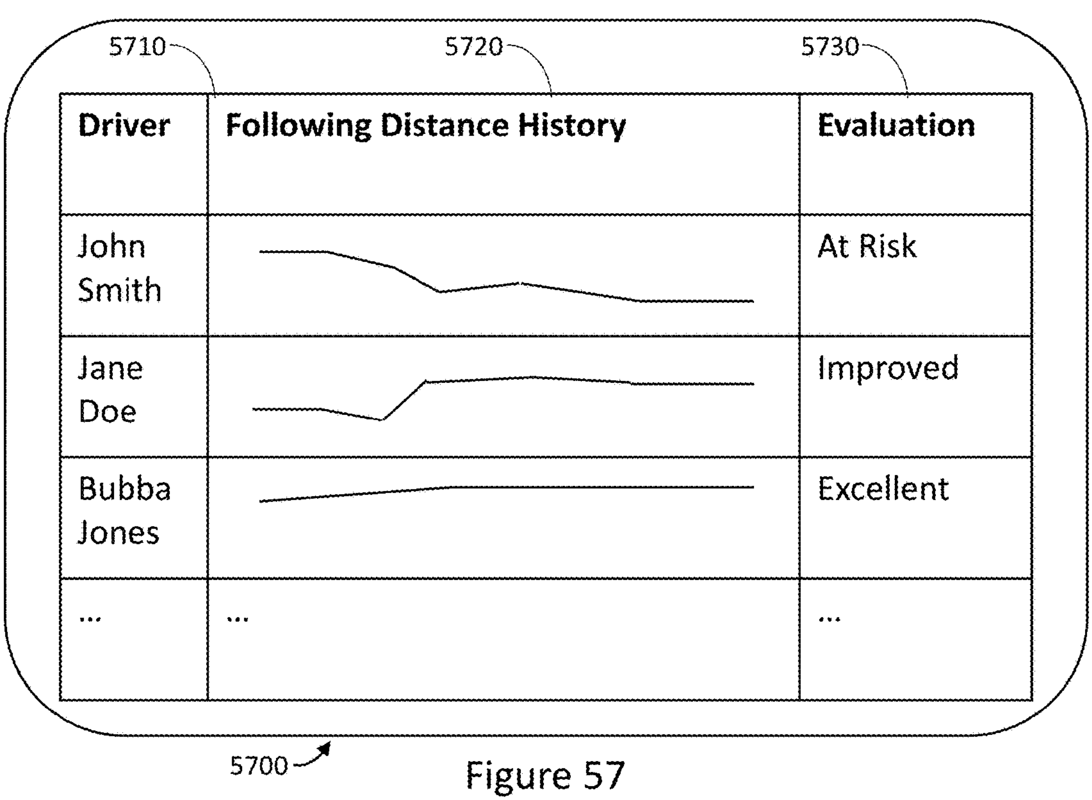
FIG. 57 is an exemplary user interface for presenting following distance information to a user, in accordance with at least one exemplary implementation.

FIG. 57 illustrates an exemplary user interface 5700, which shows an exemplary output from a device which collects following distance data from a plurality of vehicles (such as reported in method 5400). For example, user interface 5700 can be presented via a display of client device 104, or via a display of a device communicatively coupled to cloud server 106 or local server 118 (such as user device 300), which are discussed earlier with reference to FIGS. 1A 1B, and 3. User interface 5700 is shown as including a table with 3 columns 5710. 5720, and 5730.

In column 5710, a plurality of driver identifiers are listed. While three drivers are illustrated, any appropriate number of drivers can be listed. Further, any appropriate driver identifiers can be used, such as name, identification number or code, nickname, or any other identifier.

In column 5720, a respective following distance history for each driver is indicated. The respective following distance histories are based on following distance data (simplified or not simplified) as output for a plurality of vehicles, such as in accordance with act 5430 of method 5400. In the illustrated example, the respective following distance is indicated per driver. For example, each vehicle can be associated with a particular driver, such that following distance data for the vehicle indicates following distance for the driver. In other examples, drivers may not consistently use a single vehicle, in which cased following distance for vehicles can be compared (e.g. by at least one processor of a management device or user terminal) to a vehicle schedule, to compile following distance data per driver. In the illustrated example, following distance history is shown as a visual trend, but in alternative implementations following distance can be indicated in any appropriate way, such as numerically or with other visualizations like a bar graph.

In column 5730, an evaluation is indicated for each user, which can be used by an operator or manager to take appropriate action to optimize safety. In the illustrated example, while John Smith is shown in column 5720 to have previously maintained a high (safe) following distance, in recent times this following distance has decreased. John Smith is thus evaluated as being At Risk in column 5730. In response, corrective action can be taken, such as coaching, reminders, or training, to help John Smith return to former safe driving habits. Further in the illustrated example, Jane Doe is shown in column 5720 to have previously maintained a low (unsafe) following distance. However, Jane Doe's following distance habits improved after a previous coaching event (shown as a sudden increase in following distance in column 5720). Thus, Jane Doe's Evaluation in column 5730 is shown as having Improved. Jane Doe can be rewarded for this improvement. Further still in the illustrated example, Bubba Jones is shown in column 5720 to have consistently maintained a high (safe) following distance, in the past and as far as shown in the present data. Bubba Smith can be rewarded for excellent driving practices.

FIG. 57 thus illustrates a system, device, or interface which can be used for managing vehicles and drivers. The user interface 5700 of FIG. 57 is merely exemplary, and any appropriate user interface could be implemented as appropriate for a given application. Further, the specific details shown in interface 5700 are also exemplary, and any appropriate details could be added, removed, or changed as appropriate for a given application.

In some implementations, tailgating events can be identified based on the simplified following distance data output at 5430 in method 5400. In particular, for any (or for each) data point in the simplified following distance data, at least one processor (e.g. a processor at a management device or server where the simplified following distance data is received) can determine whether a respective physical distance between the subject vehicle and the other vehicle for the data point is within tailgating distance criteria. If the respective physical distance is outside of the tailgating distance criteria, the at least one processor identifies that the subject vehicle is not tailgating the other vehicle at a time corresponding to the data point (e.g. at a timestamp associated with the data point). On the other hand, if the tailgating criteria are met (e.g. such as whether the respective physical distance is within the tailgating distance criteria), the at least one processor identifies that the subject vehicle is tailgating the other vehicle at a time corresponding to the data point (e.g. at a timestamp associated with the data point).

Such determination of tailgating events and tailgating criteria are discussed earlier with reference to FIGS. 22 and 23. Discussion of FIGS. 22 and 23 is fully applicable here, and is not repeated for brevity. As previously discussed, tailgating criteria can include additional criteria beyond just tailgating distance criteria.

Data points where tailgating is identified can be logged, labelled, or otherwise flagged as tailgating events. In some implementations, in response to identification that the subject vehicle is tailgating the other vehicle, a tailgating indication is output. For example, an alert or notification can be presented which indicates the tailgating event (such as shown for example in FIG. 26). Such an indication can be output to a driver of the vehicle, so that the driver can take prompt corrective action, and/or such an indication can be output to a management device or server, so that a manager can perform driver evaluation or coaching, as discussed previously.

Identifying tailgating events based on the simplified following distance data generated at 5420 (as opposed to full following distance data generated at 5410) advantageously reduces processing burden associated with identifying tailgating events. In some implementations, identification of tailgating events as discussed above can be performed at (by at least one processor of) a vehicle device positioned at a vehicle, where processing resources tend to be particularly limited. In such implementations, outputting a tailgating indication by the vehicle device can entail transmitting the tailgating indication, by a communication interface of the vehicle device, to a remote management device or server. In other implementations, identification of tailgating events as discussed above can be performed remote from the vehicle device (e.g. at a management device or server which receives the simplified following distance data output at 5430). In this way, processing burden at the vehicle device can be further alleviated, and the management device or server can still reasonably identify tailgating events based on the simplified following distance data generated at 5420 without the transmission burden of transmitting the full following distance data generated at 5410.

Figure 58:
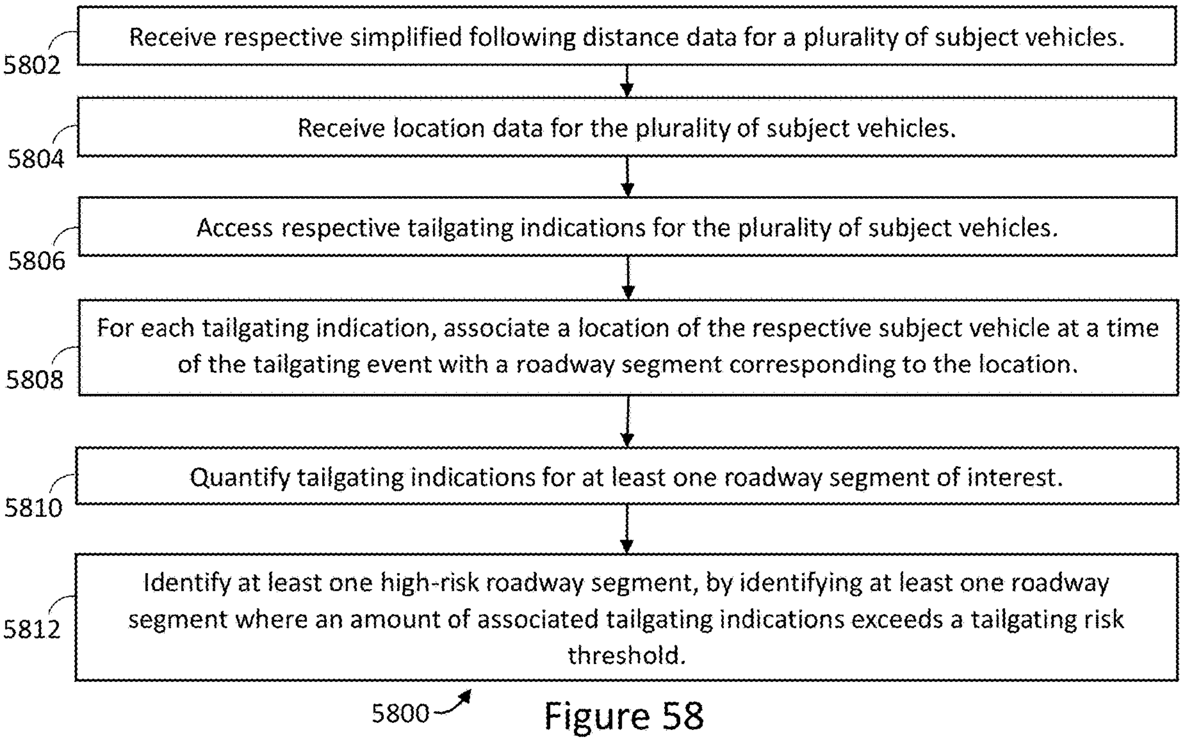
FIG. 58 is a flowchart diagram which illustrates a method for associating tailgating with roadway segments.

FIG. 58 is a flowchart diagram which illustrates an exemplary method 5800 for associating tailgating indications with roadway segments. Method 5800 as illustrated includes acts 5802, 5804, 5806, 5808, 5810, and 5812. One skilled in the art will appreciate that additional acts could be added, acts could be removed, or acts could be reordered as appropriate for a given application. Method 5800 as illustrated can follow method 5400 in FIG. 54. In particular, method 5400 in FIG. 54 is directed to generating simplified following distance data for a subject vehicle, and method 5800 is directed to receiving such following distance data from a plurality of subject vehicles and associating tailgating indications with roadway segments. In this regard, acts of method 5800 can be performed at a management device or server (such as any of client device 104, cloud server 106, or local server 118 discussed with reference to FIG. 1A or 1B).

At 5802, respective simplified following distance data is received for a plurality of subject vehicles. That is, for each subject vehicle in the plurality of subject vehicles, method 5400 in FIG. 54 is performed, with simplified following distance data being output for each subject vehicle at 5430. This following distance data for each subject vehicle is received at 5802 by a communication interface of a device which performs method 5800.

At 5804, location data is received by a communication interface for the plurality of subject vehicles. Such location data is captured by a location sensor positioned at each vehicle (e.g. as a location sensor integrated in each vehicle, or included in a telematics device installed to each vehicle, or any other appropriate implementation, such as location module 208 discussed earlier with reference to FIGS. 2A and 2B). The location data can be transmitted together with the simplified following distance data (e.g. as metadata indicating a location associated with each data point in the simplified following distance data), or can be transmitted as independent location data associated with time (e.g. each point of location data is paired with an indication of time at which the location data was captured).

At 5806, respective tailgating indications are accessed for the plurality of subject vehicles. Such tailgating indications can be generated as discussed above. In some implementations, tailgating indications for each subject vehicle are generated at each respective subject vehicle, and transmitted to the device performing method 5800. In such implementations, accessing the respective tailgating indications can comprise receiving the respective tailgating indications by a communication interface of the device performing method 5800. In some implementations, respective tailgating indications are determined or generated at the device performing method 5800. In such implementations, accessing the respective tailgating indications can comprise generating the respective tailgating indications by at least one processor of the device performing method 5800 as discussed earlier. In some implementations, tailgating indications for the plurality of vehicles (whether generated at vehicle devices or at a management device or server) can be stored at a non-transitory processor-readable storage medium (such as at a management device or server, or remote database accessible to the management device or server). In such implementations, accessing the respective tailgating indication at 5806 can comprise retrieving or otherwise accessing the stored tailgating indications.

At 5808, for each tailgating indication, the at least one processor associates a location of the respective subject vehicle (to which a given tailgating indication applies) at a time of the tailgating event indicated by the tailgating indication, with a roadway segment corresponding to the location. In this context, a roadway segment can refer to any appropriate delineation of a roadway where vehicles travel, such as an intersection, a section of road between intersections, a highway, a particular lane of a road, etcetera.

At 5810, the at least one processor quantifies tailgating indications for roadway segments of interest. For example, for each roadway segment of interest, the at least one processor can sum a total quantity of tailgating indications. As another example, for each roadway segment of interest, the at least one processor can determine a quantity of tailgating indications that pertain to a certain period of time. As yet another example, for each roadway segment of interest, the at least one processor can determine a rate of tailgating indications per unit of time (e.g. determine number of tailgating indications per hour, or any other appropriate unit of time).

Roadway segments of interest can be determined or indicated in any appropriate way. As one example, an operator can provide user input to the device performing method 5800 (e.g. using any appropriate hardware, such as that discussed with reference to FIG. 3, as a non-limiting example). Such user input can indicate one or more roadway segments of interest, for which the operator wants information regarding tailgating events. As another example, all roadway segments managed by a particular entity (e.g. a Municipality, road owner, or road management entity) can be included in roadway segments of interest. In such implementations, a database of roadway segments of interest can be stored in a non-transitory processor-readable storage medium accessible to the device performing method 5800.

At 5812, the at least one processor identifies at least one high-risk roadway segment. The at least one high-risk roadway segment is identified where an amount of associated tailgating indications exceeds a tailgating risk threshold. That is, tailgating events for the high-risk roadway segment are identified as occurring to a noteworthy extent. The tailgating risk threshold can comprise any appropriate metric as suitable for a given application. In some implementations, the tailgating risk threshold can comprise a threshold amount of tailgating events within a certain time period. For example, the tailgating risk threshold could comprise 50 tailgating events per calendar day. That is, for a particular roadway segment, if more than 50 tailgating indications are quantified in a given calendar day at 5810, the particular roadway segment is identified as a high-risk roadway segment (at least for the particular calendar day). In some other implementations, the tailgating risk threshold can comprise a threshold amount of tailgating events per unit of time. For example, the tailgating risk threshold could comprise 10 tailgating events per hour. That is, for a particular roadway segment, if more than 10 tailgating indications are quantified within any 60 minute period at 5810, the particular roadway segment is identified as a high-risk roadway segment.

Following distance data and tailgating indications may not be available for every vehicle which travels through a roadway segment of interest. For example, on public roads many vehicles may not collect or report following distance data, or may not be integrated with a system which collects such data. Consequently, quantification of tailgating indications as in act 5810 of method 5800 can be a representative quantification, based on available data. For example, if an estimated 10% of vehicles which travel through a roadway segment of interest collect and report following distance data and/or tailgating indications available to the device which performs method 5800, then a tailgating risk threshold can be adjusted under the assumption that ten times more vehicles actually travel through the roadway segment of interest. In such an example, tailgating events could be assumed to be ten times higher than as indicated by the tailgating indications available to the system which performs method 5800.

At least one indication of any identified high-risk roadway segments can be output, for example via a user interface to an operator or manager as shown in FIG. 59 discussed below.

Identification of high-risk roadway segments can be useful for a manager or other pertinent entities who determine, advise, and/or implement roadway changes and improvements. In particular, increased occurrence of tailgating in an area (compared to other areas or compared to historical tailgating occurrences) is a symptom of vehicle congestion and/or other impedances to smooth traffic flow, which in turn contribute to increased collisions or other dangerous situations. By identifying high-risk roadway segments, action can be taken to reduce risk in these roadway segments. For example, additional lanes could be added to a roadway segment to increase vehicle throughput, thereby reducing congestion and in turn reducing tailgating events. As another example, particular connections or relationships between roadway segments (e.g. intersections) may cause merging or intersecting traffic flows to impede vehicles. For example, an on-ramp to a highway may not be sufficiently long for some vehicles to accelerate to highway speed prior to merging into the flow of highway traffic. This can impede flow of the highway traffic and cause an increase in tailgating events. This could be addressed by increasing length of the on-ramp or increasing length of an acceleration lane adjacent the highway.

FIG. 59 illustrates an exemplary user interface for use in the context of method 5800 in FIG. 58 (and for use in the context of method 6000 in FIG. 60 discussed later). In particular, FIG. 59 illustrates a graphic 5900 where a roadway is displayed. The roadway in the illustrated example is a one-directional highway, having two lanes of travel 5910 and 5912. Traffic flow on the roadway is illustrated by arrows, with arrow thickness (line weight) representing quantity of vehicle flow through a particular roadway segment. Each individual arrow is not labelled to reduce clutter. The roadway also includes an on-ramp 5920 where vehicles merge into lane 5912, and an off-ramp 5930 where vehicles exit lane 5912. Three roadway segments are labelled by dashed boxes, including roadway segment 5950 leading up to where vehicles merge into lane 5912 from on-ramp 5920, roadway segment 5952 where vehicles merge into lane 5912 from on-ramp 5920 until vehicles exit lane 5912 via off-ramp 5930, and roadway segment 5954 after vehicles exit lane 5912 via off-ramp 5930. On-ramp 5920 and off-ramp 5930 can also be considered as respective roadway segments, but are not expressly labelled as such to reduce clutter. In roadway segment 5950, vehicle flow in lanes 5910 and 5912 is relatively low or acceptable (tailgating events are within a tailgating risk threshold in the context of method 5800). In roadway segment 5952, vehicle flow in lane 5912 increases substantially due to vehicles entering lane 5912 via on-ramp 5920. This is shown by arrow 5940 being substantially thicker (higher line weight) than other arrows in FIG. 59. Additionally, in roadway segment 5952, vehicle flow in lane 5910 is also higher due to vehicles moving from lane 5912 to lane 5910 (to accommodate vehicles entering via on-ramp 5920). In roadway segment 5954, vehicles travelling through lanes 5910 and 5912 decreases (compared to roadway segment 5952) due to vehicles exiting at off-ramp 5930 (and vehicles transitioning back from lane 5910 to lane 5912).

In the example of FIG. 59, due to acceptable levels of vehicle flow in roadway segments 5950 and 5954, tailgating indications in these roadway segments are within a tailgating risk threshold in the context of act 5812 in method 5800. In contrast, in roadway segment 5952, vehicle flow is higher, resulting in a higher amount of tailgating indications, which (in this illustrative example) exceeds the tailgating risk threshold in the context of act 5812 in method 5800. As a result, roadway segment 5952 is identified as a high-risk roadway segment in act 5812 of method 5800. This identification can be presented to an operator of the device which presents the user interface of FIG. 59. For example, the identification can be indicated visually on graphic 5900 (such as by bolding, coloring, shading, or otherwise highlighting roadway segment 5952), can be indicated in a list format with other high-risk road segments, can be presented via an alert or notification (with an example text-based alert 5990 shown in FIG. 59), or can be presented via any other appropriate presentation (including other formats such as audio).

FIG. 60 is a flowchart diagram which illustrates an exemplary method 6000 for associating following distance with roadway segments. Method 6000 as illustrated includes acts 6002, 6004, 6006, and 6008. One skilled in the art will appreciate that additional acts could be added, acts could be removed, or acts could be reordered as appropriate for a given application. Method 6000 as illustrated can follow method 5400 in FIG. 54. In particular, method 5400 in FIG. 54 is directed to generating simplified following distance data for a subject vehicle, and method 6000 is directed to receiving such following distance data from a plurality of subject vehicles and associating following distance with roadway segments. In this regard, acts of method 6000 can be performed at a management device or server (such as any of client device 104, cloud server 106, or local server 118 discussed with reference to FIG. 1A or 1B).

At 6002, respective simplified following distance data is received for a plurality of subject vehicles. That is, for each subject vehicle in the plurality of subject vehicles, method 5400 in FIG. 54 is performed, with simplified following distance data being output for each subject vehicle at 5430. This following distance data for each subject vehicle is received at 6002 by a communication interface of a device which performs method 6000.

At 6004, location data is received by a communication interface for the plurality of subject vehicles. Such location data is captured by a location sensor positioned at each vehicle (e.g. as a location sensor integrated in each vehicle, or included in a telematics device installed to each vehicle, or any other appropriate implementation such as location module 208 discussed earlier with reference to FIGS. 2A and 2B). The location data can be transmitted together with the simplified following distance data (e.g. as metadata indicating a location associated with each data point in the simplified following distance data), or can be transmitted as independent location data associated with time (e.g. each point of location data is paired with an indication of time at which the location data was captured).

At 6006, for each data point in the simplified following distance data for each subject vehicle of the plurality of subject vehicles, the at least one processor of the device which performs method 6000 associates a location of the respective subject vehicle at a respective time of the data point with a roadway segment corresponding to the location of the respective subject vehicle at the respective time. That is, location, time and following distance for each data point and each subject vehicle are associated, thus representing a dataset indicative of following distance by vehicles across locations and times. Similarly to as discussed earlier, a roadway segment can refer to any appropriate delineation of a roadway where vehicles travel, such as an intersection, a section of road between intersections, a highway, a particular lane of a road, etcetera.

At 6008, the at least one processor of the device which performs method 6000 quantifies following distance for the plurality of vehicles for at least one roadway segment of interest. For example, for each roadway segment of interest, the at least one processor can determine an average or median following distance by subject vehicles of the plurality of subject vehicles which pass through the roadway segment of interest. As another example, for each roadway segment of interest, the at least one processor can determine an average or median following distance by subject vehicles of the plurality of subject vehicles which pass through the roadway segment of interest, within a certain period of time. As yet another example, for each roadway segment of interest, the at least one processor can determine a quantity of time that subject vehicles which pass through the region of interest spend at a following distance below a safe following distance threshold.

Roadway segments of interest can be determined or indicated in any appropriate way, similarly to as discussed above regarding method 5800 in FIG. 58 and not repeated for brevity.

Optionally, the at least one processor can identify at least one high-risk roadway segment. For example, the at least one high-risk roadway segment can be identified as high-risk when a following distance for the plurality of subject vehicles as quantified at 6008 is below a safe following distance threshold. That is, following distance is determined (on average or cumulatively) to be unsafe, and consequently the roadway segment is identified as high-risk. The safe following distance threshold can comprise any appropriate metric as suitable for a given application, such as those discussed earlier with reference to FIGS. 22 and 23.

Following distance as associated with roadway segments can be presented to a user in any appropriate manner. For example, a user interface akin to that shown in FIG. 59 can be presented (e.g. via a display of a device such as that discussed with reference to FIG. 3), which indicates following distance for roadway segments. For example, roadway segments 5950, 5952, and 5954 can be color-coded, labelled with text, or with any other appropriate indication, to indicate smaller following distance (or following distance being below a safe following distance threshold) in roadway segment 5952 compared to roadway segments 5950 and 5954. As another example, a notification or alert can be presented or sent, similar to alert 5990 which indicates roadway segments where following distance is determined as being below a safe following distance threshold. As yet another example, a table of roadway segments of interest can be presented, with indications of following distance presented for each roadway segment of interest. As yet another example, an alert can be presented to drivers who are entering or will enter a high-risk roadway segment (e.g. via output interface 218 in FIG. 2A or 2B). Such an alert can prompt drivers to drive extra cautiously, or increase following distance, for the high-risk roadway segment.

While the present invention has been described with respect to the non-limiting embodiments, it is to be understood that the invention is not limited to the disclosed embodiments. Persons skilled in the art understand that the disclosed invention is intended to cover various modifications and equivalent arrangements included within the scope of the appended claims. Thus, the present invention should not be limited by any of the described embodiments.

Throughout this specification and the appended claims, infinitive verb forms are often used, such as "to operate" or "to couple". Unless context dictates otherwise, such infinitive verb forms are used in an open and inclusive manner, such as "to at least operate" or "to at least couple".

The Drawings are not necessarily to scale and may be illustrated by phantom lines, diagrammatic representations, and fragmentary views. In certain instances, details that are not necessary for an understanding of the exemplary embodiments or that render other details difficult to perceive may have been omitted.

The specification includes various implementations in the form of block diagrams, schematics, and flowcharts. A person of skill in the art will appreciate that any function or operation within such block diagrams, schematics, and flowcharts can be implemented by a wide range of hardware, software, firmware, or combination thereof. As non-limiting examples, the various embodiments herein can be implemented in one or more of: application-specific integrated circuits (ASICs), standard integrated circuits (ICs), programmable logic devices (PLDs), field-programmable gate arrays (FPGAs), computer programs executed by any number of computers or processors, programs executed by one or more control units or processor units, firmware, or any combination thereof.

The disclosure includes descriptions of several processors. Said processors can be implemented as any hardware capable of processing data, such as application-specific integrated circuits (ASICs), standard integrated circuits (ICs), programmable logic devices (PLDs), field-programmable gate arrays (FPGAs), logic circuits, or any other appropriate hardware. The disclosure also includes descriptions of several non-transitory processor-readable storage mediums. Said non-transitory processor-readable storage mediums can be implemented as any hardware capable of storing data, such as magnetic drives, flash drives, RAM, or any other appropriate data storage hardware. Further, mention of data or information being stored at a device generally refers to the data information being stored at a non-transitory processor-readable storage medium of said device.

What is claimed is:

1. A method for generating following distance data over time for a subject vehicle, the method comprising:

- accessing a set of images, each image of the set of images being from a perspective of the subject vehicle and including a respective representation of another vehicle positioned in front of the subject vehicle, and each image of the set of images being associated with a respective time;
- generating following distance data based on at least a subset of images in the set of images, comprising:
  - for each image in the subset of images, determining a respective physical distance between the subject vehicle and the other vehicle; and
  - compiling the following distance data over time as a plurality of following distance data points, each following distance data point representing the determined physical distance for a respective image in the subset of images and the time associated with the respective image in the subset of images;
- generating simplified following distance data, comprising:
  - identifying select data points from the following distance data for inclusion in the simplified following distance data, based on differences between the data points and iteratively-defined reference lines through portions of the following distance data; and
  - compiling the select data points as the simplified following distance data, excluding data points which are not identified as select data points; and
- outputting the simplified following distance data.

2. The method of claim 1, wherein identifying select data points from the following distance data for inclusion in the simplified following distance data, based on differences between the data points and iteratively-defined reference lines through portions of the following distance data, comprises, for each data point of the following distance data:

- determining a minimum difference between the data point and a corresponding reference line of the iteratively-defined reference lines; and identifying the data point as a select data point if the minimum difference between the data point and the corresponding reference line exceeds a difference threshold.

3. The method of claim 1, wherein identifying select data points from the following distance data for inclusion in the simplified following distance data, based on differences between the data points and iteratively-defined reference lines through portions of the following distance data, comprises:

defining a reference line through the following distance data;

identifying a candidate data point of the following distance data, where a minimum difference between the candidate data point and the reference line is greater than a minimum difference between other data points and the reference line; and if the minimum difference between the candidate data point and the reference line exceeds a difference threshold:

identifying the candidate data point as a select data point for inclusion in the simplified following distance data; and defining new reference lines which intersect the candidate data point through the following distance data.

4. The method of claim 3, wherein identifying select data points from the following distance data for inclusion in the simplified following distance data, based on differences between the data points and iteratively-defined reference lines through portions of the following distance data, further comprises:

defining an additional reference line through the following distance data which intersects a select data point previously identified for inclusion in the simplified following distance data;

identifying an additional candidate data point of the following distance data, where a minimum difference between the additional candidate data point and the additional reference line is greater than a minimum difference between other data points and the additional reference line; and if the minimum difference between the additional candidate data point and the additional reference line exceeds the difference threshold: identifying the additional candidate data point as an additional select data point for inclusion in the simplified following distance data.

5. The method of claim 1, wherein:

the following distance data comprises at least one data series of following distance data points;

identifying select data points from the following distance data for inclusion in the simplified following distance data, based on differences between the data points and iteratively-defined reference lines through portions of the following distance data, comprises, for each data series in the following distance data, until all data points in each data series are within a distance threshold of a corresponding reference line:

identifying a first data point in the data series and a last data point in the data series as select data points for inclusion in the simplified following distance data;

defining a reference line between the first data point in the data series and the last data point in the data series;

identifying a candidate data point between the first data point in the data series and the last data point in the data series, where a minimum difference between the candidate data point and the reference line is greater than a minimum difference between other data points in the data series and the reference line;

if the minimum difference between the candidate data point and the reference line exceeds a difference threshold:

identifying the candidate data point as a select data point for inclusion in the simplified following distance data;

defining a component data series between the first data point in the data series and the candidate data point; and defining another component data series between the candidate data point and the last data point in the data series; and if the minimum difference between the candidate data point and the reference line exceeds a difference threshold:

excluding each data point of the data series between the first data point and the last data point from inclusion in the simplified following distance data.

6. The method of claim 1, further comprising:

accessing a plurality of images captured by an image capture device positioned at the subject vehicle; and identifying the set of images as images of the plurality of images which include another vehicle positioned in front of the subject vehicle.

7. The method of claim 1, further comprising:

accessing a plurality of images captured by an image capture device positioned at the subject vehicle; and identifying the set of images as images of the plurality of images which include another vehicle positioned in front of the subject vehicle and in a common lane of travel with the subject vehicle.

8. The method of claim 1, wherein, for each image in the subset of images, determining the respective physical distance between the subject vehicle and the other vehicle comprises: applying a following distance determination model to the respective image, the following distance determination model being a machine learning model trained based on minimization of a following distance loss function for a training set of images representing a respective lead vehicle from a perspective of a following vehicle associated with a label indicating following distance between the lead vehicle and the following vehicle.

9. The method of claim 1, wherein, for each image in the subset of images, determining the respective physical distance between the subject vehicle and the other vehicle comprises:

determining at least one image attribute based on a positional measure between the other vehicle as represented in the respective image and at least one boundary of the image; and applying a following distance determination model to determine a following distance based on the determined at least one image attribute.

10. The method of claim 1, wherein, for each image in the subset of images, determining the respective physical distance between the subject vehicle and the other vehicle comprises:

determining, by at least one processor, a first vertical position in the image representing a bottom of the other vehicle;

accessing, by the at least one processor, a second vertical position in the image representing a static physical distance from the subject vehicle;

determining a transformed first vertical position by applying, by the at least one processor, an image transformation matrix to the first vertical position;

determining a transformed second vertical position by applying, by the at least one processor, the image transformation matrix to the second vertical position;

determining an image distance between the transformed first vertical position and the transformed second vertical position; and determining the following distance as a physical distance between the other vehicle and the subject vehicle based on the determined image distance and the static physical distance.

11. The method of claim 1, wherein outputting the simplified following distance data comprises transmitting, by a communication interface positioned at the subject vehicle, the simplified following distance data to a device remote from the subject vehicle.

12. The method of claim 11, further comprising presenting, by a user interface of the device remote from the vehicle, at least a portion of the following distance data.

13. The method of claim 1, further comprising, for each data point in the simplified following distance data:

determining whether the respective physical distance between the subject vehicle and the other vehicle for the data point is within a tailgating distance criteria;

identifying that the subject vehicle is not tailgating the other vehicle at a time corresponding to the data point if the respective physical distance is outside of the tailgating distance criteria; and identifying that the subject vehicle is tailgating the other vehicle at a time corresponding to the data point if tailgating criteria are met, wherein the tailgating criteria includes the respective physical distance being within the tailgating distance criteria.

14. The method of claim 13, further comprising, in response to an identification that the subject vehicle is tailgating the other vehicle, outputting a tailgating indication.

15. The method of claim 14, wherein outputting the tailgating indication comprises transmitting the tailgating indication to a management device.

16. The method of claim 14, further comprising:

receiving, at a management device, respective simplified following distance data for a plurality of subject vehicles;

receiving, at the management device, location data for the plurality of subject vehicles;

accessing, by the management device, respective tailgating indications for the plurality of subject vehicles; and for each tailgating indication, associating a location of the respective subject vehicle as indicated in the location data, at a time of the tailgating indication, with a roadway segment corresponding to the location of the subject vehicle.

17. The method of claim 16, further comprising:

quantifying, by at least one processor of the management device, an amount of tailgating indications for at least one roadway segment of interest; and identifying, by the at least one processor of the management device, at least one high-risk roadway segment, by identifying at least one roadway segment where an amount of associated tailgating indications exceeds a tailgating risk threshold.

18. The method of claim 1, further comprising:

receiving, by a management device, respective simplified following distance data for a plurality of subject vehicles;

receiving, by the management device, respective location data for the plurality of subject vehicles;

for each data point in the simplified following distance data for each subject vehicle of the plurality of subject vehicles: associating a location of the respective subject vehicle at a respective time of the data point with a roadway segment corresponding to the location of the respective vehicle at the respective time; and quantifying following distance for the plurality of subject vehicles for at least one roadway segment of interest.

* * * * *